United States Patent [19]

Loshbough et al.

[11] 4,181,946
[45] Jan. 1, 1980

[54] DIGITAL SCALE

[75] Inventors: Richard C. Loshbough; Edward G. Pryor, both of Westerville, Ohio

[73] Assignee: Reliance Electric Company, Cleveland, Ohio

[21] Appl. No.: 828,041

[22] Filed: Aug. 25, 1977

[51] Int. Cl.² ..................... G01G 19/413; G06F 15/20
[52] U.S. Cl. .................................... 364/466; 177/25; 364/567
[58] Field of Search .................. 364/466, 567; 177/25, 177/210, 211; 235/92 WT

[56] References Cited

U.S. PATENT DOCUMENTS

| | | | |
|---|---|---|---|
| 3,692,129 | 9/1972 | Pratt et al. | 177/211 |
| 3,872,288 | 3/1975 | Sampey | 235/92 |
| 3,962,569 | 6/1976 | Loshbough et al. | 364/466 |
| 3,962,570 | 6/1976 | Loshbough et al. | 364/466 |
| 3,986,012 | 10/1976 | Loshbough et al. | 364/466 |
| 4,004,139 | 1/1977 | Hall | 364/466 |
| 4,008,776 | 2/1977 | Kushmuk | 177/210 |
| 4,041,289 | 8/1977 | Brosh et al. | 364/567 |

Primary Examiner—Felix D. Gruber
Attorney, Agent, or Firm—William Simpson; Roy F. Hollander

[57] ABSTRACT

The invention relates to a scale system which employs a microcomputer forming an integral part of the analog to digital conversion means in which the microcomputer controls the sequence of operations for performing the conversion, accumulates and stores digital data derived during the conversion of the analog signal and combines and processes that data to provide the digital output data resulting from the conversion, all in addition to performing other scale functions. The invention relates to an improved multicapacity weighing and computing digital scale in which switch means are provided to change the weight indication from pounds to kilograms and visa versa at any time either before or during a weighing operation. Provision is made to also convert all the weight limits and any stored tare weight. In addition, the unit price and total price or value display is either cleared or else converted from price per pound to price per kilogram and the total price recomputed.

19 Claims, 42 Drawing Figures

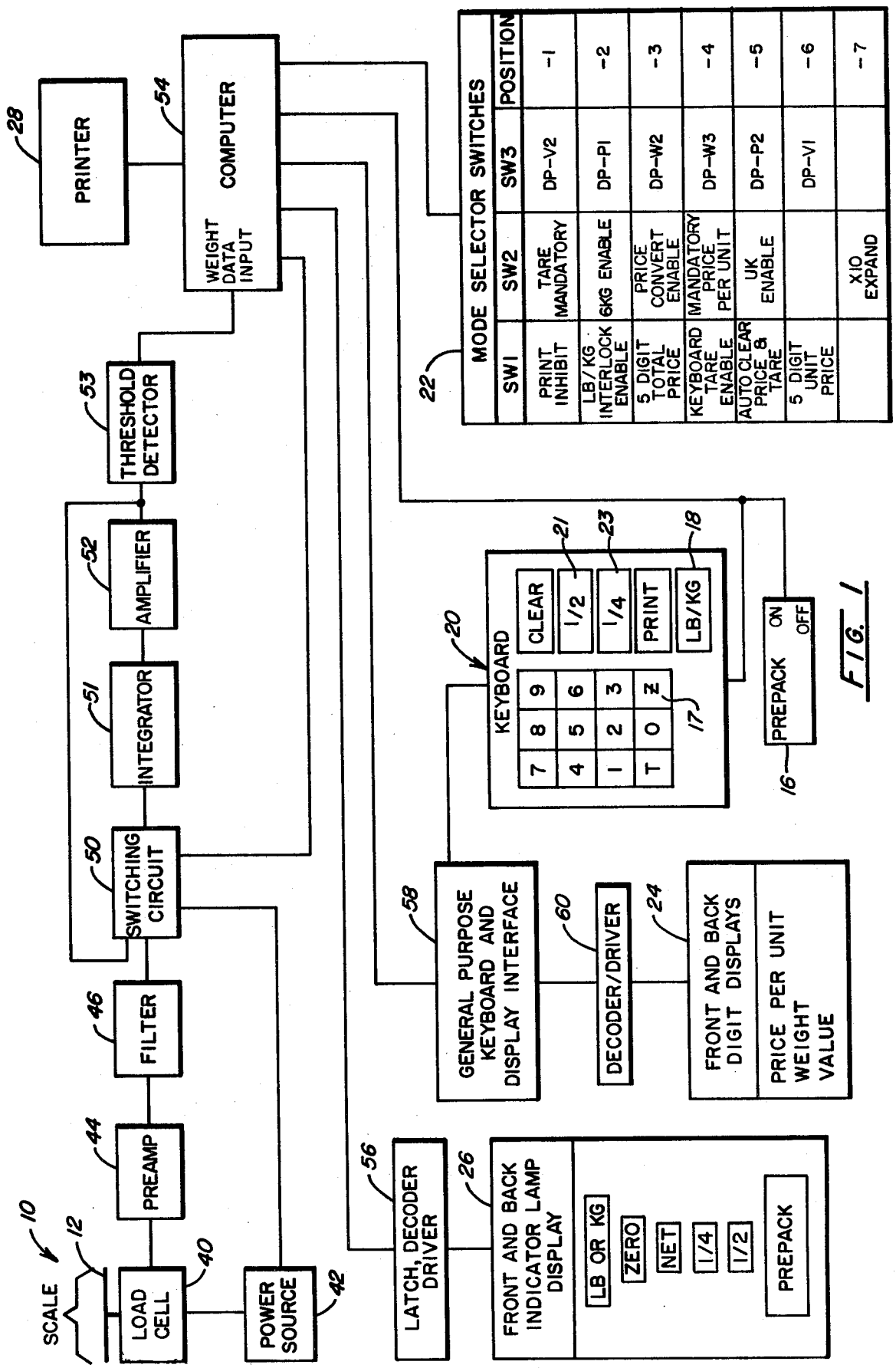

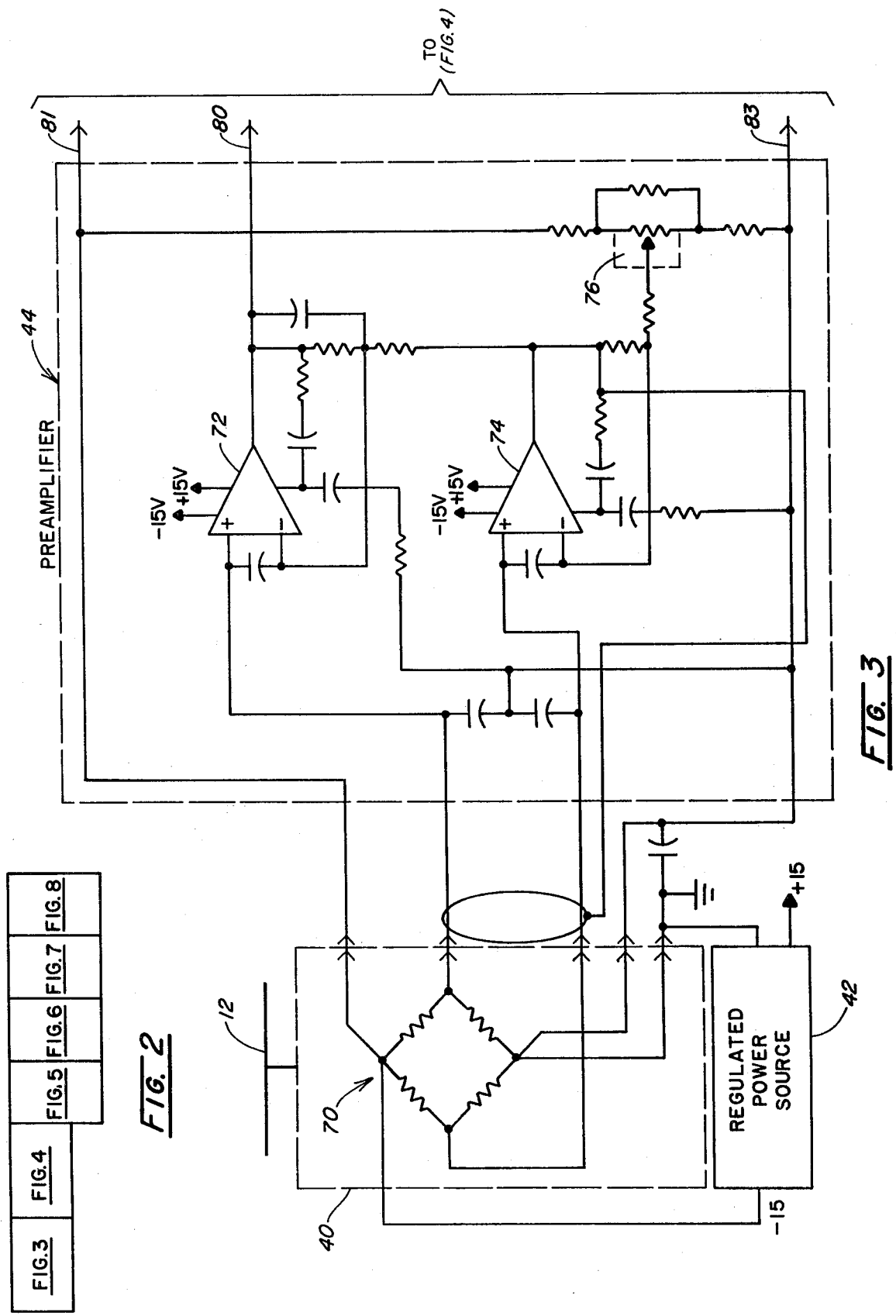

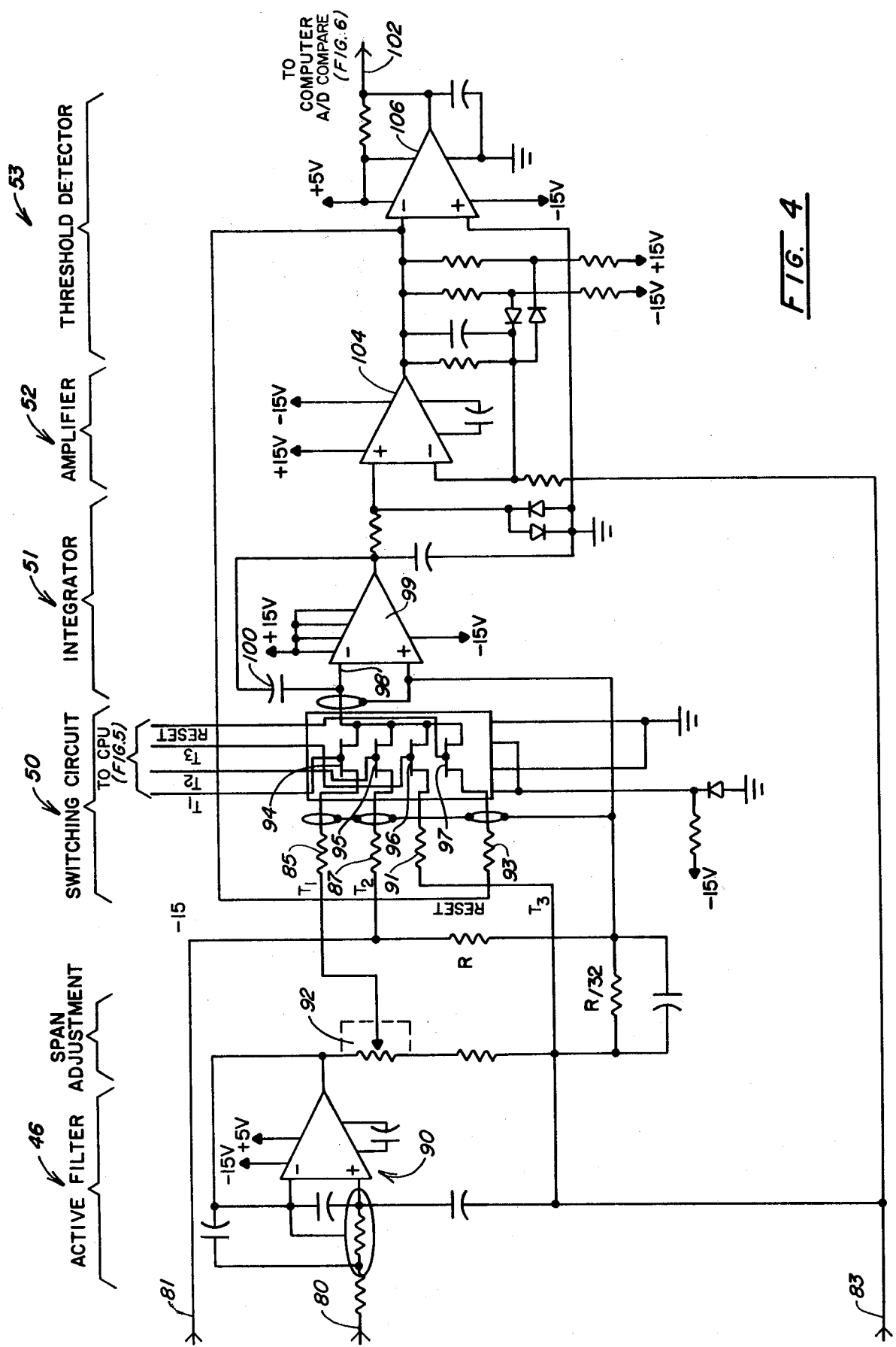

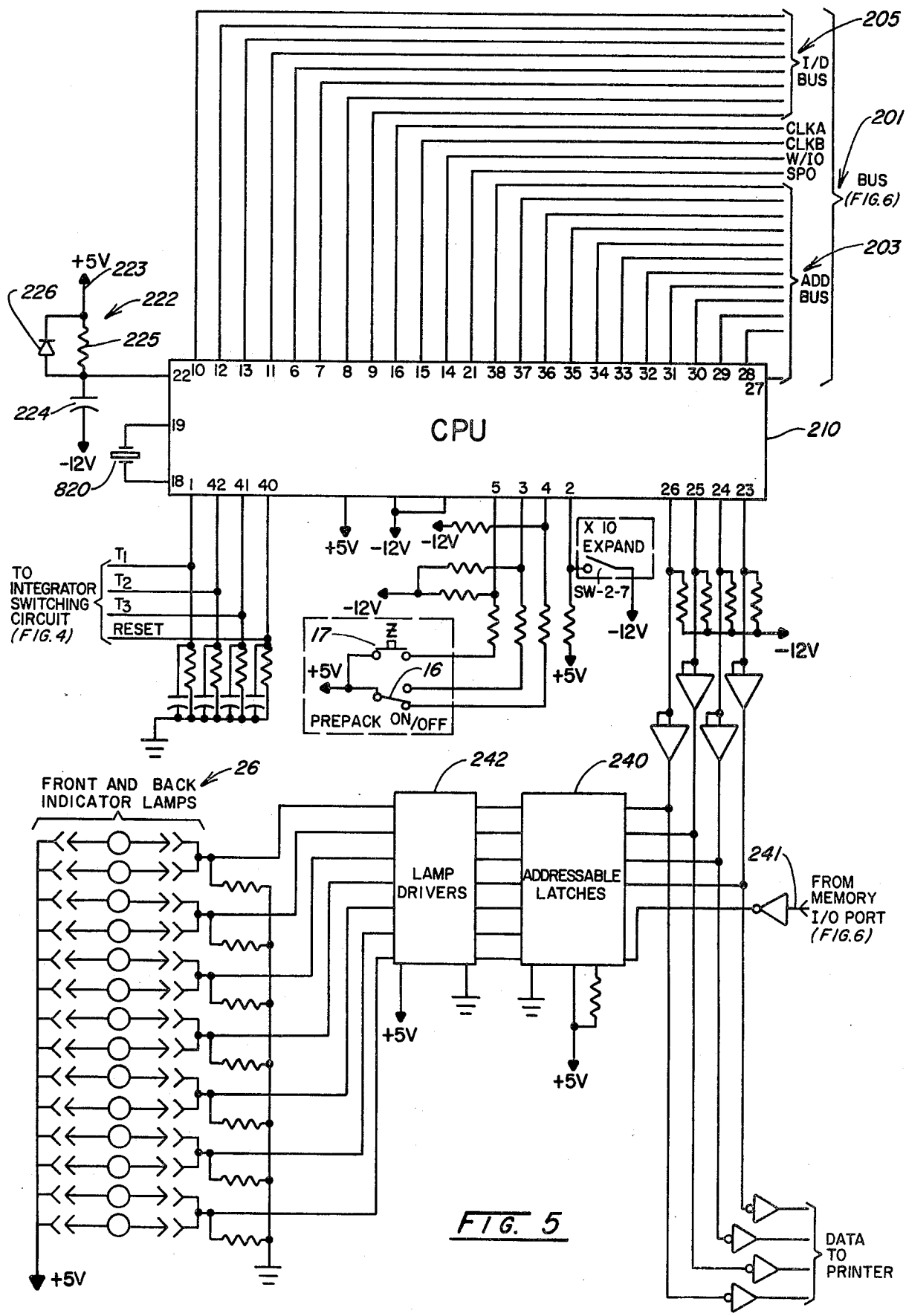

RAM ASSIGNMENTS

00

| | | |
|---|---|---|
| 0 | MOTION FLAG | -000 |
| 1 | ZERO INCREMENT FLAG | -001 |
| 2 | TARE DONE FLAG | -002 |
| 3 | MANUAL TARE FLAG | -003 |
| 4 | DIGIT TIMER | -004 |
| 5 | | -005 |
| 6 | | |
| 7 | | |
| 8 | | |
| 9 | | -009 |
| A | RESULT | -00A |
| B | | |
| C | | |
| D | | |
| E | | |
| F | | -00F |

01

| | | |
|---|---|---|
| 0 | FILTER COUNTER | -010 |
| 1 | ZERO LAMP FLAG | -011 |
| 2 | NET FLAG | -012 |
| 3 | FACTOR FLAG | -013 |
| 4 | KG FLAG | -014 |
| 5 | TOG FLAG | -015 |
| 6 | | |
| 7 | | |
| 8 | VERIFY TEST FLAG | -018 |
| 9 | SIGN | -019 |
| A | | -01A |
| B | ARI ARITHMETIC SCRATCH PAD REGISTER | |
| F | | -01F |

02

| | | |
|---|---|---|
| 0 | LB/KG LAMP | -020 |
| 1 | ZERO LAMP | -021 |
| 2 | NET LAMP | -022 |
| 3 | 1/2 LAMP | -023 |
| 4 | 1/4 LAMP | -024 |
| 5 | PRE-PACK HALF PENCE | -025 |
| 6 | PRE-PACK HALF PENCE | -026 |
| 7 | PRINT COMMAND | -027 |
| 8 | | |
| 9 | SIGN | -029 |
| A | | -02A |
| B-E | WEIGHT | |
| F | | -02F |

03

| | | |
|---|---|---|
| 0 | Z KEY TIMER | -030 |
| 1 | ZERO DONE FLAG | -031 |
| 2 | | |
| 3 | AUTO CLEAR FLAG | -033 |
| 4 | 2 PREVIOUS LSD | -034 |
| 5 | 1 PREVIOUS LSD | -035 |
| 6 | | |
| 7 | | |
| 8 | | |
| 9 | SIGN | -039 |
| A | | -03A |
| B-E | FILTERED WEIGHT | |
| F | | -03F |

04

| | | |
|---|---|---|
| 0 | PRICE CONVERT EN. | -040 |
| 1 | MANDATORY PRICE/UNIT EN. | -041 |
| 2 | TARE MANDATORY EN. | -042 |
| 3 | LB/KG | -043 |
| 4 | 6 KG EN. | -044 |
| 5 | UK EN. | -045 |
| 6 | KEYBOARD RETURN | -046 |
| 7 | KEYBOARD STROBE | -047 |
| 8 | X ZERO BY PER. 10 KEY | -048 |
| 9 | SIGN | -049 |
| A | | -04A |
| B-E | AUTO ZERO | |
| F | | -04F |

05

| | | |
|---|---|---|
| 0 | 5 DIGIT TOTAL PRICE ENABLE | -050 |
| 1 | 5 DIGIT PRICE ENABLE | -051 |
| 2 | LB/KG INTERLOCK EN. | -052 |
| 3 | AUTO CLEAR EN. | -053 |
| 4 | 20 INCREMENT PRINT DISABLE | -054 |
| 5 | KEYBOARD TARE EN. | -055 |
| 6 | | |
| 7 | RECOMPUTE FLAG | -057 |
| 8 | VERIFY MODE FLAG | -058 |
| 9 | SIGN | -059 |
| A | | -05A |
| B-E | TARE | |
| F | | -05F |

06

| | | |
|---|---|---|
| 0 | | -060 |
| 1-3 | TOTAL PRICE | |
| 4 | | -064 |
| 5 | | -065 |
| 6-8 | PRICE | |
| 9 | | -069 |
| A | | -06A |
| B-C | OUTPUT WEIGHT | |
| D | | -06D |
| E | SIGN | -06E |
| F | | -06F |

07

| | | |
|---|---|---|
| 0 | | -070 |
| 1-8 | WORK AREA AND DISPLAY OUTPUT REGISTERS | |
| 9 | | -079 |
| A-D | TEMPORARY SCRATCH PAD REGISTERS | |
| F | | -07F |

FIG. 13

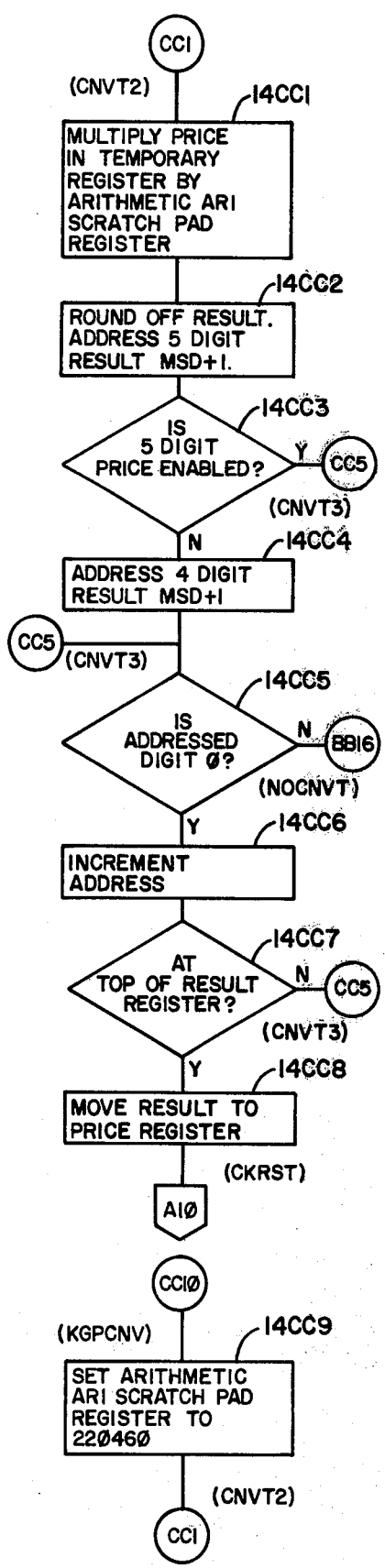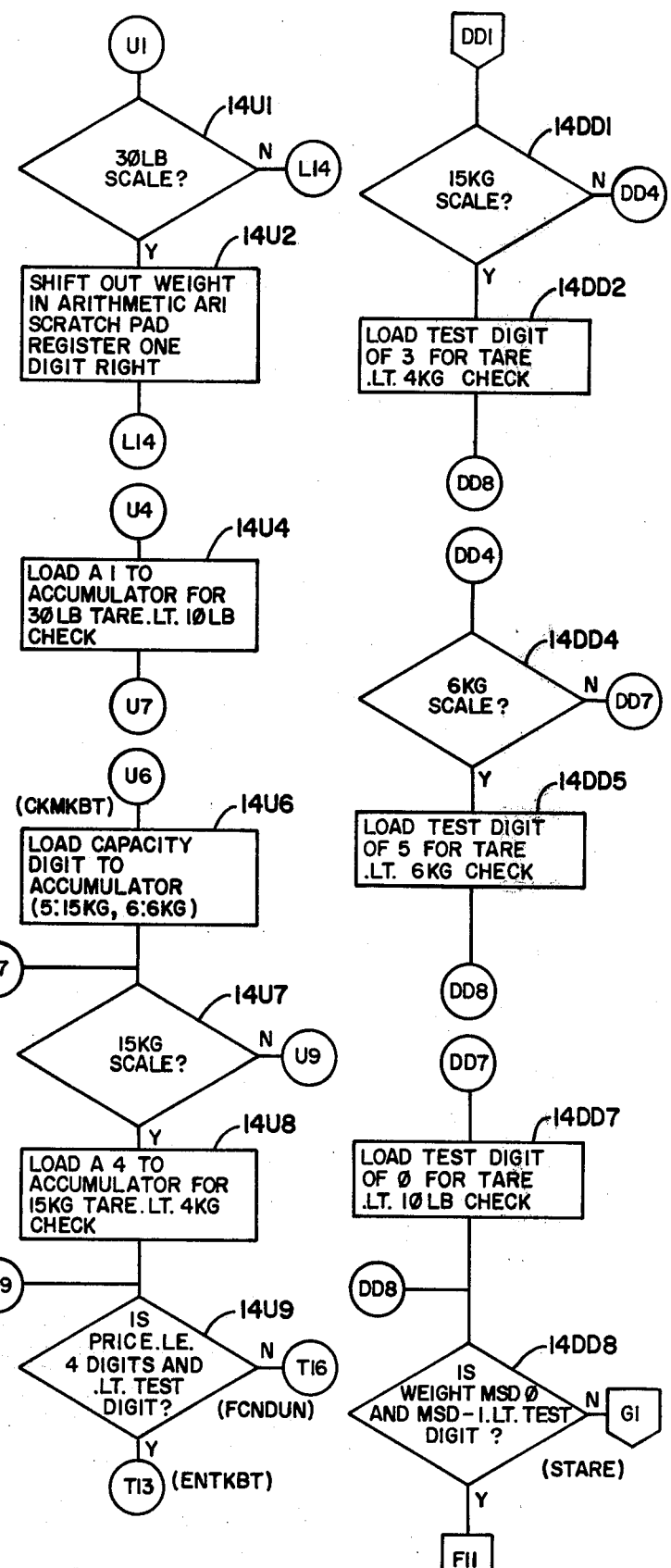
FIG. 14CC  FIG. 14U  FIG. 14DD

DIGITAL SCALE

BACKGROUND OF THE INVENTION

1. Field of the Invention

This invention concerns weight measuring apparatus. More particularly, the invention is concerned with a weighing scale system having an improved analog-to-digital conversion means including a microcomputer which forms an integral part thereof and to the rapid and accurate conversion from pounds to kilograms and visa versa. In accordance with this invention, the weight indication of an object to be weighed may be changed from pounds to kilograms either before or during a weighing operation. The various weight limits and the tare weight is changed. The price per unit and the total value may be either changed or the indication cleared when the change is made during a weighing operation.

2. Description of the Prior Art

Weighing and computing scales must meet several stringent requirements for performance and cost. The scales must be accurate enough to satisfy public weights and measures authorities, yet be available at a reasonably affordable price and perform their operations within a period of time which is convenient for sales transactions.

One of the important factors in digital scales upon which cost, accuracy, and operation time depends, is the conversion of the unknown analog weight signal corresponding to an article weight to digital data representative of the article weight.

In the past, in order to change from weighing operations in pounds to weighing operations in kilograms, it has been necessary to change certain switches under the scale cover and to also make final adjustments of certain circuit elements so the scale will accurately weigh in either pounds or kilograms. In the scale arrangements of the prior art, it is not possible to change the stored tare weight from pounds to kilograms or visa versa during a weighing operation. Neither has it been possible to automatically change the unit price and then recompute the total value during a weighing operation. Typical prior art multicapacity digital computing scale arrangements are described in U.S. Pat. Nos. 3,962,569 Loshbough et al; 3,962,570 Loshbough et al; and 3,986,012 Loshbough et al; and U.S. application Ser. No. 729,911 filed Oct. 3, 1976, Donivan L. Hall et al.

SUMMARY OF THE INVENTION

There is, therefore, a need for a digital weighing and computing scale having a relatively simple design which is capable of easily, rapidly, more effectively, and more accurately changing from weighing operations in terms of pounds to weighing operations in terms of kilograms or from weighing operations in terms of kilograms to weighing operations in terms of pounds. There is also a need to make such changes either before or during weighing operations. There is also a need to change the stored tare weight and unit price and the computed total value.

The present invention achieves the foregoing needs by providing a digital weighing and computing scale system which employs a microcomputer data processing means which is used for controlling the sequence of operations and computing the required data for the scale system. In accordance with this invention a lb/kg switch is provided. When in the lb position, the weight indications are in pounds. When in the kg position, the weight indications are in kilograms. When the position of this switch is changed either before or during a weighing operation, all the stored weight data including the tare weight is changed to the new units and the weight indicated in accordance with the position of this switch. In addition, the unit price is either converted to the value in accordance with the position of this switch or the stored unit price is cleared depending upon the condition of other switches. If the unit price is converted, then the total value is recomputed. If the unit price is only cleared, then the total value is also cleared. If the unit price is cleared, then a new unit price must be entered before the total value can be computed.

In order for a weighing scale to be able to provide a choice of full scale capacities, it is necessary that the weight signal or data be modified in either its analog form or its digital form in a manner which is dependent upon the particular scale capacity and units of weight which are selected.

The weight can be detected according to a single one of several possible scale capacities and weight units and then multiplied by an appropriate conversion factor when another scale capacity is selected. This, however, requires that a computer of such a weighing scale have a more complex sequence of operations because for each selected scale capacity, it must deal with substantially different numbers in performing all of its various checks and control functions.

Alternatively, the analog weight signal may be amplified by an amplification factor which is unique for each scale capacity. This selective modification of the analog gain has the disadvantage that it requires the use of either adjustable or multiple circuit elements, such as resistors, in the analog circuitry, one of which must be manually switched into the circuit for each selected amplification factor corresponding to each selected scale capacity. The use of such alternatively selectable circuit elements requires a substantial additional expense and creates problems in calibration.

These problems can be reduced by causing the full capacity analog weight signal for each scale capacity to produce the same digital number at the output of the analog to digital converter. This also permits a single span control to set the full capacity output for all selectable scale capacities. For example, in the exemplary embodiment of the present invention, a full scale weight for each scale capacity will produce a digital output of 30,000 net effective weight increments which are termed raw weight increments. The number of raw weight increments is then multiplied by a factor, depending upon the scale capacity to obtain the proper weight units.

It is a unique feature of the present invention that it provides substantially the same digital data with a full capacity weight for all selected scale capacities without requiring multiple circuit elements and without requiring modification of the analog circuit gain. This unique aspect of the present invention is provided by the microcomputer implementation of the analog-to-digital conversion.

Another unique feature of the present invention relates to the computing and displaying of a net weight. The prior art includes weighing and computing scales upon which a food container or other tare weight may be placed, weighed and have the tare weight entered into memory. This stored tare weight is available for later subtraction from the gross weight of the filled container to compute and display the net weight of the contents.

DESCRIPTION OF THE DRAWINGS

FIG. 1 is a block diagram illustrating the apparatus of the exemplary embodiment of the invention.

FIG. 2 is a diagram illustrating the layout and relative interrelationship of the circuit diagrams of FIGS. 3 through 8 and is shown on the same sheet as FIG. 10.

FIGS. 3 through 8 show the detailed circuitry of an exemplary embodiment of the invention.

FIG. 13 is a random access memory assignment table illustrating the assignments for the memory of the exemplary embodiment of the invention.

Figure 6:
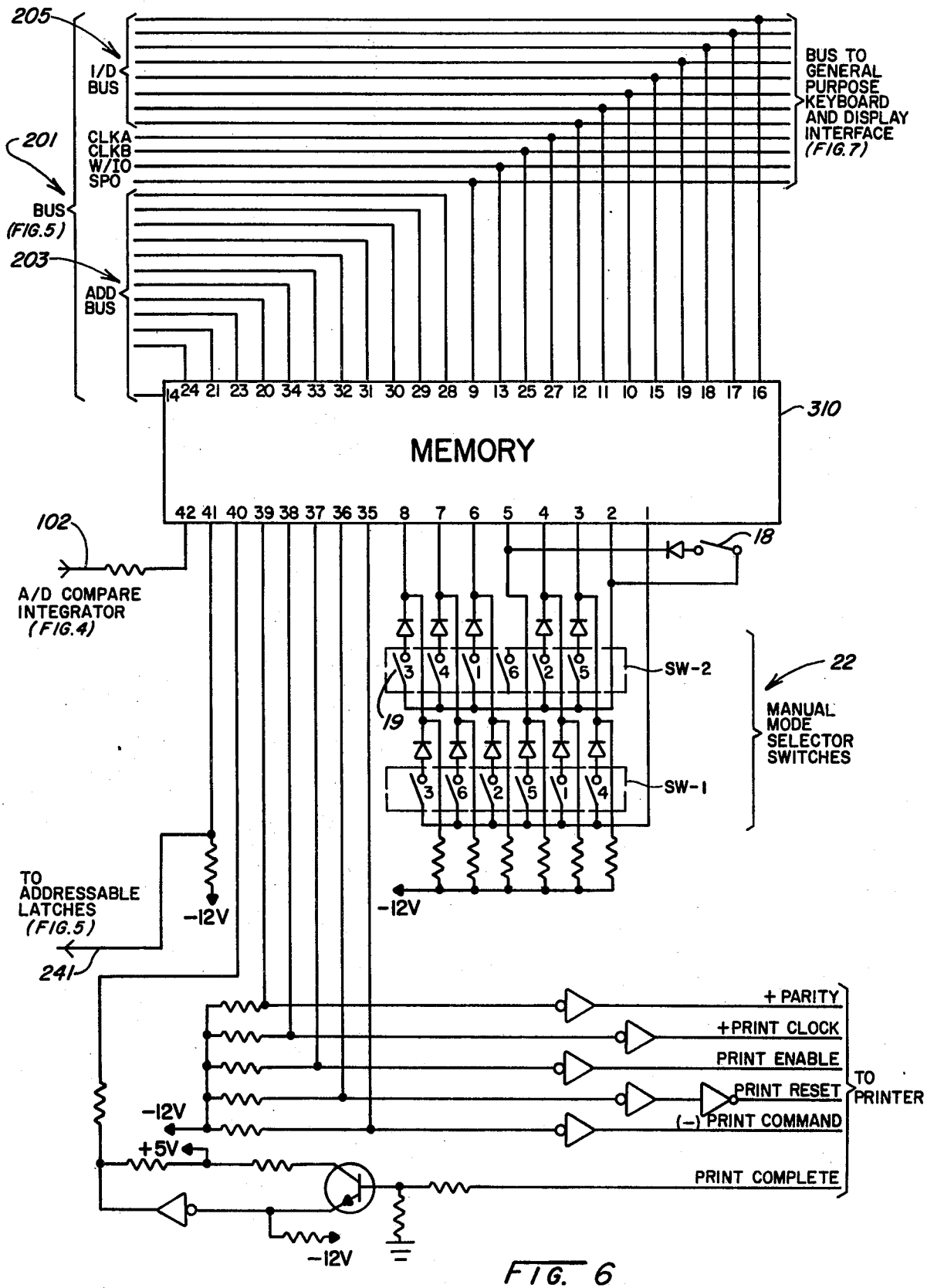

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose. For example, the term connection is not necessarily limited to direct connection but also includes connection through other circuit elements.

The means, apparatus, and structure, by which the above novel improvements, in accordance with the present invention, are achieved in the exemplary embodiment described herein, comprises various registers, counters, timers, flags, storage spaces, together with specific routines for the control of the respective apparatus or means by the central control unit. In addition, numerous switches, lamps and display devices cooperate with the central control unit and the various storage spaces, counters, timers, etc., which apparatus comprises input and output means for the system.

GENERAL DESCRIPTION

The exemplary embodiment of this invention described herein is incorporated in and arranged to cooperate with the digital weighing and computing scale disclosed in the copending U.S. patent application of R. C. Loshbough and E. G. Pryor Ser. No. 824,858 filed Aug. 15, 1977; which application is fully incorporated herein. The exemplary embodiment described herein discloses features claimed in the above application or in applications referred to in the above application.

The exemplary embodiment of the invention is illustrated in the block diagram of FIG. 1. A load cell 40 mechanically support a platter 12 and is supplied with electrical energy by a power source 42. The load cell applies an analog weight signal through a preamplifier 44 and filter 46 to a switching circuit 50. The analog weight signal has an amplitude which is dependent upon the weight supported by the load cell 40.

The switching circuit 50 is also connected to the power supply so that not only the analog signal but also two reference DC sources can be sequentially applied to the integrator 51 during the performance of a triple slope A/D conversion. The output of the integrator is amplified by an amplifier 52 and applied to a threshold detector so that the crossover of the integrator output with its reference output level is detected by the threshold detector 53. The output of the amplifier is also connected to the switching means 50 for use in resetting the integrator 51. The output of the threshold detector 53 is applied to a microcomputer 54 which is also connected to the switching circuit 50 for controlling its switching functions.

The microcomputer 54 is connected to a printer 28 and through latch decoder and driver circuitry 56 to indicator lamp displays 26. Operational mode selector switches 22 are also connected to data input terminals of the microcomputer 54.

The microcomputer is further connected to a general purpose keyboard and display interface 58 for receiving data from a keyboard 20 and transmitting data through a decorder/driver 60 to digit displays 24. The "PRE-PACK ON/OFF" switch 16 and the "Z" key 17 are individually connected to discrete inputs to the microcomputer 54.

In this exemplary embodiment, the analog-to-digital conversion is performed by the combination of the switching circuit 50, the reference DC sources derived from the power source 42, the integrator 51, the threshold detector 53 and the microcomputer 54. The amplifier 52 is provided to amplify the integrator output so that the threshold detector will more accurately determine when the integrator output crosses the threshold voltage.

The microcomputer 54 includes storage registers in which the elapsed time counts, which are derived from a microcomputer instruction loop, are accumulated. It also includes stored data for each scale capacity. The microcomputer 54 includes a central processor, associated memory and stored data for controlling the switching circuit 50 to appropriately apply the inputs to the integrator 51 in the proper sequence and at the proper time, for interrogating the ouput of the threshold detector 53, and for arithmetically processing the accumulated elapsed time intervals or counts.

Figure 12:
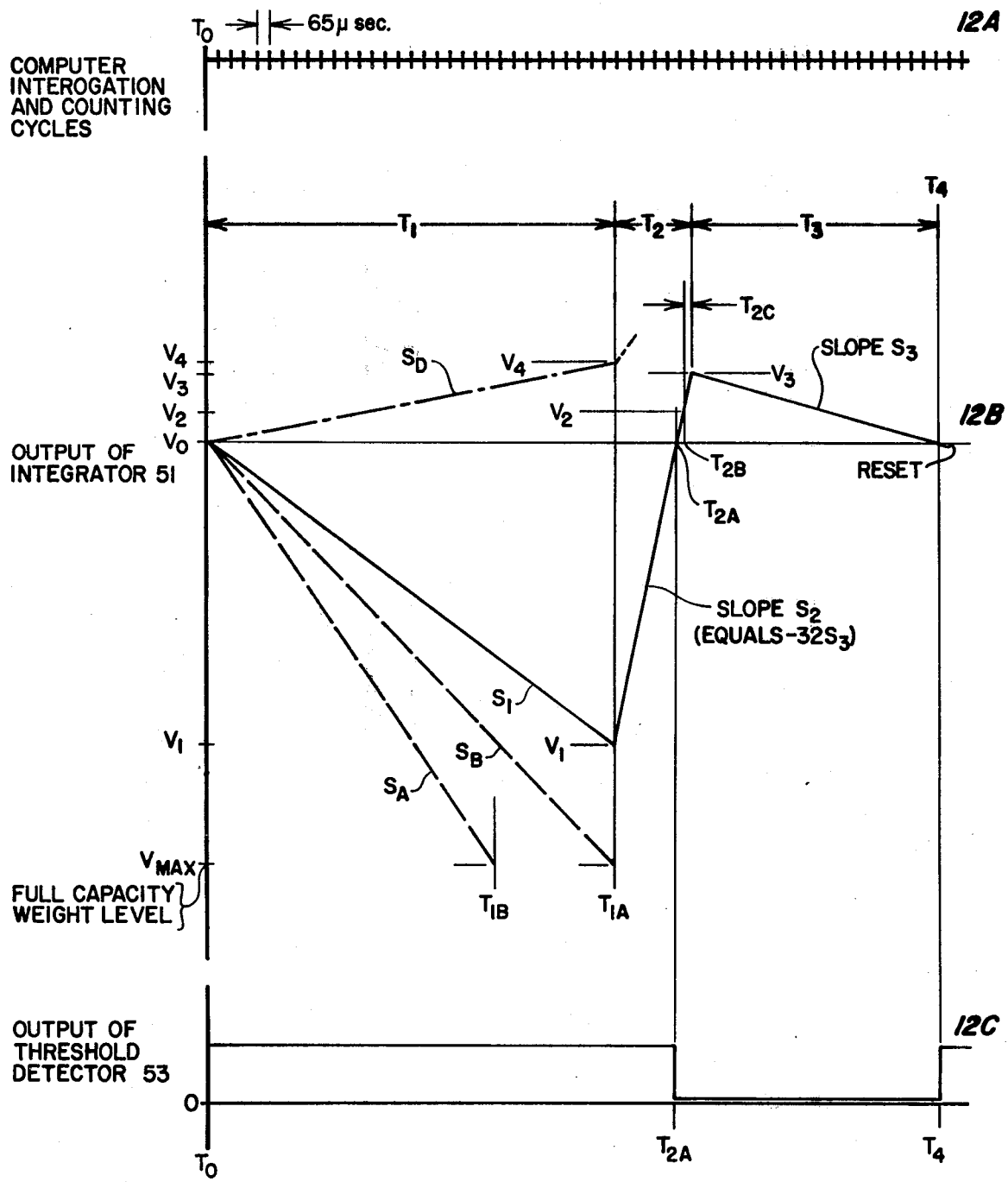
FIG. 12 is a diagram illustrating the operation of the exemplary embodiment of the invention.

FIG. 12 illustrates, in simplified form, the signal relationships which are most significant in describing the analog to digital conversion of the weight indications. The vertical axis represent amplitudes which are not drawn to scale in order that the principles of operation may be more clearly illustrated. The horizontal axis represents time.

The top most graph 12A depicts the computer interrogation and counting cycles and in the exemplary embodiment have a 65 microsecond period. These are not drawn to scale because several thousand such cycles would be needed. Each cycle represents the length of time required for the microcomputer to loop through its interrogation and indexing sequence of operations.

Below that is a graph 12B, illustrating in a solid line the output of the integrator 51 and also illustrating with broken lines, portions of alternative outputs from the integrator 51.

Finally, the lowest graph 12C illustrates the output state of the threshold detector 53. Its threshold level is set to correspond to the initial level $V_0$ at the output of the integrator 51 and its output is high when the output of the integrator is negative and is low when the output of the integrator is positive.

Referring to FIGS. 1 and 12, at time $T_0$, the microcomputer 54 switches the switching circuit 50 to apply the analog signal, which was derived from the load cell, to the input of the integrator 51. This analog signal continues to be applied and is integrated for the entire time interval $T_1$. This input causes the output of the integrator to be driven from its initial level $V_0$ along slope $S_1$ to level $V_1$. The magnitude of $V_1-V_0$ is a directly proportional function of the amplitude of the analog signal and is also a function of its integration time $T_1$.

The time interval $T_1$ is a different but fixed and constant time for each different scale capacity and is controlled by the microcomputer 54 and is obtained by reading permanently stored timing data from the computer memory, loading it into suitable registers and sequentially setting the registers in accordance with selected timing loop instructions.

One unique feature of the present invention is that this first integrating interval $T_1$, during which the analog signal is integrated, is different for each scale capacity and therefore different data is stored in memory and loaded into the time delay registers for each scale capacity.

A particular $T_1$ time is chosen for each scale capacity so that whatever scale capacity is selected, a full scale weight on the platter for that scale capacity will always drive the integrator output to substantially the same level. Assume for example, that the above described integration along integrator output slope $S_1$ represents a 20 pound weight on the platter 12 with a 30 pound scale capacity selected, then a 30 pound weight on the platter 12 would integrate along slope $S_B$ to arrive at $V_{MAX}$ at the time $T_{1A}$ after time interval $T_1$. If, for example, a 15 kg scale capacity were then selected, a shorter analog signal integrating the time would be provided by the microcomputer 54 so that a 15 kg weight on the scale platter would drive the integrator output along the slope $S_C$ to reach $V_{MAX}$ at a time $T_{1B}$.

In order to change from pounds to kilograms in accordance with this invention by means of a single switch, which in the exemplary embodiment is readily accessable and may be operated at any time either before or during a weighing operation, the $T_1$ times for the two different units must be accurately controlled and determined so that the ratio of these times correspond to the conversion factors for changing weights from pounds to kilograms or from kilograms to pounds. Thus, in the exemplary embodiment of the invention described herein the $T_1$ times are as follows:

| Capacity | $T_1$ Time |
|---|---|
| 30 lb × 0.01 lb | 105.770 milliseconds |
| 15 KG × 0.005 KG | 95.950 milliseconds |
| 6 KG × 0.002 KG | 239.805 milliseconds |

At time $T_{1A}$, which is the end of the first integrating time interval $T_1$, the microcomputer 54 switches the switching circuit 50 to begin the second integrating time interval $T_2$ by applying a first reference DC source $I_1$ to the output of the integrator 51. This first reference DC source $I_1$ is then integrated to drive the integrator output level, which represents the sum of the integral obtained during $T_1$ and the integral being performed during $T_2$, along slope $S_2$ back towards and past the initial integrator output level $V_0$.

After initiating this second integrating interval $T_2$, the microcomputer begins periodically interrogating the output of the threshold detector 53 looking for the transition which indicates the crossover of the integrator output level with its initial level $V_0$.

Each time the microcomputer interrogates the output of the threshold detector 53 and finds that corssover has not occurred, it increments a memory assigned to accumulate such interrogation counts $T_2$ counts. Each such interrogation and counting cycle or instruction loop requires the identical time to perform which in the exemplary embodiment is 65 microseconds.

Eventually, at a time labelled $T_{2A}$ in FIG. 12B, the output of the integrator 51 crosses over its initial level $V_0$ causing the output of the threshold detector to switch from a low state to a high state. This transition may occur anywhere within an interrogation and indexing cycle or the end or beginning of such a cycle. However, because of the digital ambiguity, the microcomputer 54 will not detect this transition until it interrogates the output of the threshold detector 53 at time $T_{2B}$.

When the switching of the output of the threshold detector 53 is detected at $T_2B$ by the microcomputer 54, no more interrogation and indexing cycle counts are accumulated in the memory register. Therefore, the digital count accumulated in the first memory register at time $T_22B$ represents the sum of the amplitude $(V_1-V_0)$ plus any overshoot $V_2-V_0$ of slope $S_2$, beyond level $V_o$.

On occasion, the coincidence of the integrator output with the threshold level $V_0$ will occur relatively near the end of a counting cycle. The possibility then exists that circuit switching, which occurs at the end of the computer interrogating cycles, may cause transients which might cause erroneous operation. For example, if the crossover occurs just before an interrogation of the output of the threshold detector 53 by the microcomputer 54 so that very little overshoot occurs, then the output level of the integrator will be close to the level $V_0$. If the next integrating interval $T_3$ were then begun, a computer clock pulse may cause the threshold detector 53 to switch states prematurely.

A unique feature of the present invention is that these crosstalk problems can be eliminated by providing an extra delay at the end of the $T_2$ interval after the microcomputer 54 has detected the $V_0$ crossover. Conveniently, this delay interval, labelled $T_2C$, can be made equal to one interrogation cycle and will cause the integrator output to be driven further along $S_2$ from $V_2$ and $V_3$. However, the count accumulating memory is not incremented so that no count is added to the memory register for that extra cycle.

After delay time $T_2C$, the computer 54 switches the switching circuit 50 to apply a second reference DC source $I_2$ to the integrator 51. This second reference DC source $I_2$ is substantially less than the first reference DC source $I_1$ which was integrated during interval $T_2$ because it is desired to integrate at a reduced slope $S_2$ in order to obtain more precisely the time of the coincidence of the integrator output with its initial level $V_0$. In the exemplary embodiment of the invention, the reference source which is integrated during the $T_2$ interval is 32 times greater than the reference source which is integrated during the $T_3$ interval. Therefore, the magnitude of the slope $S_2$ of the integrator output during interval $T_2$ is 32 times greater than the magnitude of the slope $S_3$ during interval $T_3$.

Upon the beginning of interval $T_3$, the microcomputer 54 again goes through interrogating and counting cycles just as it did during interval $T_2$. However, during interval $T_3$, the interrogating and counting cycles are counted by incrementing a memory register referred to as the $T_3$ counter or $T_3$ register. Then, as during interval $T_2$, counts continue to be accumulated in the second memory register until the first interrogation of the threshold detector 53 by the computer 54 which occurs after coincidence of the integrator output with the threshold level $V_0$. When the computer detects the resultant output level change of the threshold detector 53 at time $T_4$, and $T_3$ integrating interval and the count accumulation is stopped by the microcomputer 54.

At time $T_4$, the count accumulated in the second register during interval $T_3$, is directly proportional to and represents the difference between the integrator output level $V_3$ at $T_{3A}$ which is at the beginning of interval $T_3$ and the integrator output level at $T_4$ at the end of interval $T_3$. For computational purposes, the integrator output level at the end of $T_3$ is assumed to be $V_0$. Since this is a digital ambiguity within one of the counting cycles for the integration along the lesser slope $S_3$, it will be apparent from the following discussion that the error is less than one part in 30,000 at full scale capacity in the exemplary embodiment.

Nonetheless, the time $T_4$, when the microcomputer detects the crossover, there will again be some overshoot past the initial level $V_0$ if the crossover occurs between periodic interrogations of the output of the threshold detector 53.

In order to remove the affect of this overshoot and accurately reset the integrator precisely to the identical $V_0$ prior to each integration, the microcomputer 54 switches the switching circuit 50 to effectively connect the integrator output to its input. This negative feedback drives the integrator output to $V_0$ following $T_4$ by effectively discharging the capacitor of the integrator 51.

The integration functions of the triple slope A/D conversion are completed with the accumulation in each of two memory registers of the digital count data taken along slopes $S_2$ and $S_3$. The microcomputer must now take this data and derive a digital number which is proportional to $V_1-V_0$ and which therefore is proportional to the amplitude of the analog input signal which was integrated during time interval $T_1$.

The counts in the $T_2$ register are proportional to $V_1-V_2$. The counts accumulated in the $T_3$ register are proportional to $V_3-V_0$. However, these counts were derived from the integration of two different reference DC sources of substantially different amplitudes. Therefore each $T_2$ count represents a different and greater quantity of integrator output amplitude and thus a greater weight increment than is represented by each $T_3$ count. In the exemplary embodiment, the first reference DC source $I_1$ is 32 times greater than the second reference DC source $I_2$ and therefore each $T_2$ count represents 32 times as much amplitude (32 raw weight increments) as does each $T_3$ count.

In order to equalize the value of each count in the $T_2$ and $T_3$ counters, the microcomputer 54 first multiplies the $T_2$ count by the ratio of $I_1/I_2$ which in the exemplary embodiment is 32. Thereupon, the result represents the raw weight increments.

By way of example, 600 interrogating and counting cycle counts may have been accumulated in the $T_2$ register in driving the integrator output from $V_1$ to $V_2$ and 45 interrogating and counting cycle counts may have been accumulated in the $T_3$ counter in driving the integrator output from $V_3$ to $V_0$ during interval $T_3$. Consequently, in accordance with the invention, the microcomputer will multiply 600 by 32 to obtain a product of 19,200 raw weight increments represented by $V_1-V_2$.

The microcomputer then processes the $T_3$ count to convert it from a number representing $V_3-V_0$ to a number representing $V_2-V_0$. This is done by subtracting from the $T_3$ count a number of counts representing $V_3-V_2$. Since the integration along slope $S_2$ from $V_2$ to $V_3$ required one interrogating and counting cycle during time $T_2$, that interval $T_{2C}$ represents the same amplitude as is represented by a number of $T_3$ counts which is equal to the ratio of the first reference DC source $I_1$ to the second constant DC source $I_2$. Consequently, the microcomputer subtracts that ratio $I_1/I_2$ from the accumulated $T_3$ count.

In the above example for the exemplary embodiment, the number 32 is the ratio which is subtracted from the $T_3$ count of 45 yield a difference of 13 counts. These 13 counts represent 13 raw weight increments represented by $V_2-V_0$.

Therefore, the microcomputer can now arithmetically derive the number of raw weight increments represented by $V_1-V_0$ by subtracting this difference of $T_3$ counts which represents $V_2-V_0$ from 32 times the number of $T_2$ counts. In the example, the microcomputer subtracts 13 from 19,200 to yield 19,187 raw weight increments.

This digital number is proportional to the amplitude of the analog weight signal which was integrated during $T_1$. In the exemplary embodiment this digital represents weight increments which are referred to as raw weight increments herein:

Each weight indication is then filtered by an improved digital filter. Each weight, when obtained, is subtracted from the filtered weight and the difference divided by two. A one is then added or subtracted from the result to make the result approach the last weight and the last weight corrected by the final result.

This digital number of raw weight units is multiplied by the computer at a later time by the computer by a factor, depending upon the scale capacity to obtain the weight in the proper units for display.

The present invention maintains an accurate zero indication when the scale is not operating in the net mode and also maintains an accurate net zero indication in addition by updating the data stored in a tare weight register.

Tare weight data may be entered into a tare memory register by either of two methods. The digits of a tare weight may be keyed in through the keyboard 20 and this is referred to as a keyboard tare. The tare weight data may also be entered into memory by placing an empty container or other tare weight on the platter and depressing the "T" key. This is referred to as manual tare and causes the scale to read the tare weight and store it in the tare memory.

After a tare weight is properly entered by either of these operations, the computing and weighing scale displays the net weight, which is the difference between the weight of an object on the platter and the weight data stored in the tare register. Consequently, an object weighing the same as the tare weight, for example, the same empty container, should cause a zero net weight to be displayed. A lesser weight on the platter will generate the display of a negative weight.

Unfortunately, creep, hysteresis effects and drift may cause an object on the platter to generate slightly different tare weight data at different times. Similar difficulties have been observed in the maintenance of a gross zero indication as described in Loshbough et al, U.S. Pat. No. 3,986,012. In that situation, a separate auto zero register is used to store a correction factor for automatically correcting the gross zero indication. However, it has been discovered that the same auto zero register cannot be used for net zero tracking because whenever the scale reverts from a net mode of operation back to its gross mode, the auto zero register would still contain net zero tracking data and be erroneous for gross auto zero correction purposes.

The invention involves the periodic updating of the tare weight data to track such wander in order to maintain the display of a zero net weight under the conditions for which a zero net weight should be displayed and in order to use the most recently detected and most accurate tare weight data as a reference which is subtracted from total gross weight to compute net weight.

Each time the microcomputer 54 computes a new weight it examines that weight data to determine whether the tare weight data should be modified. If the net weight is found to be exactly zero, then no drift has occurred and no tracking is necessary. Since a zero indication already exists, the microcomputer skips the remaining net zero tracking sequence of operations. However, if the computed net weight is not exactly zero, it is then examined to determine whether it is close enough to a net weight of zero that its departure from zero can be attributed to creep, drift or hysteresis effects rather than to a change in the weight placed on the platter.

This decision, whether the net zero tracking should actually be performed, is made by determining whether the net weight is within a preselected, narrow, weight range or band centered about a net weight indication of zero. Therefore if the computed but non-zero net weight is outside this range, the remainder of the net zero tracking sequence of operations is skipped. However if it is within the range, net zero tracking is performed by modifying the previously stored tare weight data to compensate for the shift or wander of the net zero.

Data representing the preselected range within which net zero tracking is performed is permanently stored in the memory of the microcomputer 54. In the exemplary embodiment of the invention, this range is a predetermined number of increments which represent different weights for each scale capacity so the net zero tracking sequence of operation is done with data which has already been multiplied by a scale conversion factor to represent output increments of weight rather than units of raw weight increments.

For example, in the exemplary embodiment, for the following scale capacities, the net weight must be within the following ranges in order for the tare weight data to be modified to track the net zero:

| Scale Capacity | Range |
| --- | --- |
| 6 kg × 0.002 kg | ± 0.0008 kg |
| 15 kg × 0.005 kg | ±00.0002 kg |
| 30 lb × 0.01 lb | ±00.004 lb |

If the net weight is within the preselected range for the selected scale capacity, then the microcomputer modifies the tare weight register in a direction which will reduce the next computed net weight by one increment of its least significant digit.

This is done by algebraically adding to the tare weight data a one having the same sign as the previously computed net weight.

For example, for the 30 lb×0.01 lb capacity, a computed net weight of +00.002 pounds will cause a +1 to be added to the least significant digit of the tare weight data, any carry being appropriately propagated. If the stored tare weight was 00.192 pounds it will become 00.193 pounds. Therefore, the next time a net weight is computed for the identical gross weight data, the net weight will be +00.001 pounds.

If the gross weight data does not change, continued repetition of the above sequence of operations will continue to increment the stored tare weight data ultimately to cause a net weight result of 00.000 pounds. Thus, in the exemplary embodiment 00.00 will be displayed when only the 4 most significant digits are displayed. The repetition of these net weight tracking operations occur approximately five times per second in the exemplary embodiment.

The exemplary embodiment of the invention incorporates and cooperates with many features shown in U.S. Pat. Nos. 3,962,569; 3,962,570; and 3,986,012; and in U.S. application Ser. No. 729,911 and an application of R. C. Loshbough and E. G. Pryor for Digital Scale Ser No. 824,858 filed Aug. 15, 1977 which are incorporated herein.

However, these features are briefly described to the extent which is helpful to enable those skilled in the art to construct an embodiment of the invention and to practice the invention.

The exemplary embodiment comprises a digital weighing and computing scale to determine the weight of merchandise, to compute the total price or value of the merchandise and to display, and optionally to print, the price per unit weight, the weight of the merchandise and the total value or total price of the merchandise.

FIG. 1 is a block diagram of the exemplary embodiment of the invention and was broadly described above. The exemplary embodiment has input and output structures which may be explained in more detail.

The first input device is the load cell 40 linked to a platter 12 upon which merchandise is supported. The load cell 40 provides the analog output signal which is related to the weight of the merchandise.

The second group of inputs comprises operator accessible switches 20 including a "PREPACK on/off" switch 16 for selecting a prepack mode of operation and a keyboard 20 having keys labelled and physically arranged as illustrated in FIG. 1. The "PREPACK on/off" switch is not provided for UK modes of operation when Half Pence pricing is used. While the "PREPACK on/off" switch 16 is not electrically a part of the keyboard, it is conveniently positioned adjacent the keyboard for ease of access by the operator. Similarly, the lb/kg switch 18 is provided and usually located adjacent the keyboard so the operator may readily change from pounds to kg or visa versa.

The third group of inputs comprises a plurality of programmable mode selector switches 22 which are selectively switched at the factory or by a service technician in the field and are inaccessible to the operator. These mode selector switches 22 are labelled as indicated in FIG. 1 and are switched to those operational modes which are appropriate for the weight and currency units, legal standards and requirements and to the merchandising and pricing methods of the particular store in which the weighing and computing scale will be used. In accordance with this invention, the lb/kg switch 18 is provided to enable the operator to change the scale at any time, either before or during a weighing operation, in either pounds or kilograms to kilograms or pounds respectively. Switch element number 3 of switch 2, designated 19 in FIG. 6, is provided to enable condition the scale to convert the unit price and total price or to clear the unit price and total price where the position of the lb/kg switch is changed.

The weighing and computing scale embodying the present invention also has three groups of output devices. The first group consists of two identical sets of three numerical display devices 24. One set is mounted so that it is visible to the scale operator and a duplicate set is mounted to be visible to the customer or purchaser of the merchandise.

Each display device contains five, cold cathode, gas discharge display digits with three lower commas, each digit having seven segments to display any number from zero through nine. The three displays of each duplicate set ordinarily display price per unit, net or gross weight and total value.

The second output group comprises a pair of duplicate front and back indicator lamp displays, one facing the operator and one facing the purchasing customer. Each indicator lamp display has six translucent windows upon which labels are printed and which are at times backlighted by suitable lamps for making the labels visible. As illustrated in FIG. 1, the labels include "ZERO", "NET", "PREPACK", "½", "¼", and a sixth legend which is alternatively labelled at the factory either "LB" or "KG".

The third output is a printer 28 which is optional.

The "Z" key 17 is operated to zero or null the scale. After power is first applied to the weighing and computing scale embodying the present invention or after a power interruption, no unit price data or tare weight data will be accepted and no total price or value will be displayed until the exemplary embodiment has been so zeroed. The scale may also be zeroed at other times using the "Z" key.

The scale is zeroed in response to depression of the "Z" key 17 when no substantial weight is on the scale by loading the presently detected weight into a memory register for subsequent use as a correction factor. In subsequent weight measurements this correction factor is subtracted from the detected weight to provide a corrected weight. Consequently a zero weight indication will be displayed when there is no weight on the scale.

In order for the exemplary embodiment to perform the zero operation in response to depression of "Z" pushbutton 17, all of the following four conditions must exist. These interlocks prevent the customer from being defrauded by intentional or accidental creation of an erroneous zero. First the "Z" pushbutton 17 must be depressed continuously for at least 1.5 seconds. Second, the platform of the scale must have been motionless for a predetermined interval of time. Third, there must be no tare weight data stored in the memory registers of the exemplary embodiment. Fourth, there must be no significant weight on the platter.

Shortly after the exemplary embodiment has been zeroed in this manner the lamp behind the "ZERO" legend of the indicator lamp display 26 will be illuninated.

The keyboard 20 is a 4×5 matrix in which 15 of its key positions are used. The 10 keys labelled "0" through "9" are used to key in price per unit information and, under conditions subsequently described, may be used to key in a tare weight.

Tare weight data may be entered into memory registers in one of two ways. First, a known tare weight may be keyed in by using the keys labelled "0" through "9" of the keyboard 20 and then subsequently depressing the "T" key within two seconds after entry of the last tare weight digit. Such a keyboard entry of tare weight data is accepted only if the corresponding mode of operation is selected by the appropriate mode selector switches 22. Second, an ampty container or other object of unknown tare weight may be positioned on the platter 12 and the "T" key then depressed to cause the exemplary embodiment of the invention to automatically store in memory the weight of that object as the tare weight. This is termed a manual tare operation. A tare weight will be accepted and entered into memory only when certain conditions exist which are described in connection with FIGS. 14A–14Z in the detailed description of the operation of the exemplary embodiment.

If an operator discovers that erroneous tare weight data has been entered, the tare data may be cleared by pressing the key with the numeral "0" and then pressing the "T" key within 2 seconds of the operation of the "0" key. However, such a clearing of the tare data will only be accepted and the tare data will be cleared only if the net weight on the scale is less than 10 scale increments. This prevents the defrauding of a customer by the erroneous clearing or changing of the tare data while an object is on the platter.

After the entry and acceptance of tare weight data, the "NET" legends of the indicator lamp displays will be backlighted to signify that the exemplary embodiment is in a net mode of operation and therefore that its displayed data is a net weight.

If tare weight data has been entered by a manual tare, then the removal of the container will cause the exemplary embodiment to display the tare weight preceded by a negative sign.

The ten digit keys 0 through 9 are used to enter the price per unit weight either after tare data has been entered into memory or, under no tare conditions, by keying in the price per unit and failing to depress the "T" key.

The fraction keys 21 and 23 bear, respectively, the legends "½" and "¼". These fraction keys are depressed to input the information that the pricing is per ½ unit or ¼ unit of weight. Depression of a fraction key 21 or 23 at the appropriate time will cause the corresponding fractional legend on the indicator lamp displays 26 to be illuminated.

The "CLEAR" key of the keyboard 20 may perform two different functions. First, any price data which has been entered may be cleared by depressing the "CLEAR" key. Second, when the "CLEAR" key is pressed and held in a depressed position, all output displays will be blanked or held off. If the pushbutton is released and subsequently again held in a depressed state, all display segments and all display indicating lamps will be turned on.

These two modes permit the displays to be checked to make certain that there are no short circuits which are erroneously turning on display segments and no open circuits which are preventing display segments from being turned on.

When the weighing and computing scale embodying the present invention is used with a printer 28, the operator may depress the "PRINT" key to initiate the printing of an appropriate label bearing the price per unit, the total weight and the total value.

The manually programmable mode selector switches 22 comprise a plurality of individually operable, single pole, single throw switches. Their functions are enabled, that is their labelled conditions exist, when the switches are on or made.

The exemplary embodiment of the present invention has three selectable scale capacities, these are: 15.00 kg×0.005 kg., 30.00 lbs.×0.01 lbs. and 6.000 kg×0.002 kg.

The circuitry of the weighing and computing scale illustrated in FIG. 1 is shown in detail in the schematic diagrams of FIGS. 3 through 11. FIG. 2 shows how FIGS. 3 through 8 are associated to illustrate the complete circuit. The random access memory assignments are illustrated in FIG. 13 and are discussed in connection with the subsequent description of the detailed operation of the exemplary embodiment.

FIG. 3 illustrates a load cell 40 which is mechanically linked to the platter 12 and includes four resistive strain gage elements which are connected in a Wheatstone bridge arrangement 70. Typical scale mechanisms suitable for cooperating in the embodiment of the invention described herein are shown in U.S. Pat. No. 3,847,238 granted to D. L. Hall, et al, on Nov. 12, 1974 and U.S. Pat. No. 3,074,496 granted to L. S. Williams on Jan. 22, 1963.

Electrical power from the regulated power supply 42 is applied across one pair of opposite terminals of the bridge 70. The other pair of opposite terminals of the strain gage bridge 70 forms the output of the strain gage bridge and is connected to the input of the preamplifier 44. With no strain, the bridge 70 would be balanced and the output would be zero volts. In this state each output terminal of the strain gage bridge is at the same potential intermediate the potentials of the terminals of the regulated power source 42. However, in practical application, the strain gage bridge 70 will be under the stress of the platter and other mechanical linkages.

Any weight positioned on the platter 12 will further deform the resistive element of the bridge 70 causing a variation in their resistance and unbalancing of the bridge. In this manner, an output analog voltage is obtained from the strain gage bridge 70 which is related to the weight of the object on the platter 12 and is applied and amplified by the preamplifier 44.

The preamplifier 44 has two differential operational amplifiers 72 and 74 which are connected for form a differential amplifier presenting a very high input impedence to the output of the strain gage bridge 70 so that there is substantially no current drain from the bridge 70 while still providing a preamplifier which is a true differential amplifier rejecting all common mode voltages such as drift or changes in the bridge excitation voltage.

The non-inverting input of the OP-AMP 72 is connected to one of the output terminals of the strain gage bridge 70. The other output terminal of the bridge 70 is connected to the non-inverting input of OP-AMP 74. The OP-AMP 74 provides a substantially unity gain amplifier with its output fed across to the inverting input of the OP-AMP 72. In addition, the inverting input of the OP-AMP 74 is connected to the wiper of a potentiometer 76 which is used to shift the output level of OP-AMP 72. The potentiometer 76 is manually adjusted to compensate for small differences in the mechanical and electrical parameters of production parts and circuits to provide a total effective analog signal component resulting primarily from loading of the strain gages 70 when the platter has no object placed thereon. This known analog signal component or analog offset is subsequently removed by a subtraction in the digital data processing circuitry.

Referring now to FIG. 4, the output 80 of the preamplifier 44 provides a voltage having an amplitude proportional to the sum of the analog offset and the signal change resulting from an object being placed on the platter 12 and is applied to an active filter circuit 46. This active filter circuit 46 is a low pass filter designed to filter out scale platform or platter vibration. The output circuit of the active filter 46 includes a span adjustment potentiometer 92 which is connected as a simple voltage divider for adjustably selecting the desired proportion of the filtered analog weight voltage to be applied through the switching circuit 50 to the integrator 52 at the appropriate time. This potentiometer adjusts the analog circuit gain to a value suitable for the various scale capacities.

The switching circuit 50 under the control of the microcomputer 54 (see FIG. 1) may be used to selectively gate one of four possible inputs through four field effect transistors to the input 98 of the integrator 51. The four alternatively selectable inputs are: (1) the analog weight signal from the wiper of the potentiometer 92 which is applied through a resistor 85 and FET 94; (2) a reference DC source applied through resistor 87 and FET 95; (3) a second reference DC source which is applied through resistor 91 and FET 96; and (4) a reset signal applied through resistor 93 and FET 97. In the exemplary embodiment, resistors 85, 87, and 91 are all 500 K ohms.

Figure 9:
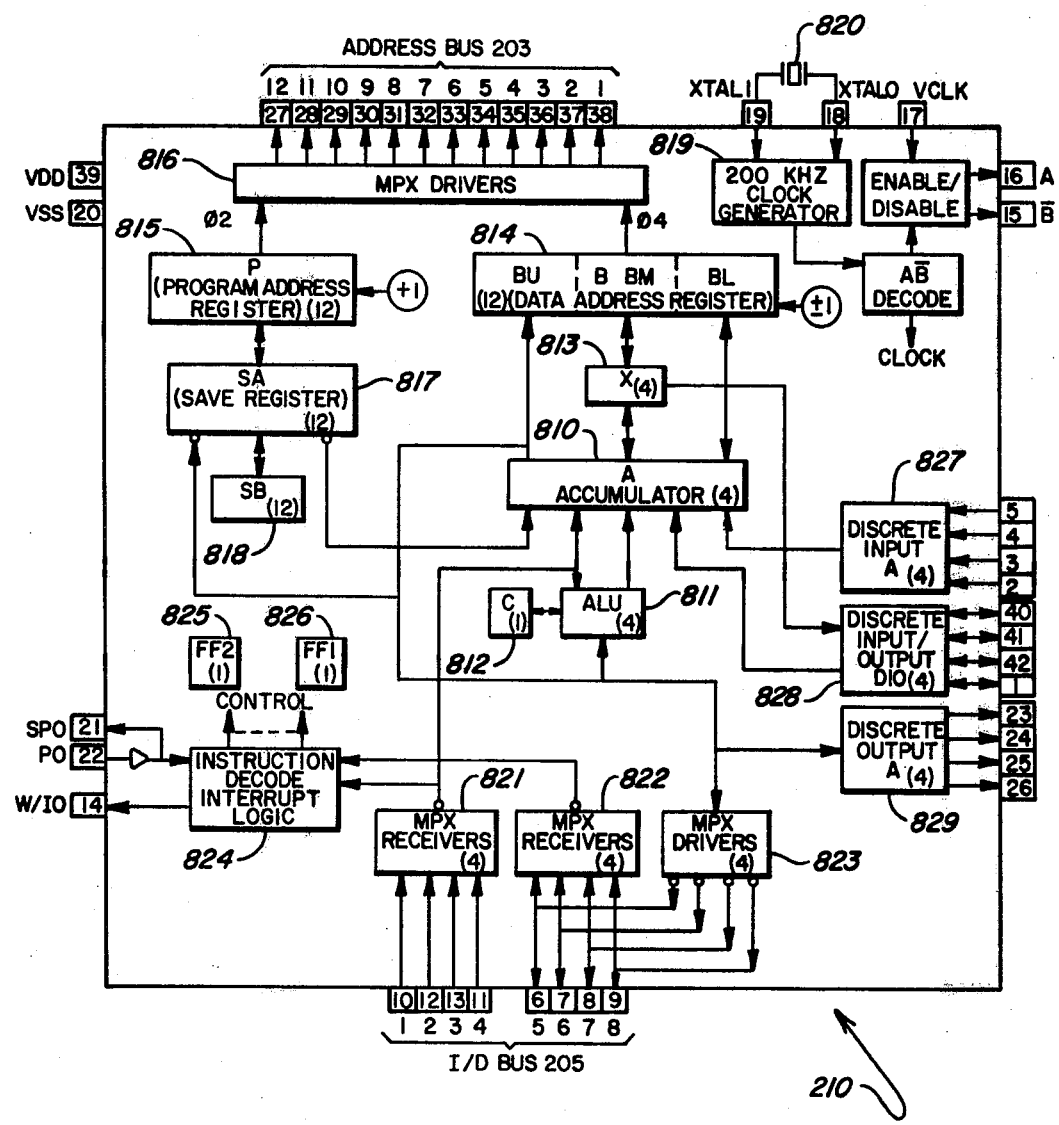
FIGS. 9 through 11 are block diagrams of the integrated circuits forming the central processor, memory and general purpose keyboard and display interface devices used in combination with the circuitry of the exemplary embodiment of the invention.

The gates of four FETS 94, 95, 96, and 97 are connected to four discrete input/output terminals, 1, 42, 41, and 40 of the CPU as illustrated in FIGS. 5 and 9 so that the CPU can control these gates.

As previously described in the exemplary embodiment, the amplitude of the first reference DC source, which is integrated during the second integration interval $T_2$ of the triple slope A/D conversion, is 32 times greater than the second reference DC source which is integrated during the third integration time interval $T_3$.

This is accomplished in the exemplary embodiment by referencing the input to the integrator 51 to a particular non-zero potential rather than to ground. In particular, series resistors R and R/32 shown in FIG. 4 form a voltage divider between the power supply potential of $-15$ volts and ground. Resistor R is 32 K ohms and resistor R/32 is 1 K ohm. Therefore, the reference potential which is always applied to the non-inverting input of OP-AMP 99 of the integrator 51 has an amplitude equal to 1/33 of the power supply potential and has the same polarity. In the exemplary embodiment this reference potential fixed is at $-15/33$ volts relative to ground potential by resistors R and R/32.

During the first integrating interval $T_1$ of the triple slope conversion, a positive analog weight signal is normally applied to the integrator 51. Then, during the second interval $T_2$, the $-15$ volt power supply provides the first reference DC source having a polarity opposite to the polarity of the analog weight signal and having an amplitude of $-32/33 \times 15$ volts relative to the reference potential at the noninverting input of the OP-AMP 99.

During the third integrating interval $T_3$, FET 96 is switched on to apply a second reference DC source to the integrator which is derived through resistor 91 from ground potential. Since ground potential is positive with respect to the reference voltage at the noninverting input of OP-AMP 99 and has an amplitude of 15/33 volts, the connection of the integrator input 98 to ground through resistor 91 effectively provides a second reference DC source during interval $T_3$ which is both opposite in polarity to and 1/32 the amplitude of the reference DC source applied during interval $T_2$.

Except for this manner of referenceing the integrator 51, it is a conventional integrator circuit including an integrating capacitor 100.

The output of the integrator 51 is applied to the amplifier 52 and through it to the threshold detector 53. The amplifier 52 comprises an OP-AMP 104 and is provided to amplify the output of the integrator 51 to make the slope of the output of integrator 51 steeper so that the time of its crossover with its initial level can be more accurately determined.

The threshold detector circuit 53 includes an OP-AMP 106. It is simply a high gain amplifier which is driven from one saturation to the other when its input voltage crosses zero.

FIGS. 5-8 show the details of the input and output devices and circuitry and the digital data processing and control circuitry.

In accordance with the present invention, the microcomputer 54 of FIG. 1 may be any of several suitable types of commercially available microcomputers or other similar control circuitry including wired components of types well known in the computer and electronics arts.

In the exemplary embodiment of the invention the microcomputer 54 is essentially a PPS-4 parallel processing, microcomputer system developed by and using devices manufactured by Rockwell International Corporation. The microcomputer 54 is comprised essentially of a central processing unit or CPU which in the exemplary embodiment described herein is a Rockwell PPS-4/2 unit and a memory unit having both read only memory or ROM for storage of program and fixed constants and also random access memory or RAM for storage of data for use in processing. The preferred memory used with the exemplary embodiment of the invention is a Rockwell P/N A17XX device.

In addition to its connection to the output of the threshold detector 53, the microcomputer 54 is also directly connected to the mode selector switches 22, the printer 28, the "Z" key 17, keys 18 and 19, and the "PREPACK ON/OFF" switch 16. The microcomputer 54 is also connected to the front and back indicator lamp displays 26 through suitable interfacing latching, decoding and driving circuitry 56.

Finally, the microcomputer 54 is also connected to a general purpose keyboard and display interfacing device 58 for interfacing the keyboard 20 and the front and back digit displays 24 with the microcomputer 54. A general purpose keyboard and display interface or GPKD interface 58 is employed which in the exemplary embodiment described herein comprises a device manufactured by Rockwell International Corporation and designated P/N 10788. This unit, under the control of the microcomputer 54, receives and temporarily holds data keyed in on the keyboard 20 for subsequent transmission to the microcomputer 54. The GPKD interface unit 58 also receives data from the microcomputer 54 which it applied through decoder/drive logic 60 the front and back digit displays 24 under control of the microcomputer 54. The Rockwell PPS 4 microcomputer system uses four bit data words, eight bit instruction words and in the exemplary embodiment of the present invention twelve bit address words all of which are parallel transferred within the system.

Figure 7:
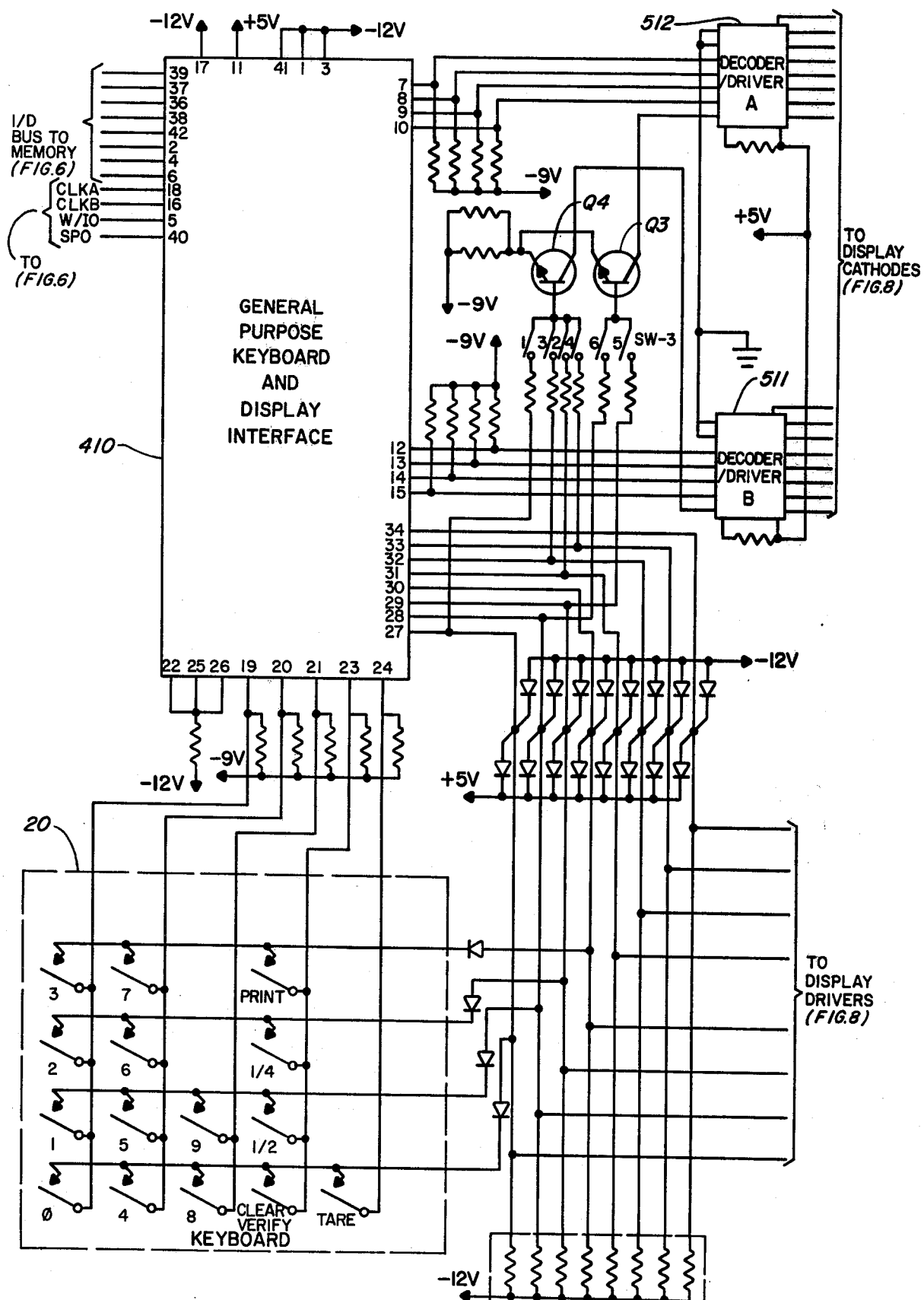

Referring now to FIGS. 5-8, at the top of FIG. 5 is shown the bus system 201 interconnecting the CPU 210 of FIG. 5, the memory 310 of FIG. 6 and the GPKD 410 of FIG. 7. The bus system 201 includes a twelve line address bus 203 which is connected only to the memory 310 for addressing the RAM and ROM memory. The bus 201 further includes an eight line instruction/data bus 205 which transfers, at different times, either eight bit instruction words or two four bit data words bidirectionally. The bus 201 further includes two clock lines, CLKA and CLKB, a write command line and an input/output enable line W/10 for use during one clock phase time for instructing the RAM memory to write and for use during another clock phase time for disabling the RAM memory and enabling the input/output devices for the performance of an input/output instruction. The bus system also includes a "synchronized power on" CPU output line labelled SPO for use in initializing other devices in the circuit.

The CPU 210, which is shown as a single block in FIG. 5, is illustrated in greater detail in FIG. 9. FIG. 9 is a block diagram available with technical information from Rockwell International, Inc.

The CPU 210 as shown in FIG. 9 has an accumulator 810 which is the basic work register of the CPU. It also has an arithmetic logic unit 811 with a carry register 812 and an X register 813 all connected to the accumulator 810. The CPU 210 further has a data address register 814 and a program address register 815 which may be selectively interconnected with the address bus 203 output pins 27 through 38 through the multiplex driver circuits 816. The CPU 210 has two program address save registers 817 and 818 to provide two levels of subroutine stacking. The Rockwell CPU PPS 4/2 is provided with internal clock 819 when a suitable crystal 820 is connected to its pins 18 and 19. The instruction/data bus 205 is connected to pins 6 through 13 which in turn are connected to multiplex receivers 821 and 822 and the multiplex driver 823. Incoming instructions are decoded by the CPU in its instruction decode logic 824 and two separate flip-flops 825 and 826 are provided for programmer use.

In addition to the bus input/output capabilities, the CPU 210 is provided with 12 discrete input/output pins, four from each of the three registers 827, 828, and 829. These are connected as illustrated to pins 1-5, 23-26, and 40-42.

Referring back to FIG. 5, the discrete input/output register 828 of the CPU as shown in FIG. 9 is connected as shown in FIG. 5 to the four control lines labelled $T_1$, $T_2$, $T_3$, and "Reset" which extend to the switching circuit 50 in order to control the integrations of the triple slope A/D conversion. The crystal 820, shown in FIG. 5, controls the frequency of its internal clock generator which is preferably 0.20 MHZ.

A time delay circuit 222 FIG. 5, is provided for delaying the CPU 210 and in particular its program counter (which must be returned to 0000) after power is first applied or after a brief power interruption or momentary power failure.

As illustrated in FIG. 5, output terminals 23-26 of the CPU 210 also provide four bit data to the printer.

Figure 10:
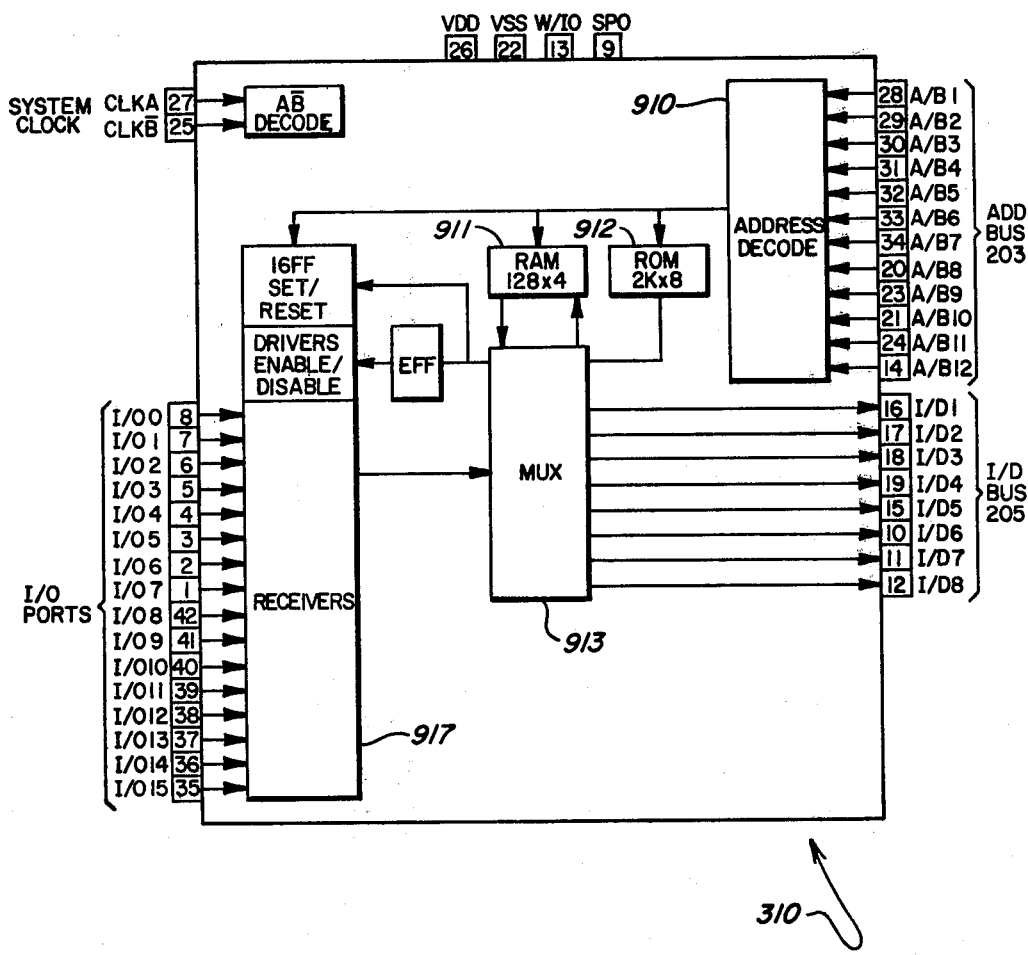

FIG. 6 illustrates, in block form, the memory 310 which is illustrated in greater detail in FIG. 10. Referring to FIG. 10, the memory includes both RAM memory 911 and ROM memory 912. These are connected to the instruction/data or I/D bus 205 through a multiplexer 913 which is connected to pins 10-12 and 15-19. An address decoder 910 is connected to the address bus 203 through pins 14, 20, 21, 23, 24 and 28-34. The memory 310 further has sixteen discrete input/output ports connected at pins 1-8 and 35-42 through receiver buffers 917 to the multiplexer 913.

The read-only memory 912 has a storage capacity of 2k eight bit words, any of which may be addressed over the address bus 203 and its stored eight bit word returned to the CPU over the instruction/data bus 205.

The random access memory 911 has 128 four bit storage registers for storing four bit words. Dependent upon the clock phase and the state of the w/IO line connected from terminal 14 of the CPU to terminal 13 of the memory, the addressed memory register will read its four bit contents out onto the instruction/data bus 205 and will write, if so instructed, a new four bit work from the CPU into the addressed register through the multiplexer 913.

Returning to FIG. 6, the output 102 from the threshold detector 53 illustrated in FIG. 4 is applied to one of the discrete input/output ports at pin 42 of the memory 310.

Eight other discrete input/output ports connected to pins 1-8 of the memory 310 are connected to the twelve manual mode selection switches 22 illustrated in FIG. 6. Half of the twelve switches, labelled SW-1, are connected between pin 2 and through diodes to pins 3-8 of the memory 310. The other half of the twelve switches, labelled SW-2, are connected between pin 1 and pins 3-8. Each of the individual switches of both switches SW-1 and SW-2 are individually and independently actuable and each is labelled with a number which corresponds to the function listed in block 22 on FIG. 1. Consequently, the microcomputer 54 can interrogate the condition of switches SW-1 by strobing pin 2 and examining the data of lines 3-8 and can interrogate switches SW-2 by strobing pin 1 and examining the data of pins 3-8. It is to be understood that any particular one of these switches may be assigned any particular operational mode function.

Printer control signals are applied to the printer from the five discrete input/output memory ports 35-39 of the memory 310 illustrated in FIG. 6. The "print complete" signal when received from the printer is applied to the discrete input/output port 40 of the memory 310.

Figure 8:
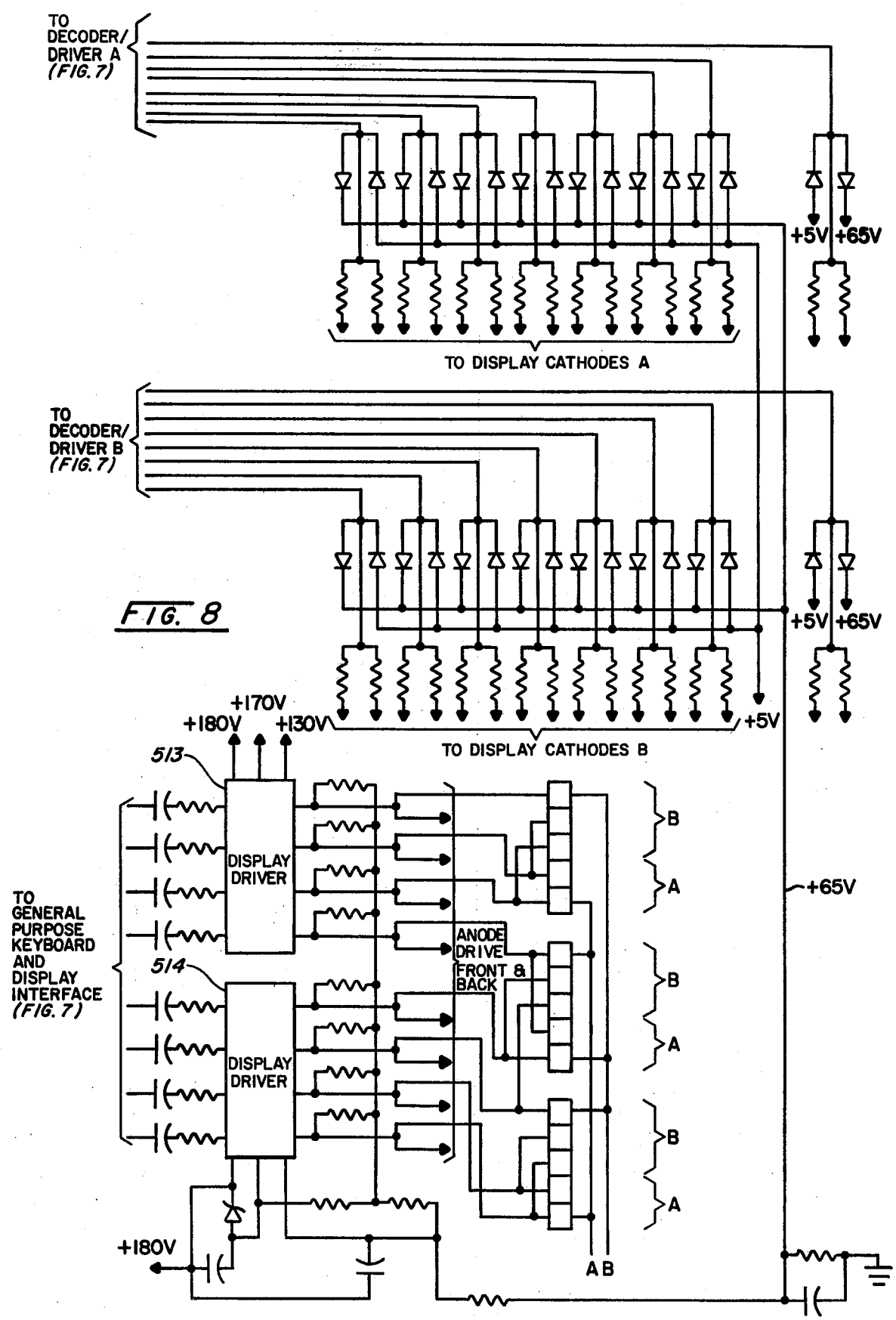

FIG. 7 includes, in block diagram form, the general purpose keyboard and display interface 410. FIGS. 7 and 8 illustrate the keyboard 20 and display drivers connected thereto.

The GPKD interface 410 used in the exemplary embodiment is a device manufactured by Rockwell International Corporation and given their type number P/N 10788. It is interconnected with the memory 310 and the CPU 210 through the data bus 205 as well as the clock A, clock B, synchronized power on and write/input-output lines of the bus 201.

Figure 11:
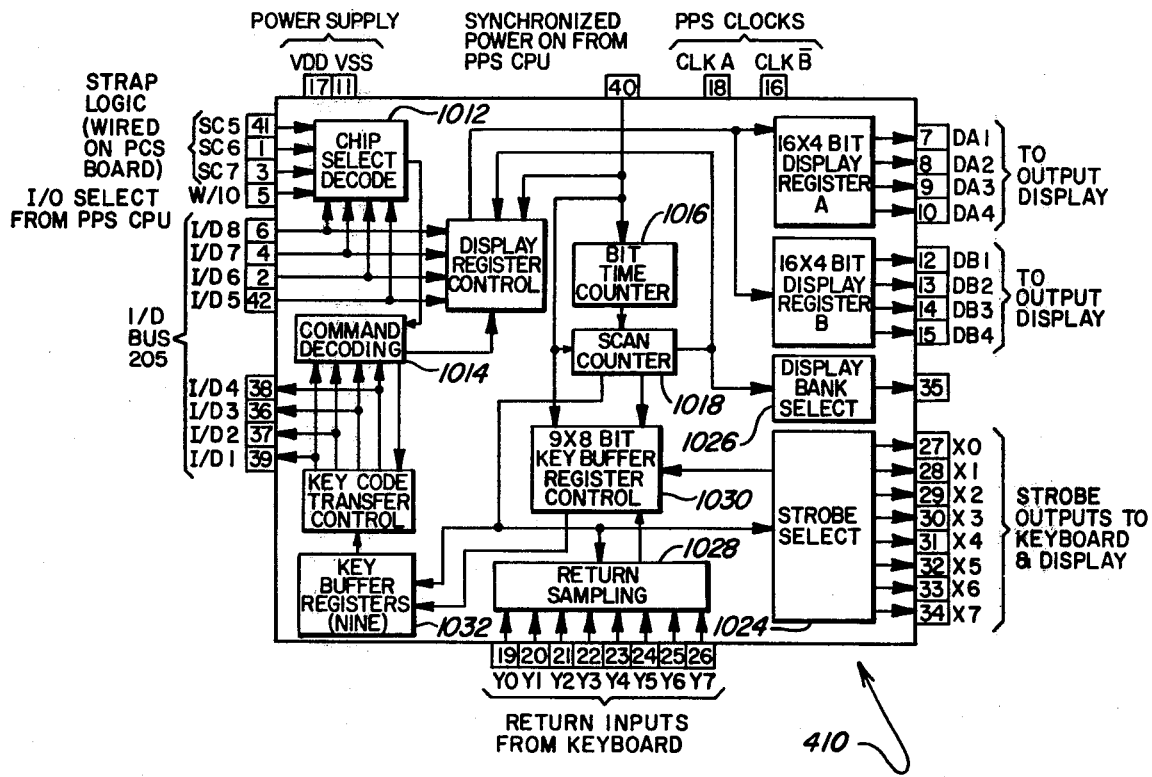

A block diagram of the circuit of the GPKD interface 410 is illustrated in FIG. 11. Referring to FIG. 11, chip select decode circuit 1012 compares the chip address data applied by the CPU 210 to pins 2,4, and 42 of the GPKD over the instruction/data bus to the data on the chip select straps at pins 1, 3, and 41. If the strapped address is identical to the address on the instruction/data bus, if the instruction/data line connected to pin 6 is true, and if the write/input-output mode has been selected by the CPU so that the CPU has trued the W/IO input pin 5, then the GPKD is selected to execute the command.

The command is applied to the GPKD from the CPU 210 over that half of the instruction/data bus which is connected to pins 36 through 39. The command is decoded by the command decoding logic circuitry 1014. A bit time counter 1016 is provided to divide the clock frequency from the PPS clock and apply its output to a scan counter 1018. The scan counter 1018 provides timing signals for the display register control display bank select 1026, return sampling 1028, key buffer register 1032, and control 1030 and strobe select circuit 1024.

The GPKD of FIG. 11 includes two display registers A and B, which store display data. These display registers store data from the instruction/data bus and, upon command, output the data to their associated displays.

The strobe select circuit 1024, with its eight output pins, 27 through 34, sequentially outputs eight strobe signals to its eight output pins. These outputs may be used to strobe an 8×8 keyboard matrix or for multiplexing display characters.

The return sampling circuit 1029 receives data from the strobed keyboard indicating the states of the key matrix return lines from the keyboard. When a key closure is detected at the return sampling circuit 1028, the key buffer register control circuit 1030 and loads the key code for that key into the buffer register 1032. Subsequent key closures which are detected may also be stored in the key buffer registers 1032 until they are called for by and transferred to the CPU on a first in, first out basis.

Returning to FIG. 7, the eight strobe select output pins 27 through 34 are applied four to the display driver 513 of FIG. 8 and four to the display driver 514 of FIG. 8. The outputs of the display drivers 513 and 514 are applied to the anode drive terminals of the front and back displays.

Referring to FIG. 7, since various decimal point locations are required by the various countries, a switch labelled SW-3 consisting of six individually operated single pole, single throw switches is associated with transistors Q3 and Q4 for selectively enabling those digit positions in which decimals may be displayed.

Four of the strobe select lines at pins 27 through 30 of the GPKD 410 are additionally applied to the four input strobe lines of the keyboard matrix of the keyboard 20. The keyboard return lines are connected to pins 19 through 21, 23 and 24 of the return sampling inputs of the GPKD 410. These permit interrogation of the keyboard for key depressions.

OPERATION OF THE SYSTEM

Figure 14A:
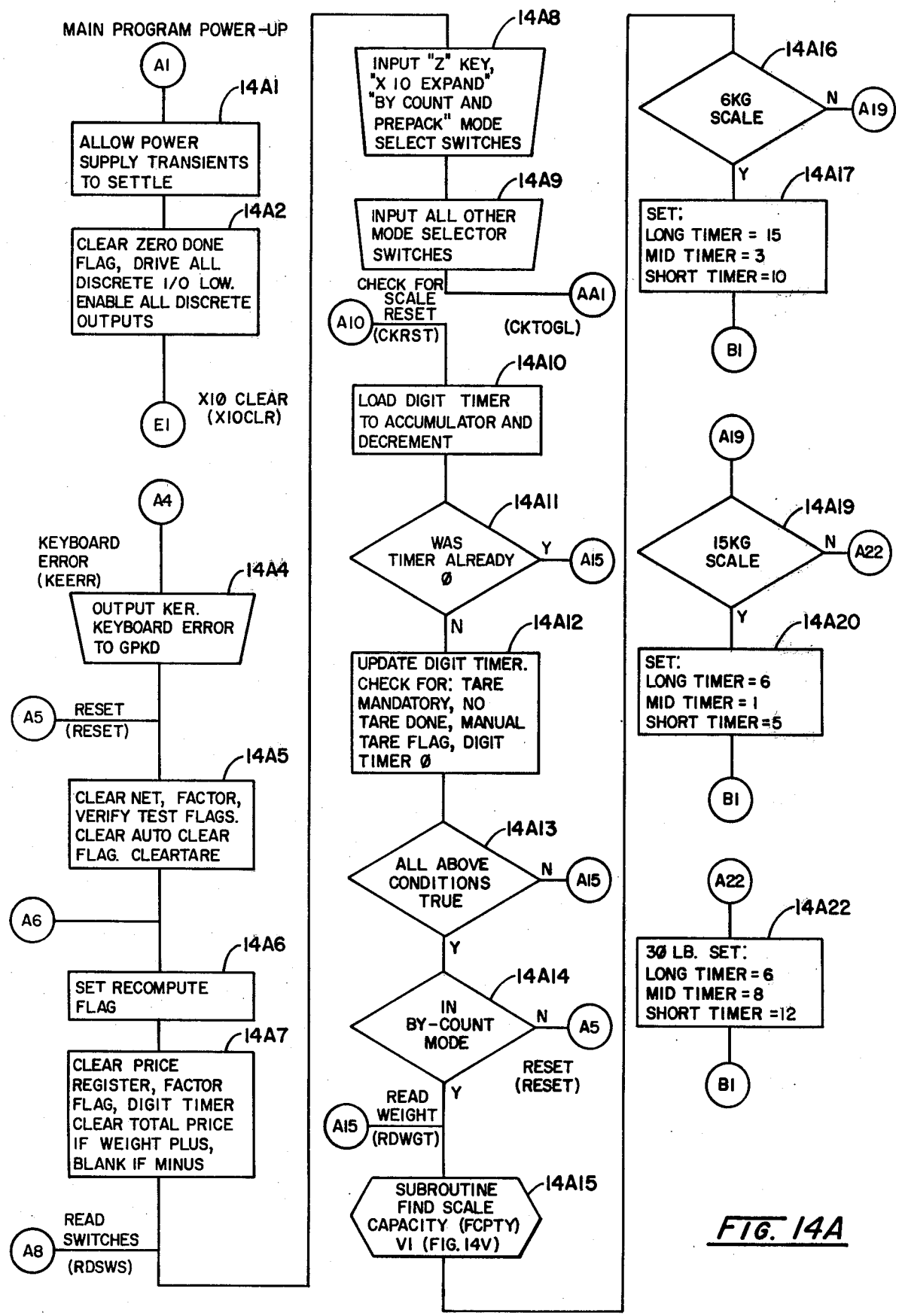
FIGS. 14A through 14Z and 14AA through 14DD are flow diagrams illustrating the operation of the preferred embodiment of the invention. FIG. number 14Q is not used for clarity.
Figure 14B:
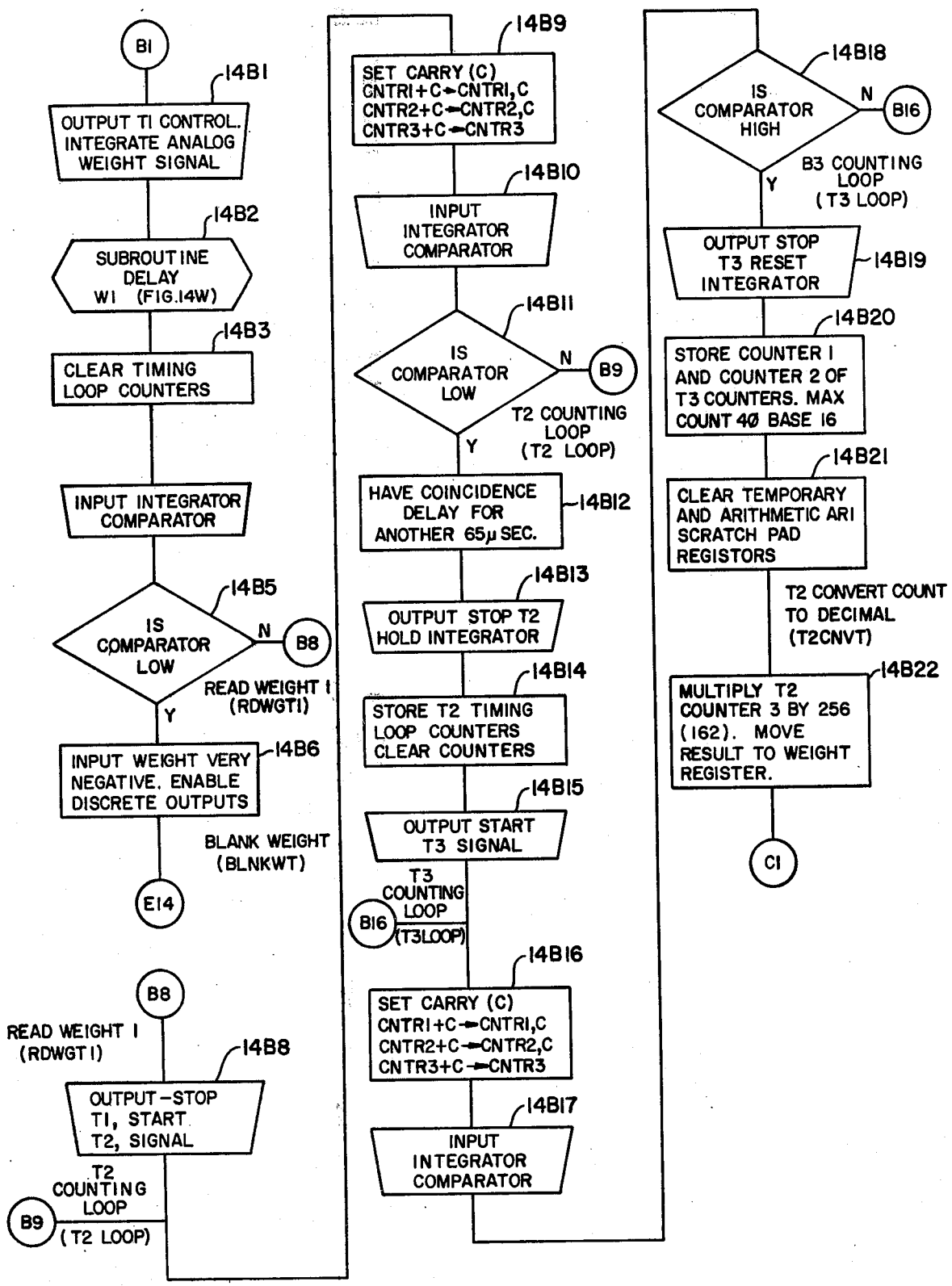
Figure 14C:
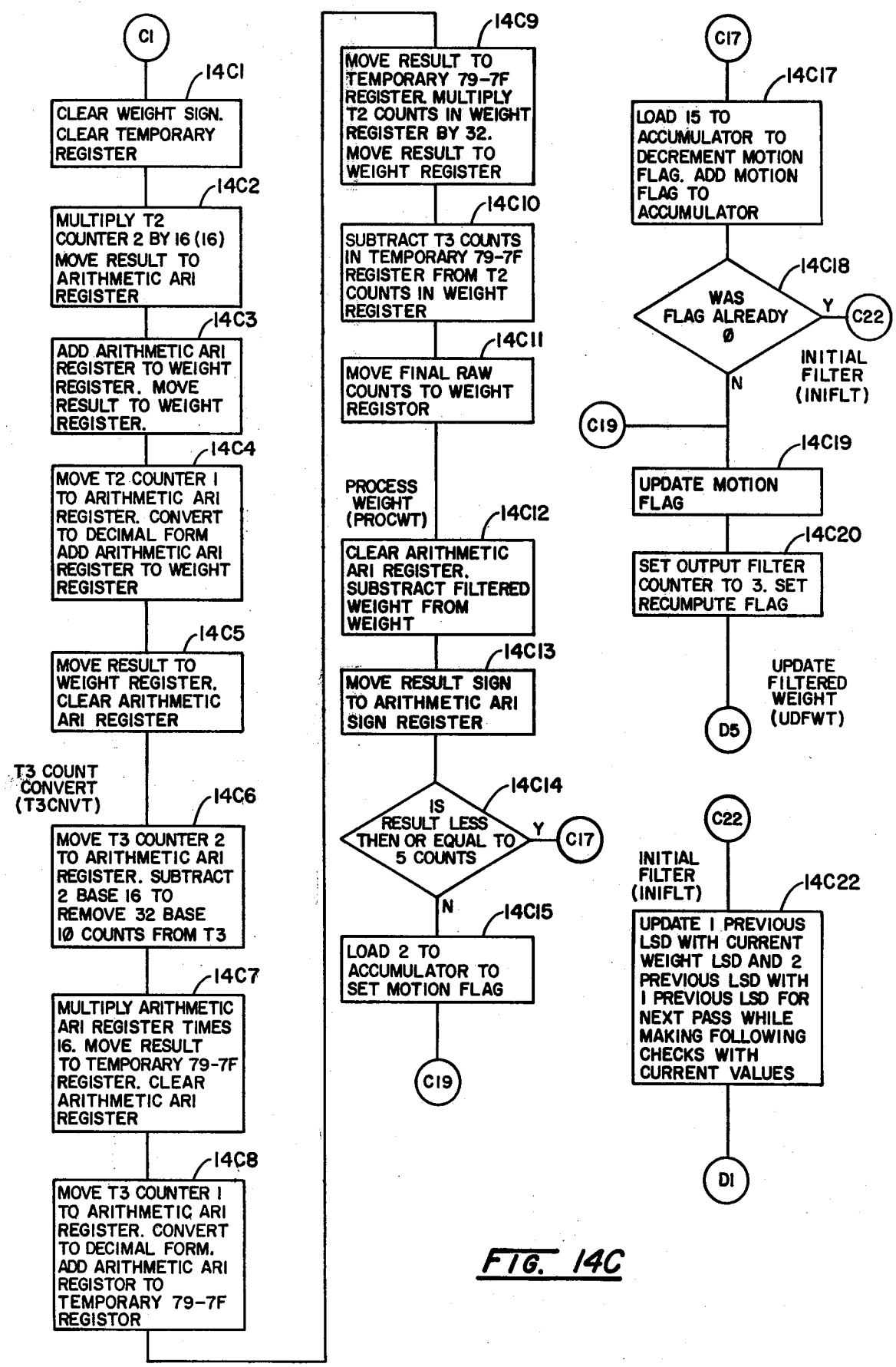
Figure 14D:
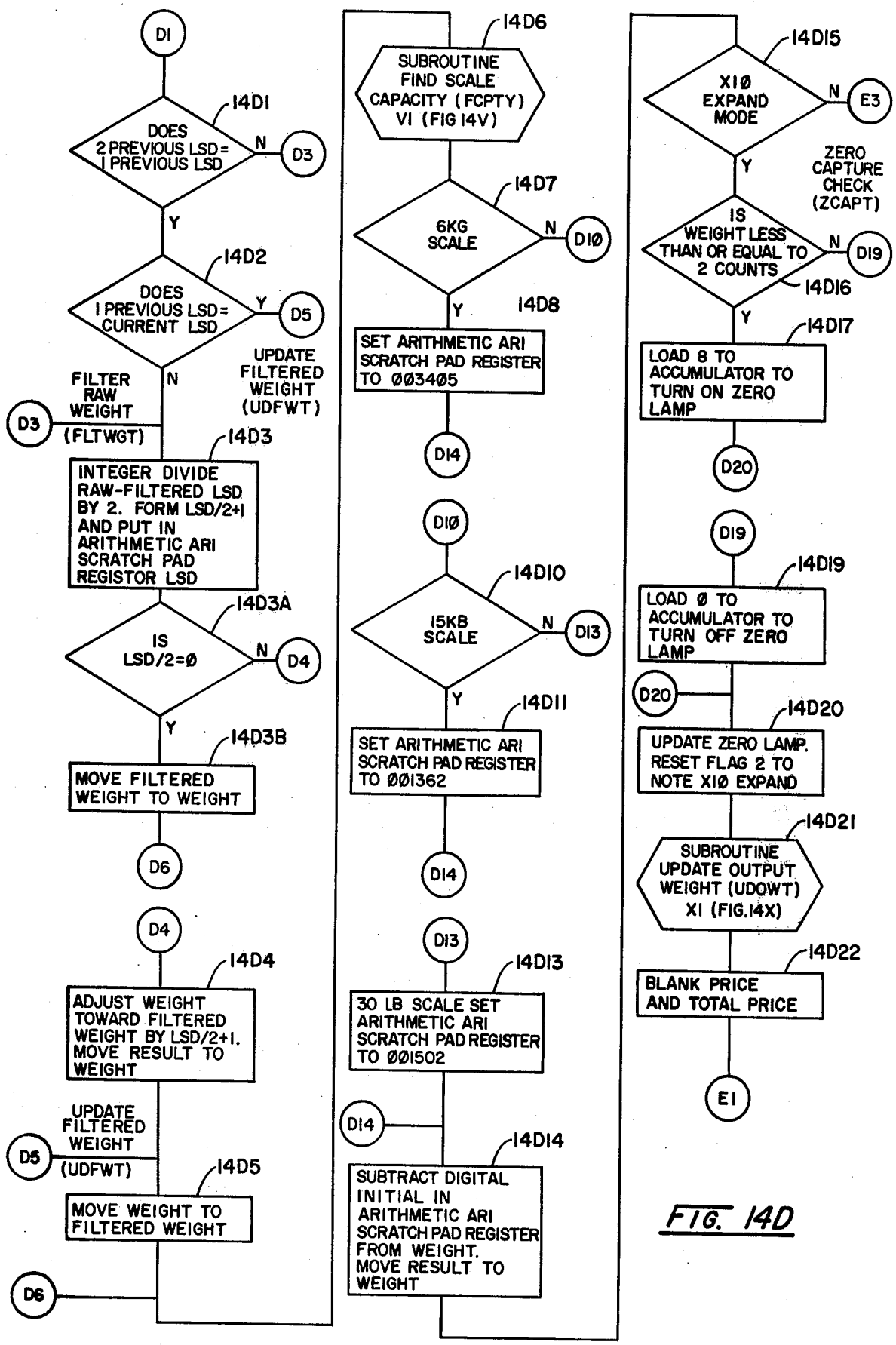
Figure 14E:
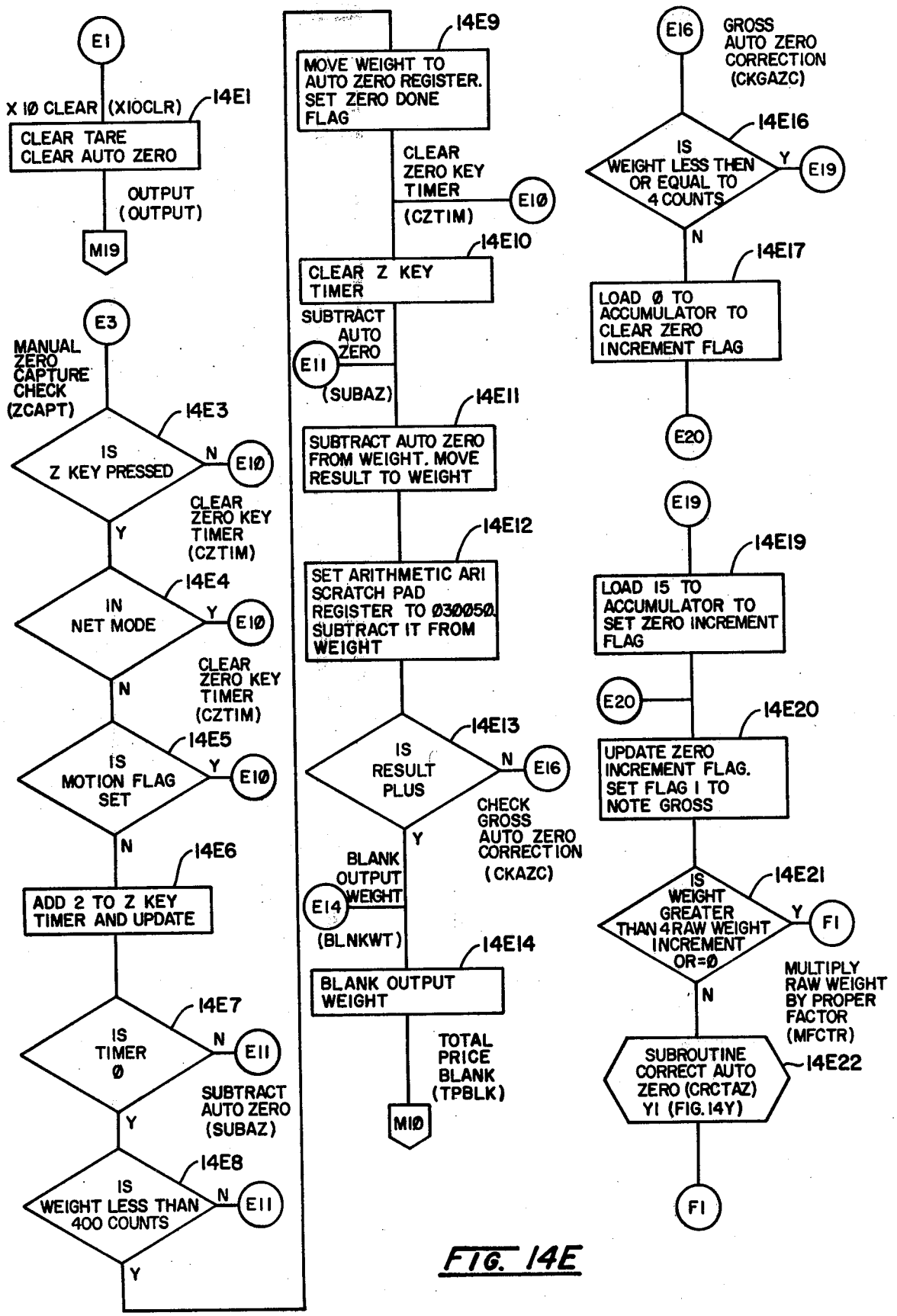
Figure 14F:
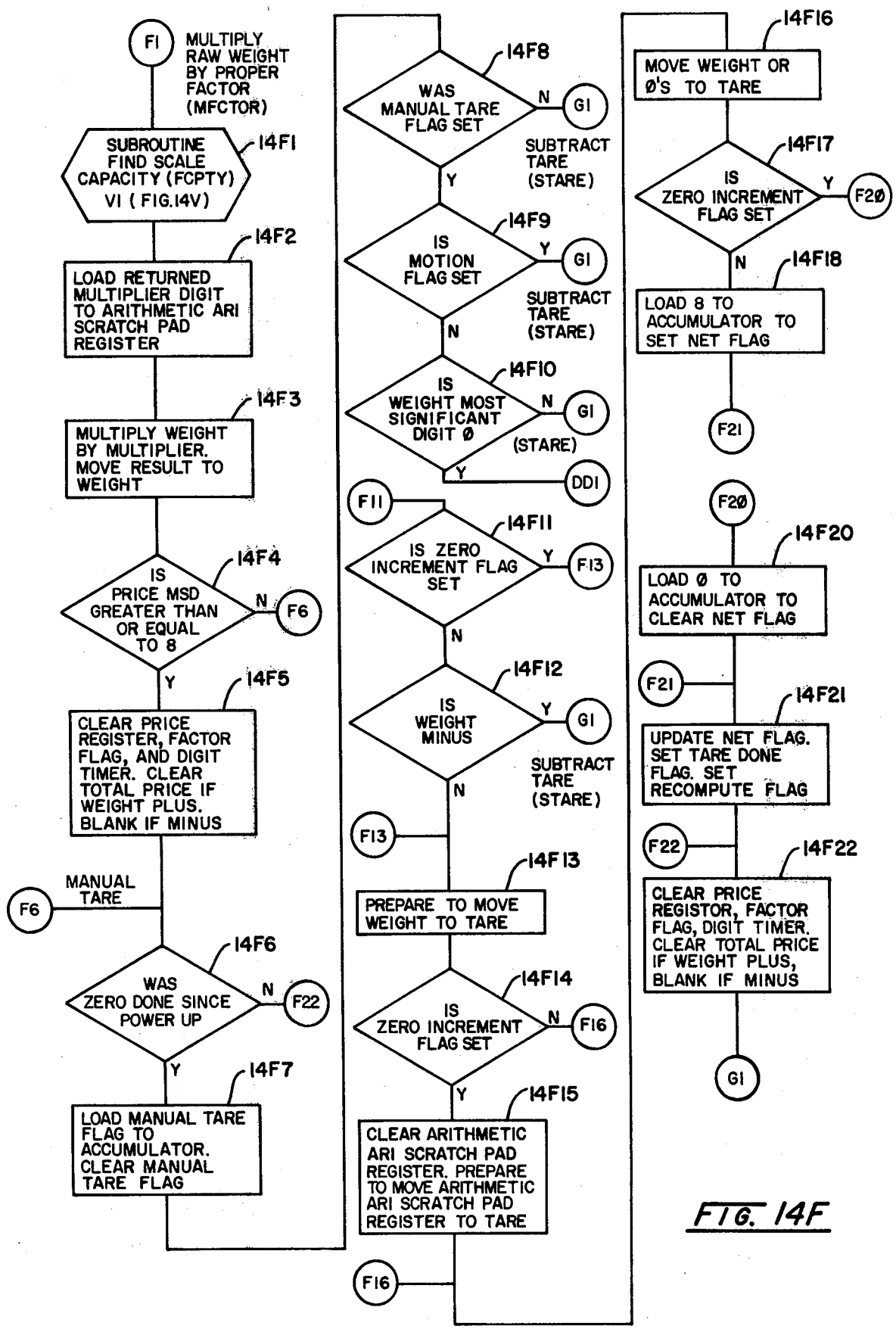
Figure 14G:
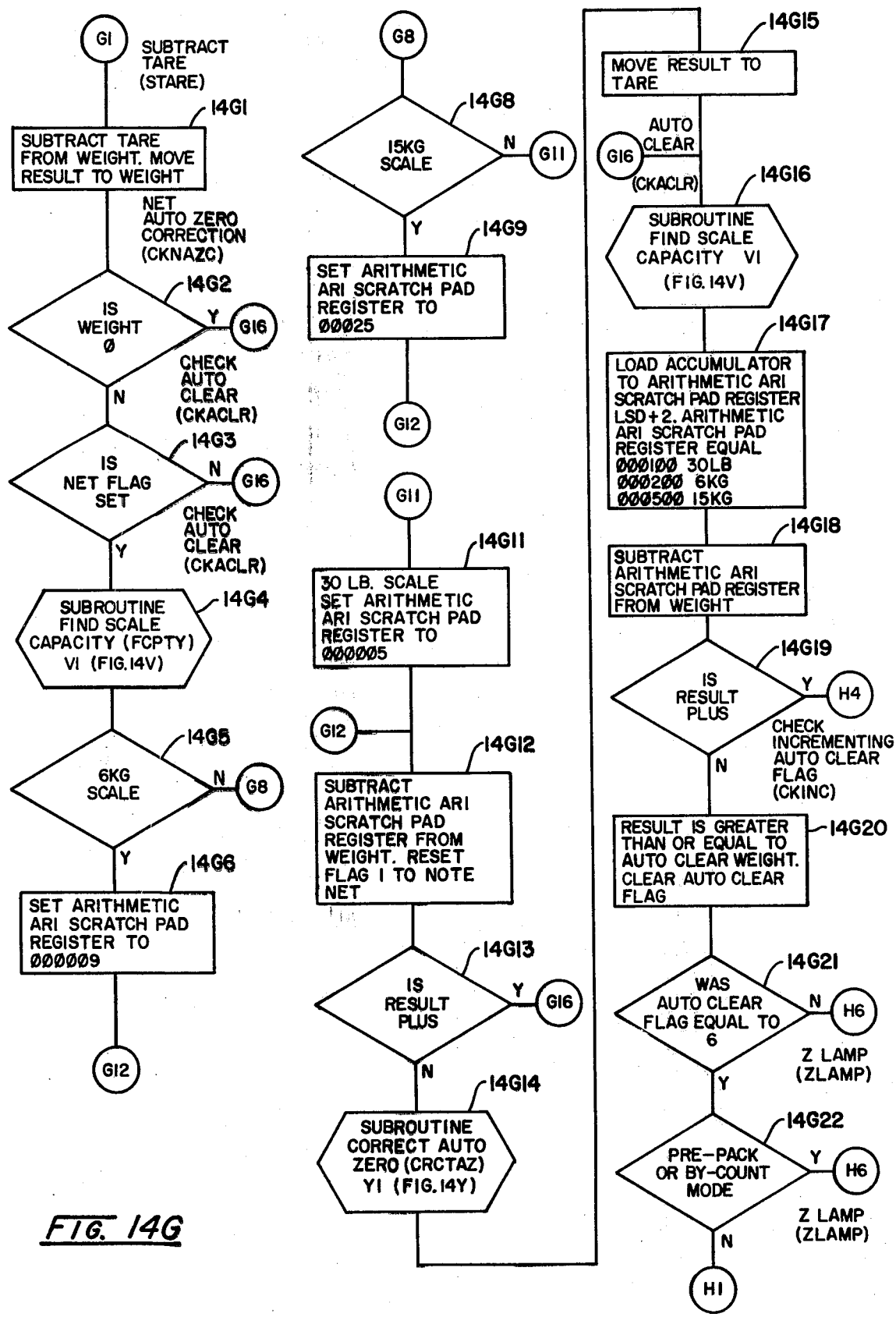
Figure 14H:
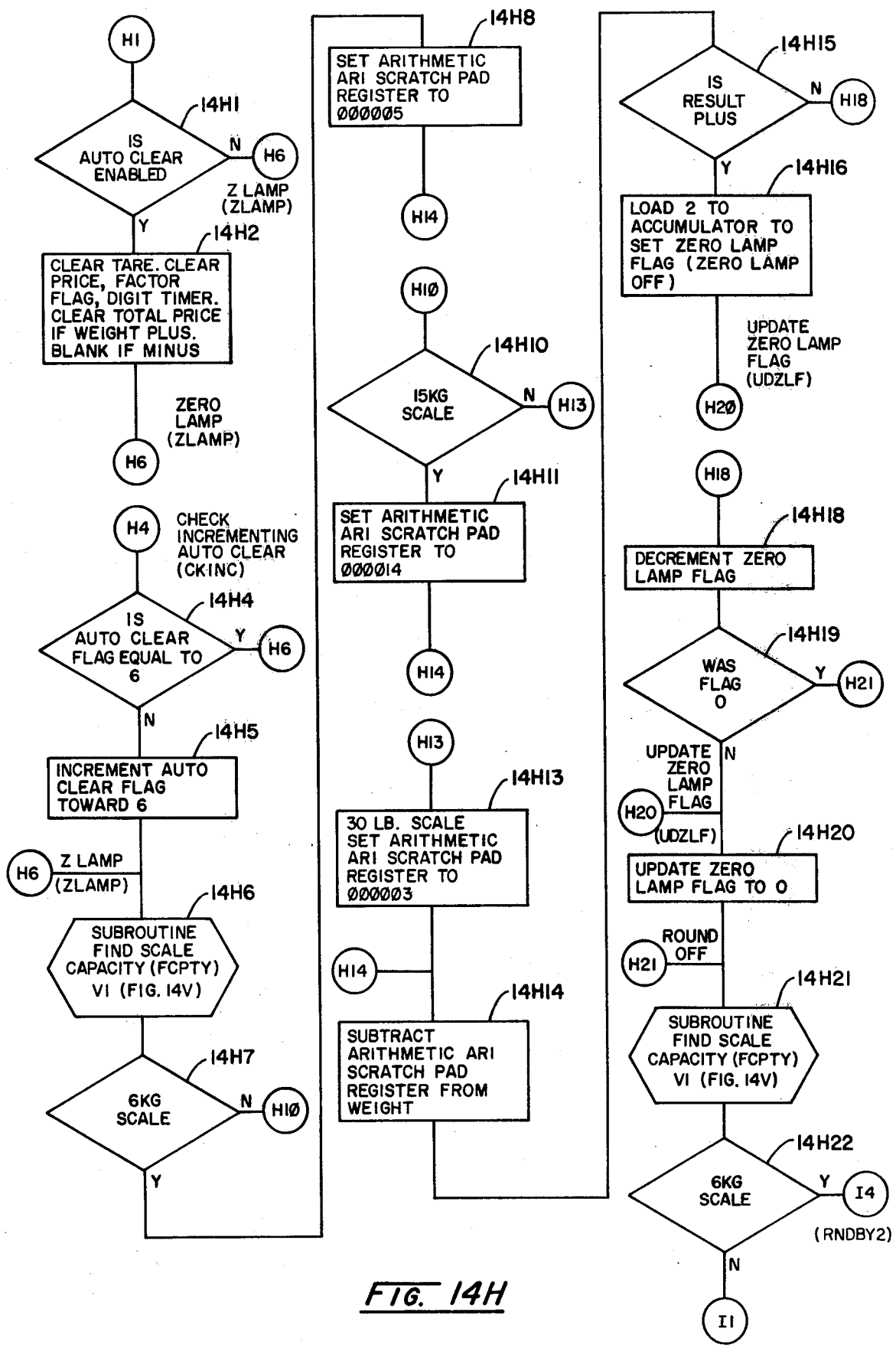
Figure 14I:
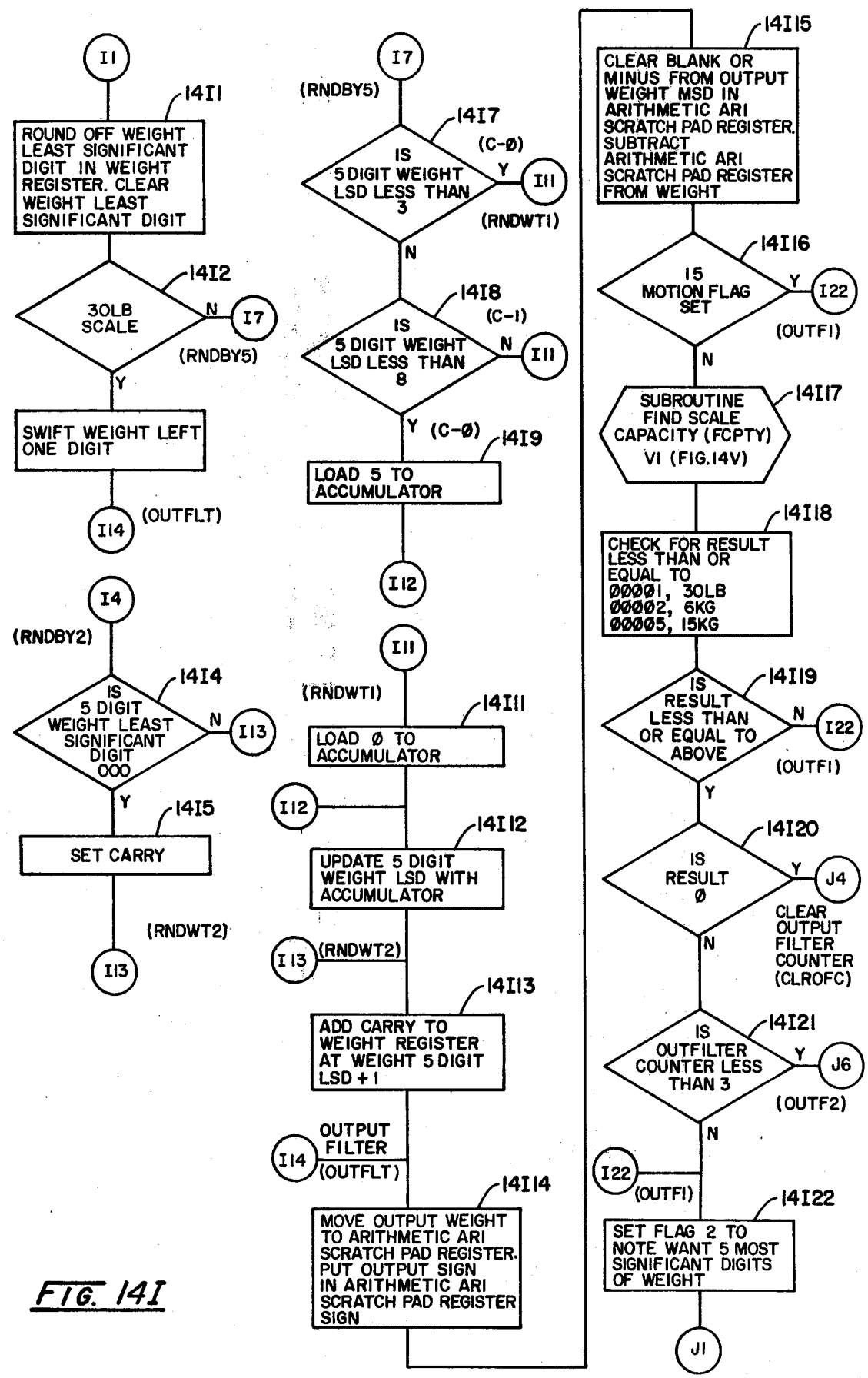
Figure 14J:
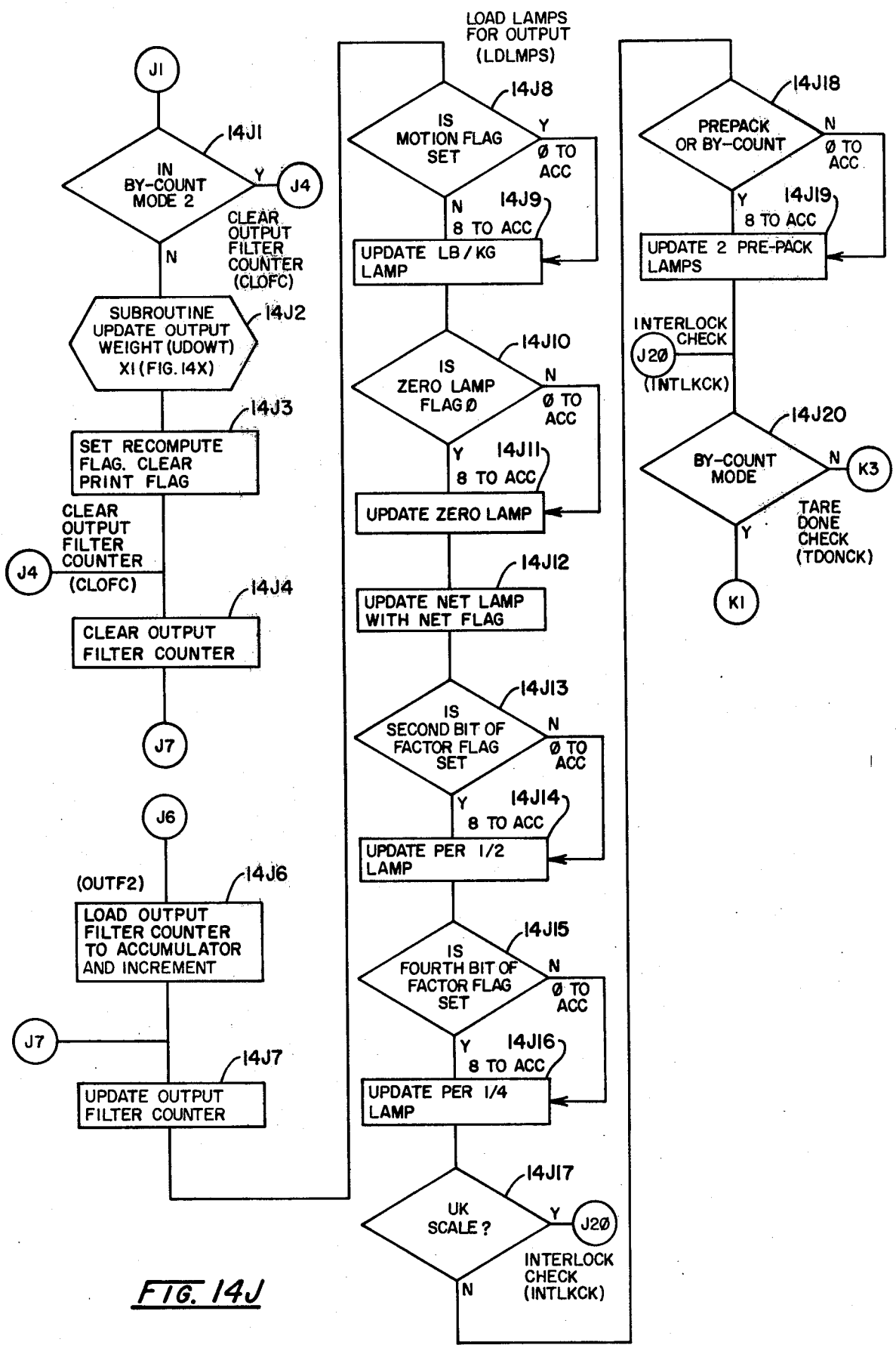
Figure 14K:
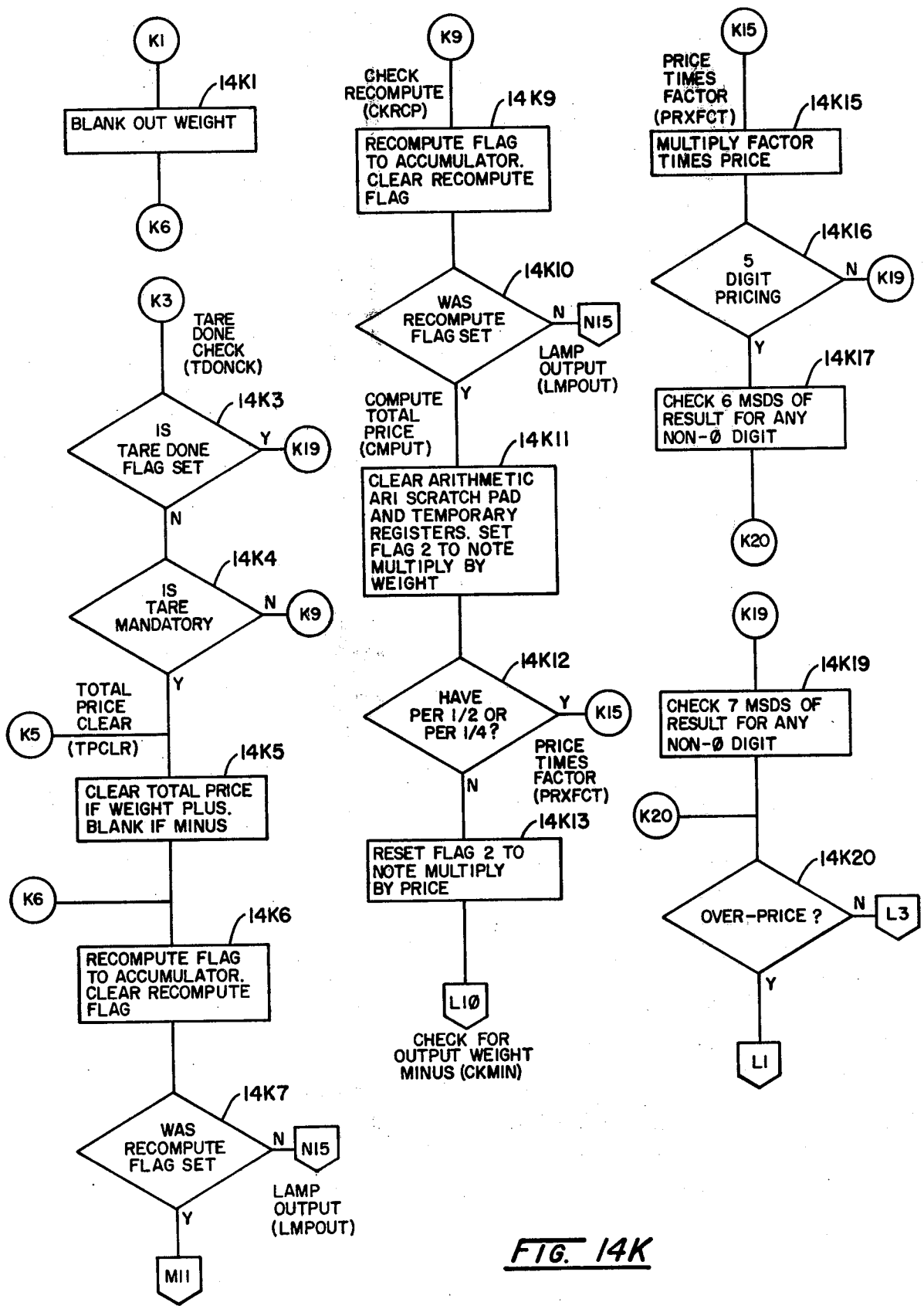
Figure 14L:
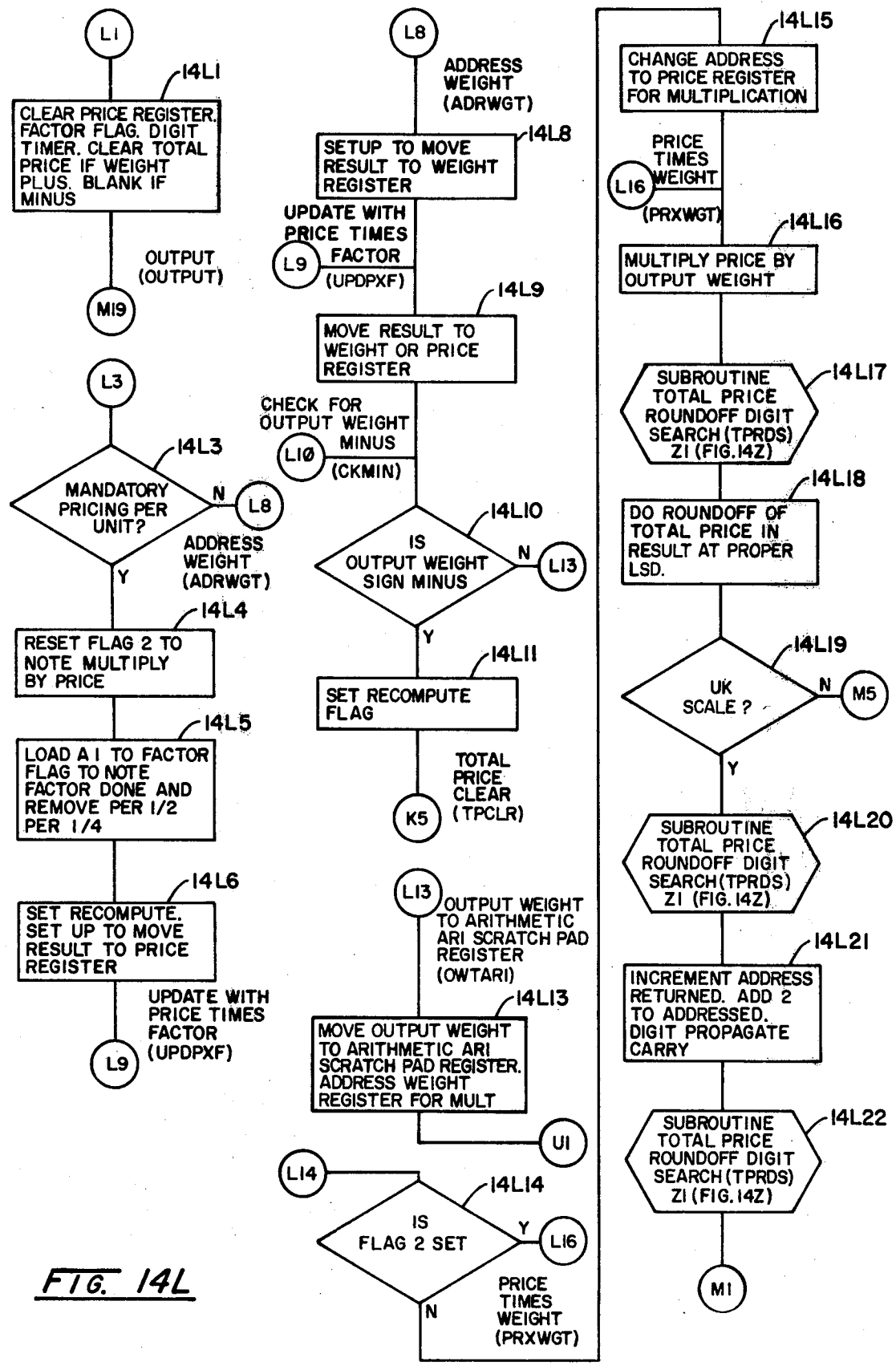
Figure 14M:
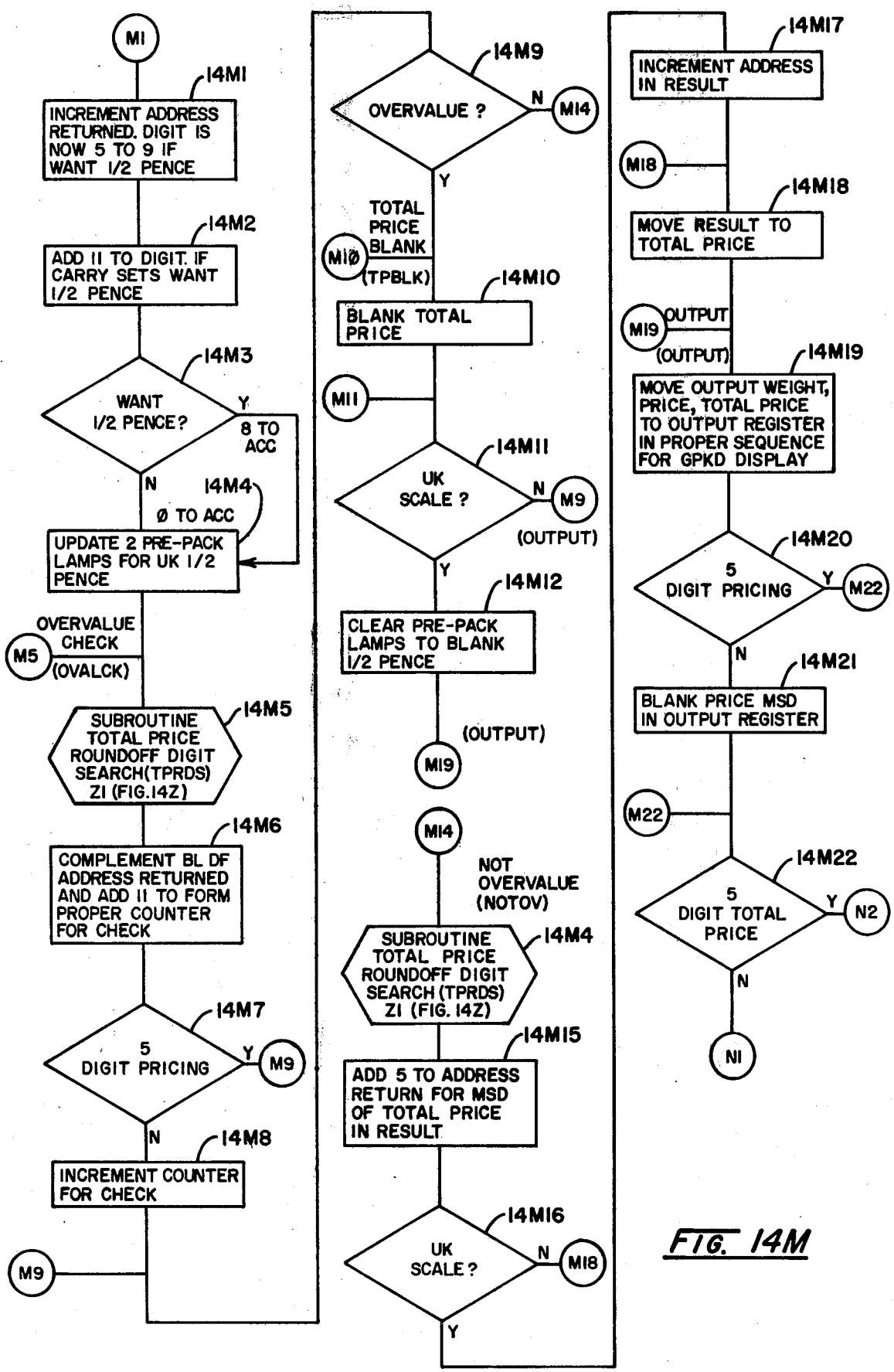
Figure 14N:
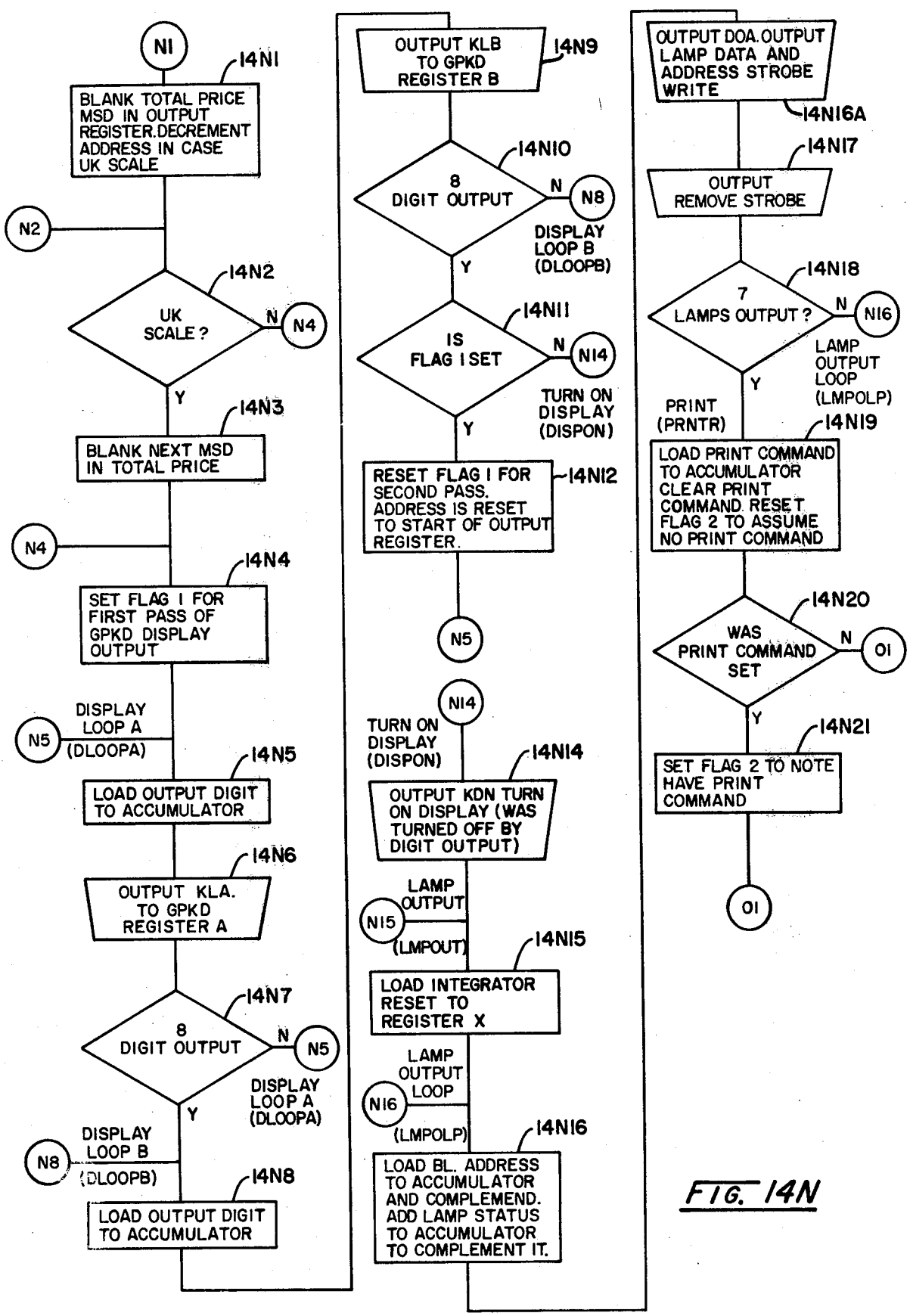
Figure 14O:
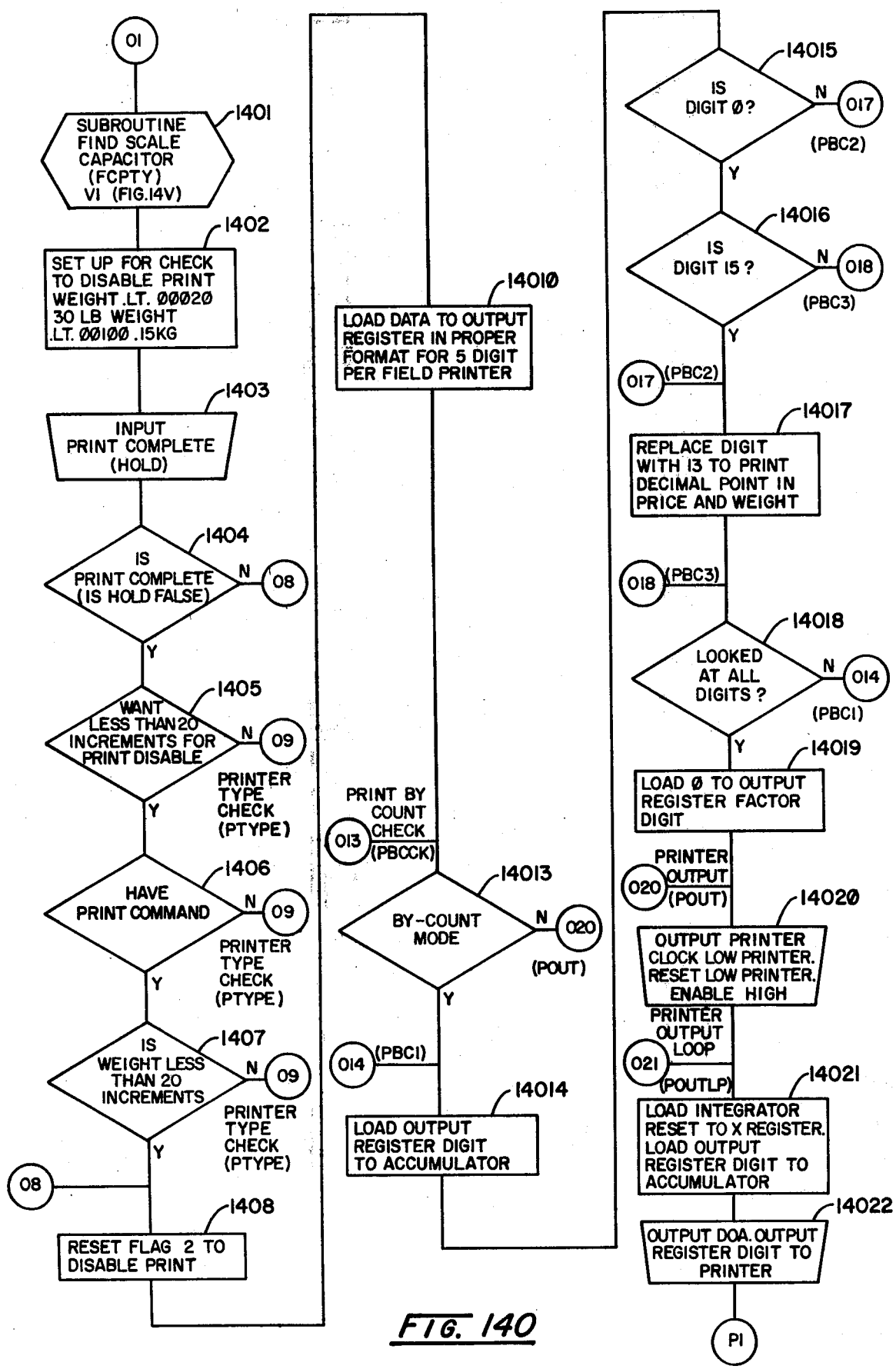
Figure 14P:
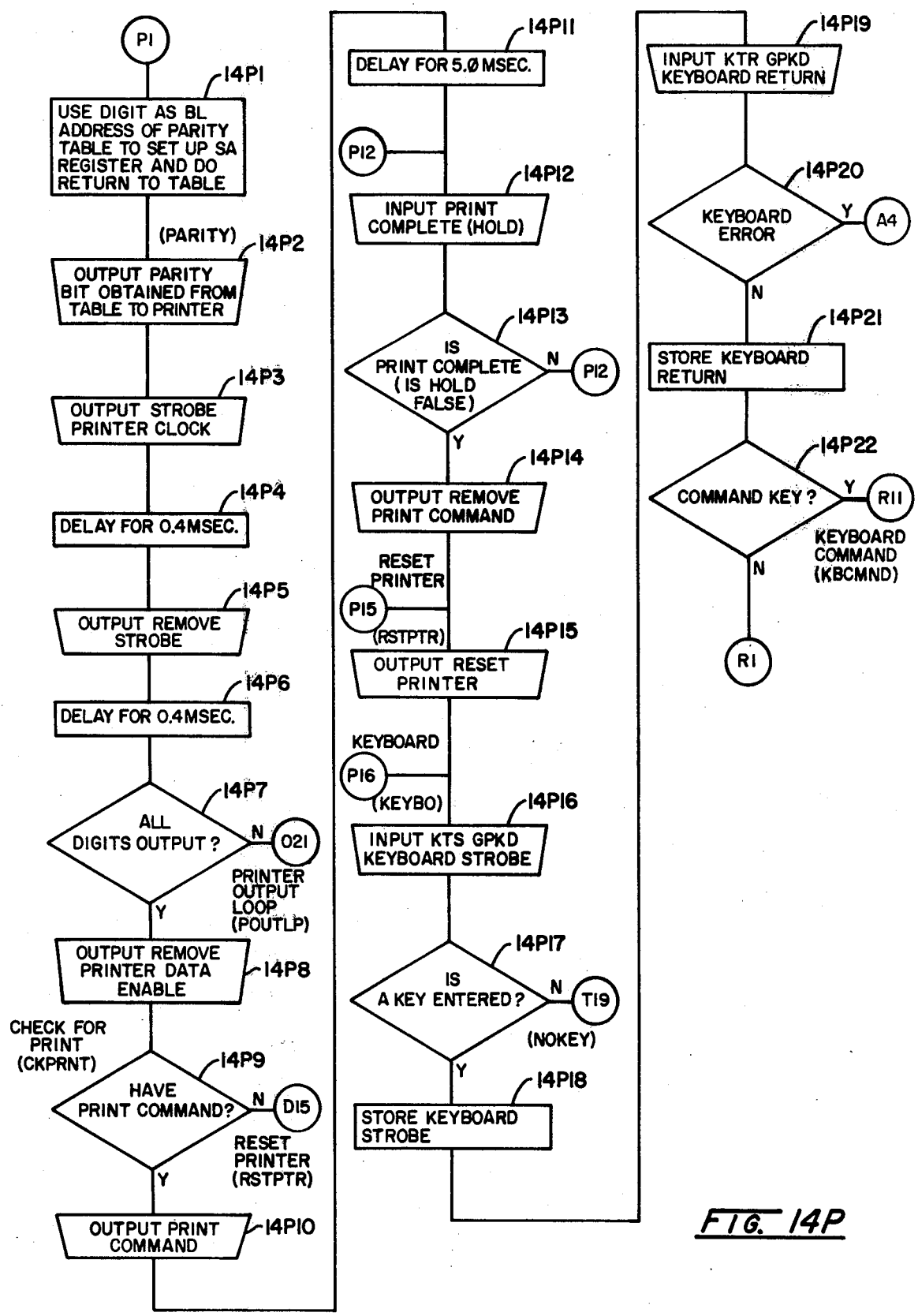
Figure 14R:
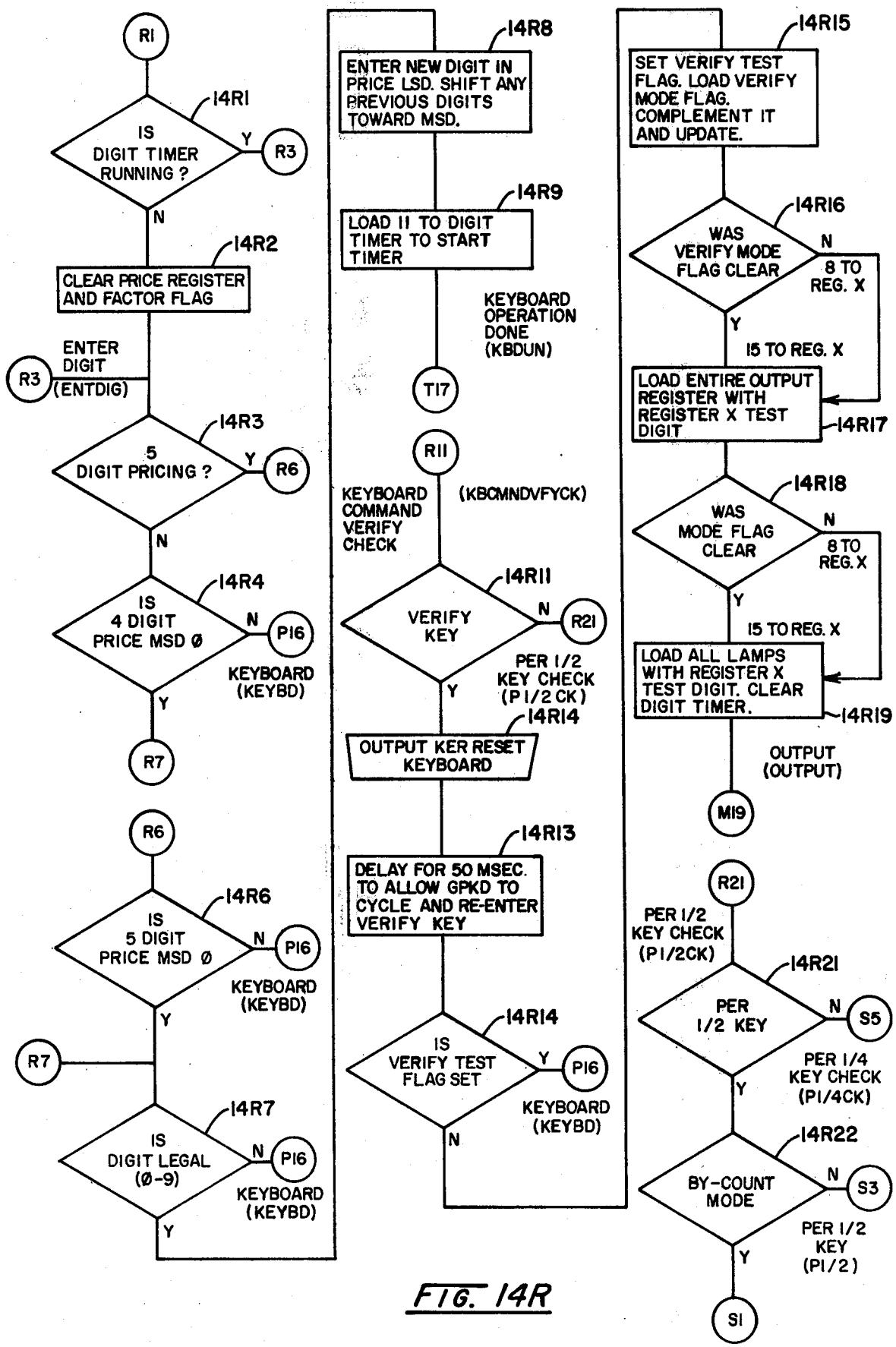
Figure 14S:
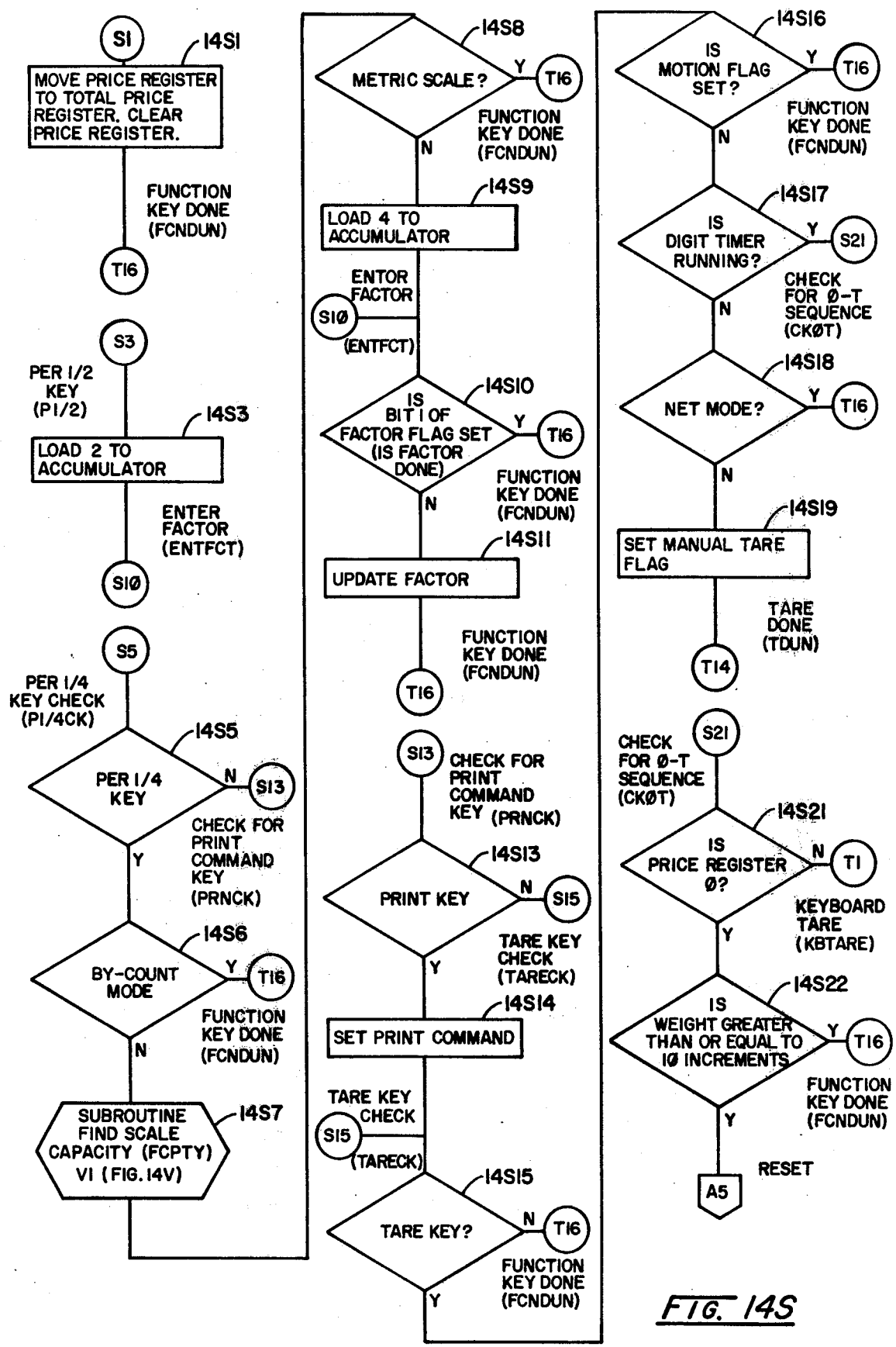
Figure 14T:
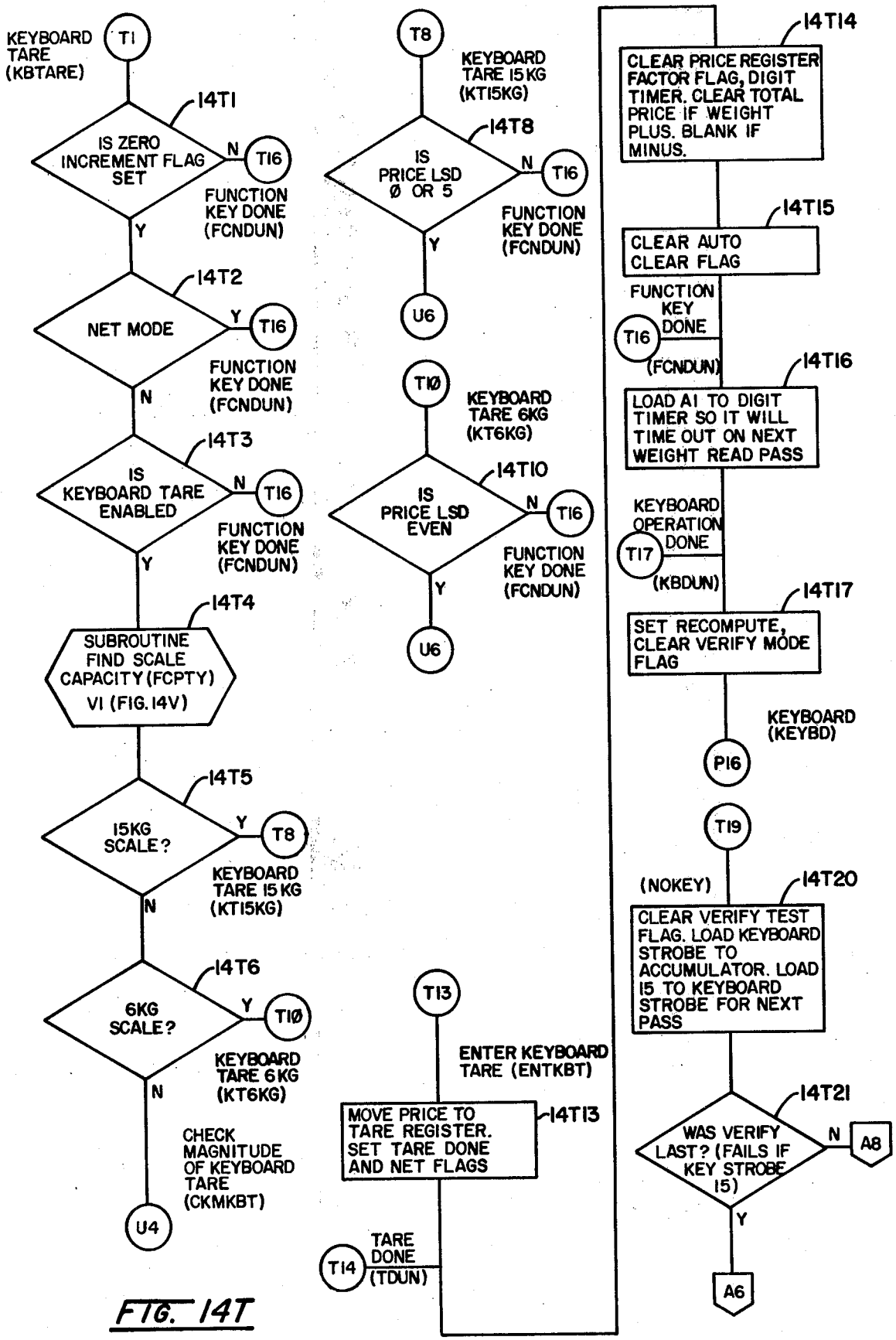
Figure 14V:
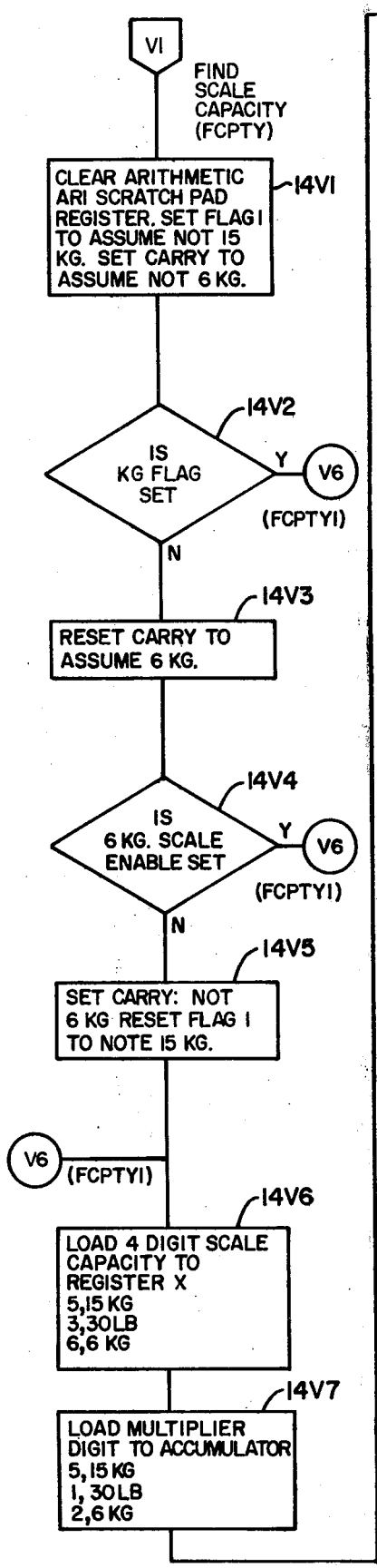
Figure 14W:
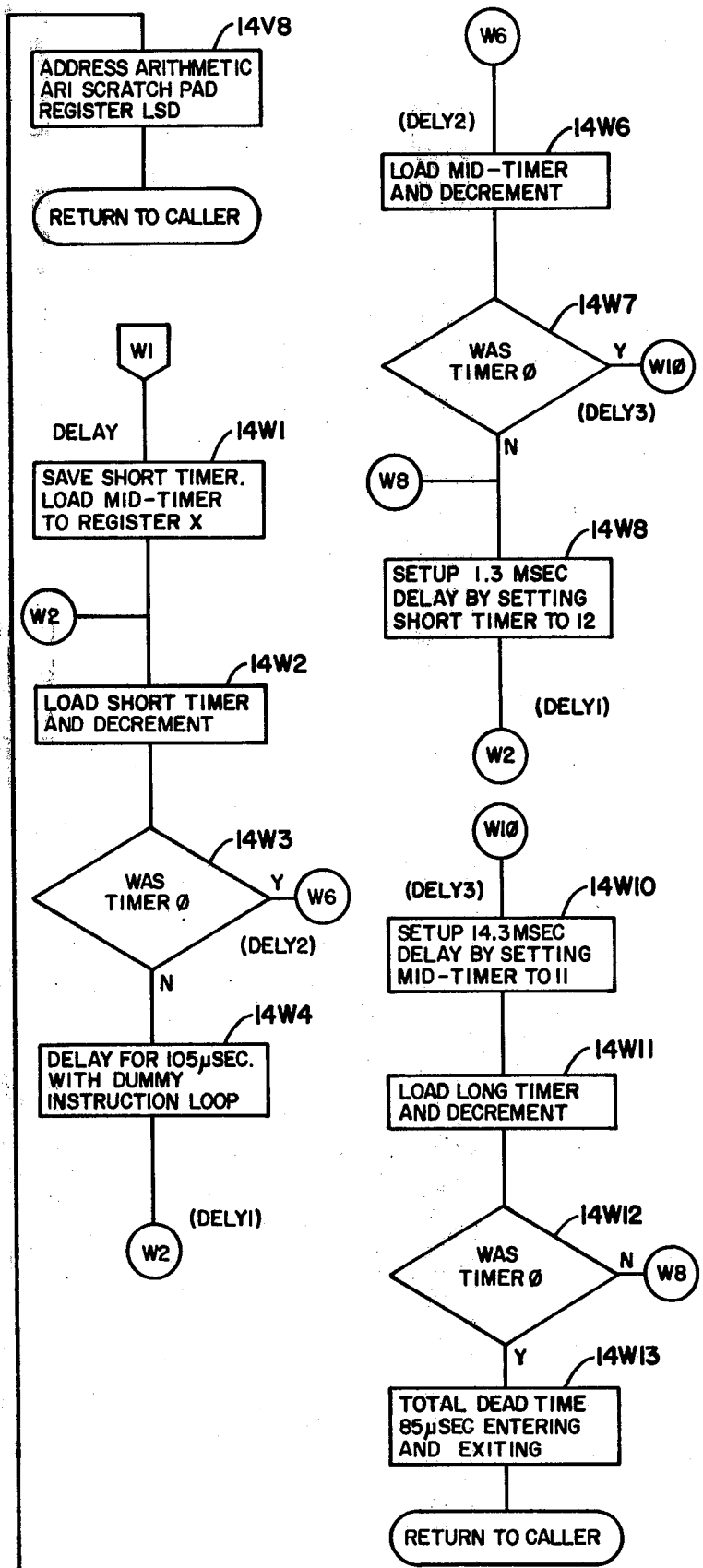
Figure 14X:
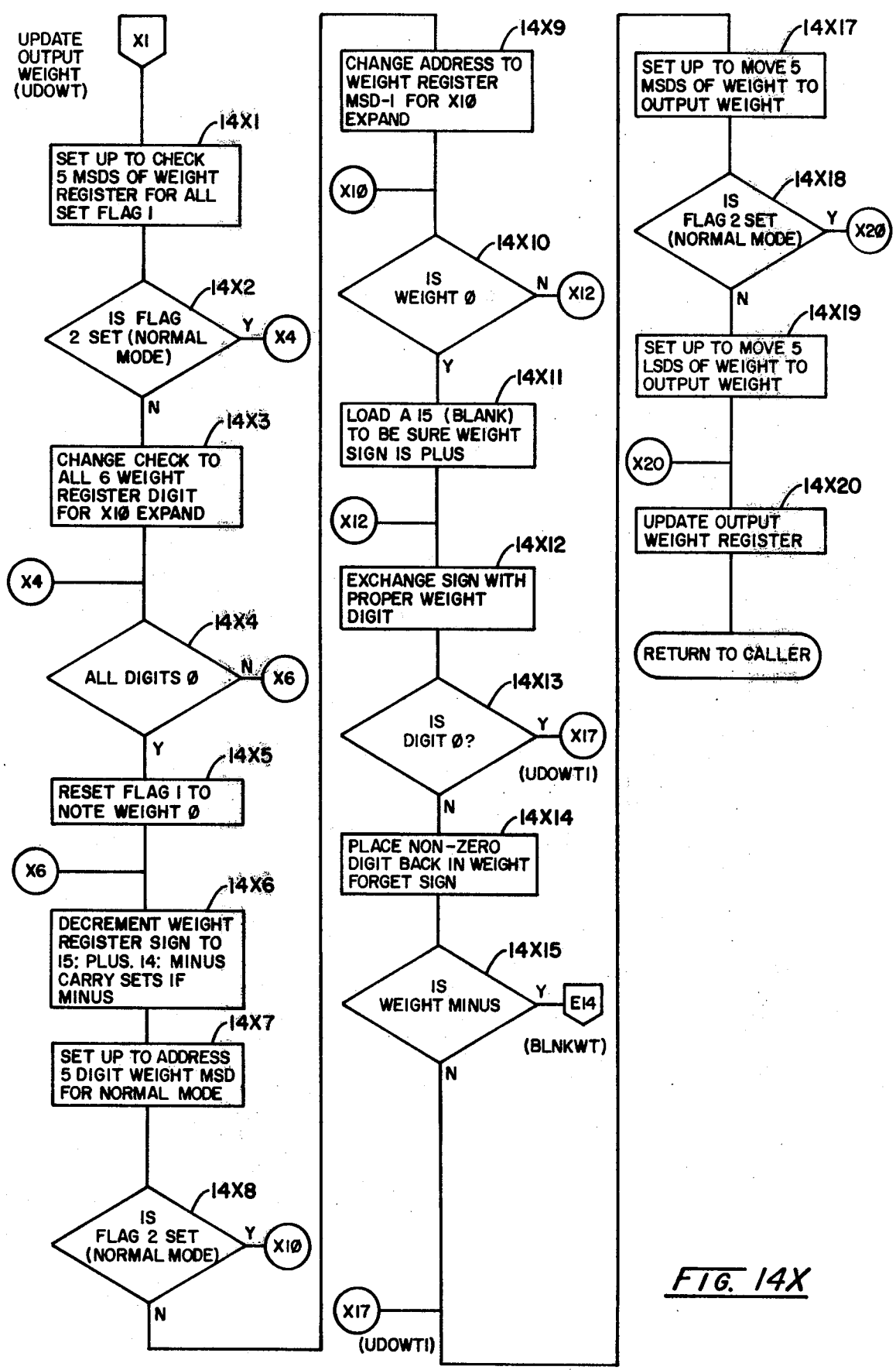
Figure 14Y:
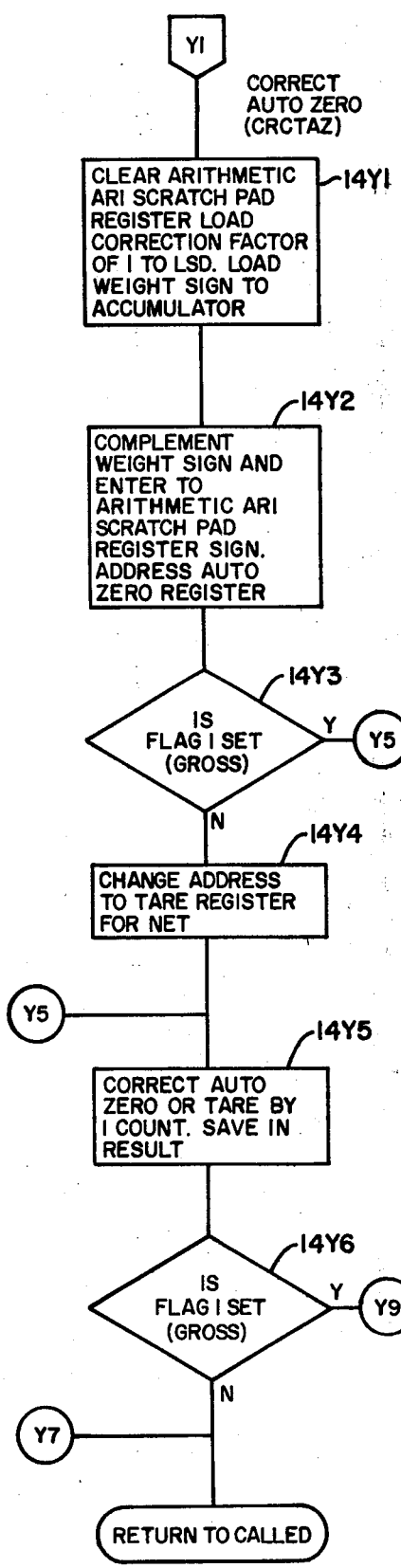
Figure 14Z:
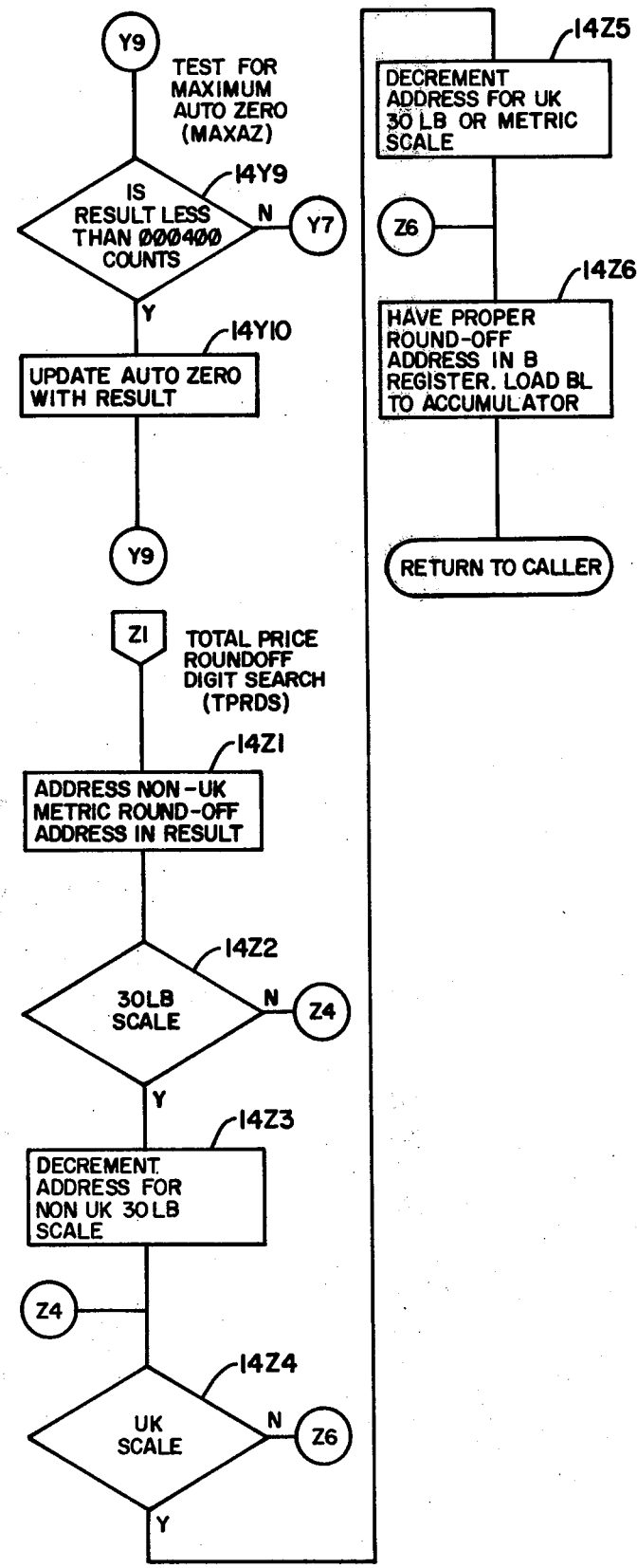
Figure 14A:
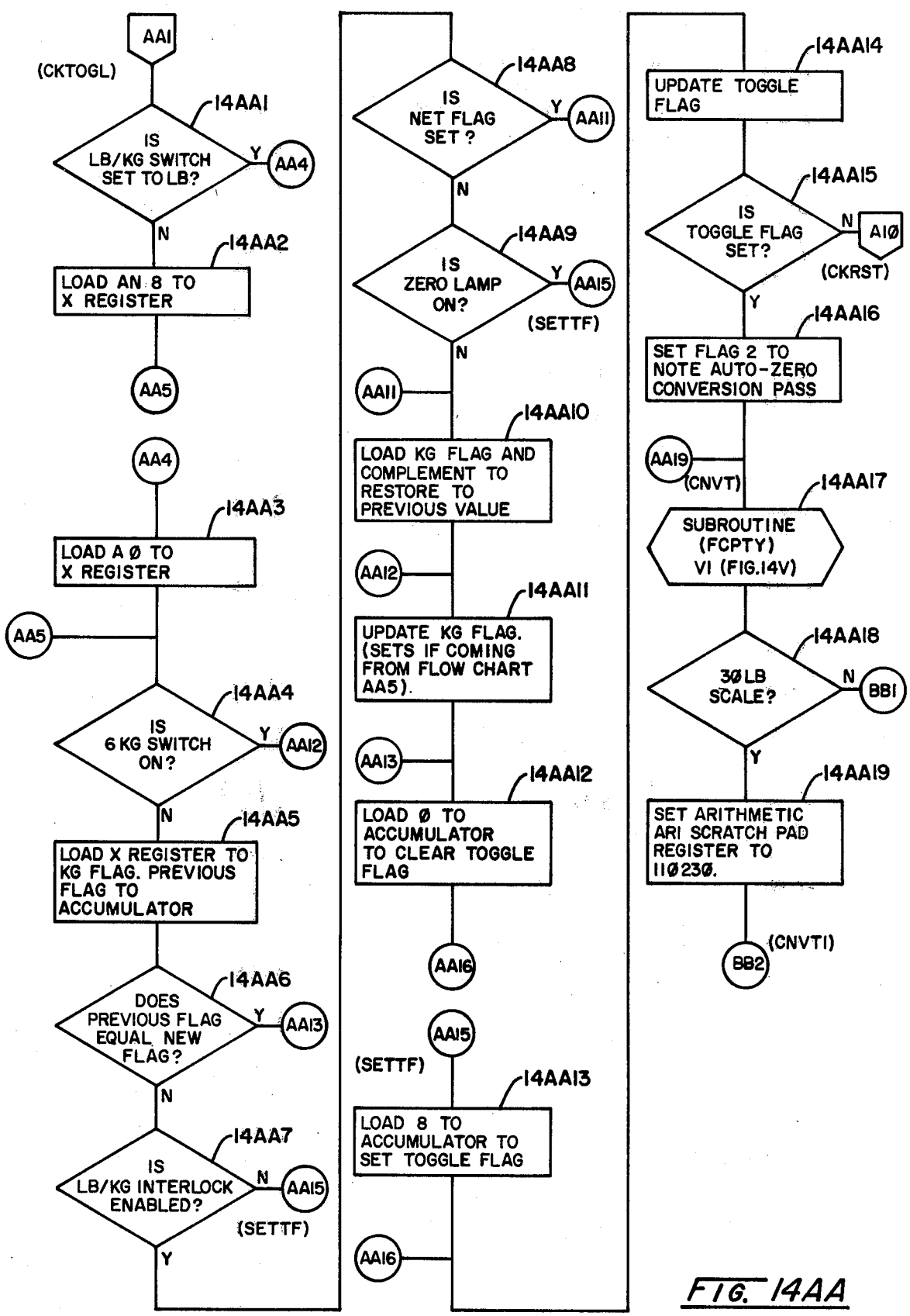
Figure 14B:
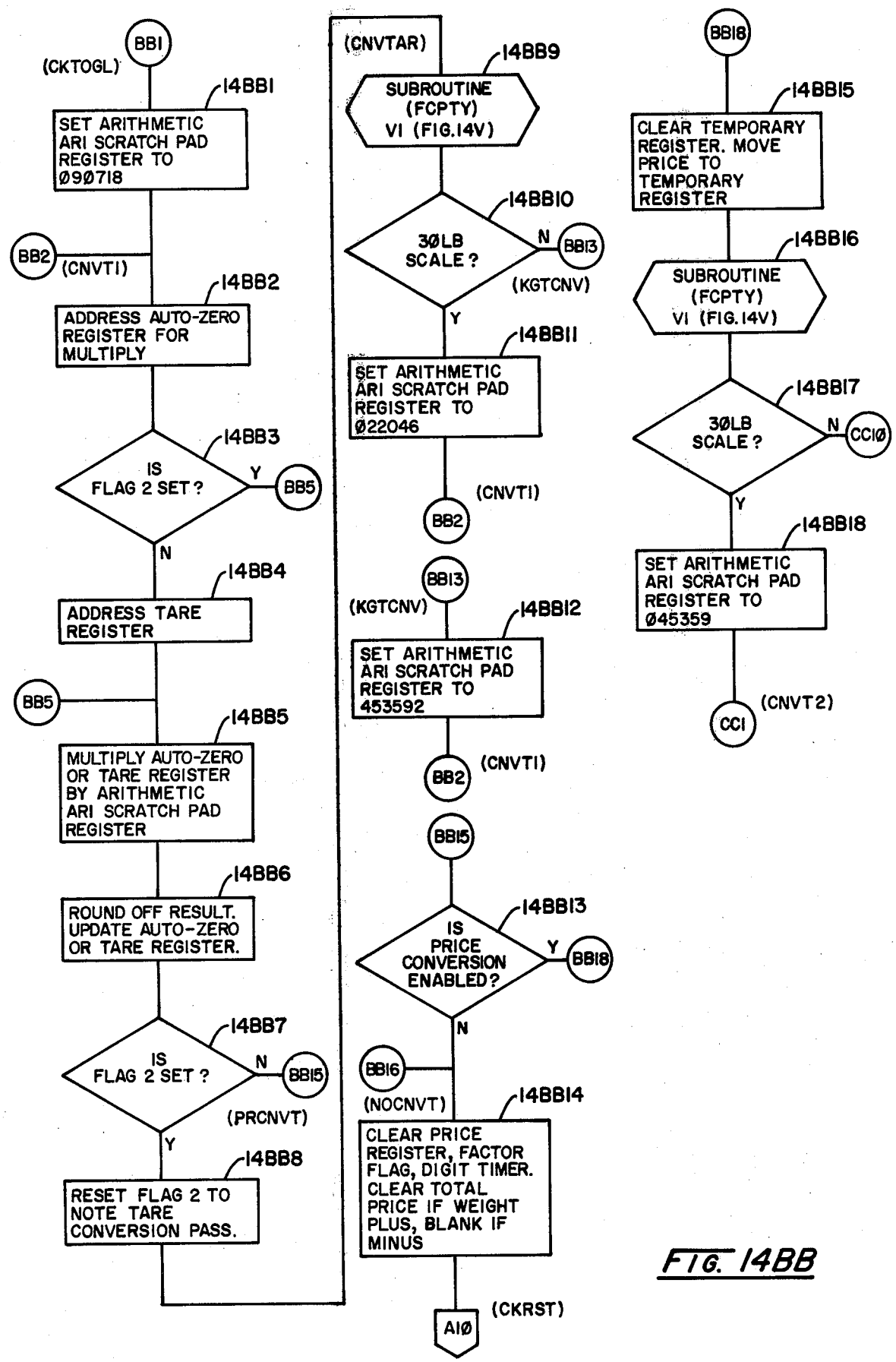

The operation of the system can be most conveniently described in conjunction with FIGS. 14A through 14Z of the drawings (FIG. numbers 14Q and 14U are not used for clarity). The flow diagrams of FIGS. 14A through 14Z graphically describe the operation of the scale system utilizing the operating sequence represented by the program listing included herewith as an appendix in combination with the Rockwell PPS-4/2 microcomputer described above. However, it should be appreciated that the operating sequence of the system utilizing this operating sequence may be implemented on other types of commercially available computers in accordance with the above principles described herein.

The present invention, as incorporated in the exemplary embodiment described herein, is arranged to cooperate with many features and operations which are described and claimed in U.S. Pat. Nos. 3,984,667 to Loshbough, number 3,869,005 to Williams, Jr., and U.S. Pat. No. 3,861,479 to Pryor, which patents are specifically incorporated by reference herein; and U.S. patent application Ser. No. 729,911 of Donivan L. Hall and Edward G. Pryor entitled "Digital Scale With Antifraud Features", and the application of R. C. Loshbough and E. G. Pryor Ser. No. 824,858 filed Aug. 15, 1977, which patent applications are also incorporated by reference herein. In order to more clearly set forth the precise invention for which this patent is solicited, in such a manner as to distinguish it from other inventions and from what is old, those operations which are disclosed in the incorporated references will only be generally described, with the primary emphasis being given those operations forming a part of the instant invention.

Many of the operations of the scale system utilizing the operating sequence are performed only partially by single pass through the operating sequence (hereinafter referred to as an operating sequence cycle), so that a plurality of passes or cycles through the operating sequence may be required in order to complete a particular operation. Such operations are clearly disclosed in the incorporated references and will be referred to in the instant disclosure only where necessary to clearly set forth the instant invention. The details of the operations are completely disclosed in the accompanying program listing in the appendix and in the flow diagrams FIGS. 14A through 14Z.

The flow diagrams of FIGS. 14A through 14Z disclose in graphical form an exemplary operating sequence of the scale system, including the operations required for implementing the analog-to-digital conversion and the net zero tracking described herein. The flow diagrams consist of a series of geometrical shapes, each of which corresponds to a particular type of operation. Each rectangular block represents the performance of a function which is generally indicated by the notation found within the rectangular block. Each diamond shaped geometrical figure represents a decision making operation where one of two alternatives is determined. The hexagons represent that a subroutine is performed at that particular point in the operating sequence, with the subroutine being performed indicated by the notation within the hexagon. The oval-shaped geometrical figures represent a branch back operation and are used in conjunction with a subroutine to indicate that the operating sequence continues at that point in the main operating sequence where the subroutine was entered. A rhomboid geometrical figure represents either an input or an output operation. The numbers placed in circles to the top and left of the geometrical figures represent input locations to those particular operations. The numbers in the circles to the right and below the blocks in the flow diagrams represent an output connected to a different location in the flow diagrams indicating a transfer in the operating sequence. The mnemonic designations found in parenthesis adjacent to the circles containing numbers, indicate labels which have been given to a particular group of operations. These mnemonics may be utilized in referring back to the detailed operating sequence disclosed in the appendix by referring to the symbol table found at the end of the appendix. The symbol table found in the appendix lists, in alphabetical order, the mnemonic labels and the corresponding location in the detailed program listing of the operating sequence where the particular operations represented by the mnemonic label may be found. Also a table is included showing the operations represented by the mnemonic labels.

In order to accomplish the operations illustrated in FIGS. 14A-14Z, data is assigned to and stored in various registers or memory cells in the random access memory or RAM 911 as illustrated in FIG. 13.

The memory unit 310 which is shown in FIG. 6 and illustrated in more detail in FIG. 10, includes a random access memory or RAM with a capacity of 128 four-bit words and arranged as shown in FIG. 13. Each of the 128 four-bit words may contain any one of sixteen states. These states can represent numerical values of data or a status or condition.

In FIG. 13, the register addresses are referred to by the hexidecimal equivalents of their binary address. The two most significant hexadecimal digits of the address within the RAM define a particular column or grouping of four bit words and the least significant hexidecimal digit defines a row or particular four bit word within the RAM. The hexadecimal address designations are also used as reference numerals below. The various register or storage spaces in the RAM are shown in FIG. 13. These designations are essentially as shown in FIG. 13 of the above copending application Ser. No. 824,858 except as follows:

A kg flag register is provided at 014; a toggle flag at 015; a price convert enable at 040; a lb/kg switch register at 043; and a lb/kg interlock enable register at 052.

The operation of the exemplary embodiment of the invention is now described with reference to the flow chart diagrams of FIGS. 14A-14Z and 14AA-14DD. The first two digits of the alphanumeric reference numerals for the individual steps of the operation are the Figure numbers on which the particular steps are illustrated. The latter alphanumeric digits refer to the particular step in that Figure. The labels which are shown in parentheses on the drawings are the labels used in the program and therefore provide cross references to the appended program listing.

Main Program Power-Up

The power-up sequence is an initialization sequence which is performed when power is first applied to the central processor or there is an interruption of power to the central processor.

During step 14A2, various registers within the computer are cleared to an initial state to provide a known starting state for the operating sequence.

After the main program power-up sequence, the operating sequence then proceeds to the X10 CLEAR sequence beginning at step 14E1 which causes a clearing operation to take place with respect to the tare and auto-zero. The operating sequence then proceeds to the output sequence beginning at 14M19.

The main program then advances through the remaining sequences shown in FIG. 14M and then transfers to the sequences of FIGS. 14N and 14O and through the various sequences of FIGS. 14P through 14P15. These output and printer sequences are analogous to the output sequences such as described in the above identified patents and applications. The main program then advances through the various keyboard sequences or routines beginning at 14P16. If no key is operated, the program transfers to T19 of FIG. 14T and then to A8 assuming no verifying operation.

Upon transfer to block 14A8 via transfer A8, the various control and mode switches are scanned and the various registers in the RAM 911 conditioned or set in accordance with the condition of the various control and mode switches. These various operations are designated in blocks 14A8 through 14A9. These operations, and the operations relating to the scanning and response to the keyboard digit keys, are analogous to the corresponding operations described in the above patents and applications incorporated herein.

The various means and apparatus for performing the functions and improvements in accordance with the exemplary embodiment of the invention comprise the scale mechanism, keys, switches, register and storage spaces together with program sequences or routines in combination with the computer, and the output or display apparatus and the control thereof.

Thus the means for controlling the time the integrator means is connected to the scale means comprises program sequences of blocks 14A20 or 14A22 in combination with the computer.

The means for reading the weight includes the flow diagrams beginning at B8 of FIG. 14B of the drawing.

The switch means to change the weight displayed from pounds to kilograms comprises the LB/KG switch 18 and the read weight routine beginning at B8 of FIG. 14B.

The means to convert the stored tare weight; the means to convert the stored zero correction factor; and the means to convert the stored price per unit weight; comprise the program sequences or routines beginning with the flow charts of FIG. 14AA in continuation with the computer. In addition the various flags, registers, and storage spaces as described below are also employed in the conversions.

After all of the other mode selector switches have been scanned by the computer in accordance with block 14A9, control advances by a transfer AA1 to block 14AA1. In accordance with block 14AA1, the computer determines whether the LB/KG pound kilogram switch 18 is set to LB or pounds. Assuming first that this switch is in the pounds or LB position. As a result of this test, the computer then will transfer control via transfer AA4 to block 14AA3. In accordance with block 14AA3, zero is entered or loaded into the X register and control and advances to block 14AA4. Since it is assumed that the scale is in the 30 pound mode or capacity, the 6KG switch will not be on with the result that a program advances to block 14AA5 where the zero in the X register from block 14AA3 is loaded or transferred to the kilogram flag register space 014 while the previous zero in the kilogram flag register space 014 is transferred to the accumulater. Then in accordance with block 14AA6, the accumulater determines whether or not the previous condition of the KG flag 014 is the same as the present condition of this flag. Under the assumed conditions, both conditions are zero so the previous condition of this flag is equal the new condition with the result that the control now transfers via transfer AA13 to block 14AA12. In accordance with block 14AA12, zero is entered in the accumulater to clear the toggle flag 015. Thereafter, control transfers via transfer AA16 to block 14AA114 which causes the toggle flag 015 to be updated with the zero entered in the accumulater in accordance with block 14AA12. Then in accordance with block 14AA15, the condition of the toggle flag 015 is determined and since this toggle is not set at this time, control then transfers back to the block 14A10 via transfer A10.

Thereafter, the control advances to the other routines and functions of the main program as described herein and in the copending applications referred to above and incorporated herein. On each subsequent cycle of the program, the above operations are performed so long as the pound kilograms switch 18 remains in the 30 pound setting.

If now at some subsequent time, the scale operator or attendant desires to change the scale from a scale operating in the 30 pound capacity to a scale operating in the 15 kilogram capacity, either prior to a weighing operation or during a weighing operation, the operator will change the position of the pound kilogram switch 18 to the kilogram position. As a result, the next time the program is transferred to block 14AA1 via transfer AA1, control will advance from block 14AA1 to block 14AA2 instead of to block 14AA3 via transfer AA4 as described above. As a result, an eight is loaded into the X register in accordance with block 14AA2 and then the control transfers via transfer AA5 to block 14AA4 and six kilogram switch is now on, control then will advance to block 14AA5 where the eight will be loaded into the kilogram flag register 014 and the previously recorded zero on this register will be transferred to the accumulater. As a result, when control advances to block 14AA6, the previous condition of the KG flag and the new position of the KG flag are not equal so that control now advances to block 14AA7.

Assuming now that the pound kilogram interlock switch is not operated so that control will now transfer via transfer AA15 to block 14AA13 where an eight is entered into the accumulater for setting the toggle register flag 015 to eight. Consequently, when control then advances to block 14AA14 an eight is entered in the toggle register space. Then when control advances to block 14AA15, the toggle flag will be set so that control will advance to block 14AA15, which causes the number 2 flip-flop A25 of the central processing unit shown in FIG. 9 to be set in its one state to cause the weight recorded in the auto zero register space 04A through 04F to be converted to kilograms as will be described hereinafter. Next control will advance to block 14AA17 where control transfer to the subroutine beginning in block 14V1, which determines the scale capacity. After this capacity has been determined from the setting of the mode switches and switch 18, control then returns to the block 14AA18 of the routine shown in FIG. 14AA. At this time, the scale capacity will not be 30 pounds, so that the control does not advance to block 14AA19. Instead, control transfers to block 14BB1 via transfer BB1 where the conversion factor 090718 is entered in the ARI register 01A through 01F of FIG. 13.

As described herein and in the copending application, incorporated herein, the $T_1$ time in the analog to digital convertor is different for different scale capacities and is different for 30 pound capacity and the 15 kilogram capacity. As a result, it is necessary to convert the auto zero factor recorded in the auto zero register 04A through 04F of FIG. 13 from a reading appropriate for pounds to a reading appropriate for kilograms. The appropriate conversion factor is 090718 entered in the ARI register in accordance with block 14BB1, as described above.

From block 14BB1 control advances to block 14BB2 where the address of the auto zero register is obtained and then the control advances to block 14BB3. Since the flip-flop 2 or flag 2 was set in accordance with block 14AA16, control now advances via transfer BB5 to block 14BB5 where the auto zero factor stored in the auto zero register space 04A through 04F is multiplied by the conversion factor 090718 and then in accordance with block 14BB6, the result is rounded off and the auto zero register storage area 04A through 04F is updated with the rounded off result of the converted auto zero factor.

Then control is advanced to block 14BB7 and since the flag 2 or flip-flop 2 is still set, control advances to block 14BB8 where the flip-flop or flag 2 is reset to prepare for the conversion of the tare wight recorded in the tare register space 05A through 05F of FIG. 13. Next, control is advanced to block 14BB9 where control is transferred to the FCPTY routine shown in FIG. 14V. At the end of this subroutine, control is transferred back to the program, or routines of FIG. 14BB and more particularly to block 14BB10. Since the pound kilogram switch 18 is set in the kilogram state or position, control then transfers via transfer BB13 to block 14BB12 where the conversion factor 453592 is entered in the ARI register space 01A through 01F of FIG. 13. This is the proper conversion factor to convert the unit price in per pound to the unit price per kilogram. From block 14BB12 control then transfers to block 14BB2 where the address of the auto zero register is again entered in the control circuits of the central processing unit and then control advances to block 14BB3.

This time when the control advances to block 14BB3, the number 2 flag or number 2 flip-flop will not be set because it was previously reset in accordance with block 14BB8 as described above. Consequently, control advances to block 14BB4 where the address of the tare register 05A through 05F if substituted for the address of the auto zero register. Then, in accordance with block 14BB5, the tare weight recorded in the tare register is converted by multiplying it by the converting factor 453592 and then the result is rounded off in accordance with block 14BB6 and the tare register space is updated with the resulting converted tare weight. Next, the control advances to block 14BB7 and since the flag 2 or flip-flop 2 is now not set, control transfers via transfer BB15 to block 14BB13.

In accordance with block 14BB13, the price conversion enabling mode switch 19 is checked. If this switch is not operated, then control advances to block 14BB14 where the price register is cleared, the factor flag and digit timer are cleared and the total price is cleared, if the weight is plus, but blank, if the weight is minus. From block 14BB14, control then transfers via transfer A10 back to the main program of FIG. 14A, block 14A10. Thereafter, the control advances through the various routines as the manner described herein and in the copending applications so long as the pound KG switch 18 remains in the kilogram position.

Assume now that the price conversion enabling switch 19 has been operated so that the price conversion is enabled under these conditions when control advances to block 14BB13, control then transfers via transfer BB18 to block BB15 where the temporary scratch pad register spaces 079 through 07F are cleared and the price is moved from the price register 065 through 069 to this temporary scratch pad register. Next, control is again transferred to the routine FCPTY in accordance with block 14BB16 where the capacity of the scale is again determined and after the routine is concluded, control transfers back to block 14BB17. Since the pound kilogram switch is still in its kilogram position, control now transfers via transfer CC10 to block 14CC9 where the conversion factor 220460 is entered in the ARI register 01A through 01F and then control transfers via transfer CC1 to block 14CC1 where the price is multiplied by the conversion factor and then rounded off in accordance with block 14CC2.

Also, in accordance with block 14CC2, the most significant digit of the result of the conversion and rounding off is addressed to determine its location and then, in accordance with block 14CC3, the condition of the five digit price enabling mode switch is checked. If this switch is operated and the five digit price enabled control transfers via transfer CC5 to block 14CC5. If the five digit price enabling switch is not operated, then five digit price is not enabled so that control will advance to block 14CC4 instead of being transferred via transfer CC5. In accordance with block 14CC4, the fourth most significant digit of the result of the price conversion and rounding off operation is addressed. Control then advances to block 14CC5. Thus, when control advances to block 14CC5, either through block 14CC4 or via transfer CC5, the addressed digit is tested to determine whether or not it is zero. If this digit is not zero, control transfers via transfer BB16 to block 14BB14 where the price register is cleared in the factor flag and digit timer cleared and the total price cleared if the weight is plus and blanked if the weight is minus. Thereafter, control again transfers back to the main program via transfer A10 to block 14A10. However, if when the control advances to block 14CC5, the address digit is zero, then control advances to block 14CC6 and the address incremented by one and control advance to block 14CC7. If the address is the top of the result register 005 through 00F, the result is moved to the price register 065 through 069 and control then transfers via transfer A10 back to the main program block 14A10 and the various routines employed to control the scale system. If, however, when control advances to block 14CC7, the resulting address is not the top of the result register 005, then control transfers via transfer CC5 to block 14CC5 and the control advances through blocks 14CC5, 14CC6, and 14CC7 until the incremented addressed digit in accordance with block 14CC6 at the top of the result register is zero so the control then advances from block 14CC7 to block 14CC8 and then to the main program block 14A10 via transfer A10 in the manner described. Thereafter, the various routines are employed to control the system in the manner described so long as the pound kilogram switch remains in its kilogram position. During all of the subsequent cycles of the main program with the pound kilogram switch in its kilogram position, the KG register flag 014 of FIG. 13 will have an eight recorded in it and the eight will be the same as previously recorded so that when the control advances to block 14AA6, the previous flag and the new flag condition will be the same so that the above described conversion routines will not be employed to control the system. Instead, control will advance via transfer AA13 to block 14AA12, block 14AA via transfer AA16 and then block 14AA15 and then via transfer A10 to block 14AA10 of the main program. Thus, the conversion routines described above are employed once after the pound kilogram switch is operated from one position to the other.

When it is desired to again weigh in terms of pounds by the scale system, in accordance with the present invention, it is only necessary to move the pounds kilogram switch 18 to its pounds position. Then when on the next program cycle, control advances to block 14AA1, the pound kilogram switch 18 will be in its pound position with a result that zero is ordered into the X register and then when control advances to about 14AA6, as described above, the previous kilogram flag register 8 will not equate to the new information in this flag register space 014 with the result that the program will advance through the conversion routines described above.

However, when the control advances to block 14AA18, since the pound kilogram switch 18 is in the pound position, control will advance to block 14AA19 where the conversion factor 110230 is entered in the ARI register space 01A through 01F. This conversion factor is the proper conversion factor to change the weight indication in the auto zero register 04A through 04F to a value suitable for operation in pounds mode rather than the kilogram mode.

Again, when control advances to block 14BB10, the pound kilogram switch will be in the pound or 30 pound position with the result that control advances to block 14BB11 where the conversion factor 022046 is entered in the ARI register 01A through 01F. This conversion factor is the proper conversion factor to change the weight stored in the tare register from kilograms to pounds. Again, if the price conversion switch 19 is in the able position, then when the control advances to block 14BB17 and with the pound kilogram switch 18 in the 30 pound position, control will advance to block 14BB18 where the conversion factor is 045359 is entered in the ARI register 01A through 017. This factor is the factor required to change the price entered in the unit price register from price per kilogram to price per pound.

Then later, as described herein and in the copending application, with the price entered in the price register or storage spaces 065 through 069, the total price or value will be computed based upon this price. Thus, upon unit price per pound.

Thus, all that is required to change the scale from operating in a pound mode to a kilogram mode or from a kilogram mode to the pound mode, is to properly position switch 18 by the operator or attendant and the various stored weights will be automatically converted to the desired mode of operation. If the price conversion switch 19 is not operated, price conversion is not enabled so that the price register and total price register will be cleared so that the operator will then have to enter a new unit price in the scale in order for the total price to be computed. On the other hand, if the price conversion switch 19 is operated, the price conversion is enabled so that this unit price will be converted and then the total price computed in accordance with the converted unit price.

At the end of the conversion, operations described above control will be returned to the main program block 14A10 via transfer A10.

In the beginning under the assumed conditions, the digit timer was previously or already zero so when control transfers from block 14A10 to block 14A11 control will transfer via transfer A15 to block 14A15.

Beginning with block 14A15, the read weight sequence of operations is performed in which the analog to digital conversion in accordance with the present invention is accomplished.

At the beginning of the read weight sequence of operations, a find scale capacity subroutine is performed. This subroutine is illustrated on FIG. 14V. It performs the interrogation of RAM registers 043 and 044 to determine what scale capacity is selected and places data in registers in the CPU 210, FIGS. 5 and 9, which is dependent upon which capacity is selected.

Referring to FIG. 14V, at step 14V1, the arithmetic scratch pad register 01A-01F is cleared and flag 1, i.e., flip-flop 825 of the CPU 210 is set to make an initial assumption that the 15 kilogram scale is not selected. Similarly, the carry register 812 of the CPU 210 is set for an initial assumption that the 6 kilogram scale is not selected.

Then, in step 14V2, the 30 lb. enable RAM register 043 is examined to determine whether the 30 pound scale is selected. If it is, operation jumps to step 14V6. However, if it is not, the carry is then reset in step 14V3 to assume that the 6 kilogram scale is selected. Then in step 14V4, the 6 kilogram enable register RAM 044 is examined to determine whether the 6 kilogram scale is selected. If it is, operation jumps to step V6. However, if it is not, the carry register is set and flag 1 is reset to note that the 15 kilogram scale is selected.

Then, at step 14V6, the flag 1 (FF825) and carry register 812 are used to load into the X register 813 of the CPU 210 a 5 if the 15 kilogram scale was selected, a 3 if 30 pound scale is selected and a 6 if the 6 kilogram scale is selected. In step 14V7 there is loaded into the accumulator 810 a 5 if the 15 kilogram scale was selected, a 1 if the 30 pound scale is selected, and a 2 if the 6 kilogram scale is selected. Then, in step 14V8, the address 001A of the arithmetic scratch pad register ARI is loaded in the BL section of the address register 814 and operation returns to the next order in the sequence of operations at which the find scale capacity sequence of operations was called.

Referring now again to FIG. 14A, data returned in this manner is then used in steps 14A16 through 14A22 to set up a timing sequence for providing the time interval during which the analog weight signal is integrated as part of the analog to digital conversion.

In the exemplary embodiment of the present invention, three, four bit, digital timers are employed; a "Long Timer" in RAM register 00A, a "Mid Timer" in RAM register 009, and a "Short Timer" in the accumulator and initialized to the values shown in blocks 14A17, 14A20, or 14A22. The times are then processed according to the subsequently described timing subroutines in order to provide the desired integrating time interval $T_1$ illustrated in FIG. 12.

Although a single timer register having sufficient bit capacity could be used to provide the desired time interval, it is advantageous to use the short, mid and long timers described above.

As an example, if the scale has been set or conditioned to operate as 6 kilogram scale, the long timer 00A, is set to a 15 state, the mid-timer 009, is set to its 3 state, and the short timer in the accumulator is set to a 10 state.

After loading this initial timing data into the long, mid and short timers, the CPU 210 at step 14B1 switches the transistor 94 (FIG. 4) of the switching circuit 50 to its conduction state in order to apply the analog weight signal to the integrator circuit 51 and begin the integration.

The delay subroutine at step 14B2 then uses the previously loaded long, mid and short timers to provide the desired time-delay such as $T_1$. This delay subroutine is illustrated in detail on FIG. 14W.

Referring now to FIG. 14W, upon entry into the delay subroutine at step 14W1, the four bit contents of the midtimer is loaded to register X 813 of the CPU. The four bit contents of the short timer is then loaded at step 14W2 into the accumulator and decremented. The timer is checked at step 14W3 to determine whether it had previously been 0. If it was not 0, then at step 14W4, a 105 microsecond delay is obtained by causing the CPU 210 to perform routine or series of instructions causing the CPU to count cycles for the purpose of obtaining the delay. Thereafter, the sequence of operation loops back again to step 14W2. Operation continues to loop through these 14W2 through 14W4 steps until the short timer is decremented to zero. Thus, it will loop through these steps a number of times equal to the number initially loaded into the short timer.

When a 0 is detected in step 14W3, the operation jumps to step 14W6 in which the mid-timer is loaded into the accumulator and decremented. The contents of the mid-timer is then checked at step 14W7 to determine whether it was a 0. If the mid-timer was not 0, a 1.26 millisecond delay is provided by setting the short timer to a 12 state and looping back to step 14W2. This causes the operations to loop through steps 14W2, 14W3, and 14W4 twelve times until the short timer again is decremented to 0. The 1.26 delay plus the times required by the other orders of the mid delay timer provide a delay of 1.3 milliseconds for each count in the mid delay timer.

Thereupon, steps 14W6, 14W7, and 14W8 will again be performed and the entire procedure repeated until the mid-timer was found to be 0 at step 14W7. Upon finding the mid-timer to be 0 at step 14W7, the operation jumps to step 14W10 which sets up a 14.3 millisecond time delay by loading an 11 state into the mid-timer. This delay plus the time required for the other portions of the long timer routing provide a delay of 15.64 milliseconds for each count of the long timer. The previously set long timer is then loaded into the accumulator at step 14W11 and is decremented. Then, at step 14W12, the timer is checked to determine whether it was previously 0. If the long timer was not previously 0, operation loops back to step 14W8 and then to step 14W2 and repeats the previously described loop until operation arrives again at step 14W12 and finds that the long timer was decremented to zero. In addition to the times determined by the short timer, the mid timer and the long timer, there is an entrance and an exit time, or dead time of 85 microseconds which is included in the selected time delay interval $T_1$.

As noted above the $T_1$ time for the 15 KG capacity is 95.950 MS; for the 30 pound capacity 105.770 MS; and for the 6 KG capacity is 239.805 MS. The times are accurately related to the respective scale capacities.

When the entire selected time delay such as $T_1$, during which the analog signal was integrated has expired and operation returns to step 14B3 of FIG. 14B.

Returning to FIG. 14B, at step 14B3, the timing loop counters which are going to be used during the time intervals for integrating the reference DC source are cleared. The discrete outputs of the CPU 210 are disabled and the state of the output 102 of the threshold detector 53 is examined.

If, during the first integrating interval $T_1$ then (See FIG. 12), the output of the integrator 51 becomes opposite in polarity from the initial level $V_0$ along a slope such as $S_D$ to a level such as $V_3$ such output represents a negative raw weight of relatively large magnitude. This might happen if the platter were removed or if an operator lifted up on it. It will immediately cause the output of the threshold detector 53 to switch to its low state. If the comparator is found to be in a low state at step 14B5, then this indicates at step 14B6 that a large negative raw weight was detected and therefore all the discrete outputs of the CPU are enabled and operation jumps to step 14E14 at FIG. 14E and then to step 14M10. This results in skipping of many intermediate operations which check, filter, correct, or otherwise process the raw weight and which would not be meaningful with such negative weight data.

However, if a positive raw weight is found in step 14B5 such as would result from the integration along slope $S_1$ to $V_1$, operation proceeds to step 14B8 which stops the integration of the analog signal by switching transistor 94 to a nonconducting state and begins the first reference source integration, such as time interval $T_2$, by switching the transistor 95 of FIG. 4 to its conducting state.

Steps 14B9 through 14B11 form the interrogation and counting cycle or instruction loop for the integration of the comparator or threshold detector during the $T_2$ integration time of the first reference DC source. During each instruction loop, the output of the threshold detector 53 is periodically interrogated and a counter is incremented each time the output of the comparator has not occurred changed sign. This counting for both the first and second reference DC source integrating intervals $T_2$ and $T_3$ is done in three, four-bit counters, one counter for each of three hexadecimal digits.

While each of these three, four-bit counters could be formed in three, four-bit RAM registers, it is more convenient to form them in the save register 817 forming a part of the CPU 210 illustrated in FIG. 9. The twelve bits of the save register 817 can be considered three, four-bit counters referred to as counter 1, counter 2, and counter 3. This is convenient because the Rockwell PPS-4/2 CPU has an instruction, with the mnemonic CYS, which cycles the save register 817 and the accumulator. This convenient instruction provides a four-bit right shift of the save register 817 with the four-bits which are shifted off the right end of the save register 817 being transferred to the accumulator and with the contents of the accumulator being transferred into the left end of the save register 817.

As shown in steps 14B9-14B11, the counting begins by setting the carry register 812 of the CPU 210 (FIG. 9) to its 1 state. That carry is added to the contents of counter 1 with the results placed in counter 1. Then any carry generated from counter 1 is added to the contents of counter 2 with the result placed in counter 2. Then any carry produced by counter 2 is added to the contents of counter 3 and the result placed in counter 3.

At step 14B10, the output 102 of the threshold detector is then loaded to the accumulator and examined in step 14B12 to determine if it is yet low, that is whether the $V_0$ level has been crossed. If the comparator is not low, operation then loops back to step 14B9 where it passes again through steps 14B9–14B11. Each pass through this loop requires 65 microseconds using the specific selected CPU instructions. Operation continues to loop through steps 14B9–14B11 until the comparator is found at step 14B11 to have switched to its low state. This indicates that the output of the integrator circuit 51 has crossed its initial voltage level $V_0$.

An additional 65 microsecond delay is then provided at step 14B12 to extend the second integrating time by the interval $T_{2C}$ shown on FIG. 12 and described above. Then, at step 14B13, transistor 95 of FIG. 4 is switched to its non-conducting state to halt the integration of the first reference DC source.

The count contained in the three timing loop counters for the second integrating time interval $T_2$ is then stored in the scratch pad registers 70, 71, and 72 of the RAM memory and the counters (the SA register 817) are cleared for reuse. Then, at step 14B15, the third timing interval $T_3$ illustrated in FIG. 12 is begun by switching the transistor 96 of FIG. 3 to its conducting state to apply the second reference DC source to the integrator circuit 51.

Then steps 14B16, 14B17, and 14B18 provide an interrogation and counting cycle or loop of steps 14B9–14B11. While the steps of the $T_3$ counting loop are not identical with the steps of the $T_2$ loops, they require the same overall time of 65 microseconds. During each pass through this $T_3$ cycle, the output 102 of the threshold detector 53 is examined to determine whether it has returned to its high state. So long as it has not, operation continues looping through the $T_3$ interrogating and counting cycle of steps 14B16–14B18. However, whenever in step 14B18 the output 102 has been found to have shifted to its high state, then at step 14B19, the transistor 96 (FIG. 4) is turned off to stop the integration of the second reference DC source and the integrator 51 is reset by switching the transistor 97 to its conducting state.

Then, at step 14B20, the contents of counter 1 and counter 2 of the $T_3$ counters is stored in RAM memory register spaces 73 and 74. At step 14B21, the scratch pad memories (i.e., register spaces 01A through 01F) illustrated in FIG. 13 are cleared for subsequent use.

Thus, the contents of each of the four-bit registers 70, 71, 72, 73, and 74 now represents a hexadecimal digit of the $T_2$ and $T_3$ count which in turn represent the raw weight on the scale. Next these counts are converted to decimal notation and then finally to raw weight increments. This is begun in step 14B22 by multiplying the contents of register 72 (which has stored in it the most significant hexadecimal of the $T_2$ count) by 256 and moving the result to the weight register 02A through 02F illustrated in FIG. 13. Then, at step 14C1, the weight sign is cleared and the temporary scratch pad is again cleared. The contents of register 71 (which has stored in it the next most significant hexadecimal of the $T_2$ count), the $T_2$ counter is multiplied in step 14C2 by 16 and the result moved to the arithmetic scratch pad register illustrated in FIG. 13. Then, at step 14C3, the results of these two multiplications are added together with the result being moved to the weight register. Then, at step 14C4, the least significant hexadecimal digit of the $T_2$ count is converted to decimal form and added to the sum in the weight register. At 14C5 the resulting total is placed in the weight register and represents the total count during time interval $T_2$ in decimal digits. The arithmetic scratch pad register is then cleared. While the digits of this decimal number are different from the digits of the hexadecimal number, both numbers represent the same number of counts or cycles obtained during the $T_2$ interval and each count represents 32 raw weight increments.

The decimal conversion of the $T_3$ count then begins at step 14C6 by moving the contents of register 74 (which has stored in it the most significant digit of the $T_3$ count) to the arithmetic register. As stated previously, the reference signal level during time interval $T_3$ is 1/32 the reference signal level which is integrated during time interval $T_2$ and therefore each count during time interval $T_2$ represents 32 times as much analog weight signal (i.e., 32 raw weight increments) as does each $T_3$ count. In order to eliminate the effect of the additional 65 microsecond delay provided at step 14B12 during time interval $T_2$, (one additional $T_2$ count) 32 counts are subtracted from the $T_3$ count in step 14C6.

Conversion of the $T_3$ count to decimal form then proceeds at step 14C7 by multiplying the result of the subtraction in step 14C6 by 16 and moving the result to the temporary scratch pad register (FIG. 13). The arithmetic register is also cleared and in step 14C8 the low digit of the $T_3$ count is moved from register 74 (FIG. 13) to the arithmetic register and converted to decimal form. The result of the multiplication in step 14C7 which is stored in the temporary scratch pad register, and the result of the decimal conversion of step 14C8 which is stored in the arithmetic register, are then added together in step 14C8 to represent the total counts (raw weight increments) during time interval $T_3$ reduced by 32 counts to compensate for the 65 microsecond delay as described above.

Because each $T_2$ count represents 32 times as much analog weight signal amplitude as each $T_3$ count, at step 14C9, the total of the $T_2$ counts is multiplied by 32 and the result is moved to the weight register. Then, at step 14C10, the $T_3$ count is subtracted from the $T_2$ count in order to provide the net number of raw weight increments. This final number of raw weight increments, which is proportional to the sum of the weight on the scale platter and the analog offset, is then moved in step 14C11 to the weight register and is referred to as the raw weight.

Next, the presence or absence of platter motion is first detected and noted, the digital weight data resulting from step 14C11 is then filtered or updated, the appropriate initial analog offset is digitally subtracted and finally the "x10 EXPAND" operations are performed if that mode is selected. These operations are performed in the same manner as described in detail in the above identified copending application included herein by reference. The detection of motion begins at block 14C12 and the above operations extend through blocks 14D17 or 14D19.

Potentiometer 76 is adjusted initially at the factory to provide an analog offset under no weight conditions. However, it is undesirable to change this adjustment when changing from pounds to kilograms or visa versa. Thus this initial offset must be more accurately removed from the detected raw weight data then in the scale described in the above copending applications. This is done in steps 14D6 through 14D14. However, because a different analog signal integrating time interval is used for different scale capacities and the load cell output voltage is interpreted differently for different capacities, a different number must be subtracted from the raw weight for each scale capacity.

Therefore, in step 14D6, the find scale capacity subroutine of FIG. 14V is performed which returns the data described above. The returned data is used to set the arithmetic scratch pad register to 003405 if the 6 kg scale capacity is selected, to 001362 if the 15 kilogram scale capacity is selected, and to 001502 if the 30 pound scale capacity is selected.

After the arithmetic scratch pad register is set to one of these three numbers, which is the analog offset expressed in raw weight increments for the particular scale capacity selected, then in step 14D14, the chosen number of raw weight increments is subtracted from the raw weight and the result is moved to the weight register.

The control advances through the various routines in a manner similar to that described in the above copending applicaions until the control advances to block 14F10, which block defines a portion of the manual tare routine and operation.

Then in block 14F10, the most significant digit of the weight register is examined to see if it contains a zero. If it does not, operation must jump to step 14G1 and the manual tare operation skipped because the most significant weight digit will be used to display a negative sign in the net mode of operation.

If the most significant digit of the weight register is found to be zero, operation transfer to the DD routine shown in FIG. 14DD. Thus, routine is required to insure that if the tare weight is converted as described above in response to the operation of key 18, the converted tare weight will still have a zero for the most significant digit. Thus, the DD routing checks digits of the tare weight to ensure that the next most significant digit is less than a test digit, which test is different for the different scale capacities as indicated in the DD routine. If the tare weight is less than the respective test digits, the operation proceeds to block 14F11 and then to the following routines.

As indicated above for the 30 lb×0.01 lb scale capacity, two places are displayed to the right of the decimal point while for the 15 KG×0.005 KG and the 6 KG×0.002 KG. Thus, to change from the 15 KG capacity to the 30 lb capacity, or from the 30 lb capacity to the 15 KG it is necessary to properly display the weight. In accordance with the exemplary embodiment of the invention described herein, after the weight is rounded off in accordance with block 14I1 control advances to block 14I2. If the capacity is 30 lb control advances to block 14I3 when the weight is shifted one place to the left so the weight will be properly displayed for the 30 lb capacity.

To permit the use of the same routines as employed in the copending application, when it is desired to multiply the weight by the price, the weight is shifted to the right one place for the 30 lb capacity. Thus, after block 14L13 control is transferred to block 14U1 via transfer U1. If the scale is operating as a 30 lb scale control advances to block 14U2 where the weight is shifted one place to the right. Control then returns to block 14L14 and then advances through the various routine similar to the advance described in the above copending applications.

As described above, with reference to manual tare to permit the proper conversion of the stored tare weight in the exemplary embodiment of the invention described herein, the tare weight should not exceed predetermined limits or values for the various scale capacities.

Thus, it is desirable to also check and limit the tare weight is stored in the scale system from the keyboard.

In order to check the magnitude of the tare entered from the keyboard and to prevent the entering of too great a tare weight from the keyboard control transfers from block 14T6 or block 14T8 or 14T10 via transfer U4 or U6 to block 14U3 or 14U4 and then to the other blocks of FIG. 14U and then back to block 14T13 or 14T16 and then to the other blocks as described in the copending application incorporated herein by reference.

The exemplary embodiment of the invention described herein is arranged to cooperate with the scale system disclosed in the above identified copending application incorporated herein by reference. However, the invention is not limited to this exemplary embodiment. Instead it may be arranged to cooperate with other scale system employing the same or different computers including computer arrangements employing various components all wired together.

APPENDIX

| LABEL | OPERATION |
|---|---|
| 216 ADD | Add |
| 481 ADDC | Add Carry to Field |
| 347 ADDC> | Link to ADDC |
| 1340 ADRWGT | Address Weight |
| 249 ARICL | ARI Clear |
| 329 BLANK | Blank |
| 970 BLNKWT | Blank Out Weight |
| 1063 CKACL> | Link to CKACLR |
| 1089 CKACLR | Check Auto Clear |
| 973 CKGAZC | Check Gross Auto Zero Correction |
| 1116 CKINC | Check incrementing Auto Clear Flag |
| 1345 CKMIN | Check for Our Weight Minus |
| 1878 CKMKBT | Check for Magnitude of Keyboard Tare |
| 1055 CKNAZC | Check Net Auto Zero Correction |
| 1648 CKPRNT | Check for Print |
| 1291 CKRCP | Check Recompute |
| 2091 CKRST | Check for Scale Reset |
| 1970 CKRST | Link to CKRST |
| 592 CKRST1 | Label & CKRST |
| 591 CK TOG | Link to CKTOGL |
| 1933 CKTOGL | Check and update Toggle Flag |
| 321 CKWSGN | Check for Weight Sign |
| 1837 CKOT | Check for O-T Sequence |
| 296 CLEAR | Clear Subroutine |
| 1224 CLROFC | Clear Out Filter Counter |
| 340 CLRPF | Clear Print Flag |
| 314 CLRPR | Clear Price Subroutine |
| 285 CLRT | Clear Tare Subroutine |
| 154 CMDIG | Compare Test Digit with Memory |
| 1297 CMPUT | Compute Total Price |
| 1973 CNVT | Convert Auto Zero, Tare Price units |
| 2010 CNVTAR | Convert Tare Units |
| 1995 CNVT1 | Label in CNVT |
| 2067 CNVT2 | Label in CNVT |
| 2077 CNVT3 | Label in CNVT |
| 2162 CRCAZ | Label starting CRCTAZ subroutine |
| 354 CRCTAZ | Correct Auto Zero |
| 348 CRTAZ> | Link to CRCTAZ |
| 949 CZTIM | Clear Zero Key Timer |
| 500 DELAY | Delay Subroutine |
| 350 DELAY | Link to DELAY |
| 504 DELY1 | Label in DELAY |
| 511 DELY2 | Label in DELAY |
| 517 DELY3 | Label in DELAY |
| 1499 DISPON | Turn on Display |
| 464 DL.4MS | 0.4 MS DELAY |
| 1482 DLOOPA | Display Loop Label |
| 491 DLOOPB | Display Loop Label |
| 351 DLY.4> | Link to DL.4MS |
| 1715 ENTDIG | Enter Digit |
| 1913 ENTFCT | Enter Factor |
| 1890 ENTKBT | Enter Keyboard Tare |

APPENDIX-continued

| LABEL | | OPERATION |
|---|---|---|
| 1903 | FCNDUN | Function Key Done |
| 380 | FCPTY | Find Scale Capacity Subroutine |
| 345 | FCPTY> | Link to FCPTY |
| 393 | FCPTY1 | Label in FCPTY |
| 398 | FCPTY2 | Label in FCPTY |
| 405 | FCPTY3 | Label in FCPTY |
| 1800 | FDUN> | Link to FCNDUN |
| 1848 | FDUN>> | Link to FCNDUN |
| 860 | FLTWGT | Filter Raw Weight |
| 872 | FLTWT1 | Label in FLTWGT |
| 842 | INIFLT | Initial Filter |
| 1271 | ITLKCK | Interlock Check |
| 20 | KAF | Turn Off A |
| 1736 | KBCMND | Keyboard Command |
| 1906 | KBDUN | Keyboard Operation Done |
| 1695 | KBD1 | Label in KEYBD |
| 541 | KBERR | Keyboard Error |
| 21 | KBF | Turn off B |
| 1850 | KBTARE | Keyboard Tare |
| 1705 | KCMND> | Link to KBCMND |
| 22 | KDN | Turn on Display |
| 23 | KER | Keyboard Error |
| 1704 | KERR> | Link to KBERR |
| 1670 | KEYBD | Keyboard Routine |
| 1758 | KEYBD> | Link to KEYBD |
| 1986 | KGCNV | Convert LB to Kg units |
| 2094 | KGPCNV | Convert Price per LB to per Kg |
| 2024 | KGTCNV | Convert LB Tare to Kg Tare |
| 2083 | KGPCV | Link to KGPCNV |
| 24 | KLA | Load Display Register A |
| 25 | KLB | Load Display Register B |
| 26 | KTR | Transfer Keyboard Return |
| 27 | KTS | Transfer Keyboard Strobe |
| 1869 | KT15KG | Keyboard Tare 15 KG |
| 1874 | KT6KG | Keyboard Tare 6 KG |
| 1230 | LDLMPS | LD Lamps for Output |
| 897 | LDPPUK | LD Pre-pack or UK Total Price ½ Lamps |
| 1296 | LMOUT> | Link to LMP Out |
| 1506 | LMPOLP | Lamp Output Loop |
| 1500 | LMPOUT | Lamp Output Routine |
| 864 | LSD/2 | Raw Weight LSD Divided by 2 |
| 258 | MADDL | Multiply Add Loop |
| 143 | MAGCK | Magnitude Check Routine |
| 147 | MAGLP | Label in MAGCK |
| 412 | MAXAZ | Test for Maximum Auto Zero Subroutine |
| 245 | MDIG | Multiplier Digit |
| 989 | MFCTR | Multiply Raw Weight by Proper Factor |
| 303 | MODECK | Check for By-Count Mode Subroutine |
| 88 | MOVPR | Link to MOVPRX |
| 421 | MOVPRX | Move Price Subroutine |
| 77 | MOVX | Move Register to Register Subroutine |
| 352 | MOVX> | Link to MOVX |
| 99 | MOV5 | Move 5 Digits Subroutine |
| 97 | MOV5X | Specialized Move 5 Digits Subroutine |
| 235 | MULT | Multiply Subroutine |
| 268 | NDIG | Next Digit of Multiplier |
| 2044 | NOCNVT | No Price Conversion |
| 1918 | NOKEY | No Key Depression |
| 1703 | NOKEY> | Link to NOKEY |
| 1415 | NOTOV | Not Overvalue |
| 1014 | NOZDUN | No Zero Done Since Power-Up |
| 1181 | OUTFLT | Output Filter Routine |
| 1216 | OUTF1 | Label in OUTFLT |
| 1227 | OUTF2 | Label in OUTFLT |
| 166 | OUTPT> | Link to OUTPUT |
| 1431 | OUTPUT | Output Routine |
| 1392 | OVALCK | Overvalue Check |
| 1352 | OW> ARI | Output Weight to the ARI Register |
| 1628 | PARITY | Parity Formulation Return |
| 1582 | PBCCK | Price By-Count Check |
| 1592 | PBC 1 | Label in PBCCK |
| 1598 | PBC 2 | Label in PBCCK |
| 1600 | PBC 3 | Label in PBCCK |
| 1609 | POUT | Printer Output |
| 1606 | POUT> | Link to POUT |
| 1615 | POUTLP | Printer Output Loop |
| 2040 | PRCNVT | Check for Price Conversion |
| 1813 | PRNCK | Check for Print Command Key |
| 1524 | PRNTR | Printer Routine |
| 820 | PROCWT | Process Weight |
| 1551 | PRSET | Set Up for Printer Output |
| 1308 | PRXFCT | Price Times Factor |
| 1372 | PRXWGT | Price Times Weight |
| 1811 | P½ | Per ½ Key |
| 1789 | P½CK | Per ½ Key Check |
| 1801 | P¼CK | Per ¼ Key Check |
| 563 | RDSWA | Label in RDSWS |
| 554 | RDSWS | Read Switches Routine |
| 1930 | RDSWS> | Link to RDSWS |
| 614 | RDWGT | Read Weight |
| 660 | RDWGT1 | Label in RDWGT1 |
| 542 | RESET | Scale Reset |
| 1165 | RNDBY2 | Round Weight by 2's |
| 1171 | RNDBY5 | Round Weight by 5's |
| 341 | RNDOF | Link to RNDOFF |
| 476 | RNDOFF | Round OFF Subroutine |
| 1171 | RNDWT1 | Label in Weight Roundoff |
| 1180 | RNDWT2 | Label in Weight Roundoff |
| 567 | RSLOOP | Read Switch Loop |
| 1651 | RSTPR> | Link to RSTPTR |
| 1667 | RSTPTR | Reset Printer |
| 227 | SDUN | Subtract Subroutine Done |
| 28 | SES | PPS4 Select Enable Status |
| 2103 | SETD1 | Set Up Digital Initial Subtraction |
| 353 | SETRC> | Link to SETRCP |
| 2156 | SETRCP | Set Recompute Subroutine |
| 1962 | SETTF | Set Toggle Flag |
| 29 | SOS | PPS4 Select Output Status |
| 1051 | STARE | Subtract Tare |
| | STARE | Link to STARE |
| 952 | SUBAZ | Subtract Auto-Zero |
| 888 | SUBDI | Subtract Digital Initial from Weight |
| 182 | SUBL | Subtract Loop |
| 201 | SUBM | Subtract Result Minus (Borrow) |
| 208 | SUBML | Subtract Result Minus Loop |
| 175 | SUBT | Subtract Subroutine |
| 1818 | TARECK | Tare Key Check |
| 1899 | TDUN | Tare Done |
| 1277 | TDUNCK | Tare Done Check |
| 1879 | TL7C07 | Link to Address 7CO |
| 1407 | TPBLK | Total Price Blank |
| 1284 | TPCLR | Total Price Clear |
| 2141 | TPRDS | Total Price Round Off Digit Research |
| 344 | TPRDS | Link to TPRDS |
| 721 | T2CNVT | T2 Count Convert |
| 664 | T2LOOP | T2 Counting Loop |
| 777 | T3CNVT | T3 Count Convert |
| 693 | T3LOOP | T3 Counting Loop |
| 884 | UDFWT | Update Filtered Weight |
| 432 | UDOWT | Update Output Weight Subroutine |
| 349 | UDOWT> | Link to UDOWT |
| 455 | UDOWT1 | Label in UDOWT |
| 1343 | UDTPXF | Update with Price Times Factor |
| 1151 | UDZLF | Update Zero Lamp Flag |
| 1744 | VFYCK | Verify Key Check |
| 922 | X10CLR | Times 10 Routine Clear |
| 910 | X10EXP | Times 10 Expand |
| 926 | ZCAPT | Zero Capture Check |
| 1122 | ZLAMP | Zero Lamp Routine |
| 1760 | ¼CK> | Link to P¼CK |

PPS ASSEMBLY LISTING

```
ADDR CODE   ARG   STMT              STMT
                   1     *******************************************
                   2     ****   CALCULATOR OPTION SWITCH ASSIGNMENTS   *****
                   3     *      NAME DEFINES ON CONDITION
                   4     *        SP1-1: .LT.20 INCREMENT PRINT INHIBIT
                   5     *           -2: LB/KG INTERLOCK ENABLEE
                   6     *           -3: 5 DIGIT TOTAL PRICE ENABLE
                   7     *           -4: KEYBOARD TARE ENABLE
                   8     *           -5: 10 INCREMENT AUTO CLR ENABLE
                   9     *           -6: 5 DIGIT UNIT PRICE ENABLE
                  10     *           -7: NOT USED
                  11     *        SP2-1: TARE MANDATORY ENABLE
                  12     *           -2: 6 KG CAPACITY ENABLE
                  13     *           -3: PRICE CONVERT ENABLE
                  14     *           -4: MANDATORY PRICE/UNIT ENABLE
                  15     *           -5: UNITED KINGDOM ENABLE
                  16     *           -6: NOT CONNECTED
                  17     *           -7: TIMES 10 EXPAND ENABLE
                  18     *****                                          *****
                  19     *******************************************
            00FB  20     KAF   EQX   FB
            00F7  21     KBF   EQX   F7
            00F3  22     KDN   EQX   F3
            00F6  23     KER   EQX   F6
            00FE  24     KLA   EQX   FE
            00FD  25     KLB   EQX   FD
            00FC  26     KTR   EQX   FC
            00FA  27     KTS   EQX   FA
            0040  28     SES   EQX   40
            0041  29     SDS   EQX   41
                  30                 ORG   0C0
00C0  FF    0000  31     >00   PTR   #00     MOTION FLAG
00C1  FE    0001  32     >01   PTR   #01     Z GRAD FLAG
00C2  FD    0002  33     >02   PTR   #02     TARE DONE FLAG
00C3  FB    0004  34     >04   PTR   #04     DIGIT TIMER
00C4  F6    0009  35     >09   PTR   #09     RESULT PTR FOR MOVX
00C5  ED    0012  36     >12   PTR   #12     NET FLAG
00C6  EC    0013  37     >13   PTR   #13     PER 1/2 FLAG
00C7  E5    001A  38     >1A   PTR   #1A     ARI LSD
00C8  DE    0021  39     >21   PTR   #21     ZERO LAMP, WGT=ARI
00C9  D6    0029  40     >29   PTR   #29     WGT SIGN
00CA  CC    0033  41     >33   PTR   #33     AUTO CLR FLAG
00CB  B7    0048  42     >48   PTR   #48     PREPAK,Z KEY,AZ INH,X10
00CC  A8    0057  43     >57   PTR   #57     RECOMPUTE FLAG
00CD  96    0069  44     >69   PTR   #69     PRICE MSD
00CE  91    006E  45     >6E   PTR   #6E     OUT WGT SIGN
00CF  85    007A  46     >7A   PTR   #7A     TEMP LSD
                  47
                  48                 ORG   0D0
00D0  EF    01EF  49     >MOVX  PTR   MOVX>
00D1  02    0102  50     >MOV5X PTR   MOV5X
00D2  04    0104  51     >MOV5  PTR   MOV5
00D3  40    0140  52     >SUBT  PTR   SUBT
00D4  79    0179  53     >MULT  PTR   MULT
00D5  26    0126  54     >MAGCK PTR   MAGCK
00D6  B3    01B3  55     >ARICL PTR   ARICL
00D7  85    0185  56     >CLEAR PTR   CLEAR
00D8  A9    01A9  57     >CLRT  PTR   CLRT
00D9  C0    01C0  58     >CLRPR PTR   CLRPR
00DA  CF    01CF  59     >BLANK PTR   BLANK
00DB  DF    01DF  60     >TPRDS PTR   TPRDS>
00DC  E1    01E1  61     >FCPTY PTR   FCPTY>
00DD  E3    01E3  62     >RNDOF PTR   RNDOF>
00DE  E5    01E5  63     >ADDC  PTR   ADDC>
00DF  E9    01E9  64     >UDOWT PTR   UDOWT>
00E0  EB    01EB  65     >DELAY PTR   DELAY>
00E1  4C    014C  66     >SUBL  PTR   SUBL
00E2  ED    01ED  67     >DLY.4 PTR   DLY.4>
00E3  00    0100  68     >MOVPR PTR   MOVPR
00E4  BA    01BA  69     >MODE  PTR   MODECK
```

PPS ASSEMBLY LISTING

```
ADDR   CODE   ARG    STNO         STMT

00E5   F1     01F1    70    >SETRC   PTR     SETRC>
00E6   E7     01E7    71    >CRTAZ   PTR     CRTAZ>
00E7   3D     013D    72    >OUTP>   PTR     OUTPT>
                      73    * MOVX SUBROUTINE - MOVES DIGS FROM ADDR UP TO END
                      74    *        TO CALL:         BM=SOURCE BM
                      75    *                         BL=SOURCE AND DEST BL (LSD)
                      76    *                         A=DESTINATION BM
00E8   1B             77    MOVX     LXA             DEST BM>X
00E9   37     0       78             LD              LD DATA WRD
00EA   18             79             XBMX            DEST BM>BM,SOURCE BM>X
00EB   3F     0       80             EX              WRITE DATA WRD
00EC   18             81             XBMX            SOURCE BM>BM,DEST BM>X
00ED   17             82             INCB            INC BL, SKIP IF 0
00EE   A9     00E9    83             T       MOVX+1  BL NOT 0
00EF   05             84             RTN             RETURN
                      85
                      86             ORG     100
                      87    * MOVPR SUBROUTINE - MOVES UNIT PRICE TO REG 7A-7E
0100   5238   0238    88    MOVPR    TL      MOVPRX
                      89    * MOV5 SUBROUTINE - MOVES 5 DIGS INDEPENDENT OF ADDR
                      90    *        TO CALL:         BM=SOURCE BM
                      91    *                         BL=SOURCE BL (MSD)
                      92    *                         X=DESTINATION BM
                      93    *                         A=DESTINATION BL (MSD)
                      94    *        ON RETURN 6TH DIG IS IN A AND B OK FOR "EX"
                      95    ****    MAY BE CALLED FROM MAIN PROGRAM ONLY    ****
                      96    * MOV5X DIFFERS ONLY IN DEFAULT DEST BL=15
0102   1B             97    MOV5X    LXA             A>X,DEST BM IN A
0103   70     000F    98             LDI     15      DEST BL=15
0104   26             99    MOV5     RF1             RESET FLG 1
0105   06            100             XS              EXCH SA AND SB
0106   6F            101             CYS             SA*DEST BL/?/?,A*?
0107   37     0      102             LD              LD DATA WRD N
0108   1F            103             DECB            DEC BL
0109   8A     010A   104             T       *+1
010A   6F            105             CYS             SA*DATN/DEST BL/?,A*?
010B   37     0      106             LD              LD DATA WRD N-1
010C   1F            107             DECB            DEC BL
010D   8E     010E   108             T       *+1
010E   6F            109             CYS             SA*DATN-1-DATN=DEST BL,A*?
010F   37     0      110             LD              LD DATA WRD N-2
0110   1F            111             DECB            DEC BL
0111   92     0112   112             T       *+1
0112   6F            113             CYS
                    114    *                SA*DATN-2/DATN-1/DATN,A*DEST BL
0113   19            115             XABL            DEST BL>BL,SOURCE BL>A
0114   18            116             XBMX            DEST BM>BM,SOURCE BM>X
0115   6F            117             CYS
                    118    *                SA*SRCE BL/DATN-2/DATN-1,A*DATN
0116   2F     0     119             EXD             WRITE DATA WRD N,DEC BL
0117   98     0118  120             T       *+1
0118   6F           121             CYS             SA*?/SRCE BL/DATN-2,A*DATN-1
0119   2F     0     122             EXD             WRITE DATA WRD N-1,DEC BL
011A   98     011B  123             T       *+1
011B   6F           124             CYS             SA*?/?/SRCE BL,A*DATN-2
011C   16           125             SKF1            SKIP ON FLG 1, PASS 2
011D   A0     0120  126             T       *+3     PASS 1
011E   06           127             XS              RESTORE SA FOR RETURN
011F   05           128             RTN             RETURN
0120   2F     0     129             EXD             WRITE DATA WRD N-2,DEC BL
0121   6F           130             CYS             SA*?/?/?,A*SRCE BL
0122   19           131             XABL            SOURCE BL>BL,DEST BL>A
0123   18           132             XBMX            SOURCE BM>BM,DEST BM>X
0124   22           133             SF1             SET FLG 1,PASS 2
0125   86     0106  134             T       MOV5+2
                    135    * MAGCK SUBROUTINE - CHECKS FIELD FOR .LE. TEST DIG
                    136    *        TO CALL:         BM=FIELD BM
                    137    *                         BL=COUNTER DOWN TO TEST POINT
                    138    *                         A=TEST DIGIT
```

PPS ASSEMBLY LISTING

| ADDR | CODE | ARG | STNO | | STMT | | |
|------|------|-----|------|---|------|---|---|
| | | | 139 | * | ON RETURN: | | |
| | | | 140 | * | IF ALL 0S FOUND:C=0,A=15,NO SKIP | | |
| | | | 141 | * | IF MEM.LE.TEST: C=0,A=DIFFERENCE,NO SKIP | | |
| | | | 142 | * | IF MEM.GT.TEST: C=1,SKIPS NEXT INSTR ON RTN | | |
| 0126 | 1B | | 143 | MAGCK | LXA | | TEST DIG>X |
| 0127 | 70 | 000F | 144 | | LDI | 15 | FIELD BL |
| 0128 | 19 | | 145 | | XABL | | COUNTER>A,15>BL |
| 0129 | 24 | | 146 | | RC | | |
| 012A | 60 | 000F | 147 | MAGLP | ADI | 15 | DEC COUNTER,SKIP ON C |
| 012B | 05 | | 148 | | RTN | | NO C,C=0,A=15,RETURN |
| 012C | 3F | 0 | 149 | | EX | | MEM DIG>A,CNTR>MEM |
| 012D | 1E | | 150 | | SKZ | | SKIP IF DIG 0 |
| 012E | B1 | 0131 | 151 | | T | CMDIG | NOT 0,COMPARE DIGS |
| 012F | 2F | 0 | 152 | | EXD | | CNTR>A,MEM DIG>MEM,DEC BL |
| 0130 | AA | 012A | 153 | | T | MAGLP | LOOP |
| 0131 | 3F | 0 | 154 | CMDIG | EX | | CNTR>A,MEM DIG>MEM |
| 0132 | 60 | 000F | 155 | | ADI | 15 | DEC CNTR,SKIP ON C |
| 0133 | B6 | 0136 | 156 | | T | *+3 | CNTR 0,DO COMPARISON |
| 0134 | 20 | | 157 | | SC | | SET C FOR RTN |
| 0135 | 07 | | 158 | | RTNSK | | TOO EARLY,C=1,A=? |
| 0136 | 12 | | 159 | | LAX | | TEST DIG>A |
| 0137 | 0E | | 160 | | COMP | | COM TEST DIG |
| 0138 | 0B | | 161 | | AD | | ADD MEM DIG |
| 0139 | 0E | | 162 | | COMP | | COM RES TO FORM POS DIFF |
| 013A | 15 | | 163 | | SKC | | SKIP ON C,MEM DIG.GT.TEST |
| 013B | 05 | | 164 | | RTN | | RETURN,MEM DIG.LE.TEST DIG |
| 013C | 07 | | 165 | | RTNSK | | RETURN,MEM DIG.GT.TEST DIG |
| 013D | 55B5 | 05B5 | 166 | OUTPT> | TL | OUTPUT | OUTPUT ROUTINE LINK |
| | | | 167 | | | | |
| | | | 168 | | ORG | 140 | |
| | | | 169 | * SUBT SUBROUTINE - SUBTRACTS 2 FIELDS WITH SIGNS | | | |
| | | | 170 | * IN BL ADDR 9, DATA IN BL ADDR 10-15(A-F) | | | |
| | | | 171 | * TO CALL: BM=MINUEND BM | | | |
| | | | 172 | * BL=SUBTRAHEND BM | | | |
| | | | 173 | * ON RETURN RESULT SIGN IS IN A, B ADDRESSES | | | |
| | | | 174 | * RESULT SIGN, RESULT IN RAM 09 THRU 0F | | | |
| 0140 | 76 | 0009 | 175 | SUBT | LDI | 9 | MINUEND SIGN ADDR>A |
| 0141 | 19 | | 176 | | XABL | | MND SGN ADDR>BL,SBTRND BM>A |
| 0142 | 1B | | 177 | | LXA | | SBTRND BM>X |
| 0143 | 37 | 0 | 178 | | LD | | LD MND SGN |
| 0144 | 13 | | 179 | | SAG | | ADDR RESULT |
| 0145 | 3F | 0 | 180 | | EX | | WRITE TO RESULT SGN |
| 0146 | 37 | 0 | 181 | | LD | | LD MND SGN |
| 0147 | 18 | | 182 | | XBMX | | SBTRND BM>BM,MND BM>X |
| 0148 | 0C | | 183 | | EOR | | EX-OR SIGNS |
| 0149 | 17 | | 184 | | INCB | | INC BL |
| 014A | 1E | | 185 | | SKZ | | SKIP IF SIGNS SAME |
| 014B | AA | 016A | 186 | | T | ADD | SIGNS DIFFERENT |
| 014C | 20 | | 187 | SUBL | SC | | SET C TO START |
| 014D | 37 | 0 | 188 | | LD | | LD SBTRND DIG |
| 014E | 0E | | 189 | | COMP | | COM IT |
| 014F | 18 | | 190 | | XBMX | | MND BM>BM,SBTRND BM>X |
| 0150 | 08 | | 191 | | ADCSK | | ADD MND DIG+C,SKIP ON C |
| 0151 | 65 | | 192 | | DC | | NO C,DECIMAL CORRECT |
| 0152 | 13 | | 193 | | SAG | | ADDR RESULT |
| 0153 | 3F | 0 | 194 | | EX | | WRITE TO RESULT |
| 0154 | 18 | | 195 | | XBMX | | SBTRND BM>BM,MND BM>X |
| 0155 | 17 | | 196 | | INCB | | INC BL,SKIP IF 0 |
| 0156 | 8D | 014D | 197 | | T | SUBL+1 | NOT 0,LOOP |
| 0157 | 15 | | 198 | | SKC | | SKIP IF NO BORROW |
| 0158 | 9A | 015A | 199 | | T | SUBM | BORROW |
| 0159 | B5 | 0175 | 200 | | T | SDUN | DONE |
| 015A | 00F6 | 0009 | 201 | SUBM | LBL | #09 | ADDR RESULT SIGN |
| 015C | 37 | 0 | 202 | | LD | | LD RESULT SIGN |
| 015D | 0E | | 203 | | COMP | | COM IT |
| 015E | 3F | 0 | 204 | | EX | | UPDATE IT |
| 015F | 17 | | 205 | | INCB | | INC BL |
| 0160 | 20 | | 206 | | SC | | 10S COM LSD |
| 0161 | 7F | 0000 | 207 | | LDI | 0 | 0>A |

PPS ASSEMBLY LISTING

| ADDR | CODE | ARG  | STNO |       | STMT |       |                          |
|------|------|------|------|-------|------|-------|--------------------------|
| 0162 | 3F   | 0    | 208  | SUBML | EX   |       | RESULT DIG>A,0>RESULT    |
| 0163 | 0E   |      | 209  |       | COMP |       | COM DIG                  |
| 0164 | 08   |      | 210  |       | ADCSK|       | ADD DIG COM+0+C,SKIP ON C|
| 0165 | 65   |      | 211  |       | DC   |       | NO C,DECIMAL CORRECT     |
| 0166 | 3F   | 0    | 212  |       | EX   |       | RESULT DIG>RESULT,0>A    |
| 0167 | 17   |      | 213  |       | INCB |       | INC BL,SKIP IF 0         |
| 0168 | A2   | 0162 | 214  |       | T    | SUBML | NOT 0,LOOP               |
| 0169 | 85   | 0175 | 215  |       | T    | SDUN  | DONE                     |
| 016A | 24   |      | 216  | ADD   | RC   |       | RESET C TO START         |
| 016B | 37   | 0    | 217  |       | LD   |       | LD ADDEND DIG            |
| 016C | 69   | 0006 | 218  |       | ADI  | 6     | EXCESS 6                 |
| 016D | 18   |      | 219  |       | XBMX |       | MND BM>BM,ADND BM>X      |
| 016E | 08   |      | 220  |       | ADCSK|       | ADD MND+C,SKIP ON C      |
| 016F | 65   |      | 221  |       | DC   |       | NO C,DECIMAL CORRECT     |
| 0170 | 13   |      | 222  |       | SAG  |       | ADDR RESULT              |
| 0171 | 3F   | 0    | 223  |       | EX   |       | WRITE TO RESULT          |
| 0172 | 18   |      | 224  |       | XBMX |       | ADND BM>BM,MND BM>X      |
| 0173 | 17   |      | 225  |       | INCB |       | INC BL,SKIP IF 0         |
| 0174 | AB   | 016B | 226  |       | T    | ADD+1 | NOT 0,LOOP               |
| 0175 | 00F6 | 0009 | 227  | SDUN  | LBL  | #09   | ADDR RESULT SGN          |
| 0177 | 37   | 0    | 228  |       | LD   |       | LD RESULT SGN            |
| 0178 | 05   |      | 229  |       | RTN  |       | RETURN                   |
|      |      |      | 230  | * MULT SUBROUTINE - MULTIPLIES MULTIPLICAND BY ARI |||
|      |      |      | 231  | *  WITH BL ADDR OF 10-15(A-F) ||||
|      |      |      | 232  | *       TO CALL:     BM=MULTIPLICAND BM ||||
|      |      |      | 233  | *                    BL=5 ||||
|      |      |      | 234  | *    ON RETURN B ADDRESSES RESULT LSD (05) ||||
| 0179 | 7F   | 0000 | 235  | MULT  | LDI  | 0     | 0>A                      |
| 017A | 13   |      | 236  |       | SAG  |       | ADDR RESULT              |
| 017B | 3F   | 0    | 237  |       | EX   |       | CLR RESULT               |
| 017C | 17   |      | 238  |       | INCB |       | INC BL,SKIP IF 0         |
| 017D | B9   | 0179 | 239  |       | T    | MULT  | NOT 0,LOOP               |
| 017E | 5180 | 0180 | 240  |       | TL   | #180  |                          |
|      |      |      | 241  |       |      |       |                          |
|      |      |      | 242  |       | ORG  | 180   |                          |
| 0180 | 75   | 000A | 243  |       | LDI  | 10    | ARI BL                   |
| 0181 | 1B   |      | 244  |       | LXA  |       | INIT X WITH ARI BL=10    |
| 0182 | 7E   | 0001 | 245  | MDIG  | LDI  | 1     | ARI BM                   |
| 0183 | 1A   |      | 246  |       | XAX  |       | ARI BL>A,ARI BM>X        |
| 0184 | 18   |      | 247  |       | XBMX |       | ARI BM>BM,MPCND BM>X     |
| 0185 | 19   |      | 248  |       | XABL |       | ARI BL>BL                |
| 0186 | 37   | 0    | 249  |       | LD   |       | LD MULTIPLIER DIG        |
| 0187 | 60   | 000F | 250  |       | ADI  | 15    | DEC BY 1,SKIP ON C       |
| 0188 | 99   | 0199 | 251  |       | T    | NDIG  | DIG WAS 0,ADV TO NXT MPR DIG|
| 0189 | 3F   | 0    | 252  |       | EX   |       | UPDATE MULTIPLIER DIG    |
| 018A | 18   |      | 253  |       | XBMX |       | MPCND BM>BM              |
| 018B | 75   | 000A | 254  |       | LDI  | 10    | MPCND BL                 |
| 018C | 19   |      | 255  |       | XABL |       | ARI BL>A,MPCND BL>BL     |
| 018D | 1B   |      | 256  |       | LXA  |       | ARI BL>X                 |
| 018E | 24   |      | 257  |       | RC   |       | RESET C TO START ADD LOOP|
| 018F | 37   | 0    | 258  | MADDL | LD   |       | LD MPCND DIG             |
| 0190 | 69   | 0006 | 259  |       | ADI  | 6     | EXCESS 6                 |
| 0191 | 13   |      | 260  |       | SAG  |       | ADDR RESULT              |
| 0192 | 08   |      | 261  |       | ADCSK|       | ADD PARTIAL RES+C,SKIP ON C|
| 0193 | 65   |      | 262  |       | DC   |       | NO C,DECIMAL CORRECT     |
| 0194 | 13   |      | 263  |       | SAG  |       | ADDR RESULT              |
| 0195 | 3F   | 0    | 264  |       | EX   |       | UPDATE PARTIAL RESULT    |
| 0196 | 17   |      | 265  |       | INCB |       | INC MPCND BL,SKIP IF 0   |
| 0197 | 8F   | 018F | 266  |       | T    | MADDL | NOT 0,LOOP               |
| 0198 | 82   | 0182 | 267  |       | T    | MDIG  | BL 0,GET MULTIPLIER DIG  |
| 0199 | 17   |      | 268  | NDIG  | INCB |       | INC ARI BL,SKIP IF 0     |
| 019A | 9E   | 019E | 269  |       | T    | *+4   | NOT 0 SHIFT RESULT       |
| 019B | 00F5 | 000A | 270  |       | LBL  | #0A   | ADDR RESULT 6 DIG MSD    |
| 019D | 05   |      | 271  |       | RTN  |       | RETURN                   |
| 019E | 70   | 000F | 272  |       | LDI  | 15    | RESULT MSD               |
| 019F | 19   |      | 273  |       | XABL |       | ARI BL>A,RES MSD>BL      |
| 01A0 | 18   |      | 274  |       | XBMX |       | MPCND BM>BM              |
| 01A1 | 1B   |      | 275  |       | LXA  |       | ARI BL>X                 |

PPS ASSEMBLY LISTING

```
ADDR   CODE    ARG    STNO         STMT

01A2    7F     0000   276          LDI     0           0>A TO CLEAR RESULT MSD
01A3    13            277          SAG                 ADDR RESULT
01A4    3F     0      278          EX                  DIG N>RES,DIG N-1>A
01A5    1F            279          DECB                DEC BL
01A6    44     0004   280          SKBI    4           SKIP IF BL=4
01A7    A3     01A3   281          T       *-4         BL NOT 4,LOOP
01A8    82     0182   282          T       MDIG        SHIFT DONE,GET NEXT MPR DIG
                      283   * CLRT SUBROUTINE - CLEARS TARE REG,TARE DONE FLAG,
                      284   * NET FLAG,MANUAL TARE FLAG
01A9    00FC   0003   285   CLRT   LBL     #03
01AB    7F     0000   286          LDI     0
01AC    2E     1      287          EXD     1           CLR MANUAL TARE FLAG
01AD    7F     0000   288          LDI     0
01AE    3E     1      289          EX      1           CLR NET FLAG
01AF    7F     0000   290          LDI     0
01B0    3F     0      291          EX                  CLR TARE DONE FLAG
01B1    00A6   0059   292          LBL     #59         ADDR TARE
                      293   * ARICL SUBROUTINE - CLEARS ARI REG FROM 19 THRU 1F
01B3    00E6   0019   294   ARICL  LBL     #19         ADDR ARI
                      295   * CLEAR SUBROUTINE - CLEARS REG FROM ADDR UP TO END
01B5    7F     0000   296   CLEAR  LDI     0
01B6    3F     0      297          EX                  0>MEM DIG
01B7    17            298          INCB                INC BL,SKIP IF 0
01B8    B5     01B5   299          T       CLEAR       NOT 0,LOOP
01B9    05            300          RTN                 RETURN
                      301   * MODECK SUBROUTINE - CHECKS FOR BY COUNT
                      302   * MODE IN KEYBD PER 1/2 AND 1/4 KEY SECTION
01BA    CB     00CB   303   MODECK LB      >4B
01BB    70     0002   304          LDI     2           2>A
01BC    0D            305          AND                 .AND.WITH BY COUNT
01BD    1E            306          SKZ                 SKIP IF BY COUNT
01BE    05            307          RTN                 NORMAL OR PRE-PAK
01BF    07            308          RTNSK               BY COUNT
                      309
                      310          ORG     1C0
                      311   * CLRPR SUBROUTINE - CLEARS PRICE REG,PER 1/2,1/4,
                      312   * FCTR DONE FLAGS,DIGIT TIMER, CLEARS TOTAL PRICE
                      313   *  IF OUT WGT PLUS,BLANKS TOTAL PRICE IF MINUS.
01C0    C3     00C3   314   CLRPR  LB      >04
01C1    7F     0000   315          LDI     0
01C2    2E     1      316          EXD     1           CLR DIGIT TIMER
01C3    7F     0000   317          LDI     0
01C4    3F     0      318          EX                  CLR FACTOR
01C5    CD     00CD   319          LB      >69
01C6    01CE   01CE   320          TML     BLANK-1 CLR PRICE
01C8    CE     00CE   321   CKWSGN LB      >6E
01C9    71     000E   322          LDI     14          14>A
01CA    0C            323          EOR                 EX-OR WITH OUT WGT SIGN
01CB    009B   0064   324          LBL     #64         ADDR TOTAL PRICE MSD
01CD    1E            325          SKZ                 SKIP IF OUT WGT SIGN MINUS
01CE    7F     0000   326          LDI     0           PLUS,LD 0 TO CLR TOTAL PRICE
                      327   * BLANK SUBROUTINE - BLANKS REG FROM ADDR DOWN TO
                      328   * BOTTOM OR DOWN TO BL ADDR OF 5
01CF    70     000F   329   BLANK  LDI     15
01D0    1B            330          LXA                 0 OR 15>X
01D1    2F     0      331          EXD                 15>MEM DIG,DEC BL,SKIP IF 15
01D2    94     01D4   332          T       *+2         NOT 15
01D3    9A     01DA   333          T       CLRPF
01D4    12            334          LAX                 0 OR 15>A
01D5    49     0009   335          SKBI    9           SKIP IF BL=9
01D6    98     01D8   336          T       *+2
01D7    9A     01DA   337          T       CLRPF
01D8    44     0004   338          SKBI    4           SKIP IF BL=4
01D9    91     01D1   339          T       BLANK+2     NOT 4,LOOP
01DA    00DB   0027   340   CLRPF  LBL     #27
01DC    7F     0000   341          LDI     0
01DD    3F     0      342          EX                  CLR PRINT COMMAND
01DE    05            343          RTN                 RETURN
01DF    5900   0900   344   TPRDS> TL      TPRDS       TPRDS SUBROUTINE LINK
```

PPS ASSEMBLY LISTING

```
ADDR   CODE    ARG     STNO            STMT

01E1   5211    0211    345     FCPTY>  TL      FCPTY    FCPTY SUBROUTINE LINK
01E3   5270    0270    346     RNDOF>  TL      RNDOFF   RNDOFF SUBROUTINE LINK
01E5   5274    0274    347     ADDC>   TL      ADDC     ADDC SUBROUTINE LINK
01E7   51F3    01F3    348     CRTAZ>  TL      CRCTAZ   CRCTAZ SUBROUTINE LINK
01E9   5240    0240    349     UDOWT>  TL      UDOWT    UDOWT SUBROUTINE LINK
01EB   5280    0280    350     DELAY>  TL      DELAY    DELAY SUBROUTINE LINK
01ED   5263    0263    351     DLY.4>  TL      DL.4MS   DL.4MS SUBROUTINE LINK
01EF   50E8    00F8    352     MOVX>   TL      MOVX     MOVX SUBROUTINE LINK
01F1   5910    0910    353     SETRC>  TL      SETRCP   SETRCP SUBROUTINE LINK
01F3   5914    0914    354     CRCTAZ  TL      CRCAZ    CRCTAZ SUBROUTINE LINK
                       355
                       356             ORG     200
0200   77      0008    357             LDI     8        DIG 0 PARITY
0201   7F      0000    358             LDI     0        DIG 1
0202   7F      0000    359             LDI     0        DIG 2
0203   77      0008    360             LDI     8        DIG 3
0204   7F      0000    361             LDI     0        DIG 4
0205   77      0008    362             LDI     8        DIG 5
0206   77      0008    363             LDI     8        DIG 6
0207   7F      0000    364             LDI     0        DIG 7
0208   7F      0000    365             LDI     0        DIG 8
0209   77      0008    366             LDI     8        DIG 9
020A   77      0008    367             LDI     8        DIG 10
020B   7F      0000    368             LDI     0        DIG 11
020C   77      0008    369             LDI     8        DIG 12
020D   7F      0000    370             LDI     0        DIG 13
020E   7F      0000    371             LDI     0        DIG 14
020F   5695    0695    372             TL      PARITY
                       373     * FCPTY SUBROUTINE - SETS FLG1,C,A,X ACCORDING
                       374     *  TO SCALE CAPACITY, THE ARI REG IS CLEARED.
                       375     *     FLG1  - RESET IF 15KG SCALE
                       376     *     C     - RESET IF  6KG SCALE
                       377     *     A     - 10 GRADUATION DIGIT
                       378     *     X     - CAPACITY DIGIT
                       379     *     B     - ADDRESSES ARI LSD(1A)
0211   D6      0006    380     FCPTY   TM      >ARICL
0212   22              381             SF1              ASSUME NOT 15KG
0213   20              382             SC               ASSUME NOT 6KG
0214   00EB    0014    383             LBL     #14
0216   32      5       384             LD      5        LD KG FLAG
0217   67      0008    385             ADI     8        SKIP IF KG
0218   9F      021F    386             T       FCPTY1   30LB SCALE
0219   24              387             RC               NOT 30LB, ASSUME 6KG
021A   37      0       388             LD               LD 6KG SCALE ENB
021B   1E              389             SKZ              SKIP IF NOT 6KG SCALE
021C   9F      021F    390             T       FCPTY1   6KG SCALE
021D   20              391             SC               NOT 6KG
021E   26              392             RF1              15KG
021F   15              393     FCPTY1  SKC              SKIP IF NOT 6KG
0220   A4      0224    394             T       FCPTY2   6KG
0221   16              395             SKF1             SKIP IF NOT 15KG
0222   7A      0005    396             LDI     5        15KG
0223   7C      0003    397             LDI     3        30LB
0224   79      0006    398     FCPTY2  LDI     6        6KG
0225   1B              399             LXA              CAPACITY DIGIT>X
0226   15              400             SKC              SKIP IF NOT 6KG
0227   AB      022B    401             T       FCPTY3   6KG
0228   16              402             SKF1             SKIP NOT 15KG
0229   7A      0005    403             LDI     5        15KG
022A   7E      0001    404             LDI     1        30LB
022B   7D      0002    405     FCPTY3  LDI     2        6KG
022C   00E5    001A    406             LBL     #1A
022E   05              407             RTN              RETURN
                       408     * MAXAZ SUBROUTINE - CHECKS THAT WGT OR AUTO ZERO
                       409     *  CORRECTION RESULT IS LESS THAN 000400 CNTS, ON
                       410     *   ENTRY B IS SET TO 24(WGT) OR 04(RESULT). IF
                       411     *    AUTO ZERO IS UPDATED A RETURN AND SKIP OCCURS.
022F   7C      0003    412     MAXAZ   LDI     3
0230   05      0005    413             TM      >MAGCK   CK FOR,LE,3XX,WGT OR RES FLD
```

PPS ASSEMBLY LISTING

| ADDR | CODE | ARG  | STNO |        | STMT  |         |                              |
|------|------|------|------|--------|-------|---------|------------------------------|
| 0231 | 83   | 0233 | 414  |        | T     | *+2     | ,LE,3XX RTN                  |
| 0232 | 05   |      | 415  |        | RTN   |         | ,GT,3XX RTN,OVER,RETURN      |
| 0233 | 76   | 0009 | 416  |        | LDI   | 9       |                              |
| 0234 | 19   |      | 417  |        | XABL  |         | ADDR WGT OR RESULT SIGN      |
| 0235 | 7B   | 0004 | 418  |        | LDI   | 4       |                              |
| 0236 | D0   | 00D0 | 419  |        | TM    | >MOVX   | MOVE WGT OR RES TO AUTO ZERO |
| 0237 | 07   |      | 420  |        | RTNSK |         | UPDATE DONE,RETURN AND SKIP  |
| 0238 | CD   | 00CD | 421  | MOVPRX | LB    | >69     |                              |
| 0239 | 78   | 0007 | 422  |        | LDI   | 7       |                              |
| 023A | 1B   |      | 423  |        | LXA   |         |                              |
| 023B | 71   | 000E | 424  |        | LDI   | 14      |                              |
| 023C | 5104 | 0104 | 425  |        | TL    | MOV5    |                              |
|      |      |      | 426  |        |       |         |                              |
|      |      |      | 427  |        | ORG   | 240     |                              |
|      |      |      | 428  | * UDOWT SUBROUTINE - MOVES WGT 5 MSDS AND WGT SIGN |
|      |      |      | 429  | *    TO OUT WGT, BLANKS OUT WGT IF SIGN MINUS AND  |
|      |      |      | 430  | *     HAVE NON-0 DIGIT IN MSD, ENSURES THAT SIGN PLUS |
|      |      |      | 431  | *     IF OUT WGT IS 0,                              |
| 0240 | 00DA | 0025 | 432  | UDOWT  | LBL   | #25     |                              |
| 0242 | 14   |      | 433  |        | SKF2  |         | SKIP NOT X10 EXP             |
| 0243 | 17   |      | 434  |        | INCB  |         |                              |
| 0244 | 7F   | 0000 | 435  |        | LDI   | 0       |                              |
| 0245 | 22   |      | 436  |        | SF1   |         |                              |
| 0246 | D5   | 00D5 | 437  |        | TM    | >MAGCK  | CK FOR ALL 0S IN FINAL WGT   |
| 0247 | 26   |      | 438  |        | RF1   |         | ALL 0S RETURN,RESET FLG1     |
| 0248 | C9   | 00C9 | 439  |        | LB    | >29     |                              |
| 0249 | 70   | 000F | 440  |        | LDI   | 15      | 15>A TO DEC WGT SIGN         |
| 024A | 0B   |      | 441  |        | AD    |         | WGT SIGN>15:PLUS,14:MINUS    |
| 024B | 00D0 | 002F | 442  |        | LBL   | #2F     |                              |
| 024D | 14   |      | 443  |        | SKF2  |         | SKIP NOT X10 EXP             |
| 024E | 1F   |      | 444  |        | DECB  |         |                              |
| 024F | 16   |      | 445  |        | SKF1  |         | SKIP IF OUT WGT NOT 0        |
| 0250 | 70   | 000F | 446  |        | LDI   | 15      | BE SURE SIGN PLUS IF 0       |
| 0251 | 3F   | 0    | 447  |        | EX    |         | OUT WGT SIGN>MSD WGT,MSD>A   |
| 0252 | 1E   |      | 448  |        | SKZ   |         | SKIP IF WGT MSD 0            |
| 0253 | 95   | 0255 | 449  |        | T     | *+2     | NOT 0                        |
| 0254 | 9A   | 025A | 450  |        | T     | UDOWT1  | MSD 0                        |
| 0255 | 3F   | 0    | 451  |        | EX    |         | NOT 0,MSD>MEM                |
| 0256 | 15   |      | 452  |        | SKC   |         | SKIP IF WGT MINUS            |
| 0257 | 9A   | 025A | 453  |        | T     | UDOWT1  | WGT PLUS                     |
| 0258 | 53C9 | 03C9 | 454  |        | TL    | BLNKWT  | MINUS AND MSD NOT 0          |
| 025A | 00D0 | 002F | 455  | UDOWT1 | LBL   | #2F     |                              |
| 025C | 14   |      | 456  |        | SKF2  |         | SKIP NOT X10 EXP             |
| 025D | 1F   |      | 457  |        | DECB  |         |                              |
| 025E | 79   | 0006 | 458  |        | LDI   | 6       |                              |
| 025F | 1B   |      | 459  |        | LXA   |         |                              |
| 0260 | 71   | 000E | 460  |        | LDI   | 14      |                              |
| 0261 | 5104 | 0104 | 461  |        | TL    | MOV5    | MOVE WGT 5 MSDS TO OUT WGT   |
|      |      |      | 462  | * DL,4MS SUBROUTINE - SETS UP AND PERFORMS ,4MS DLY |
|      |      |      | 463  | *  AND RETURNS WITH B SET TO ADDR 0D                |
| 0263 | 1C41 | 0041 | 464  | DL,4MS | IOL   | SOS     | STROBE OR REMOVE CLOCK       |
| 0265 | C4   | 00C4 | 465  |        | LB    | >09     |                              |
| 0266 | 7F   | 0000 | 466  |        | LDI   | 0       |                              |
| 0267 | 3F   | 0    | 467  |        | EX    |         |                              |
| 0268 | 17   |      | 468  |        | INCB  |         |                              |
| 0269 | 7F   | 0000 | 469  |        | LDI   | 0       |                              |
| 026A | 3F   | 0    | 470  |        | EX    |         |                              |
| 026B | 7C   | 0003 | 471  |        | LDI   | 3       |                              |
| 026C | E0   | 00E0 | 472  |        | TM    | >DELAY  | ,4 MS DELAY                  |
| 026D | 00F2 | 000D | 473  |        | LBL   | #0D     |                              |
| 026F | 05   |      | 474  |        | RTN   |         |                              |
|      |      |      | 475  | * RNDOFF SUBROUTINE - DOES 5 ROUND OFF,PROPAGATES C |
| 0270 | 74   | 000B | 476  | RNDOFF | LDI   | 11      | 11>A                         |
| 0271 | 0B   |      | 477  |        | AD    |         | ADD RND OFF DIG,C>1 IF,GE,5  |
| 0272 | 7F   | 0000 | 478  |        | LDI   | 0       |                              |
| 0273 | 87   | 0277 | 479  |        | T     | ADDC+3  | REPLACE LSD WITH 0           |
|      |      |      | 480  | * ADDC SUBROUTINE - ADDS C TO FIELD,PROPAGATES C    |
| 0274 | 79   | 0006 | 481  | ADDC   | LDI   | 6       | EXCESS 6                     |
| 0275 | 08   |      | 482  |        | ADCSK |         | ADD MEM DIG+C,SKIP ON C      |

PPS ASSEMBLY LISTING

| ADDR | CODE | ARG | STNO | | STMT | | |
|------|------|-----|------|------|------|------|------|
| 0276 | 65 | | 483 | | DC | | DECIMAL CORRECT |
| 0277 | 3F | 0 | 484 | | EX | | UPDATE MEM DIG |
| 0278 | 17 | | 485 | | INCB | | INC BL,SKIP IF 0 |
| 0279 | 84 | 0274 | 486 | | T | ADDC | NOT 0,LOOP |
| 027A | 05 | | 487 | | RTN | | RETURN |
| | | | 488 | | | | |
| | | | 489 | | ORG | 280 | |
| | | | 490 | | | | |
| | | | 491 | * DELAY SUBROUTINE - ALLOWS TIME DELAYS FROM 190 | | | |
| | | | 492 | * MIC-SEC TO 255.76 MILLI-SEC, INCREMENT .105 MS | | | |
| | | | 493 | * TO CALL: | | LONG TIMER IN ADDR 0A | |
| | | | 494 | * | | MID TIMER IN ADDR 09 | |
| | | | 495 | * | | SHORT TIMER IN A | |
| | | | 496 | * DELAY VALUES: | | LONG TIMER 15.64 MS/COUNT | |
| | | | 497 | * | | MID TIMER 1.3 MS/COUNT | |
| | | | 498 | * | | SHORT TIMER 0.105 MS/COUNT | |
| | | | 499 | * | | DEAD TIME 0.085 MS | |
| 0280 | 00F6 | 0009 | 500 | DELAY | LBL | #09 | |
| 0282 | 3F | 0 | 501 | | EX | | MID TIMER>A,SHORT TIMER>MEM |
| 0283 | 1B | | 502 | | LXA | | SAVE MID TIMER IN X |
| 0284 | 3F | 0 | 503 | | EX | | SHORT TIMER>A,MID TIMER>MEM |
| 0285 | 60 | 000F | 504 | DELY1 | ADI | 15 | DEC SHORT TIM,SKIP WAS NOT 0 |
| 0286 | 8E | 028E | 505 | | T | DELY2 | WAS 0 |
| 0287 | 00F3 | 000C | 506 | | LBL | #0C | LD B WITH 4 COUNTER |
| 0289 | 528B | 028B | 507 | | TL | *+2 | 10 MIC-SEC |
| 028B | 17 | | 508 | | INCB | | 5 MIC-SEC,INC BL,SKIP IF 0 |
| 028C | 89 | 0289 | 509 | | T | *-3 | 5 MIC-SEC,X4 FOR 80 MIC-SEC |
| 028D | 85 | 0285 | 510 | | T | DELY1 | SHORT DELY=TIMERX105 MIC-SEC |
| 028E | 12 | | 511 | DELY2 | LAX | | LD MID COUNTER |
| 028F | 60 | 000F | 512 | | ADI | 15 | DEC,SKIP WAS NOT 0 |
| 0290 | 94 | 0294 | 513 | | T | DELY3 | WAS 0 |
| 0291 | 1B | | 514 | | LXA | | DECREMENTED TIMER>X |
| 0292 | 73 | 000C | 515 | | LDI | 12 | SET UP SHORT DELAY=1.26 MS |
| 0293 | 85 | 0285 | 516 | | T | DELY1 | MID DELAY=TIMERX1.3 MS |
| 0294 | 74 | 000B | 517 | DELY3 | LDI | 11 | |
| 0295 | 1B | | 518 | | LXA | | SET UP MID DELAY=14.3 MS |
| 0296 | 00F5 | 000A | 519 | | LBL | #0A | |
| 0298 | 37 | 0 | 520 | | LD | | LD LONG TIMER |
| 0299 | 60 | 000F | 521 | | ADI | 15 | DEC,SKIP WAS NOT 0 |
| 029A | 05 | | 522 | | RTN | | WAS 0,DONE,85 MIC-SEC ADDED |
| 029B | 3F | 0 | 523 | | EX | | UPDATE LONG TIMER |
| 029C | 92 | 0292 | 524 | | T | DELY3-2 | SET UP SHORT DELAY |
| | | | 525 | | | | |
| | | | 526 | ************************************************ | | | |
| | | | 527 | ********** MAIN PROGRAM POWER-UP START *********** | | | |
| | | | 528 | ************************************************ | | | |
| | | | 529 | | ORG | 0 | |
| 0000 | 81 | 0001 | 530 | | T | *+1 | POWER UP ENTRY |
| 0001 | 00CE | 0031 | 531 | | LBL | #31 | |
| 0003 | 7F | 0000 | 532 | | LDI | 0 | |
| 0004 | 2C | 3 | 533 | | EXD | 3 | BE SURE Z DONE FLAG CLR |
| 0005 | 77 | 0008 | 534 | | LDI | 8 | |
| 0006 | 1C41 | 0041 | 535 | | IOL | SOS | DISCRETE I/O>LOW |
| 0008 | 17 | | 536 | | INCB | | |
| 0009 | 85 | 0005 | 537 | | T | *-4 | LOOP TO INIT ALL 15 I/O |
| 000A | 77 | 0008 | 538 | | LDI | 8 | |
| 000B | 1C40 | 0040 | 539 | | IOL | SES | ENABLE ALL DISCRETE OUTPUTS |
| 000D | 5392 | 0392 | 540 | | TL | X10CLR | |
| 000F | 1CF6 | 00F6 | 541 | KBERR | IOL | KER | RESET KEYBOARD |
| 0011 | 00E7 | 0018 | 542 | RESET | LBL | #18 | |
| 0013 | D7 | 0007 | 543 | | TM | >CLEAR | CLR VERIFY TEST FLAG |
| 0014 | CA | 00CA | 544 | | LB | >33 | |
| 0015 | 7F | 0000 | 545 | | LDI | 0 | |
| 0016 | 3D | 2 | 546 | | EX | 2 | ;CLR AUTO CLR FLAG |
| 0017 | 7F | 0000 | 547 | | LDI | 0 | |
| 0018 | 2F | 0 | 548 | | EXD | | CLR FACTOR |
| 0019 | 7F | 0000 | 549 | | LDI | 0 | |
| 001A | 3F | 0 | 550 | | EX | | CLR NET FLAG |

PPS ASSEMBLY LISTING

| ADDR | CODE | ARG  | STNO | | STMT | | |
|------|------|------|------|------|------|------|------|
| 001B | 08   | 00D8 | 551  |      | TM   | >CLRT | CLR TARE |
| 001C | E5   | 00E5 | 552  |      | TM   | >SETRC | SET RECOMPUTE |
| 001D | 09   | 0009 | 553  |      | TM   | >CLRPR | CLR PRICE, TOTAL PRICE |
| 001E | 0090 | 006F | 554  | RDSWS | LBL | #6F | |
| 0020 | 7F   | 0000 | 555  |      | LDI  | 0    | |
| 0021 | 3F   | 0    | 556  |      | EX   |      | BE SURE RAM REG 6F CLR |
| 0022 | C3   | 00CB | 557  |      | LB   | >4B  | |
| 0023 | 27   |      | 558  |      | DIA  |      | RD X10,Z KEY,BY CNT,PRE-PAK |
| 0024 | 2B   | 4    | 559  |      | EXD  | 4    | STORE |
| 0025 | 1F   |      | 560  |      | DECB |      | |
| 0026 | 22   |      | 561  |      | SF1  |      | SET FLG1 FOR 1ST SWITCH BANK |
| 0027 | 7B   | 0004 | 562  |      | LDI  | 4    | WANT RAM REG 4 FOR 1ST BANK |
| 0028 | 1B   |      | 563  | RDSWA | LXA |      | RAM REG>X |
| 0029 | 7F   | 0000 | 564  |      | LDI  | 0    | |
| 002A | 1C41 | 0041 | 565  |      | IOL  | SOS  | ENB BANK,SET I/O 6:1ST,7:2ND |
| 002C | C0   | 00C0 | 566  |      | LB   | >00  | |
| 002D | 77   | 0008 | 567  | RSLOOP | LDI | 8 | |
| 002E | 1C41 | 0041 | 568  |      | IOL  | SOS  | RD SWITCH,0>A:ON,8>A:OFF |
| 0030 | 1B   |      | 569  |      | XBMX |      | RAM REG>BM,0>X |
| 0031 | 1E   |      | 570  |      | SKZ  |      | SKIP IF SW ON |
| 0032 | 7F   | 0000 | 571  |      | LDI  | 0    | SW OFF |
| 0033 | 77   | 0008 | 572  |      | LDI  | 8    | SW ON |
| 0034 | 3F   | 0    | 573  |      | EX   |      | 8>MEM:ON,0>MEM:OFF |
| 0035 | 17   |      | 574  |      | INCB |      | INC BL |
| 0036 | 1B   |      | 575  |      | XBMX |      | 0>BM,RAM REG>X |
| 0037 | 46   | 0006 | 576  |      | SKBI | 6    | SKIP IF BL=6 |
| 0038 | AD   | 002D | 577  |      | T    | RSLOOP | LOOP |
| 0039 | 16   |      | 578  |      | SKF1 |      | SKIP ON FLG1,1ST BANK READ |
| 003A | 17   |      | 579  |      | INCB |      | 2ND BANK READ,WANT I/O 7 |
| 003B | 77   | 0008 | 580  |      | LDI  | 8    | |
| 003C | 1C41 | 0041 | 581  |      | IOL  | SOS  | DIS BANK,CLR I/O 6:1ST,7:2ND |
| 003E | 5040 | 0040 | 582  |      | TL   | #040 | |
|      |      |      | 583  |      |      |      | |
|      |      |      | 584  |      | ORG  | 040  | |
| 0040 | 16   |      | 585  |      | SKF1 |      | SKIP IF 1ST BANK READ |
| 0041 | 87   | 0047 | 586  |      | T    | CKTOG> | 2ND BANK READ,DONE |
| 0042 | 17   |      | 587  |      | INCB |      | START 2ND BANK,WANT I/O 7 |
| 0043 | 26   |      | 588  |      | RF1  |      | CLR FLG1 FOR 2ND SWITCH BANK |
| 0044 | 7A   | 0005 | 589  |      | LDI  | 5    | WANT RAM REG 5 FOR 2ND BANK |
| 0045 | 5028 | 0028 | 590  |      | TL   | RDSWA | LOOP |
| 0047 | 5800 | 0800 | 591  | CKTOG> | TL | CKTOGL | GO UPDATE TOGGLE FLAG |
| 0049 | 60   | 000F | 592  | CKRST1 | ADI | 15 | DEC DIG TMR,SKIP WAS NOT 0 |
| 004A | 9D   | 005D | 593  |      | T    | RDWGT | NO C,TIMER WAS 0,SKIP CHECK |
| 004B | 3F   | 0    | 594  |      | EX   |      | UPDATE DIGIT TIMER |
| 004C | 00BD | 0042 | 595  |      | LBL  | #42  | |
| 004E | 77   | 0008 | 596  |      | LDI  | 8    | 8>A TO SELECTIVELY COM 8 BIT |
| 004F | 0C   |      | 597  |      | EOR  |      | EX-OR WITH TARE MAND ENB |
| 0050 | C2   | 00C2 | 598  |      | LB   | >02  | |
| 0051 | 0F   |      | 599  |      | OR   |      | ,OR,WITH T DONE,A=0:NOT DONE |
| 0052 | 17   |      | 600  |      | INCB |      | |
| 0053 | 0F   |      | 601  |      | OR   |      | NO RESET IF MAN T FLAG SET |
| 0054 | 17   |      | 602  |      | INCB |      | |
| 0055 | 0F   |      | 603  |      | OR   |      | ,OR,WITH DIG TIM,A=0:JUST 0 |
| 0056 | 1E   |      | 604  |      | SKZ  |      | SKIP IF ALL TRUE TO RESET |

```
605       ********************************************
606       * SKIP IF (TARE MANDATORY).AND.(NO TARE DONE).AND.
607       *         (NO MANUAL TARE FLAG).AND.(TIMER JUST 0)
608       ********************************************
```

| 0057 | 9D   | 005D | 609  |      | T    | RDWGT | A.NE.0,NO RESET |
| 0058 | E4   | 00E4 | 610  |      | TM   | >MODE | CK FOR BY COUNT MODE |
| 0059 | 9B   | 005B | 611  |      | T    | *+2  | NOT BY COUNT,RESET OK |
| 005A | 9D   | 005D | 612  |      | T    | RDWGT | BY COUNT,SKIP RESET |
| 005B | 5011 | 0011 | 613  |      | TL   | RESET | A.EQ.0,RESET SCALE |
| 005D | DC   | 00DC | 614  | RDWGT | TM  | >FCPTY | DETERMINE SCALE CAPACITY |
| 005E | C4   | 00C4 | 615  |      | LB   | >09  | |
| 005F | 15   |      | 616  |      | SKC  |      | SKIP NOT 6KG |
| 0060 | A4   | 0064 | 617  |      | T    | *+4  | 6KG |
| 0061 | 16   |      | 618  |      | SKF1 |      | SKIP NOT 15KG |
| 0062 | 7E   | 0001 | 619  |      | LDI  | 1    | 15KG |

PPS ASSEMBLY LISTING

| ADDR | CODE | ARG | STNO | | STMT | | |
|------|------|-----|------|--|------|--|--|
| 0063 | 77 | 0008 | 620 | | LDI | 8 | 30LB |
| 0064 | 7C | 0003 | 621 | | LDI | 3 | 6KG |
| 0065 | 3F | 0 | 622 | | EX | | ENTER T1 DELAY MID TIMER |
| 0066 | 17 | | 623 | | INCB | | |
| 0067 | 15 | | 624 | | SKC | | SKIP NOT 6KG |
| 0068 | 70 | 000F | 625 | | LDI | 15 | 6KG |
| 0069 | 79 | 0006 | 626 | | LDI | 6 | 15KG OR 30LB |
| 006A | 3F | 0 | 627 | | EX | | ENTER T1 DELAY LONG TIMER |
| 006B | 77 | 0008 | 628 | | LDI | 8 | |
| 006C | 1B | | 629 | | LXA | | T1 CONTROL BIT>X |
| 006D | 7F | 0000 | 630 | | LDI | 0 | |
| 006E | 1D | | 631 | | DOA | | START T1 INTEGRATION |
| 006F | 15 | | 632 | | SKC | | SKIP NOT 6KG |
| 0070 | B4 | 0074 | 633 | | T | *+4 | 6KG |
| 0071 | 16 | | 634 | | SKF1 | | SKIP NOT 15KG |
| 0072 | 7A | 0005 | 635 | | LDI | 5 | 15KG,TOTAL DELAY 95,950 MS |
| 0073 | 73 | 000C | 636 | | LDI | 12 | 30LB,TOTAL DELAY 105,770 MS |
| 0074 | 75 | 000A | 637 | | LDI | 10 | 6KG,TOTAL DELAY 239,805 MS |
| 0075 | E0 | 00E0 | 638 | | TM | >DELAY | PERFORM T1 DELAY |
| 0076 | 7F | 0000 | 639 | | LDI | 0 | |
| 0077 | 6F | | 640 | | CYS | | |
| 0078 | 7F | 0000 | 641 | | LDI | 0 | |
| 0079 | 6F | | 642 | | CYS | | |
| 007A | 7F | 0000 | 643 | | LDI | 0 | |
| 007B | 6F | | 644 | | CYS | | |
| 007C | 16 | | 645 | | SKF1 | | SKIP NOT 15KG |
| 007D | 17 | | 646 | | INCB | | 15KG,WANT EXTRA 15 MIC-SEC |
| 007E | 5080 | 0080 | 647 | | TL | #080 | |
| | | | 648 | | | | |
| | | | 649 | | ORG | 080 | |
| 0080 | 1F | | 650 | | DECB | | |
| 0081 | 48 | 0008 | 651 | | SKBI | 8 | |
| 0082 | 80 | 0080 | 652 | | T | *-2 | |
| 0083 | 7F | 0000 | 653 | | LDI | 0 | |
| 0084 | 3F | 0 | 654 | | EX | | FORM DUMMY MEM 0 FOR ADDS |
| 0085 | 77 | 0008 | 655 | | LDI | 8 | |
| 0086 | 1C41 | 0041 | 656 | | IOL | SOS | INPUT COIN,A>8:TOO MINUS |
| 0088 | 67 | 0008 | 657 | | ADI | 8 | SKIP IF WGT TOO MINUS |
| 0089 | 8C | 008C | 658 | | T | RDWGT1 | NO COIN,NOT TOO MINUS |
| 008A | 53C9 | 03C9 | 659 | | TL | BLNKWT | TOO MINUS |
| 008C | 73 | 0004 | 660 | RDWGT1 | LDI | 4 | |
| 008D | 1B | | 661 | | LXA | | T2 CONTROL BIT>X |
| 008E | 7F | 0000 | 662 | | LDI | 0 | |
| 008F | 1D | | 663 | | DOA | | STOP T1,START T2 INTEGRATION |
| 0090 | 20 | | 664 | T2LOOP | SC | | START 65 MIC-SEC T2 LOOP |
| 0091 | 77 | 0008 | 665 | | LDI | 8 | |
| 0092 | 6F | | 666 | | CYS | | LD LOW DIGIT COUNTER |
| 0093 | 0A | | 667 | | ADC | | CNTR+0+C>A,C |
| 0094 | 6F | | 668 | | CYS | | STORE LOW,LD MID DIG COUNTER |
| 0095 | 0A | | 669 | | ADC | | CNTR+0+C>A,C |
| 0096 | 6F | | 670 | | CYS | | STORE MID,LD HI DIG COUNTER |
| 0097 | 0A | | 671 | | ADC | | CNTR+0+C>A,C |
| 0098 | 6F | | 672 | | CYS | | STORE HIGH DIGIT COUNTER,0>A |
| 0099 | 1C41 | 0041 | 673 | | IOL | SOS | INPUT A/D CMPRTR,8>A IF LOW |
| 009B | 67 | 0008 | 674 | | ADI | 8 | SKIP IF COMPARATOR LOW |
| 009C | 90 | 0090 | 675 | | T | T2LOOP | NO COIN,CONTINUE COUNTING |
| 009D | 0083 | 007C | 676 | | LBL | #7C | |
| 009F | 17 | | 677 | | INCB | | INC BL,SKIP IF 0,WANT EXTRA |
| 00A0 | 9F | 009F | 678 | | T | *-1 | 65 MIC-SEC DELAY TO DOA INST |
| 00A1 | 7F | 0000 | 679 | | LDI | 0 | |
| 00A2 | 1B | | 680 | | LXA | | T2 OFF>X |
| 00A3 | 1D | | 681 | | DOA | | STOP T2 INTEGRATION |
| 00A4 | 7F | 0000 | 682 | | LDI | 0 | |
| 00A5 | 6F | | 683 | | CYS | | T2 DIGIT CNTRS>A,0>CNTRS |
| 00A6 | 3F | 0 | 684 | | EX | | LOW>ADDR 70,MID>71,HIGH >72 |
| 00A7 | 17 | | 685 | | INCB | | INC BL |
| 00A8 | 43 | 0003 | 686 | | SKBI | 3 | SKIP IF BL=3 |
| 00A9 | A4 | 00A4 | 687 | | T | *-5 | LOOP |
| 00AA | 00F7 | 0008 | 688 | | LBL | #08 | |

PPS ASSEMBLY LISTING

| ADDR | CODE | ARG | STNO | | STMT | | |
|------|------|-----|------|---|------|---|---|
| 00AC | 7D | 0002 | 689 | | LDI | 2 | |
| 00AD | 1B | | 690 | | LXA | | T3 CONTROL BIT>X |
| 00AE | 7F | 0000 | 691 | | LDI | 0 | |
| 00AF | 1D | | 692 | | DOA | | START T3 INTEGRATION |
| 00B0 | 77 | 0008 | 693 | T3LOOP | LDI | 8 | START 65 MIC-SEC T3 LOOP |
| 00B1 | 20 | | 694 | | SC | | |
| 00B2 | 6F | | 695 | | CYS | | LD LOW DIGIT COUNTER |
| 00B3 | 0A | | 696 | | ADC | | CNTR+0+C>A,C |
| 00B4 | 6F | | 697 | | CYS | | STORE LOW,LD MID DIG COUNTER |
| 00B5 | 0A | | 698 | | ADC | | CNTR+0+C>A,C |
| 00B6 | 6F | | 699 | | CYS | | STORE MID,LD HI DIG COUNTER |
| 00B7 | 0A | | 700 | | ADC | | CNTR+0+C>A,C (ALWAYS 0) |
| 00B8 | 6F | | 701 | | CYS | | STORE HIGH DIGIT COUNTER,0>A |
| 00B9 | 1C41 | 0041 | 702 | | IOL | SOS | INPUT A/D CMPRTR,8>A IF LOW |
| 00BB | 1E | | 703 | | SKZ | | SKIP IF COMPARATOR HIGH |
| 00BC | B0 | 00B0 | 704 | | T | T3LOOP | NO COIN,CONTINUE COUNTING |
| 00BD | 7E | 0001 | 705 | | LDI | 1 | |
| 00BE | 5290 | 029D | 706 | | TL | #29D | |
| | | | 707 | | | | |
| | | | 708 | | ORG | 29D | |
| 029D | 1B | | 709 | | LXA | | A/D RESET CONTROL BIT>X |
| 029E | 70 | 000F | 710 | | LDI | 15 | |
| 029F | 1D | | 711 | | DOA | | RESET A/D INTEGRATOR |
| 02A0 | 008C | 0073 | 712 | | LBL | #73 | |
| 02A2 | 6F | | 713 | | CYS | | LD LOW DIGIT T3 COUNTER |
| 02A3 | 3F | 0 | 714 | | EX | | LOW DIG CNTR>ADDR 73 |
| 02A4 | 17 | | 715 | | INCB | | |
| 02A5 | 6F | | 716 | | CYS | | LD MID DIGIT T3 COUNTER |
| 02A6 | 3F | 0 | 717 | | EX | | MID DIG CNTR>ADDR 74 |
| 02A7 | 0086 | 0079 | 718 | | LBL | #79 | |
| 02A9 | 07 | 00D7 | 719 | | TM | >CLEAR | CLR TEMP |
| 02AA | 06 | 00D6 | 720 | | TM | >ARICL | CLR ARI |
| 02AB | 008D | 0072 | 721 | T2CNVT | LBL | #72 | |
| 02AD | 37 | 0 | 722 | | LD | | LD HIGH DIGIT T2 COUNTER |
| 02AE | C7 | 00C7 | 723 | | LB | >1A | |
| 02AF | 3F | 0 | 724 | | EX | | HI DIG T2 CNTR>ARI FOR MULT |
| 02B0 | 0083 | 007C | 725 | | LBL | #7C | LD TEMP WITH 256 |
| 02B2 | 7D | 0002 | 726 | | LDI | 2 | |
| 02B3 | 2F | 0 | 727 | | EXD | | |
| 02B4 | 7A | 0005 | 728 | | LDI | 5 | |
| 02B5 | 2F | 0 | 729 | | EXD | | |
| 02B6 | 79 | 0006 | 730 | | LDI | 6 | |
| 02B7 | 3F | 0 | 731 | | EX | | |
| 02B8 | 008A | 0075 | 732 | | LBL | #75 | |
| 02BA | D4 | 00D4 | 733 | | TM | >MULT | MULT HI DIG T2 CNTR BY 256 |
| 02BB | 7D | 0002 | 734 | | LDI | 2 | |
| 02BC | 52C0 | 02C0 | 735 | | TL | #2C0 | |
| | | | 736 | | | | |
| | | | 737 | | ORG | 2C0 | |
| 02C0 | 01 | 00D1 | 738 | | TM | >MOV5X | MOVE RESULT TO WGT |
| 02C1 | 2F | 0 | 739 | | EXD | | MOVE RES 6TH DIG(LSD) TO WGT |
| 02C2 | 7F | 0000 | 740 | | LDI | 0 | |
| 02C3 | 3F | 0 | 741 | | EX | | CLR WGT SIGN |
| 02C4 | CF | 00CF | 742 | | LB | >7A | |
| 02C5 | 07 | 00D7 | 743 | | TM | >CLEAR | CLR TEMP |
| 02C6 | 008E | 0071 | 744 | | LBL | #71 | |
| 02C8 | 37 | 0 | 745 | | LD | | LD MID DIGIT T2 COUNTER |
| 02C9 | C7 | 00C7 | 746 | | LB | >1A | |
| 02CA | 39 | 6 | 747 | | EX | 6 | MID DIG T2 CNTR>ARI FOR MULT |
| 02CB | 79 | 0006 | 748 | | LDI | 6 | LD TEMP WITH 16 |
| 02CC | 3F | 0 | 749 | | EX | | |
| 02CD | 17 | | 750 | | INCB | | |
| 02CE | 7E | 0001 | 751 | | LDI | 1 | |
| 02CF | 3F | 0 | 752 | | EX | | |
| 02D0 | 008A | 0075 | 753 | | LBL | #75 | |
| 02D2 | D4 | 00D4 | 754 | | TM | >MULT | MULT MID DIG T2 CNTR BY 16 |
| 02D3 | 7E | 0001 | 755 | | LDI | 1 | |
| 02D4 | 01 | 00D1 | 756 | | TM | >MOV5X | MOVE RESULT TO ARI |
| 02D5 | 2F | 0 | 757 | | EXD | | MOVE 6TH DIG(LSD) TO ARI |

PPS ASSEMBLY LISTING

| ADDR | CODE | ARG | STNO | | STMT | | |
|------|------|-----|------|---|------|---|---|
| 02D6 | 70 | 000F | 758 | | LDI | 15 | |
| 02D7 | 3F | 0 | 759 | | EX | | MAKE MINUS SO SUBT WILL ADD |
| 02D8 | C8 | 00C8 | 760 | | LB | >21 | |
| 02D9 | D3 | 00D3 | 761 | | TM | >SUBT | 16XMID CNTR + 256XHIGH CNTR |
| 02DA | 7D | 0002 | 762 | | LDI | 2 | |
| 02DB | D0 | 00D0 | 763 | | TM | >MOVX | MOVE RESULT TO WGT |
| 02DC | C7 | 00C7 | 764 | | LB | >1A | |
| 02DD | D7 | 00D7 | 765 | | TM | >CLEAR | CLR ARI EXCEPT SIGN |
| 02DE | 008F | 0070 | 766 | | LBL | #70 | |
| 02E0 | 37 | 0 | 767 | | LD | | LD LOW DIGIT T2 COUNTER |
| 02E1 | C7 | 00C7 | 768 | | LB | >1A | |
| 02E2 | 3F | 0 | 769 | | EX | | LOW DIGIT CNTR>ARI |
| 02E3 | 24 | | 770 | | RC | | |
| 02E4 | DE | 00DE | 771 | | TM | >ADDC | TRANSFORM HEX TO DECIMAL |
| 02E5 | C8 | 00C8 | 772 | | LB | >21 | |
| 02E6 | D3 | 00D3 | 773 | | TM | >SUBT | LOW + 16XMID + 256XHIGH |
| 02E7 | 7D | 0002 | 774 | | LDI | 2 | |
| 02E8 | D0 | 00D0 | 775 | | TM | >MOVX | MOVE RESULT TO WGT |
| 02E9 | D6 | 00D6 | 776 | | TM | >ARICL | CLR ARI |
| 02EA | 0088 | 0074 | 777 | T3CNVT | LBL | #74 | |
| 02EC | 37 | 0 | 778 | | LD | | LD MID DIGIT T3 COUNTER |
| 02ED | C7 | 00C7 | 779 | | LB | >1A | |
| 02EE | 61 | 000E | 780 | | ADI | 14 | |
| 02EF | B0 | 02F0 | 781 | | T | *+1 | |
| 02F0 | 3F | 0 | 782 | | EX | | MID DIG T3 CNTR>ARI |
| 02F1 | 008A | 0075 | 783 | | LBL | #75 | |
| 02F3 | D4 | 00D4 | 784 | | TM | >MULT | MULT MID DIG T3 CNTR BY 16 |
| 02F4 | 78 | 0007 | 785 | | LDI | 7 | |
| 02F5 | D1 | 00D1 | 786 | | TM | >MOV5X | SAVE RESULT IN TEMP |
| 02F6 | 3F | 0 | 787 | | EX | | MOVE 6TH DIG(LSD) TO TEMP |
| 02F7 | D6 | 00D6 | 788 | | TM | >ARICL | CLR ARI |
| 02F8 | 008C | 0073 | 789 | | LBL | #73 | |
| 02FA | 37 | 0 | 790 | | LD | | LD LOW DIGIT T3 COUNTER |
| 02FB | C7 | 00C7 | 791 | | LB | >1A | |
| 02FC | 3F | 0 | 792 | | EX | | LOW DIG T3 CNTR>ARI |
| 02FD | 24 | | 793 | | RC | | |
| 02FE | 5300 | 0300 | 794 | | TL | #300 | |
| | | | 795 | | | | |
| | | | 796 | | ORG | 300 | |
| 0300 | DE | 00DE | 797 | | TM | >ADDC | TRANSFORM HEX TO DECIMAL |
| 0301 | 0086 | 0079 | 798 | | LBL | #79 | ADDR TEMP SIGN |
| 0303 | 70 | 000F | 799 | | LDI | 15 | |
| 0304 | 29 | 6 | 800 | | EXD | 6 | MAKE MINUS SO SUBT WILL ADD |
| 0305 | 1F | | 801 | | DECB | | |
| 0306 | D3 | 00D3 | 802 | | TM | >SUBT | 16XMID T3 CNTR + LOW T3 CNTR |
| 0307 | 78 | 0007 | 803 | | LDI | 7 | |
| 0308 | D0 | 00D0 | 804 | | TM | >MOVX | SAVE IN TEMP |
| 0309 | C7 | 00C7 | 805 | | LB | >1A | LD ARI WITH 32 |
| 030A | 7D | 0002 | 806 | | LDI | 2 | |
| 030B | 3F | 0 | 807 | | EX | | |
| 030C | 17 | | 808 | | INCB | | |
| 030D | 7C | 0003 | 809 | | LDI | 3 | |
| 030E | 3F | 0 | 810 | | EX | | |
| 030F | 00DA | 0025 | 811 | | LBL | #25 | |
| 0311 | D4 | 00D4 | 812 | | TM | >MULT | MULT T2 COUNTS IN WGT BY 32 |
| 0312 | 7D | 0002 | 813 | | LDI | 2 | |
| 0313 | D1 | 00D1 | 814 | | TM | >MOV5X | MOVE RESULT TO WGT |
| 0314 | 3F | 0 | 815 | | EX | | MOVE 6TH DIG(LSD) TO WGT |
| 0315 | 00D8 | 0027 | 816 | | LBL | #27 | |
| 0317 | D3 | 00D3 | 817 | | TM | >SUBT | T2 CNTS(WGT) - T3 CNTS(TEMP) |
| 0318 | 7D | 0002 | 818 | | LDI | 2 | |
| 0319 | D0 | 00D0 | 819 | | TM | >MOVX | MOVE FINAL RAW COUNTS TO WGT |
| 031A | D6 | 00D6 | 820 | PROCWT | TM | >ARICL | CLR ARI |
| 031B | 00DC | 0023 | 821 | | LBL | #23 | |
| 031D | D3 | 00D3 | 822 | | TM | >SUBT | SUB FILTERED WGT FROM WGT |
| 031E | 00E6 | 0019 | 823 | | LBL | #19 | |
| 0320 | 3F | 0 | 824 | | EX | | RESULT SIGN>ARI SIGN |
| 0321 | 00F9 | 0006 | 825 | | LBL | #06 | |

PPS ASSEMBLY LISTING

| ADDR | CODE | ARG | STNO | | STMT | | |
|---|---|---|---|---|---|---|---|
| 0323 | 7A | 0005 | 826 | | LDI | 5 | |
| 0324 | D5 | 0005 | 827 | | TM | >MAGCK | CK FOR RESULT.LE.5 |
| 0325 | 70 | 000F | 828 | | LDI | 15 | ,LE,5 RTN,15>A:DEC MOTN FLG |
| 0326 | 7D | 0002 | 829 | | LDI | 2 | ,GT,5 RTN,2>A:SET MOTN FLG |
| 0327 | C0 | 00C0 | 830 | | LB | >00 | |
| 0328 | 15 | | 831 | | SKC | | SKIP,GT,5, MOTION |
| 0329 | AB | 032B | 832 | | T | *+2 | NO MOTION |
| 032A | AD | 032D | 833 | | T | *+3 | MOTION |
| 032B | 09 | | 834 | | ADSK | | DEC MOTN FLG,SKIP ON C |
| 032C | B5 | 0335 | 835 | | T | INIFLT | FLG WAS 0,EXEC INITIAL FLTR |
| 032D | 3F | 0 | 836 | | EX | | UPDATE OR SET MOTN FLG |
| 032E | 00EF | 0010 | 837 | | LBL | #10 | |
| 0330 | 7C | 0003 | 838 | | LDI | 3 | |
| 0331 | 3F | 0 | 839 | | EX | | 3>OUT FLTR CNTR:UPDT OUT WGT |
| 0332 | E5 | 00E5 | 840 | | TM | >SETRC | SET RECOMPUTE |
| 0333 | 5362 | 0362 | 841 | | TL | UDFWT | SKIP INITIAL FILTER |
| 0335 | 00D5 | 002A | 842 | INIFLT | LBL | #2A | |
| 0337 | 37 | 0 | 843 | | LD | | LD WGT LSD |
| 0338 | 00CA | 0035 | 844 | | LBL | #35 | |
| 033A | 1B | | 845 | | LXA | | WGT LSD>X |
| 033B | 2F | 0 | 846 | | EXD | | WGT LSD>1 PREV LSD,1 PREV>A |
| 033C | 3F | 0 | 847 | | EX | | 1 PREV>2 PREV LSD,2 PREV>A |
| 033D | 0C | | 848 | | EOR | | EX-OR 2 PREV WITH 1 PREV LSD |
| 033E | 5340 | 0340 | 849 | | TL | #340 | |
| | | | 850 | | | | |
| | | | 851 | | ORG | 340 | |
| 0340 | 1E | | 852 | | SKZ | | SKIP IF EQUAL |
| 0341 | 88 | 0348 | 853 | | T | FLTWGT | NOT EQ,FILTER WGT |
| 0342 | 37 | 0 | 854 | | LD | | LD 1 PREV LSD |
| 0343 | 17 | | 855 | | INCB | | |
| 0344 | 0C | | 856 | | EOR | | EX-OR 1 PREV WITH CURRENT |
| 0345 | 1E | | 857 | | SKZ | | SKIP IF EQUAL |
| 0346 | 88 | 0348 | 858 | | T | FLTWGT | NOT EQ,FILTER WGT |
| 0347 | A2 | 0362 | 859 | | T | UDFWT | ALL EQ,MOVE WGT TO FLTRD WGT |
| 0348 | 7F | 0000 | 860 | FLTWGT | LDI | 0 | |
| 0349 | 13 | | 861 | | LXA | | 0>X |
| 034A | 00F5 | 000A | 862 | | LBL | #0A | |
| 034C | 36 | 1 | 863 | | LD | 1 | LD WGT-FLTRD WGT LSD |
| 034D | 3F | 0 | 864 | LSD/2 | EX | | ARI LSD-2>ARI LSD |
| 034E | 71 | 000E | 865 | | LDI | 14 | |
| 034F | 09 | | 866 | | ADSK | | SUB 2 FROM ARI LSD,SKIP ON C |
| 0350 | 95 | 0355 | 867 | | T | FLTWT1 | ARI LSD WAS 0 OR 1,DONE |
| 0351 | 1A | | 868 | | XAX | | PARTIAL LSD/2>A,LSD-2>X |
| 0352 | 6E | 0001 | 869 | | ADI | 1 | INC PARTIAL LSD/2 |
| 0353 | 1A | | 870 | | XAX | | LSD-2>A,PARTIAL LSD/2>X |
| 0354 | 8D | 034D | 871 | | T | LSD/2 | REPEAT UNTIL LSD/2 FORMED |
| 0355 | 12 | | 872 | FLTWT1 | LAX | | LD LSD/2 |
| 0356 | 1E | | 873 | | SKZ | | SKIP IF 0 |
| 0357 | 9C | 035C | 874 | | T | *+5 | |
| 0358 | 00C5 | 003A | 875 | | LBL | #3A | |
| 035A | 7D | 0002 | 876 | | LDI | 2 | |
| 035B | A5 | 0365 | 877 | | T | UDFWT+3 | |
| 035C | 6E | 0001 | 878 | | ADI | 1 | FORM LSD/2+1 |
| 035D | 3F | 0 | 879 | | EX | | LSD/2+1>ARI LSD |
| 035E | C8 | 00C8 | 880 | | LB | >21 | |
| 035F | D3 | 00D3 | 881 | | TM | >SUBT | MODIFY WGT BY LSD/2+1 |
| 0360 | 7D | 0002 | 882 | | LDI | 2 | |
| 0361 | D0 | 0000 | 883 | | TM | >MOVX | UPDATE WGT |
| 0362 | 00D6 | 0029 | 884 | UDFWT | LBL | #29 | |
| 0364 | 7C | 0003 | 885 | | LDI | 3 | |
| 0365 | D0 | 0000 | 886 | | TM | >MOVX | MOVE WGT TO FILTERED WGT |
| 0366 | 58D4 | 08D4 | 887 | | TL | SETDI | GO SET DIGITAL INITIAL |
| 0368 | C8 | 00C8 | 888 | SUBDI | LB | >21 | |
| 0369 | D3 | 00D3 | 889 | | TM | >SUBT | SUB DIG INIT FROM WGT |
| 036A | 7D | 0002 | 890 | | LDI | 2 | |
| 036B | D0 | 0000 | 891 | | TM | >MOVX | UPDATE WGT |
| 036C | CB | 00CB | 892 | | LB | >48 | |
| 036D | 5380 | 0380 | 893 | | TL | #380 | |

PPS ASSEMBLY LISTING

| ADDR | CODE | ARG | STNO | | STMT | | |
|---|---|---|---|---|---|---|---|
| | | | 894 | | ************************************************* | | |
| | | | 895 | * LDPPUK SUBROUTINE - LOADS ENTRY ACCUMULATOR | | | |
| | | | 896 | * TO 2 PRE-PAK,UK 1/2 TOTAL PRICE REGISTERS | | | |
| 036F | 00DA | 0025 | 897 | LDPPUK | LBL | #25 | |
| 0371 | 3F | 0 | 898 | | EX | | A>1ST REGISTER |
| 0372 | 37 | 0 | 899 | | LD | | RE-LD A |
| 0373 | 17 | | 900 | | INCB | | |
| 0374 | 3F | 0 | 901 | | EX | | A>2ND REGISTER |
| 0375 | 05 | | 902 | | RTN | | |
| | | | 903 | | ************************************************* | | |
| | | | 904 | | | | |
| | | | 905 | | ORG | 380 | |
| 0380 | 77 | 0008 | 906 | | LDI | 8 | |
| 0381 | 0D | | 907 | | AND | | CK FOR X10 EXPD MODE |
| 0382 | 67 | 0008 | 908 | | ADI | 8 | SKIP IF X10 EXPAND |
| 0383 | 97 | 0397 | 909 | | T | ZCAPT | |
| 0384 | 00D9 | 0026 | 910 | X10EXP | LBL | #26 | |
| 0386 | 7D | 0002 | 911 | | LDI | 2 | |
| 0387 | D5 | 00D5 | 912 | | TM | >MAGCK | CK FOR WGT,LE,2 CNTS |
| 0388 | 77 | 0008 | 913 | | LDI | 8 | ,LE,2 RTN,Z LAMP ON |
| 0389 | 7F | 0000 | 914 | | LDI | 0 | ,GT,2 RTN,Z LAMP OFF |
| 038A | C8 | 00C8 | 915 | | LB | >21 | |
| 038B | 3F | 0 | 916 | | EX | | UPDATE Z LAMP |
| 038C | 25 | | 917 | | RF2 | | NOTE X10 EXP |
| 038D | DF | 00DF | 918 | | TM | >UDOWT | |
| 038E | DA | 00DA | 919 | | TM | >BLANK | BLANK PRICE |
| 038F | 009B | 0064 | 920 | | LBL | #64 | |
| 0391 | DA | 00DA | 921 | | TM | >BLANK | BLANK TOTAL PRICE |
| 0392 | D8 | 00D8 | 922 | X10CLR | TM | >CLRT | CLR TARE |
| 0393 | 0086 | 0049 | 923 | | LBL | #49 | |
| 0395 | D7 | 00D7 | 924 | | TM | >CLEAR | CLR AUTO ZERO |
| 0396 | E7 | 00E7 | 925 | | TM | >OUTP> | GO TO OUTPUT |
| 0397 | 7B | 0004 | 926 | ZCAPT | LDI | 4 | |
| 0398 | 0D | | 927 | | AND | | CK FOR Z KEY |
| 0399 | 1E | | 928 | | SKZ | | SKIP IF TRUE |
| 039A | 81 | 03B1 | 929 | | T | CZTIM | FALSE,CLR Z KEY TIMER |
| 039B | C5 | 00C5 | 930 | | LB | >12 | |
| 039C | 37 | 0 | 931 | | LD | | LD NET FLAG |
| 039D | 1E | | 932 | | SKZ | | SKIP NOT NET |
| 039E | 81 | 03B1 | 933 | | T | CZTIM | NET,NO Z KEY ALLOWED |
| 039F | C0 | 00C0 | 934 | | LB | >00 | |
| 03A0 | 34 | 3 | 935 | | LD | 3 | LD MOTION FLAG |
| 03A1 | 1E | | 936 | | SKZ | | SKIP IF NO MOTION |
| 03A2 | 81 | 03B1 | 937 | | T | CZTIM | MOTION |
| 03A3 | 7D | 0002 | 938 | | LDI | 2 | |
| 03A4 | 0B | | 939 | | AD | | INC Z KEY TIMER |
| 03A5 | 3F | 0 | 940 | | EX | | UPDATE |
| 03A6 | 15 | | 941 | | SKC | | SKIP IF TIMER DONE |
| 03A7 | B5 | 03B5 | 942 | | T | SUBAZ | STILL COUNTING |
| 03A8 | 00DB | 0024 | 943 | | LBL | #24 | TIMER DONE |
| 03AA | 022F | 022F | 944 | | TML | MAXAZ | CK FOR WGT,LT,400 CNTS |
| 03AC | B5 | 03B5 | 945 | | T | SUBAZ | ,GE,400 CNT RTN |
| 03AD | 00CE | 0031 | 946 | | LBL | #31 | ,LT,400 CNT RTN |
| 03AF | 70 | 000F | 947 | | LDI | 15 | |
| 03B0 | 3F | 0 | 948 | | EX | | SET Z DONE FLAG |
| 03B1 | 00CF | 0030 | 949 | CZTIM | LBL | #30 | |
| 03B3 | 7F | 0000 | 950 | | LDI | 0 | |
| 03B4 | 3F | 0 | 951 | | EX | | CLR Z KEY TIMER |
| 03B5 | 00DB | 0024 | 952 | SUBAZ | LBL | #24 | |
| 03B7 | D3 | 00D3 | 953 | | TM | >SUBT | SUB AUTO-ZERO FROM WGT |
| 03B8 | 7D | 0002 | 954 | | LDI | 2 | |
| 03B9 | D0 | 00D0 | 955 | | TM | >MOVX | UPDATE WGT |
| 03BA | D6 | 0006 | 956 | | TM | >ARICL | |
| 03BB | 00E4 | 001B | 957 | | LBL | #1B | SET ARI=30050 |
| 03BD | 7A | 0005 | 958 | | LDI | 5 | |
| 03BE | 53C0 | 03C0 | 959 | | TL | #3C0 | |
| | | | 960 | | | | |
| | | | 961 | | ORG | 3C0 | |
| 03C0 | 3F | 0 | 962 | | EX | | |

PPS ASSEMBLY LISTING

| ADDR | CODE | ARG | STNU | | STMT | | |
|---|---|---|---|---|---|---|---|
| 03C1 | 00E1 | 001E | 963 | | LBL | #1E | |
| 03C3 | 7C | 0003 | 964 | | LDI | 3 | |
| 03C4 | 3F | 0 | 965 | | EX | | |
| 03C5 | C8 | 00C8 | 966 | | LB | >21 | |
| 03C6 | D3 | 00D3 | 967 | | TM | >SUBT | CK FOR OVERCAP |
| 03C7 | 1E | | 968 | | SKZ | | SKIP IF OVERCAP |
| 03C8 | 8D | 03CD | 969 | | T | CKGAZC | NOT OVERCAP |
| 03C9 | CE | 00CE | 970 | BLNKWT | LB | >6E | |
| 03CA | DA | 00DA | 971 | | TM | >BLANK | BLANK OUT WGT |
| 03CB | 55A1 | 05A1 | 972 | | TL | TPBLK | BLANK TOTAL PRICE |
| 03CD | 00D9 | 0026 | 973 | CKGAZC | LBL | #26 | CK GROSS AUTO-ZERO CRCN |
| 03CF | 7B | 0004 | 974 | | LDI | 4 | |
| 03D0 | D5 | 00D5 | 975 | | TM | >MAGCK | CK FOR WGT,LE,4 CNTS |
| 03D1 | 0E | | 976 | | COMP | | ,LE,4 RTN,A>0 IF WGT 0 |
| 03D2 | C1 | 00C1 | 977 | | LB | >01 | ,GT,4 RTN,ADDR Z GRAD FLAG |
| 03D3 | 3F | 0 | 978 | | EX | | SAVE A IN Z GRAD FLAG,FLAG>A |
| 03D4 | 15 | | 979 | | SKC | | SKIP IF WGT,GT,4 CNTS |
| 03D5 | 70 | 000F | 980 | | LDI | 15 | 15>A TO SET Z GRAD FLAG |
| 03D6 | 7F | 0000 | 981 | | LDI | 0 | 0>A TO CLR Z GRAD FLAG |
| 03D7 | 3F | 0 | 982 | | EX | | UPDT Z GRAD FLAG,MAGCK RTN>A |
| 03D8 | 60 | 000F | 983 | | ADI | 15 | SKIP IF WGT NOT 0 |
| 03D9 | 9E | 03DE | 984 | | T | MFCTR | WGT 0,SKIP CORRECTION |
| 03DA | 22 | | 985 | | SF1 | | NOTE GROSS CORRECTION |
| 03DB | 15 | | 986 | | SKC | | SKIP IF WGT,GT,4 CNTS |
| 03DC | E6 | 00E6 | 987 | | TM | >CRTAZ | ,LE,4 CNTS,DO GROSS A-Z CRCN |
| 03DD | 9E | 03DE | 988 | | T | *+1 | |
| 03DE | DC | 00DC | 989 | MFCTR | TM | >FCPTY | A=1:30LB,2:6KG,5:15KG |
| 03DF | 3F | 0 | 990 | | EX | | WRITE MULTIPLE TO ARI LSD |
| 03E0 | 00DA | 0025 | 991 | | LBL | #25 | |
| 03E2 | D4 | 00D4 | 992 | | TM | >MULT | MULT WGT BY MULTIPLE |
| 03E3 | 7D | 0002 | 993 | | LDI | 2 | |
| 03E4 | D1 | 00D1 | 994 | | TM | >MOV5X | UPDATE WGT 5 MSDS |
| 03E5 | 2B | 4 | 995 | | EXD | 4 | UPDATE WGT 6TH DIG(LSD) |
| 03E6 | 77 | 0008 | 996 | | LDI | 8 | 8>A |
| 03E7 | 0D | | 997 | | AND | | ,AND,WITH PRICE MSD |
| 03E8 | 1E | | 998 | | SKZ | | SKIP IF PRICE MSD,LT,8 |
| 03E9 | D9 | 0009 | 999 | | TM | >CLRPR | ,GE,8,INVALID PRICE |
| 03EA | 00CE | 0031 | 1000 | | LBL | #31 | |
| 03EC | 37 | 0 | 1001 | | LD | | LD Z DONE FLAG |
| 03ED | 6E | 0001 | 1002 | | ADI | 1 | SKIP IF Z DONE SINCE PWR UP |
| 03EE | 8B | 03FB | 1003 | | T | NOZDUN | NO Z DONE |
| 03EF | 00FC | 0003 | 1004 | | LBL | #03 | |
| 03F1 | 3F | 0 | 1005 | | EX | | MAN TARE FLAG>A,0>MAN T FLAG |
| 03F2 | 67 | 0008 | 1006 | | ADI | 8 | SKIP IF FLAG SET |
| 03F3 | BC | 03FC | 1007 | | T | STARE> | FLAG CLR |
| 03F4 | C0 | 00C0 | 1008 | | LB | >00 | |
| 03F5 | 37 | 0 | 1009 | | LD | | LD MOTION FLAG |
| 03F6 | 1E | | 1010 | | SKZ | | SKIP NO MOTION |
| 03F7 | BC | 03FC | 1011 | | T | STARE> | NO TARE ALLOWED IN MOTION |
| 03F8 | DC | 00DC | 1012 | | TM | >FCPTY | DETERMINE CAPACITY |
| 03F9 | 5400 | 0400 | 1013 | | TL | #400 | |
| 03FB | D9 | 00D9 | 1014 | NOZDUN | TM | >CLRPR | CLR PRICE,TOTAL PRICE |
| 03FC | 5422 | 0422 | 1015 | STARE> | TL | STARE | |
| | | | 1016 | | | | |
| | | | 1017 | | ORG | 400 | |
| 0400 | 00DD | 0022 | 1018 | | LBL | #22 | |
| 0402 | 16 | | 1019 | | SKF1 | | SKIP NOT 15KG |
| 0403 | 87 | 0407 | 1020 | | T | *+4 | 15KG |
| 0404 | 15 | | 1021 | | SKC | | SKIP NOT 6KG |
| 0405 | 7A | 0005 | 1022 | | LDI | 5 | 6KG,CK TARE,LT,6KG |
| 0406 | 7F | 0000 | 1023 | | LDI | 0 | 30LB,CK TARE,LT,10LB |
| 0407 | 7C | 0003 | 1024 | | LDI | 3 | 15KG,CK TARE,LT,4KG |
| 0408 | D5 | 00D5 | 1025 | | TM | >MAGCK | CK WGT MAGNITUDE |
| 0409 | 8B | 040B | 1026 | | T | *+2 | MAGNITUDE O,K, RTN |
| 040A | A2 | 0422 | 1027 | | T | STARE | MAGNITUDE TOO BIG RTN |
| 040B | C1 | 00C1 | 1028 | | LB | >01 | |
| 040C | 7E | 0001 | 1029 | | LDI | 1 | |
| 040D | 0B | | 1030 | | AD | | A>0,C>1 IF IN ZERO GRAD |
| 040E | C9 | 00C9 | 1031 | | LB | >29 | |

PPS ASSEMBLY LISTING

| ADDR | CODE | ARG | STNO | | STMT | | |
|---|---|---|---|---|---|---|---|
| 040F | 0D | | 1032 | | AND | | ,AND,WGT SIGN WITH 0 OR 1 |
| 0410 | 1E | | 1033 | | SKZ | | SKIP WGT PLUS,OR,ZERO GRAD |
| 0411 | A2 | 0422 | 1034 | | T | STARE | WGT MINUS,AND,NOT ZERO GRAD |
| 0412 | 17 | | 1035 | | INCB | | ADDR WGT |
| 0413 | 15 | | 1036 | | SKC | | SKIP IF IN ZERO GRAD |
| 0414 | 97 | 0417 | 1037 | | T | *+3 | NOT ZERO GRAD |
| 0415 | D6 | 00D6 | 1038 | | TM | >ARICL | CLR ARI TO GET 0 FIELD |
| 0416 | C7 | 00C7 | 1039 | | LB | >1A | CHANGE ADDR TO ARI |
| 0417 | 7A | 0005 | 1040 | | LDI | 5 | |
| 0418 | D0 | 00D0 | 1041 | | TM | >MOVX | MOVE WGT OR 0S TO TARE |
| 0419 | C5 | 00C5 | 1042 | | LB | >12 | |
| 041A | 15 | | 1043 | | SKC | | SKIP SETTING NET IF Z GRAD |
| 041B | 77 | 0008 | 1044 | | LDI | 8 | SET NET |
| 041C | 7F | 0000 | 1045 | | LDI | 0 | CLR NET |
| 041D | 3E | 1 | 1046 | | EX | 1 | UPDATE NET FLAG |
| 041E | 70 | 000F | 1047 | | LDI | 15 | |
| 041F | 3F | 0 | 1048 | | EX | | SET TARE DONE FLAG |
| 0420 | E5 | 00E5 | 1049 | | TM | >SETRC | SET RECOMPUTE |
| 0421 | D9 | 00D9 | 1050 | | TM | >CLRPR | CLR PRICE,TOTAL PRICE |
| 0422 | 00DA | 0025 | 1051 | STARE | LBL | #25 | |
| 0424 | D3 | 00D3 | 1052 | | TM | >SUBT | SUBT TARE FROM WGT |
| 0425 | 7D | 0002 | 1053 | | LDI | 2 | |
| 0426 | D0 | 00D0 | 1054 | | TM | >MOVX | UPDATE WGT |
| 0427 | 00D9 | 0026 | 1055 | CKNAZC | LBL | #26 | |
| 0429 | 7F | 0000 | 1056 | | LDI | 0 | |
| 042A | D5 | 00D5 | 1057 | | TM | >MAGCK | CK FOR WGT 0 |
| 042B | B0 | 0450 | 1058 | | T | CKACL> | WGT 0 RTN,SKIP CRRCTN |
| 042C | C5 | 00C5 | 1059 | | LB | >12 | |
| 042D | 37 | 0 | 1060 | | LD | | LD NET FLAG |
| 042E | 1E | | 1061 | | SKZ | | SKIP NOT NET |
| 042F | B2 | 0432 | 1062 | | T | *+3 | NET,CK A-Z CORRECTION |
| 0430 | 544E | 044E | 1063 | CKACL> | TL | CKACLR | NOT NET,SKIP A-Z CRRCTN |
| 0432 | DC | 00DC | 1064 | | TM | >FCPTY | CK NET AUTO ZERO CRRCTN |
| 0433 | 15 | | 1065 | | SKC | | SKIP NOT 6KG |
| 0434 | 76 | 0009 | 1066 | | LDI | 9 | |
| 0435 | 7A | 0005 | 1067 | | LDI | 5 | |
| 0436 | 3F | 0 | 1068 | | EX | | ARI LSD=9:6KG,5:15KG,30LB |
| 0437 | 17 | | 1069 | | INCB | | |
| 0438 | 16 | | 1070 | | SKF1 | | SKIP NOT 15KG |
| 0439 | 7D | 0002 | 1071 | | LDI | 2 | |
| 043A | 5440 | 0440 | 1072 | | TL | #440 | |
| | | | 1073 | | | | |
| | | | 1074 | | ORG | 440 | |
| 0440 | 3F | 0 | 1075 | | EX | | ARI=25:15KG,0>A |
| 0441 | C4 | 00C4 | 1076 | | LB | >09 | |
| 0442 | 3F | 0 | 1077 | | EX | | CLR RESULT SIGN |
| 0443 | C7 | 00C7 | 1078 | | LB | >1A | |
| 0444 | 7D | 0002 | 1079 | | LDI | 2 | |
| 0445 | 1B | | 1080 | | LXA | | |
| 0446 | E1 | 00E1 | 1081 | | TM | >SUBL | CK FOR WGT,LE,4 CNTS,A>0,GT, |
| 0447 | 26 | | 1082 | | RF1 | | NOTE NET CORRECTION |
| 0448 | 6E | 0001 | 1083 | | ADI | 1 | SKIP IF WGT,LE,4 CNTS |
| 0449 | 8E | 044E | 1084 | | T | CKACLR | ,GT,4 CNTS,SKIP CRRCTN |
| 044A | E6 | 00E6 | 1085 | | TM | >CRTAZ | ,LE,4,DO NET A-Z CRRCTN |
| 044B | C4 | 00C4 | 1086 | | LB | >09 | |
| 044C | 7A | 0005 | 1087 | | LDI | 5 | |
| 044D | D0 | 00D0 | 1088 | | TM | >MOVX | MOVE RESULT TO TARE |
| 044E | DC | 00DC | 1089 | CKACLR | TM | >FCPTY | A=1:30LB,2:6KG,5:15KG |
| 044F | 00E3 | 001C | 1090 | | LBL | #1C | |
| 0451 | 3F | 0 | 1091 | | EX | | A>ARI LSD+2 |
| 0452 | C8 | 00C8 | 1092 | | LB | >21 | |
| 0453 | D3 | 00D3 | 1093 | | TM | >SUBT | CK FOR 10 INC AUTO CLR WGT |
| 0454 | 1B | | 1094 | | LXA | | RESULT SIGN >X,0 IF,GE,10 G |
| 0455 | CA | 00CA | 1095 | | LB | >33 | |
| 0456 | 75 | 000A | 1096 | | LDI | 10 | 10>A |
| 0457 | 0B | | 1097 | | AD | | ADD AUTO CLR FLG,C>1 IF 6 |
| 0458 | 12 | | 1098 | | LAX | | RE-LD RESULT SIGN |
| 0459 | 6E | 0001 | 1099 | | ADI | 1 | SKIP IF WGT,LT,AUTO CLR WGT |
| 045A | AB | 046B | 1100 | | T | CKINC | ,GE,AUTO CLR WGT |

PPS ASSEMBLY LISTING

| ADDR | CODE | ARG | STNO | | STMT | | |
|---|---|---|---|---|---|---|---|
| 045B | 3F | 0 | 1101 | | EX | | CLR AUTO CLR FLAG |
| 045C | 15 | | 1102 | | SKC | | SKIP IF AUTO CLR FLAG,EQ,6 |
| 045D | B1 | 0471 | 1103 | | T | ZLAMP | ,LT,6 |
| 045E | CB | 00CB | 1104 | | LB | >4B | |
| 045F | 7C | 0003 | 1105 | | LDI | 3 | |
| 0460 | 0D | | 1106 | | AND | | CK FOR PRE-PAK OR BY CNT |
| 0461 | 62 | 000D | 1107 | | ADI | 13 | SKIP NOT PRE-PAK OR BY CNT |
| 0462 | B1 | 0471 | 1108 | | T | ZLAMP | PRE-PAK;BY CNT,SKIP AUTO CLR |
| 0463 | 00AC | 0053 | 1109 | | LBL | #53 | |
| 0465 | 37 | 0 | 1110 | | LD | | LD AUTO CLR PR AND TARE ENB |
| 0466 | 67 | 0008 | 1111 | | ADI | 8 | SKIP IF ENABLED |
| 0467 | B1 | 0471 | 1112 | | T | ZLAMP | NOT ENABLED |
| 0468 | D8 | 00D8 | 1113 | | TM | >CLRT | CLR TARE |
| 0469 | D9 | 00D9 | 1114 | | TM | >CLRPR | CLR PRICE,TOTAL PRICE |
| 046A | B1 | 0471 | 1115 | | T | ZLAMP | |
| 046B | 15 | | 1116 | CKINC | SKC | | SKIP IF AUTO CLR FLAG,EQ,6 |
| 046C | AE | 046E | 1117 | | T | *+2 | ,LT,6 |
| 046D | B1 | 0471 | 1118 | | T | ZLAMP | ,EQ,6,SKIP INCREMENTING |
| 046E | 7E | 0001 | 1119 | | LDI | 1 | |
| 046F | 0B | | 1120 | | AD | | INC AUTO CLR FLAG |
| 0470 | 3F | 0 | 1121 | | EX | | UPDATE AUTO CLR FLAG |
| 0471 | DC | 00DC | 1122 | ZLAMP | TM | >FCPTY | A=1;30LB,2;6KG,5;15KG |
| 0472 | 3F | 0 | 1123 | | EX | | A>ARI LSD |
| 0473 | 37 | 0 | 1124 | | LD | | RE-LD A |
| 0474 | 16 | | 1125 | | SKF1 | | SKIP ON FLG1,6KG,OR 30LB |
| 0475 | 71 | 000E | 1126 | | LDI | 14 | 15KG,LD 14 INSTEAD |
| 0476 | 6E | 0001 | 1127 | | ADI | 1 | INC |
| 0477 | 0B | | 1128 | | AD | | FORM 2A+1 OR 4 (15KG) |
| 0478 | 3F | 0 | 1129 | | EX | | 3,5 OR 4>ARI LSD;1,2,OR 5>A |
| 0479 | 63 | 000C | 1130 | | ADI | 12 | ADD 12,SKIP ON C,A>1 IF 15KG |
| 047A | BD | 047D | 1131 | | T | *+3 | NOT 15KG |
| 047B | 17 | | 1132 | | INCB | | |
| 047C | 3F | 0 | 1133 | | EX | | 15KG,1>ARI LSD+1 |
| 047D | C4 | 00C4 | 1134 | | LB | >09 | |
| 047E | 5480 | 0480 | 1135 | | TL | #480 | |
| | | | 1136 | | | | |
| | | | 1137 | | ORG | 480 | |
| 0480 | 7F | 0000 | 1138 | | LDI | 0 | |
| 0481 | 3F | 0 | 1139 | | EX | | 0>RESULT SIGN |
| 0482 | C7 | 00C7 | 1140 | | LB | >1A | |
| 0483 | 7D | 0002 | 1141 | | LDI | 2 | |
| 0484 | 1B | | 1142 | | LXA | | |
| 0485 | E1 | 00E1 | 1143 | | TM | >SUBL | CK FOR WGT,LE,2 CNTS,A>0,GT, |
| 0487 | | | 1144 | | LBL | #11 | ZERO LAMP FLAG |
| 0488 | 1E | | 1145 | | SKZ | | SKIP IF RES PLUS,Z LAMP OFF |
| 0489 | 8C | 048C | 1146 | | T | *+3 | RE NEG, DEC ZERO LAMP FLAG |
| 048A | 7D | 0002 | 1147 | | LDI | 2 | |
| 048B | 8E | 048E | 1148 | | T | UDZLF | TURN OFF ZERO LAMP |
| 048C | 09 | | 1149 | | ADSK | | DEC Z LMP FLG,SKIP WAS NOT 0 |
| 048D | 8F | 048F | 1150 | | T | *+2 | WAS 0,SKIP UPDATE |
| 048E | 3F | 0 | 1151 | UDZLF | EX | | UPDATE ZERO LAMP FLAG |
| 048F | DC | 00DC | 1152 | | TM | >FCPTY | C=0;6KG;C=1;30LB,15KG |
| 0490 | 36 | 1 | 1153 | | LD | 1 | 0>A |
| 0491 | 3D | 2 | 1154 | | EX | 2 | CLR SUBT RESULT LSD |
| 0492 | 15 | | 1155 | | SKC | | SKIP IF 30LB OR 15KG |
| 0493 | 9D | 049D | 1156 | | T | RNDBY2 | 6KG |
| 0494 | DD | 00DD | 1157 | | TM | >RNDOF | ROUND OFF 6 DIG WGT LSD |
| 0495 | 00D4 | 002B | 1158 | | LBL | #2B | |
| 0497 | 16 | | 1159 | | SKF1 | | SKIP IF 30LB SCALE |
| 0498 | A3 | 04A3 | 1160 | | T | RNDBY5 | 15KG |
| 0499 | 3F | 0 | 1161 | | EX | | 30LB,SHIFT WGT LEFT |
| 049A | 17 | | 1162 | | INCB | | |
| 049B | 99 | 0499 | 1163 | | T | *-2 | SHIFT NOT DONE,LOOP |
| 049C | AD | 04AD | 1164 | | T | OUTFLT | 30LB |
| 049D | 17 | | 1165 | RNDBY2 | INCB | | |
| 049E | 7E | 0001 | 1166 | | LDI | 1 | 6KG |
| 049F | 0D | | 1167 | | AND | | A>0 IF 5 DIG LSD EVEN |
| 04A0 | 1E | | 1168 | | SKZ | | SKIP IF EVEN,C=0 FROM RNDOFF |
| 04A1 | 20 | | 1169 | | SC | | ODD,SET C |
| 04A2 | AC | 04AC | 1170 | | T | RNDWT2 | |

PPS ASSEMBLY LISTING

| ADDR | CODE | ARG | STNO | | STMT | | |
|---|---|---|---|---|---|---|---|
| 04A3 | 72 | 000D | 1171 | RNDBY5 | LDI | 13 | 13>A |
| 04A4 | 09 | | 1172 | | ADSK | | ADD 5 DIG LSD, SKIP ON C |
| 04A5 | A9 | 04A9 | 1173 | | T | RNDWT1 | 5 DIG LSD,LT,3 |
| 04A6 | 77 | 0008 | 1174 | | LDI | 8 | 5 DIG LSD,GE,3,8>A |
| 04A7 | 09 | | 1175 | | ADSK | | ADD 5 DIG LSD,SKIP ON C |
| 04A8 | 7A | 0005 | 1176 | | LDI | 5 | 5 DIG LSD,GE,3 AND ,LT,8,5>A |
| 04A9 | 7F | 0000 | 1177 | RNDWT1 | LDI | 0 | 5 DIG LSD,LT,3 OR ,GE,8,0>A |
| 04AA | 3F | 0 | 1178 | | EX | | UPDATE 5 DIG LSD WITH 0 OR 5 |
| 04AB | 17 | | 1179 | | INCB | | |
| 04AC | DE | 00DE | 1180 | RNDWT2 | TM | >ADDC | INC WGT FIELD IF C SET |
| 04AD | CE | 00CE | 1181 | OUTFLT | LB | >6E | |
| 04AE | 7E | 0001 | 1182 | | LDI | 1 | |
| 04AF | D1 | 00D1 | 1183 | | TM | >MOV5X | MOVE OUT WGT TO ARI |
| 04B0 | 00E0 | 001F | 1184 | | LBL | #1F | |
| 04B2 | 37 | 0 | 1185 | | LD | | LD OUT WGT MSD |
| 04B3 | 6D | 0002 | 1186 | | ADI | 2 | SKIP IF MINUS OR BLANK |
| 04B4 | B7 | 04B7 | 1187 | | T | *+3 | NORMAL DIGIT |
| 04B5 | 7F | 0000 | 1188 | | LDI | 0 | WAS MINUS OR BLANK |
| 04B6 | 3F | 0 | 1189 | | EX | | CLR OUT WGT MSD |
| 04B7 | 00F5 | 000A | 1190 | | LBL | #0A | |
| 04B9 | 7F | 0000 | 1191 | | LDI | 0 | |
| 04BA | 3E | 1 | 1192 | | EX | 1 | CLR SUBT RESULT LSD |
| 04BB | 17 | | 1193 | | INCB | | |
| 04BC | 7D | 0002 | 1194 | | LDI | 2 | |
| 04BD | 1B | | 1195 | | LXA | | |
| 04BE | 54C0 | 04C0 | 1196 | | TL | #4C0 | |
| | | | 1197 | | | | |
| | | | 1198 | | ORG | 4C0 | |
| 04C0 | E1 | 00E1 | 1199 | | TM | >SUBL | SUB OUT WGT FROM 5 MSDS WGT |
| 04C1 | C0 | 00C0 | 1200 | | LB | >00 | |
| 04C2 | 37 | 0 | 1201 | | LD | | LD MOTN FLAG |
| 04C3 | 1E | | 1202 | | SKZ | | SKIP IF NO MOTION |
| 04C4 | 93 | 04D3 | 1203 | | T | OUTF1 | MOTION |
| 04C5 | DC | 00DC | 1204 | | TM | >FCPTY | A=1:30LB,2:6KG,5:15KG |
| 04C6 | 00FA | 0005 | 1205 | | LBL | #05 | |
| 04C8 | D5 | 0005 | 1206 | | TM | >MAGCK | CK FOR RESULT,LE,A |
| 04C9 | 8B | 04CB | 1207 | | T | *+2 | ,LE, |
| 04CA | 93 | 04D3 | 1208 | | T | OUTF1 | ,GT, |
| 04CB | 00EF | 0010 | 1209 | | LBL | #10 | |
| 04CD | 6E | 0001 | 1210 | | ADI | 1 | A>0,C>1 IF ALL 0S IN RESULT |
| 04CE | 90 | 04D0 | 1211 | | T | *+2 | RESULT NOT 0 |
| 04CF | A1 | 04E1 | 1212 | | T | OUTF2+2 | RESULT 0,CLR OUT FLTR CNTR |
| 04D0 | 72 | 000D | 1213 | | LDI | 13 | 13>A |
| 04D1 | 09 | | 1214 | | ADSK | | ADD OUT FLTR CNTR,SKIP ON C |
| 04D2 | 9F | 04DF | 1215 | | T | OUTF2 | OUT FLTR CNTR,LT,3 |
| 04D3 | 21 | | 1216 | OUTF1 | SF2 | | NOTE WANT 5 MSDS |
| 04D4 | E4 | 00E4 | 1217 | | TM | >MODE | CK FOR BY COUNT MODE |
| 04D5 | 97 | 04D7 | 1218 | | T | *+2 | NOT BY COUNT |
| 04D6 | 9B | 04DB | 1219 | | T | CLROFC | BY COUNT,IGNORE OUT FLT CNTR |
| 04D7 | DF | 00DF | 1220 | | TM | >UDOWT | OUT FLTR CNTR 3,UPDT OUT WGT |
| 04D8 | E5 | 00E5 | 1221 | | TM | >SETRC | SET RECOMPUTE |
| 04D9 | 7F | 0000 | 1222 | | LDI | 0 | |
| 04DA | 3F | 0 | 1223 | | EX | | CLR PRINT FLAG |
| 04DB | 00EF | 0010 | 1224 | CLROFC | LBL | #10 | |
| 04DD | 7F | 0000 | 1225 | | LDI | 0 | 0>A TO CLR OUT FLTR CNTR |
| 04DE | A1 | 04E1 | 1226 | | T | OUTF2+2 | |
| 04DF | 7E | 0001 | 1227 | OUTF2 | LDI | 1 | |
| 04E0 | 0B | | 1228 | | AD | | INC OUT FLTR CNTR |
| 04E1 | 3E | 1 | 1229 | | EX | 1 | UPDATE OUT FLTR CNTR |
| 04E2 | 35 | 2 | 1230 | LDLMPS | LD | 2 | LD MOTION FLAG |
| 04E3 | 1E | | 1231 | | SKZ | | SKIP NO MOTION |
| 04E4 | 7F | 0000 | 1232 | | LDI | 0 | MOTION |
| 04E5 | 77 | 0008 | 1233 | | LDI | 8 | NO MOTION |
| 04E6 | 3C | 3 | 1234 | | EX | 3 | UPDATE LB/KG LAMP |
| 04E7 | 17 | | 1235 | | INCB | | |
| 04E8 | 34 | 3 | 1236 | | LD | 3 | LD Z LAMP FLAG |
| 04E9 | 1E | | 1237 | | SKZ | | SKIP IF 0,LAMP ON |
| 04EA | 7F | 0000 | 1238 | | LDI | 0 | FLAG NOT 0 |
| 04EB | 77 | 0008 | 1239 | | LDI | 8 | FLAG 0 |

PPS ASSEMBLY LISTING

| ADDR | CODE | ARG | STNO | | STMT | | |
|------|------|-----|------|---|------|---|---|
| 04EC | 3C | 3 | 1240 | | EX | 3 | UPDATE ZERO LAMP |
| 04ED | 17 | | 1241 | | INCB | | |
| 04EE | 34 | 3 | 1242 | | LD | 3 | LD NET FLAG |
| 04EF | 3C | 3 | 1243 | | EX | 3 | UPDATE NET LAMP |
| 04F0 | 17 | | 1244 | | INCB | | |
| 04F1 | 7D | 0002 | 1245 | | LDI | 2 | |
| 04F2 | 0D | | 1246 | | AND | | CK FOR PER 1/2 |
| 04F3 | 1E | | 1247 | | SKZ | | SKIP NO PER 1/2 |
| 04F4 | 77 | 0008 | 1248 | | LDI | 8 | PER 1/2 |
| 04F5 | 00DC | 0023 | 1249 | | LBL | #23 | |
| 04F7 | 3C | 3 | 1250 | | EX | 3 | UPDATE PER 1/2 LAMP |
| 04F8 | 7B | 0004 | 1251 | | LDI | 4 | |
| 04F9 | 0D | | 1252 | | AND | | CK FOR PER 1/4 |
| 04FA | 1E | | 1253 | | SKZ | | SKIP NO PER 1/4 |
| 04FB | 77 | 0008 | 1254 | | LDI | 8 | PER 1/4 |
| 04FC | 00DB | 0024 | 1255 | | LBL | #24 | |
| 04FE | 5500 | 0500 | 1256 | | TL | #500 | |
| | | | 1257 | | | | |
| | | | 1258 | | ORG | 500 | |
| 0500 | 39 | 6 | 1259 | | EX | 6 | UPDATE PER 1/4 LAMP |
| 0501 | 17 | | 1260 | | INCB | | |
| 0502 | 37 | 0 | 1261 | | LD | | LD UK ENB |
| 0503 | 1E | | 1262 | | SKZ | | SKIP NOT UK SCALE |
| 0504 | 8D | 050D | 1263 | | T | ITLKCK | SKIP PRE-PAK LAMPS |
| 0505 | CB | 00CB | 1264 | | LB | >4B | |
| 0506 | 7C | 0003 | 1265 | | LDI | 3 | |
| 0507 | 0D | | 1266 | | AND | | CK FOR PRE-PAK OR BY CNT |
| 0508 | 62 | 000D | 1267 | | ADI | 13 | SKIP NOT PRE-PAK OR BY CNT |
| 0509 | 77 | 0008 | 1268 | | LDI | 8 | PRE-PAK OR BY CNT |
| 050A | 7F | 0000 | 1269 | | LDI | 0 | NOT PRE-PAK OR BY CNT |
| 050B | 036F | 036F | 1270 | | TML | LDPPUK | UPDATE 2 PRE-PAK LAMPS |
| 050D | E4 | 00E4 | 1271 | ITLKCK | TM | >MODE | CK FOR BY COUNT MODE |
| 050E | 93 | 0513 | 1272 | | T | TDUNCK | NOT BY COUNT |
| 050F | CE | 00CE | 1273 | | LB | >6E | |
| 0510 | DA | 00DA | 1274 | | TM | >BLANK | BLANK OUT WGT |
| 0511 | 3F | 0 | 1275 | | EX | | RESTORE PRINT FLAG |
| 0512 | 9C | 051C | 1276 | | T | TPCLR+2 | |
| 0513 | C2 | 00C2 | 1277 | TDUNCK | LB | >02 | |
| 0514 | 33 | 4 | 1278 | | LD | 4 | LD TARE DONE FLAG |
| 0515 | 1E | | 1279 | | SKZ | | SKIP IF TARE NOT DONE |
| 0516 | A3 | 0523 | 1280 | | T | CKRCP | |
| 0517 | 37 | 0 | 1281 | | LD | | LD TARE MANDATORY ENB |
| 0518 | 67 | 0008 | 1282 | | ADI | 8 | SKIP IF MANDATORY |
| 0519 | A3 | 0523 | 1283 | | T | CKRCP | NOT MANDATORY |
| 051A | 01C8 | 01C8 | 1284 | TPCLR | TML | CKWSGN | WGT +:0S,WGT -:15S>TOT PRICE |
| 051C | CC | 00CC | 1285 | | LB | >57 | |
| 051D | 7F | 0000 | 1286 | | LDI | 0 | |
| 051E | 3F | 0 | 1287 | | EX | | RECOMP>A,0>RECOMP |
| 051F | 60 | 000F | 1288 | | ADI | 15 | SKIP IF RECOMPUTE SET |
| 0520 | A8 | 0528 | 1289 | | T | LMOUT> | GO TO OUT LMPS AND KEYBD |
| 0521 | 55A4 | 05A4 | 1290 | | TL | TPBLK+3 | CLR TP 1/2 IF UK,OUTPUT |
| 0523 | CC | 00CC | 1291 | CKRCP | LB | >57 | |
| 0524 | 7F | 0000 | 1292 | | LDI | 0 | |
| 0525 | 3F | 0 | 1293 | | EX | | RECOMPUTE>A,0>RECOMPUTE |
| 0526 | 1E | | 1294 | | SKZ | | SKIP IF RECOMPUTE CLR |
| 0527 | AA | 052A | 1295 | | T | CMPUT | DO RECOMPUTE |
| 0528 | 55FB | 05FB | 1296 | LMOUT> | TL | LMPOUT | SKIP DISPLAY OUTPUT |
| 052A | D6 | 00D6 | 1297 | CMPUT | TM | >ARICL | |
| 052B | CF | 00CF | 1298 | | LB | >7A | |
| 052C | D7 | 00D7 | 1299 | | TM | >CLEAR | CLR RAM REG 7 |
| 052D | 21 | | 1300 | | SF2 | | SET FLG2:TOT PR MULT BY WGT |
| 052E | C6 | 00C6 | 1301 | | LB | >13 | |
| 052F | 79 | 0006 | 1302 | | LDI | 6 | 6>A |
| 0530 | 0D | | 1303 | | AND | | .AND.WITH FACTOR FLAG |
| 0531 | 1E | | 1304 | | SKZ | | SKIP NO PER 1/2 OR PER 1/4 |
| 0532 | B6 | 0536 | 1305 | | T | PRXFCT | HAVE PER 1/2 OR PER 1/4 |
| 0533 | 25 | | 1306 | | RF2 | | RESET FLG2:TOT PR MULT BY PR |
| 0534 | 555E | 055E | 1307 | | TL | CKMIN | |
| 0536 | C7 | 00C7 | 1308 | PRXFCT | LB | >1A | |

PPS ASSEMBLY LISTING

| ADDR | CODE | ARG | STNU | | STMT | | |
|------|------|-----|------|--------|------|--------|---------------------------|
| 0537 | 3F   | 0   | 1309 |        | EX   |        | FACTOR>ARI LSD |
| 0538 | C9   | 00C9| 1310 |        | LB   | >29    | |
| 0539 | D7   | 00D7| 1311 |        | TM   | >CLEAR | CLR WGT |
| 053A | E3   | 00E3| 1312 |        | TM   | >MOVPR | |
| 053B | 008A | 0075| 1313 |        | LBL  | #75    | |
| 053D | D4   | 00D4| 1314 |        | TM   | >MULT  | MULTIPLY FACTOR TIMES PRICE |
| 053E | 5540 | 0540| 1315 |        | TL   | #540   | |
|      |      |     | 1316 |        |      |        | |
|      |      |     | 1317 |        | ORG  | 540    | |
| 0540 | 00AE | 0051| 1318 |        | LBL  | #51    | |
| 0542 | 37   | 0   | 1319 |        | LD   |        | LD 5 DIG PRICE ENB |
| 0543 | 00F8 | 0007| 1320 |        | LBL  | #07    | |
| 0545 | 1E   |     | 1321 |        | SKZ  |        | SKIP IF 4 DIG PRICING |
| 0546 | 1F   |     | 1322 |        | DECB |        | 5 DIG,DEC COUNTER |
| 0547 | 7F   | 0000| 1323 |        | LDI  | 0      | |
| 0548 | D5   | 00D5| 1324 |        | TM   | >MAGCK | CK FOR OVERPRICE |
| 0549 | 8C   | 054C| 1325 |        | T    | *+3    | LEGAL PRICE RTN |
| 054A | D9   | 00D9| 1326 |        | TM   | >CLRPR | CLR PRICE,TOTAL PRICE |
| 054B | E7   | 00E7| 1327 |        | TM   | >OUTP> | GO TO OUTPUT |
| 054C | 008E | 0041| 1328 |        | LBL  | #41    | |
| 054E | 37   | 0   | 1329 |        | LD   |        | LD MANDATORY PRICE/UNIT ENB |
| 054F | 66   | 0009| 1330 |        | ADI  | 9      | A>1 AND SKIP IF ENABLED |
| 0550 | 99   | 0559| 1331 |        | T    | ADRWGT | NOT ENABLED |
| 0551 | 25   |     | 1332 |        | RF2  |        | RESET FLG2;TOT PR MULT BY PR |
| 0552 | C6   | 00C6| 1333 |        | LB   | >13    | |
| 0553 | 3F   | 0   | 1334 |        | EX   |        | 1>FACTOR FLAG;FACTOR DONE |
| 0554 | E5   | 00E5| 1335 |        | TM   | >SETRC | SET RECOMPUTE |
| 0555 | 79   | 0006| 1336 |        | LDI  | 6      | DEST BM IS PRICE |
| 0556 | 1B   |     | 1337 |        | LXA  |        | |
| 0557 | 76   | 0009| 1338 |        | LDI  | 9      | |
| 0558 | 9C   | 055C| 1339 |        | T    | UDTPXF | |
| 0559 | 7D   | 0002| 1340 | ADRWGT | LDI  | 2      | DEST BM IS WGT |
| 055A | 1B   |     | 1341 |        | LXA  |        | |
| 055B | 71   | 000E| 1342 |        | LDI  | 14     | |
| 055C | C4   | 00C4| 1343 | UDTPXF | LB   | >09    | |
| 055D | D2   | 00D2| 1344 |        | TM   | >MOV5  | MOVE RESULT TO PRICE OR WGT |
| 055E | CE   | 00CE| 1345 | CKMIN  | LB   | >6E    | |
| 055F | 71   | 000E| 1346 |        | LDI  | 14     | 14>A |
| 0560 | 0C   |     | 1347 |        | EOR  |        | EX-OR WITH OUT WGT SIGN |
| 0561 | 1E   |     | 1348 |        | SKZ  |        | SKIP IF MINUS |
| 0562 | A6   | 0566| 1349 |        | T    | OW>ARI | OUT WGT PLUS |
| 0563 | E5   | 00E5| 1350 |        | TM   | >SETRC | SET RECOMPUTE |
| 0564 | 551A | 051A| 1351 |        | TL   | TPCLR  | OUT WGT MINUS |
| 0566 | E3   | 00E3| 1352 | OW>ARI | TM   | >MOVPR | |
| 0567 | 7E   | 0001| 1353 |        | LDI  | 1      | |
| 0568 | 1B   |     | 1354 |        | LXA  |        | |
| 0569 | 00EB | 0014| 1355 |        | LBL  | #14    | |
| 056B | 37   | 0   | 1356 |        | LD   |        | LD KG FLAG |
| 056C | CE   | 00CE| 1357 |        | LB   | >6E    | |
| 056D | 1E   |     | 1358 |        | SKZ  |        | SKIP IF 30 LB |
| 056E | 71   | 000E| 1359 |        | LDI  | 14     | 6KG OR 15KG |
| 056F | 72   | 000D| 1360 |        | LDI  | 13     | 30LB,SHIFT WGT RIGHT |
| 0570 | D2   | 00D2| 1361 |        | TM   | >MOV5  | MOVE OUT WGT TO ARI |
| 0571 | 11   |     | 1362 |        | LABL |        | |
| 0572 | 6A   | 0005| 1363 |        | ADI  | 5      | |
| 0573 | 19   |     | 1364 |        | XABL |        | RE-ADDR OUT WGT MSD |
| 0574 | 37   | 0   | 1365 |        | LD   |        | LD OUT WGT MSD |
| 0575 | 6E   | 0001| 1366 |        | ADI  | 1      | INC,A>0 AND SKIP IF MSD BLNK |
| 0576 | 88   | 0578| 1367 |        | T    | *+2    | NO BLANK IN OUT WGT MSD |
| 0577 | 3F   | 0   | 1368 |        | EX   |        | REPLACE BLANK WITH 0 |
| 0578 | 00DA | 0025| 1369 |        | LBL  | #25    | |
| 057A | 14   |     | 1370 |        | SKF2 |        | SKIP IF TOT PR MULT BY WGT |
| 057B | 32   | 5   | 1371 |        | LD   | 5      | CHANGE BM FOR MULT BY PRICE |
| 057C | D4   | 00D4| 1372 | PRXWGT | TM   | >MULT  | MULTIPLY PRICE TIMES OUT WGT |
| 057D | DB   | 00DB| 1373 |        | TM   | >TPRDS | PROPER ROUND OFF ADDR>A,BL |
| 057E | 5580 | 0580| 1374 |        | TL   | #580   | |
|      |      |     | 1375 |        |      |        | |

PPS ASSEMBLY LISTING

| ADDR | CODE | ARG | STNO | | STMT | | |
|------|------|-----|------|------|------|------|------|
| | | | 1376 | | ORG | 580 | |
| 0580 | DD | 00DD | 1377 | | TM | >RNDOF | DO ROUND OFF OF TOT PR LSD |
| 0581 | 12 | | 1378 | | LAX | | LD UK ENB SAVED IN TPRDS |
| 0582 | 67 | 0008 | 1379 | | ADI | 8 | SKIP IF UK SCALE |
| 0583 | 91 | 0591 | 1380 | | T | OVALCK | NOT UK SCALE |
| 0584 | DB | 00DB | 1381 | | TM | >TPRDS | PROPER ROUND OFF ADDR>A,BL |
| 0585 | 17 | | 1382 | | INCB | | INC BL TO NEXT DIGIT |
| 0586 | 77 | 0008 | 1383 | | LDI | 8 | 2 IN EXCESS 6 CODE>A |
| 0587 | 0275 | 0275 | 1384 | | TML | ADDC+1 | ADD A TO TOTAL PRICE FIELD |
| 0589 | DB | 00DB | 1385 | | TM | >TPRDS | ADDR SAME DIGIT |
| 058A | 17 | | 1386 | | INCB | | HAVE 5 TO 9 IN DIG FOR 1/2 |
| 058B | 74 | 000B | 1387 | | LDI | 11 | 11>A |
| 058C | 09 | | 1388 | | ADSK | | ADD DIG TO A, IF C>1 WANT 1/2 |
| 058D | 7F | 0000 | 1389 | | LDI | 0 | 0>A,PRINT,DSPLY BLANK |
| 058E | 77 | 0008 | 1390 | | LDI | 8 | 8>A,PRINT,DSPLY 1/2 |
| 058F | 036F | 036F | 1391 | | TML | LDPPUK | UK 1/2>PRE-PAK |
| 0591 | DB | 00DB | 1392 | OVALCK | TM | >TPRDS | PROPER ROUND OFF ADDR>A,BL |
| 0592 | 1B | | 1393 | | LXA | | RNDOFF BL>X |
| 0593 | 00AF | 0050 | 1394 | | LBL | #50 | |
| 0595 | 32 | 5 | 1395 | | LD | 5 | LD 5 DIG TP ENB |
| 0596 | 1A | | 1396 | | XAX | | RNDOFF BL>A,ENB>X |
| 0597 | 0E | | 1397 | | COMP | | COM RNDOFF BL |
| 0598 | 64 | 000B | 1398 | | ADI | 11 | ADD TO 11 TO FORM MAGCK CNTR |
| 0599 | 9A | 059A | 1399 | | T | *+1 | |
| 059A | 19 | | 1400 | | XABL | | CNTR>BL |
| 059B | 12 | | 1401 | | LAX | | RE-LD 5 DIG TP ENB |
| 059C | 67 | 0008 | 1402 | | ADI | 8 | SKIP IF 5 DIG TP |
| 059D | 17 | | 1403 | | INCB | | 4 DIG TP, INC COUNTER |
| 059E | 7F | 0000 | 1404 | | LDI | 0 | |
| 059F | D5 | 00D5 | 1405 | | TM | >MAGCK | CK FOR OVERVALUE |
| 05A0 | AC | 05AC | 1406 | | T | NOTOV | ALL 0 RTN |
| 05A1 | 009B | 0064 | 1407 | TPBLK | LBL | #64 | |
| 05A3 | DA | 00DA | 1408 | | TM | >BLANK | BLANK TOTAL PRICE |
| 05A4 | 00BA | 0045 | 1409 | | LBL | #45 | |
| 05A6 | 37 | 0 | 1410 | | LD | | LD UK SCALE ENABLE |
| 05A7 | 67 | 0008 | 1411 | | ADI | 8 | A>0 AND SKIP IF UK |
| 05A8 | B5 | 05B5 | 1412 | | T | OUTPUT | NOT UK SCALE |
| 05A9 | 036F | 036F | 1413 | | TML | LDPPUK | BLANK UK 1/2 |
| 05AB | B5 | 05B5 | 1414 | | T | OUTPUT | |
| 05AC | DB | 00DB | 1415 | NOTOV | TM | >TPRDS | PROPER ROUND OFF ADDR>A,BL |
| 05AD | 6A | 0005 | 1416 | | ADI | 5 | ADD 5 TO GET MSD |
| 05AE | 19 | | 1417 | | XABL | | ADDR TOTAL PRICE MSD IN RES |
| 05AF | 79 | 0006 | 1418 | | LDI | 6 | |
| 05B0 | 1A | | 1419 | | XAX | | UK ENB>A,DEST BM>X |
| 05B1 | 1E | | 1420 | | SKZ | | SKIP NOT UK SCALE |
| 05B2 | 17 | | 1421 | | INCB | | INC SOURCE BL |
| 05B3 | 7B | 0004 | 1422 | | LDI | 4 | |
| 05B4 | D2 | 0002 | 1423 | | TM | >MOV5 | MOVE RESULT TO TOTAL PRICE |
| | | | 1424 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
| | | | 1425 | * THE FOLLOWING SEQUENCE OF MOV5 CALLS SET DISPLAY | | | |
| | | | 1426 | *   OUT REG AS FOLLOWS FOR OUTPUT TO GPKD: | | | |
| | | | 1427 | *    70              75      ADDRESS     7A              7F | | | |
| | | | 1428 | *  V0-V1-P2-P3-P4-W0-W1-15-V2-V3-V4-P0-P1-W2-W3-W4 | | | |
| | | | 1429 | *      P=PRICE,W=WEIGHT,V=TOTAL PRICE (VALUE) | | | |
| | | | 1430 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
| 05B5 | 0091 | 006E | 1431 | OUTPUT | LBL | #6E | |
| 05B7 | 78 | 0007 | 1432 | | LDI | 7 | |
| 05B8 | D1 | 00D1 | 1433 | | TM | >MOV5X | |
| 05B9 | 0099 | 0066 | 1434 | | LBL | #66 | |
| 05BB | 78 | 0007 | 1435 | | LDI | 7 | |
| 05BC | 1B | | 1436 | | LXA | | |
| 05BD | 73 | 000C | 1437 | | LDI | 12 | |
| 05BE | 55C0 | 05C0 | 1438 | | TL | #5C0 | |
| | | | 1439 | | | | |
| | | | 1440 | | ORG | 5C0 | |
| 05C0 | D2 | 0002 | 1441 | | TM | >MOV5 | |
| 05C1 | 70 | 000F | 1442 | | LDI | 15 | |
| 05C2 | 3F | 0 | 1443 | | EX | | |
| 05C3 | 0094 | 006B | 1444 | | LBL | #6B | |

PPS ASSEMBLY LISTING

| ADDR | CODE | ARG | STNO | | STMT | | |
|---|---|---|---|---|---|---|---|
| 05C5 | 78 | 0007 | 1445 | | LDI | 7 | |
| 05C6 | 1B | | 1446 | | LXA | | |
| 05C7 | 79 | 0006 | 1447 | | LDI | 6 | |
| 05C8 | D2 | 00D2 | 1448 | | TM | >MOV5 | |
| 05C9 | 18 | | 1449 | | XBMX | | |
| 05CA | 36 | 1 | 1450 | | LD | 1 | |
| 05CB | 2E | 1 | 1451 | | EXD | 1 | |
| 05CC | 36 | 1 | 1452 | | LD | 1 | |
| 05CD | 3D | 2 | 1453 | | EX | 2 | |
| 05CE | 17 | | 1454 | | INCB | | |
| 05CF | 37 | 0 | 1455 | | LD | | LD 5 DIG UNIT PRICE ENB |
| 05D0 | 0088 | 0074 | 1456 | | LBL | #74 | |
| 05D2 | 1E | | 1457 | | SKZ | | SKIP IF 4 DIG PRICING |
| 05D3 | 96 | 05D6 | 1458 | | T | *+3 | |
| 05D4 | 70 | 000F | 1459 | | LDI | 15 | |
| 05D5 | 3F | 0 | 1460 | | EX | | BLANK PRICE MSD (P4) |
| 05D6 | 008A | 0045 | 1461 | | LBL | #45 | |
| 05D8 | 37 | 0 | 1462 | | LD | | LD UK ENB |
| 05D9 | 1B | | 1463 | | LXA | | SAVE IN X |
| 05DA | 00AF | 0050 | 1464 | | LBL | #50 | |
| 05DC | 37 | 0 | 1465 | | LD | | LD 5 DIGIT TOTAL PRICE ENB |
| 05DD | CF | 00CF | 1466 | | LB | >7A | |
| 05DE | 1E | | 1467 | | SKZ | | SKIP IF 4 DIGIT TOTAL PRICE |
| 05DF | A2 | 05E2 | 1468 | | T | *+3 | 5 DIGIT,NO MSD BLANK |
| 05E0 | 70 | 000F | 1469 | | LDI | 15 | |
| 05E1 | 2F | 0 | 1470 | | EXD | | BLANK TOTAL PRICE MSD (V4) |
| 05E2 | 12 | | 1471 | | LAX | | RE-LD UK ENABLE |
| 05E3 | 67 | 0008 | 1472 | | ADI | 8 | SKIP IF UK SCALE |
| 05E4 | A7 | 05E7 | 1473 | | T | *+3 | NOT UK SCALE |
| 05E5 | 70 | 000F | 1474 | | LDI | 15 | |
| 05E6 | 3F | 0 | 1475 | | EX | | UK,BLANK NEXT MSD TOT PR |
| 05E7 | 008F | 0070 | 1476 | | LBL | #70 | |
| 05E9 | 22 | | 1477 | | SF1 | | SET FLG1 FOR 1ST PASS |
| | | | 1478 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
| | | | 1479 | * GPKD REG A IS SET AS FOLLOWS FROM LSD: | | | |
| | | | 1480 | * V0-V1-P2-P3-P4-W0-W1-15-V0-V1-P2-P3-P4-W0-W1-15 | | | |
| | | | 1481 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
| 05EA | 37 | 0 | 1482 | DLOOPA | LD | | LD OUT DIGIT |
| 05EB | 1CFE | 00FE | 1483 | | IOL | KLA | DIG>GPKD REG A |
| 05ED | 17 | | 1484 | | INCB | | |
| 05EE | 48 | 0008 | 1485 | | SKBI | 8 | |
| 05EF | AA | 05EA | 1486 | | T | DLOOPA | LOOP 8 TIMES |
| | | | 1487 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
| | | | 1488 | * GPKD REG B IS SET AS FOLLOWS FROM LSD: | | | |
| | | | 1489 | * V2-V3-V4-P0-P1-W2-W3-W4-V2-V3-V4-P0-P1-W2-W3-W4 | | | |
| | | | 1490 | \*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\* | | | |
| 05F0 | 37 | 0 | 1491 | DLOOPB | LD | | LD OUT DIGIT |
| 05F1 | 1CFD | 00FD | 1492 | | IOL | KLB | DIG>GPKD REG B |
| 05F3 | 17 | | 1493 | | INCB | | |
| 05F4 | B0 | 05F0 | 1494 | | T | DLOOPB | LOOP TO END |
| 05F5 | 16 | | 1495 | | SKF1 | | SKIP IF 1ST PASS |
| 05F6 | B9 | 05F9 | 1496 | | T | DISPON | 2ND PASS,DONE |
| 05F7 | 26 | | 1497 | | RF1 | | RESET FLG1 FOR 2ND PASS |
| 05F8 | AA | 05EA | 1498 | | T | DLOOPA | |
| 05F9 | 1CF3 | 00F3 | 1499 | DISPON | IOL | KDN | TURN ON DISPLAY |
| 05FB | 00DF | 0020 | 1500 | LMPOUT | LBL | #20 | |
| 05FD | 7E | 0001 | 1501 | | LDI | 1 | |
| 05FE | 5600 | 0600 | 1502 | | TL | #600 | |
| | | | 1503 | | | | |
| | | | 1504 | | ORG | 600 | |
| 0600 | 1B | | 1505 | | LXA | | 1>X,INTEGRATOR RESET |
| 0601 | 11 | | 1506 | LMPOLP | LABL | | LAMP ADDR>A |
| 0602 | 0E | | 1507 | | COMP | | ,COM,ADDR |
| 0603 | 0B | | 1508 | | AD | | ADD LAMP STAT,,COM,LAMP |
| 0604 | 1D | | 1509 | | DOA | | OUTPUT LAMP DATA AND ADDR |
| 0605 | 11 | | 1510 | | LABL | | |
| 0606 | 13 | | 1511 | | LXA | | SAVE ADDR IN X |
| 0607 | C4 | 00C4 | 1512 | | LB | >09 | |
| 0608 | 7F | 0000 | 1513 | | LDI | 0 | |

PPS ASSEMBLY LISTING

| ADDR | CODE | ARG | STNO | | STMT | | |
|------|------|-----|------|---|------|---|---|
| 0609 | 1C41 | 0041 | 1514 | | IOL | SOS | STROBE WRITE |
| 060B | 77 | 0008 | 1515 | | LDI | 8 | |
| 060C | 1C41 | 0041 | 1516 | | IOL | SOS | REMOVE STROBE |
| 060E | C8 | 00C8 | 1517 | | LB | >21 | |
| 060F | 7E | 0001 | 1518 | | LDI | 1 | |
| 0610 | 1A | | 1519 | | XAX | | ADDR>A,INTEGRATOR RESET>X |
| 0611 | 19 | | 1520 | | XABL | | ADDR>BL |
| 0612 | 17 | | 1521 | | INCB | | |
| 0613 | 47 | 0007 | 1522 | | SKBI | 7 | |
| 0614 | 81 | 0601 | 1523 | | T | LMPULP | LOOP FOR 7 LAMPS |
| 0615 | 7F | 0000 | 1524 | PRNTR | LDI | 0 | |
| 0616 | 3F | 0 | 1525 | | EX | | PRINT CMND>A,0>PRINT CMND |
| 0617 | 25 | | 1526 | | RF2 | | ASSUME NO PRINT COMMAND |
| 0618 | 1E | | 1527 | | SKZ | | SKIP IF NO PRINT COMMAND |
| 0619 | 21 | | 1528 | | SF2 | | NOTE TO OUTPUT PRINT CMND |
| 061A | DC | 00DC | 1529 | | TM | >FCPTY | |
| 061B | 16 | | 1530 | | SKF1 | | SKIP NOT 15KG |
| 061C | A0 | 0620 | 1531 | | T | *+4 | 15KG |
| 061D | 15 | | 1532 | | SKC | | SKIP NOT 6KG |
| 061E | 7C | 0003 | 1533 | | LDI | 3 | 6KG, DISABLE,LT,00040 |
| 061F | 7E | 0001 | 1534 | | LDI | 1 | 30LB,DISABLE,LT,00020 |
| 0620 | 76 | 0009 | 1535 | | LDI | 9 | 15KG,DISABLE,LT,00100 |
| 0621 | 1B | | 1536 | | LXA | | TEST DIGIT>X |
| 0622 | 36 | 1 | 1537 | | LD | 1 | DUMMY INST TO ADOR 0A |
| 0623 | 77 | 0008 | 1538 | | LDI | 8 | |
| 0624 | 1C41 | 0041 | 1539 | | IOL | SOS | INPUT PRINT COMPLETE |
| 0626 | 1C | | 1540 | | SKZ | | SKIP IF PRINT COMPLETE |
| 0627 | B3 | 0633 | 1541 | | T | PRSET-1 | DISABLE PRINT |
| 0628 | 00A9 | 0054 | 1542 | | LBL | #54 | |
| 062A | 37 | 0 | 1543 | | LD | | LD LT 20 INC PRINT DISABLE |
| 062B | 1E | | 1544 | | SKZ | | SKIP IF NO PRINT DISABLE |
| 062C | 14 | | 1545 | | SKF2 | | SKIP IF HAVE PRINT COMMAND |
| 062D | B4 | 0634 | 1546 | | T | PRSET | NO DISABLE,OR,NO PRINT CMND |
| 062E | 0092 | 006D | 1547 | | LBL | #6D | PRINT DISABLE,AND,PRINT CMND |
| 0630 | 7C | 0003 | 1548 | | LDI | 3 | |
| 0631 | 0129 | 0129 | 1549 | | TML | MAGLP-1 | CK FOR PRINT DISABLE WGT |
| 0633 | 25 | | 1550 | | RF2 | | ,LE,TEST DIG RTN,NO PRINT |
| 0634 | CE | 00CE | 1551 | PRSET | LB | >6E | |
| 0635 | 78 | 0007 | 1552 | | LDI | 7 | |
| 0636 | D1 | 00D1 | 1553 | | TM | >MOV5X | ENTER OUT WGT TO PRINT REG |
| 0637 | 18 | | 1554 | | XBMX | | |
| 0638 | C6 | 00C6 | 1555 | | LB | >13 | |
| 0639 | 71 | 000E | 1556 | | LDI | 14 | |
| 063A | 0D | | 1557 | | AND | | REMOVE FCTR DONE FROM FACTOR |
| 063B | CF | 00CF | 1558 | | LB | >7A | |
| 063C | 5640 | 0640 | 1559 | | TL | #640 | |
| | | | 1560 | | | | |
| | | | 1561 | | ORG | 640 | |
| 0640 | 3F | 0 | 1562 | | EX | | ENTER FACTOR |
| 0641 | 00BA | 0045 | 1563 | | LBL | #45 | |
| 0643 | 35 | 2 | 1564 | | LD | 2 | LD UK ENB |
| 0644 | 1F | | 1565 | | DECB | | |
| 0645 | 1E | | 1566 | | SKZ | | SKIP NOT UK SCALE |
| 0646 | 1F | | 1567 | | DECB | | DEC TOT PR SOURCE POINTER |
| 0647 | 76 | 0009 | 1568 | | LDI | 9 | |
| 0648 | D2 | 00D2 | 1569 | | TM | >MOV5 | ENTER TOTAL PRICE |
| 0649 | 18 | | 1570 | | XBMX | | |
| 064A | 00BA | 0045 | 1571 | | LBL | #45 | |
| 064C | 31 | 6 | 1572 | | LD | 6 | LD UK ENB |
| 064D | 67 | 0008 | 1573 | | ADI | 8 | SKIP IF UK SCALE |
| 064E | 93 | 0653 | 1574 | | T | *+5 | NOT UK |
| 064F | 32 | 5 | 1575 | | LD | 5 | LD UK 1/2 FROM PRE-PAK |
| 0650 | 1E | | 1576 | | SKZ | | SKIP IF 1/2 LAMP OFF |
| 0651 | 75 | 000A | 1577 | | LDI | 10 | PRINT 1/2 |
| 0652 | 3F | 0 | 1578 | | EX | | UPDATE TOT PR LSD (V0) |
| 0653 | CD | 00CD | 1579 | | LB | >69 | |
| 0654 | 73 | 0004 | 1580 | | LDI | 4 | |
| 0655 | D2 | 00D2 | 1581 | | TM | >MOV5 | ENTER UNIT PRICE |
| 0656 | 79 | 0006 | 1582 | PBCCK | LDI | 6 | 10 CNTR (301 OR SMART PRNTR) |

PPS ASSEMBLY LISTING

| ADDR | CODE | ARG | STNO | | STMT | | |
|------|------|-----|------|------|------|------|------|
| 0657 | 1B   |     | 1583 |      | LXA  |      | CNTR>X |
| 0658 | E4   | 00E4| 1584 |      | TM   | >MODE| CK FOR BY COUNT MODE |
| 0659 | AE   | 066E| 1585 |      | T    | POUT>| NOT BY COUNT |
| 065A | CF   | 00CF| 1586 |      | LB   | >7A  | |
| 065B | 12   |     | 1587 |      | LAX  |      | CNTR>A |
| 065C | 19   |     | 1588 |      | XABL |      | CNTR>BL |
| 065D | 1F   |     | 1589 |      | DECB |      | |
| 065E | 1F   |     | 1590 |      | DECB |      | START ADDR=CNTR-2 |
| 065F | 12   |     | 1591 |      | LAX  |      | CNTR>A |
| 0660 | 1B   |     | 1592 | PBC1 | LXA  |      | UPDATED CNTR>X |
| 0661 | 37   | 0   | 1593 |      | LD   |      | LD PRINT REG DIGIT |
| 0662 | 60   | 000F| 1594 |      | ADI  | 15   | SKIP DIGIT NOT 0 |
| 0663 | A6   | 0666| 1595 |      | T    | PBC2 | DIGIT 0, ENTER 13 |
| 0664 | 60   | 0002| 1596 |      | ADI  | 2    | SKIP IF DIGIT 15 |
| 0665 | A8   | 0668| 1597 |      | T    | PBC3 | NOT 0 OR 15, IGNORE |
| 0666 | 72   | 000D| 1598 | PBC2 | LDI  | 13   | |
| 0667 | 3F   | 0   | 1599 |      | EX   |      | 13>PRINT REG DIGIT |
| 0668 | 1F   |     | 1600 | PBC3 | DECB |      | |
| 0669 | AA   | 066A| 1601 |      | T    | *+1  | |
| 066A | 12   |     | 1602 |      | LAX  |      | CNTR>A |
| 066B | 6E   | 0001| 1603 |      | ADI  | 1    | INC CNTR TOWARD 0 |
| 066C | A0   | 0660| 1604 |      | T    | PBC1 | NOT 0, LOOP |
| 066D | 3F   | 0   | 1605 |      | EX   |      | MAKE SURE FACTOR 0 |
| 066E | 5680 | 0680| 1606 | POUT>| TL   | POUT | |
|      |      |     | 1607 |      |      |      | |
|      |      |     | 1608 |      | ORG  | 680  | |
| 0680 | 00F2 | 000D| 1609 | POUT | LBL  | #0D  | |
| 0682 | 7F   | 0000| 1610 |      | LDI  | 0    | |
| 0683 | 1C41 | 0041| 1611 |      | IOL  | SOS  | OUTPUT>HIGH |
| 0685 | 17   |     | 1612 |      | INCB |      | |
| 0686 | 82   | 0682| 1613 |      | T    | POUT+2| LOOP, PRNTR CLK, RST LO, ENB HI |
| 0687 | 70   | 000F| 1614 |      | LDI  | 15   | |
| 0688 | 19   |     | 1615 | POUTLP| XABL|      | A>BL |
| 0689 | 7E   | 0001| 1616 |      | LDI  | 1    | |
| 068A | 1B   |     | 1617 |      | LXA  |      | 1>X, INTEGRATOR RESET |
| 068B | 37   | 0   | 1618 |      | LD   |      | LD DIGIT |
| 068C | 1D   |     | 1619 |      | DOA  |      | OUTPUT |
| 068D | 0E   |     | 1620 |      | COMP |      | SET UP PARITY |
| 068E | 6F   |     | 1621 |      | CYS  |      | |
| 068F | 70   | 000F| 1622 |      | LDI  | 15   | |
| 0690 | 6F   |     | 1623 |      | CYS  |      | |
| 0691 | 72   | 000D| 1624 |      | LDI  | 13   | |
| 0692 | 6F   |     | 1625 |      | CYS  |      | |
| 0693 | 77   | 0008| 1626 |      | LDI  | 8    | 8>A FOR 15 PARITY |
| 0694 | 05   |     | 1627 |      | RTN  |      | |
| 0695 | 1B   |     | 1628 | PARITY| LXA |      | PARITY>X |
| 0696 | 11   |     | 1629 |      | LABL |      | BL>A |
| 0697 | 1A   |     | 1630 |      | XAX  |      | PARITY>A, BL>X |
| 0698 | 00F3 | 000C| 1631 |      | LBL  | #0C  | |
| 069A | 1C41 | 0041| 1632 |      | IOL  | SOS  | OUTPUT PARITY |
| 069C | 17   |     | 1633 |      | INCB |      | |
| 069D | 12   |     | 1634 |      | LAX  |      | DIGIT BL>A |
| 069E | 3F   | 0   | 1635 |      | EX   |      | DIGIT BL>RAM ADDR 0D |
| 069F | 77   | 0008| 1636 |      | LDI  | 8    | |
| 06A0 | E2   | 00E2| 1637 |      | TM   | >DLY,4| STROBE CLOCK,,4 MS DELAY |
| 06A1 | 7F   | 0000| 1638 |      | LDI  | 0    | |
| 06A2 | E2   | 00E2| 1639 |      | TM   | >DLY,4| REMOVE CLOCK,,4 MS DELAY |
| 06A3 | 30   | 7   | 1640 |      | LD   | 7    | DIGIT BL>A |
| 06A4 | 60   | 000F| 1641 |      | ADI  | 15   | DEC BL, SKIP NOT 15 |
| 06A5 | A7   | 06A7| 1642 |      | T    | *+2  | DONE |
| 06A6 | 88   | 0688| 1643 |      | T    | POUTLP| LOOP |
| 06A7 | 00F1 | 000E| 1644 |      | LBL  | #0E  | |
| 06A9 | 77   | 0008| 1645 |      | LDI  | 8    | |
| 06AA | 1C41 | 0041| 1646 |      | IOL  | SOS  | REMOVE PRINTER DATA ENB |
| 06AC | 00F4 | 000B| 1647 |      | LBL  | #0B  | |
| 06AE | 14   |     | 1648 | CKPRNT| SKF2|      | SKIP IF HAVE PRINT COMMAND |
| 06AF | B2   | 06B2| 1649 |      | T    | RSTPR>| NO PRINT |
| 06B0 | 56C0 | 06C0| 1650 |      | TL   | #6C0 | |

PPS ASSEMBLY LISTING

| ADDR | CODE | ARG | STNO | | STMT | | |
|------|------|-----|------|--------|------|--------|---|
| 06B2 | 56D0 | 06D0 | 1651 | RSTPR> | TL | RSTPTR | |
| | | | 1652 | | | | |
| | | | 1653 | | ORG | 6C0 | |
| 06C0 | 7F | 0000 | 1654 | | LDI | 0 | PRINT |
| 06C1 | 1C41 | 0041 | 1655 | | IOL | SOS | OUTPUT PRINT COMMAND |
| 06C3 | C4 | 00C4 | 1656 | | LB | >09 | |
| 06C4 | 7B | 0004 | 1657 | | LDI | 4 | |
| 06C5 | 3F | 0 | 1658 | | EX | | MID TIMER=4 |
| 06C6 | E0 | 00E0 | 1659 | | TM | >DELAY | 5.0 MS DELAY |
| 06C7 | 77 | 0008 | 1660 | | LDI | 8 | |
| 06C8 | 1C41 | 0041 | 1661 | | IOL | SOS | INPUT PRINT COMPLETE |
| 06CA | 1E | | 1662 | | SKZ | | SKIP IF PRINT COMPLETE |
| 06CB | 87 | 06C7 | 1663 | | T | *-4 | HOLD HERE UNTIL COMPLETE |
| 06CC | 17 | | 1664 | | INCB | | |
| 06CD | 77 | 0008 | 1665 | | LDI | 8 | |
| 06CE | 1C41 | 0041 | 1666 | | IOL | SOS | REMOVE PRINT COMMAND |
| 06D0 | 00F0 | 000F | 1667 | RSTPTR | LBL | #0F | |
| 06D2 | 77 | 0008 | 1668 | | LDI | 8 | |
| 06D3 | 1C41 | 0041 | 1669 | | IOL | SOS | RESET PRINTER |
| 06D5 | 1CFA | 00FA | 1670 | KEYBD | IOL | KTS | RD KEYBOARD STROBE |
| 06D7 | 0E | | 1671 | | COMP | | |
| 06D8 | 00B8 | 0047 | 1672 | | LBL | #47 | |
| 06DA | 67 | 0008 | 1673 | | ADI | 8 | ADD 8,SKIP IF KEY ENTERED |
| 06DB | BA | 06FA | 1674 | | T | NOKEY> | NO KEY ENTERED |
| 06DC | 2F | 0 | 1675 | | EXD | | STORE KEYBOARD STROBE |
| 06DD | 1CFC | 00FC | 1676 | | IOL | KTR | RD KEYBOARD RETURN |
| 06DF | 0E | | 1677 | | COMP | | |
| 06E0 | 67 | 0008 | 1678 | | ADI | 8 | ADD 8,SKIP IF ERROR |
| 06E1 | 67 | 0008 | 1679 | | ADI | 8 | RESTORE,WILL SKIP |
| 06E2 | BC | 06FC | 1680 | | T | KERR> | KEYBOARD ERROR |
| 05E3 | 3F | 0 | 1681 | | EX | | STORE KEYBOARD RETURN |
| 06E4 | 7B | 0004 | 1682 | | LDI | 4 | 4>A |
| 06E5 | 0D | | 1683 | | AND | | ,AND,WITH RETURN,A>0 IF DIG |
| 06E6 | 1E | | 1684 | | SKZ | | SKIP IF DIGIT KEY |
| 06E7 | BE | 06FE | 1685 | | T | KCMND> | COMMAND KEY |
| 06E8 | 7D | 0002 | 1686 | | LDI | 2 | 2>A |
| 06E9 | 0D | | 1687 | | AND | | ,AND,WITH RETURN,A>2:8,9 |
| 06EA | 1E | | 1688 | | SKZ | | SKIP NOT 8 OR 9 KEY |
| 06EB | B1 | 06F1 | 1689 | | T | KBD1 | 8 OR 9 KEY |
| 06EC | 7E | 0001 | 1690 | | LDI | 1 | 1>A |
| 06ED | 0D | | 1691 | | AND | | ,AND,WITH RETURN,A>1:4,5,6,7 |
| 06EE | 1E | | 1692 | | SKZ | | SKIP NOT 4,5,6,7 KEY |
| 06EF | 7B | 0004 | 1693 | | LDI | 4 | 4,5,6,7 KEY |
| 06F0 | 7F | 0000 | 1694 | | LDI | 0 | 0,1,2,3 KEY |
| 06F1 | 77 | 0008 | 1695 | KBD1 | LDI | 8 | 8,9 KEY |
| 06F2 | 17 | | 1696 | | INCB | | |
| 06F3 | 0B | | 1697 | | AD | | ADD STROBE,HAVE DIGIT IN A |
| 06F4 | C4 | 00C4 | 1698 | | LB | >09 | |
| 06F5 | 3F | 0 | 1699 | | EX | | NEW DIGIT>RAM ADDR 09 |
| 06F6 | C3 | 00C3 | 1700 | | LB | >04 | |
| 06F7 | 37 | 0 | 1701 | | LD | | LD DIGIT TIMER |
| 06F8 | 5700 | 0700 | 1702 | | TL | #700 | |
| 06FA | 57E7 | 07E7 | 1703 | NOKEY> | TL | NOKEY | |
| 06FC | 500F | 000F | 1704 | KERR> | TL | KBERR | |
| 06FE | 5721 | 0721 | 1705 | KCMND> | TL | KBCMND | |
| | | | 1706 | | | | |
| | | | 1707 | | ORG | 700 | |
| 0700 | 1E | | 1708 | | SKZ | | SKIP IF TIMER NOT RUNNING |
| 0701 | 88 | 0708 | 1709 | | T | ENTDIG | TIMER RUNNING |
| 0702 | CD | 00CD | 1710 | | LB | >69 | |
| 0703 | 01CE | 01CE | 1711 | | TML | BLANK-1 | CLR PRICE ONLY |
| 0705 | C6 | 00C6 | 1712 | | LB | >13 | |
| 0706 | 7F | 0000 | 1713 | | LDI | 0 | |
| 0707 | 3F | 0 | 1714 | | EX | | CLR FACTOR |
| 0708 | 00AE | 0051 | 1715 | ENTDIG | LBL | #51 | |
| 070A | 37 | 0 | 1716 | | LD | | LD 5 DIGIT PRICE ENB |
| 070B | 0097 | 0068 | 1717 | | LBL | #68 | |
| 070D | 1E | | 1718 | | SKZ | | SKIP IF 4 DIGIT PRICING |
| 070E | 17 | | 1719 | | INCB | | 5 DIG PRICING |

PPS ASSEMBLY LISTING

| ADDR | CODE | ARG | STNO | | STMT | | |
|---|---|---|---|---|---|---|---|
| 070F | 37 | 0 | 1720 | | LD | | LD MSD PRICE DIGIT |
| 0710 | 1E | | 1721 | | SKZ | | SKIP IF 0 |
| 0711 | B9 | 0739 | 1722 | | T | KEYBD> | NOT 0, REFUSE NEW DIGIT |
| 0712 | C4 | 00C4 | 1723 | | LB | >09 | |
| 0713 | 79 | 0006 | 1724 | | LDI | 6 | 6>A |
| 0714 | 09 | | 1725 | | ADSK | | ADD NEW DIGIT |
| 0715 | 97 | 0717 | 1726 | | T | *+2 | =VALID (0-9) |
| 0716 | B9 | 0739 | 1727 | | T | KEYBD> | INVALID (10-15) |
| 0717 | 37 | 0 | 1728 | | LD | | RE-LD NEW DIGIT |
| 0718 | 009A | 0065 | 1729 | | LBL | #65 | |
| 071A | 3F | 0 | 1730 | | EX | | LESS SIG DIG>MEM, MORE SIG>A |
| 071B | 17 | | 1731 | | INCB | | |
| 071C | 4A | 000A | 1732 | | SKBI | 10 | SKIP AT END OF PRICE REG |
| 071D | 9A | 071A | 1733 | | T | *-3 | LOOP TO END OF PRICE REG |
| 071E | 75 | 000A | 1734 | | LDI | 10 | |
| 071F | 57D7 | 07D7 | 1735 | | TL | KBDUN-2 | START DIGIT TIMER |
| 0721 | 7E | 0001 | 1736 | KBCMND | LDI | 1 | 1>A |
| 0722 | 0D | | 1737 | | AND | | , AND, WITH RETURN |
| 0723 | 1E | | 1738 | | SKZ | | SKIP IF 0 |
| 0724 | 7B | 0004 | 1739 | | LDI | 4 | |
| 0725 | 7F | 0000 | 1740 | | LDI | 0 | |
| 0726 | 17 | | 1741 | | INCB | | |
| 0727 | 0B | | 1742 | | AD | | ADD STROBE |
| 0728 | 0E | | 1743 | | COMP | | V>15,1/2>14,1/4>13,P>12,T>11 |
| 0729 | 6E | 0001 | 1744 | VFYCK | ADI | 1 | SKIP IF VERIFY |
| 072A | BD | 073D | 1745 | | T | 1/2CK> | |
| 072B | 1CF6 | 00F6 | 1746 | | IOL | KER | RESET KEYBOARD |
| 072D | C4 | 00C4 | 1747 | | LB | >09 | |
| 072E | 7D | 0002 | 1748 | | LDI | 2 | |
| 072F | 3F | 0 | 1749 | | EX | | |
| 0730 | 17 | | 1750 | | INCB | | |
| 0731 | 7C | 0003 | 1751 | | LDI | 3 | |
| 0732 | 3F | 0 | 1752 | | EX | | |
| 0733 | E0 | 00E0 | 1753 | | TM | >DELAY | DELAY 50MS FOR GPKD CYCLE |
| 0734 | 00E7 | 0018 | 1754 | | LBL | #18 | |
| 0736 | 37 | 0 | 1755 | | LD | | LD VERIFY TEST FLAG |
| 0737 | 67 | 0008 | 1756 | | ADI | 8 | SKIP IF VERIFY IN PROCESS |
| 0738 | BB | 073B | 1757 | | T | *+3 | 1ST PASS OF VERIFY |
| 0739 | 56D5 | 06D5 | 1758 | KEYBD> | TL | KEYBD | TIGHT LOOP DURING V HOLD |
| 073B | 5740 | 0740 | 1759 | | TL | #740 | |
| 073D | 575C | 075C | 1760 | 1/2CK> | TL | P1/2CK | |
| | | | 1761 | | | | |
| | | | 1762 | | ORG | 740 | |
| 0740 | 3B | 4 | 1763 | | EX | 4 | SET VERIFY TEST FLAG |
| 0741 | 37 | 0 | 1764 | | LD | | LD VERIFY MODE FLAG |
| 0742 | 0E | | 1765 | | COMP | | COM IT |
| 0743 | 3F | 0 | 1766 | | EX | | UPDATE FLAG |
| 0744 | 37 | 0 | 1767 | | LD | | RE-LD |
| 0745 | 1E | | 1768 | | SKZ | | SKIP IF WAS SET |
| 0746 | 70 | 000F | 1769 | | LDI | 15 | WAS CLR, TEST BLANKS |
| 0747 | 77 | 0008 | 1770 | | LDI | 8 | WAS SET, TEST BS |
| 0748 | 1B | | 1771 | | LXA | | TEST>X |
| 0749 | 0091 | 006E | 1772 | | LBL | #6E | |
| 074B | 12 | | 1773 | | LAX | | TEST>A |
| 074C | 2F | 0 | 1774 | | EXD | | LD DISPLAY REG WITH TEST |
| 074D | 8B | 074B | 1775 | | T | *-2 | LOOP TO BOTTOM |
| 074E | 00D9 | 0026 | 1776 | | LBL | #26 | |
| 0750 | 12 | | 1777 | | LAX | | TEST>A |
| 0751 | 0E | | 1778 | | COMP | | 15>0,8>7 |
| 0752 | 1E | | 1779 | | SKZ | | SKIP IF BLANKS |
| 0753 | 0E | | 1780 | | COMP | | RESTORE 8 |
| 0754 | 1B | | 1781 | | LXA | | LAMP TEST>X |
| 0755 | 12 | | 1782 | | LAX | | TEST>A |
| 0756 | 2F | 0 | 1783 | | EXD | | LD LAMP WITH TEST |
| 0757 | 95 | 0755 | 1784 | | T | *-2 | LOOP TO LAMP REG END |
| 0758 | C3 | 00C3 | 1785 | | LB | >04 | |
| 0759 | 7F | 0000 | 1786 | | LDI | 0 | |
| 075A | 3F | 0 | 1787 | | EX | | CLR DIGIT TIMER |
| 075B | E7 | 00E7 | 1788 | | TM | >OUTP> | GO TO OUTPUT |

PPS ASSEMBLY LISTING

| ADDR | CODE | ARG | STNO | | STMT | | |
|---|---|---|---|---|---|---|---|
| 075C | 6E | 0001 | 1789 | P1/2CK | ADI | 1 | SKIP IF PER 1/2 |
| 075D | AA | 076A | 1790 | | T | P1/4CK | |
| 075E | E4 | 00E4 | 1791 | | TM | >MODE | CK FOR BY COUNT |
| 075F | B4 | 0774 | 1792 | | T | P1/2 | NORMAL PER 1/2 |
| 0760 | CD | 00CD | 1793 | | LB | >69 | BY COUNT MODE |
| 0761 | 79 | 0006 | 1794 | | LDI | 6 | |
| 0762 | 1B | | 1795 | | LXA | | |
| 0763 | 7B | 0004 | 1796 | | LDI | 4 | |
| 0764 | D2 | 00D2 | 1797 | | TM | >MOV5 | MOVE PRICE TO TOTAL PRICE |
| 0765 | CD | 00CD | 1798 | | LB | >69 | |
| 0766 | 01CE | 01CE | 1799 | | TML | BLANK-1 | CLR PRICE ONLY |
| 0768 | 57D6 | 07D6 | 1800 | FDUN> | TL | FCNDUN | |
| 076A | 6E | 0001 | 1801 | P1/4CK | ADI | 1 | SKIP IF PER 1/4 |
| 076B | B7 | 0777 | 1802 | | T | PRNCK | |
| 076C | E4 | 00E4 | 1803 | | TM | >MODE | CK FOR PRE-PAK,BY COUNT |
| 076D | AF | 076F | 1804 | | T | *+2 | NORMAL OR PRE-PAK |
| 076E | A8 | 0768 | 1805 | | T | FDUN> | BY COUNT MODE |
| 076F | DC | 00DC | 1806 | | TM | >FCPTY | A=1:30LB,2:6KG,5:15KG |
| 0770 | 61 | 000E | 1807 | | ADI | 14 | SKIP IF 6KG OR 15KG |
| 0771 | B3 | 0773 | 1808 | | T | *+2 | 30LB,PER 1/4 LEGAL |
| 0772 | A8 | 0768 | 1809 | | T | FDUN> | METRIC,PER 1/4 ILLEGAL |
| 0773 | 7B | 0004 | 1810 | | LDI | 4 | |
| 0774 | 7D | 0002 | 1811 | P1/2 | LDI | 2 | |
| 0775 | 57E1 | 07E1 | 1812 | | TL | ENTFCT | GO ENTER FACTOR |
| 0777 | 6E | 0001 | 1813 | PRNCK | ADI | 1 | SKIP IF PRINT KEY |
| 0778 | BC | 077C | 1814 | | T | TARECK | |
| 0779 | 31 | 6 | 1815 | | LD | 6 | DUMMY TO ADDR 27 |
| 077A | 77 | 0008 | 1816 | | LDI | 8 | |
| 077B | 3F | 0 | 1817 | | EX | | SET PRINT FLAG |
| 077C | 6E | 0001 | 1818 | TARECK | ADI | 1 | SKIP IF TARE KEY |
| 077D | A8 | 0768 | 1819 | | T | FDUN> | |
| 077E | 5780 | 0780 | 1820 | | TL | #780 | |
| | | | 1821 | | | | |
| | | | 1822 | | ORG | 780 | |
| 0780 | C0 | 00C0 | 1823 | | LB | >00 | |
| 0781 | 37 | 0 | 1824 | | LD | | LD MOTION FLAG |
| 0782 | 1E | | 1825 | | SKZ | | SKIP NO MOTION |
| 0783 | 9B | 079B | 1826 | | T | FDUN>> | NO T ALLOWED IN MOTN |
| 0784 | C3 | 00C3 | 1827 | | LB | >04 | |
| 0785 | 37 | 0 | 1828 | | LD | | LD DIGIT TIMER |
| 0786 | 1E | | 1829 | | SKZ | | SKIP NOT RUNNING |
| 0787 | 8F | 078F | 1830 | | T | CKOT | RUNNING,CK FOR 0-T SEQ |
| 0788 | C5 | 00C5 | 1831 | | LB | >12 | |
| 0789 | 36 | 1 | 1832 | | LD | 1 | LD NET FLAG |
| 078A | 1E | | 1833 | | SKZ | | SKIP NOT NET |
| 078B | 9B | 079B | 1834 | | T | FDUN>> | NO T ALLOWED IN NET |
| 078C | 17 | | 1835 | | INCB | | |
| 078D | 57D0 | 07D0 | 1836 | | TL | TDUN-2 | SET MANUAL TARE FLAG |
| 078F | CD | 00CD | 1837 | CKOT | LB | >69 | |
| 0790 | 7F | 0000 | 1838 | | LDI | 0 | |
| 0791 | 1B | | 1839 | | LXA | | |
| 0792 | 7A | 0005 | 1840 | | LDI | 5 | |
| 0793 | 0129 | 0129 | 1841 | | TML | MAGLP-1 | CK FOR PRICE OF 0 |
| 0795 | 6E | 0001 | 1842 | | ADI | 1 | ALL 0 RTN |
| 0796 | 9F | 079F | 1843 | | T | KBTARE | PRICE NOT 0,KEYBOARD TARE |
| 0797 | CA | 00CA | 1844 | | LB | >33 | |
| 0798 | 37 | 0 | 1845 | | LD | | LD AUTO CLR FLAG |
| 0799 | 60 | 000F | 1846 | | ADI | 15 | ADD 15,SKIP IF,GE,10 INC NET |
| 079A | 9D | 079D | 1847 | | T | *+3 | ,LT, 10 INC NET,0-T LEGAL |
| 079B | 57D6 | 07D6 | 1848 | FDUN>> | TL | FCNDUN | |
| 079D | 5011 | 0011 | 1849 | | TL | RESET | LEGAL 0-T,RESET |
| 079F | C1 | 00C1 | 1850 | KBTARE | LB | >01 | |
| 07A0 | 37 | 0 | 1851 | | LD | | LD ZERO GRAD FLAG |
| 07A1 | 67 | 0008 | 1852 | | ADI | 8 | ADD 8,SKIP IF IN ZERO GRAD |
| 07A2 | 9B | 079B | 1853 | | T | FDUN>> | NO KB TARE ALLOWED OFF 0 |
| 07A3 | C5 | 00C5 | 1854 | | LB | >12 | |
| 07A4 | 37 | 0 | 1855 | | LD | | LD NET FLAG |
| 07A5 | 1E | | 1856 | | SKZ | | SKIP NOT NET |

PPS ASSEMBLY LISTING

| ADDR | CODE | ARG | STNO | | STMT | | |
|---|---|---|---|---|---|---|---|
| 07A6 | 93 | 079B | 1857 | | T | FDUN>> | NO T ALLOWED IN NET |
| 07A7 | DC | 00DC | 1858 | | TM | >FCPTY | |
| 07A8 | 00AA | 0055 | 1859 | | LBL | #55 | |
| 07A4 | 34 | 3 | 1860 | | LD | 3 | LD KEYBOARD TARE ENB |
| 07AB | 67 | 0008 | 1861 | | ADI | 8 | ADD 8, SKIP IF ENABLED |
| 07AC | 9B | 079B | 1862 | | T | FDUN>> | NOT ENABLED |
| 07AD | 16 | | 1863 | | SKF1 | | SKIP NOT 15KG |
| 07AE | 83 | 0783 | 1864 | | T | KT15KG | 15KG |
| 07AF | 15 | | 1865 | | SKC | | SKIP NOT 6KG |
| 07B0 | B8 | 07B8 | 1866 | | T | KT6KG | 6KG |
| 07B1 | 7E | 0001 | 1867 | | LDI | 1 | 30LB, CK TARE, LT, 10LB |
| 07B2 | BD | 07BD | 1868 | | T | TL7CO> | GO CK TARE MAGNITUDE |
| 07B3 | 37 | 0 | 1869 | KT15KG | LD | | LD PRICE LSD |
| 07B4 | 1E | | 1870 | | SKZ | | OK IF 0 |
| 07B5 | 64 | 000B | 1871 | | ADI | 11 | |
| 07B6 | B7 | 07B7 | 1872 | | T | *+1 | |
| 07B7 | BA | 07BA | 1873 | | T | KT6KG+2 | OK IF 0 OR 5 |
| 07B8 | 7E | 0001 | 1874 | KT6KG | LDI | 1 | |
| 07B9 | 0D | | 1875 | | AND | | CK FOR EVEN DIGIT |
| 07BA | 1E | | 1876 | | SKZ | | OK:EVEN(6KG)=0,5(15KG) |
| 07BB | 9B | 079B | 1877 | | T | FDUN>> | |
| 07BC | 12 | | 1878 | CKMKBT | LAX | | CAPACITY DIGIT>A |
| 07BD | 57C0 | 07C0 | 1879 | TL7CO> | TL | #7C0 | |
| | | | 1880 | | | | |
| | | | 1881 | | ORG | 7C0 | |
| 07C0 | 16 | | 1882 | | SKF1 | | SKIP NOT 15KG |
| 07C1 | 7B | 0004 | 1883 | | LDI | 4 | 15KG, CK TARE, LT, 4KG |
| 07C2 | 1B | | 1884 | | LXA | | X=1:30LB, 6:6KG, 4:15KG |
| 07C3 | CD | 00CD | 1885 | | LB | >69 | |
| 07C4 | 7D | 0002 | 1886 | | LDI | 2 | |
| 07C5 | 0129 | 0129 | 1887 | | TML | MAGLP-1 | CK KBT MAGNITUDE, LE, 0X--- |
| 07C7 | 60 | 000F | 1888 | | ADI | 15 | ,LE,RTN,DEC DIFF,SKIP NOT 0 |
| 07C8 | 96 | 07D6 | 1889 | | T | FCNDUN | ,GT,RTN,IGNORE,GT,OR DIFF 0 |
| 07C9 | D8 | 00D8 | 1890 | ENTKBT | TM | >CLRT | CLR TARE |
| 07CA | CD | 00CD | 1891 | | LB | >69 | |
| 07CB | 7A | 0005 | 1892 | | LDI | 5 | |
| 07CC | D1 | 00D1 | 1893 | | TM | >MOV5X | ENTER KEYBOARD TARE |
| 07CD | C2 | 00C2 | 1894 | | LB | >02 | |
| 07CE | 70 | 000F | 1895 | | LDI | 15 | |
| 07CF | 3E | 1 | 1896 | | EX | 1 | SET TARE DONE |
| 07D0 | 77 | 0008 | 1897 | | LDI | 8 | |
| 07D1 | 3F | 0 | 1898 | | EX | | SET NET FLAG |
| 07D2 | D9 | 00D9 | 1899 | TDUN | TM | >CLRPR | CLR PRICE |
| 07D3 | CA | 00CA | 1900 | | LB | >33 | |
| 07D4 | 7F | 0000 | 1901 | | LDI | 0 | |
| 07D5 | 3F | 0 | 1902 | | EX | | CLR AUTO CLR FLAG |
| 07D6 | 7E | 0001 | 1903 | FCNDUN | LDI | 1 | SET DIG TIMER TO TIME OUT |
| 07D7 | C3 | 00C3 | 1904 | | LB | >04 | ON NEXT WGT READ PASS |
| 07D8 | 3F | 0 | 1905 | | EX | | BY LOADING IT WITH 1 |
| 07D9 | CC | 00CC | 1906 | KBDUN | LB | >57 | |
| 07DA | 70 | 000F | 1907 | | LDI | 15 | |
| 07DB | 3F | 0 | 1908 | | EX | | SET RECOMPUTE |
| 07DC | 17 | | 1909 | | INCB | | |
| 07DD | 7F | 0000 | 1910 | | LDI | 0 | |
| 07DE | 3F | 0 | 1911 | | EX | | CLR VERIFY MODE FLAG |
| 07DF | 56D5 | 06D5 | 1912 | | TL | KEYBD | |
| 07E1 | 00EC | 0013 | 1913 | ENTFCT | LBL | #13 | |
| 07E3 | 3F | 0 | 1914 | | EX | | FACTOR>FACTOR FLAG,FLAG>A |
| 07E4 | 1E | | 1915 | | SKZ | | SKIP NOT DONE BEFORE |
| 07E5 | 3F | 0 | 1916 | | EX | | REPLACE FACTOR DONE |
| 07E6 | 96 | 07D6 | 1917 | | T | FCNDUN | |
| 07E7 | 00E7 | 0018 | 1918 | NOKEY | LBL | #18 | |
| 07E9 | 7F | 0000 | 1919 | | LDI | 0 | |
| 07EA | 2A | 5 | 1920 | | EXD | 5 | CLR VERIFY TEST FLAG |
| 07EB | 70 | 000F | 1921 | | LDI | 15 | |
| 07EC | 2F | 0 | 1922 | | EXD | 0 | KEY STB>A,15>KEY STB |
| 07ED | 1E | | 1923 | | SKZ | | SKIP IF STROBE 0 |
| 07EE | B5 | 07F5 | 1924 | | T | RDSWS> | |
| 07EF | 7B | 0004 | 1925 | | LDI | 4 | 4>A |

PPS ASSEMBLY LISTING

| ADDR | CODE | ARG | STNO | | STMT | | |
|------|------|-----|------|------|------|------|------|
| 07F0 | 0C | | 1926 | | EOR | | EX-OR WITH KEY RTN |
| 07F1 | 1E | | 1927 | | SKZ | | SKIP IF VERIFY LAST |
| 07F2 | 85 | 07F5 | 1928 | | T | RDSWS> | |
| 07F3 | 501C | 001C | 1929 | | TL | RDSWS-2 | CLR PRICE IF VERIFY LAST |
| 07F5 | 501E | 001E | 1930 | RDSWS> | TL | RDSWS | |
| | | | 1931 | | | | |
| | | | 1932 | | ORG | 800 | |
| 0800 | 00BC | 0043 | 1933 | CKTOGL | LBL | #43 | |
| 0802 | 77 | 0008 | 1934 | | LDI | 8 | 8>A |
| 0803 | 0B | | 1935 | | AD | | ADD LB/KG SW,A>8:KG |
| 0804 | 1B | | 1936 | | LXA | | 8:KG,0:LB>X |
| 0805 | 17 | | 1937 | | INCB | | |
| 0806 | 32 | 5 | 1938 | | LD | 5 | LD 6KG ENB |
| 0807 | 1E | | 1939 | | SKZ | | SKIP NOT ENABLED |
| 0808 | 9E | 081E | 1940 | | T | SETTF-2 | ENABLED,SET KG,CLR TOGGLE |
| 0809 | 12 | | 1941 | | LAX | | RE-LD KG FLAG VALUE |
| 080A | 3F | 0 | 1942 | | EX | | UPDATE KG FLAG,PREV FLG>A |
| 080B | 0C | | 1943 | | EOR | | EX-OR PREV WITH NEW |
| 080C | 67 | 0008 | 1944 | | ADI | 8 | SKIP IF LB/KG JUST CHANGED |
| 080D | 9F | 081F | 1945 | | T | SETTF-1 | NO CHANGE,CLR TOGGLE FLAG |
| 080E | 00AD | 0052 | 1946 | | LBL | #52 | |
| 0810 | 30 | 7 | 1947 | | LD | 7 | LD LB/KG INTERLOCK ENB |
| 0811 | 67 | 0008 | 1948 | | ADI | 8 | SKIP IF INTERLOCKED |
| 0812 | A0 | 0820 | 1949 | | T | SETTF | NO INTLK,SET TOGGLE FLAG |
| 0813 | 37 | 0 | 1950 | | LD | | INTERLOCKED,LD NET LAMP |
| 0814 | 1E | | 1951 | | SKZ | | SKIP NOT NET MODE |
| 0815 | 9A | 081A | 1952 | | T | *+5 | NET,LB/KG CHANGE NOT LEGAL |
| 0816 | 1F | | 1953 | | DECB | | NOT NET |
| 0817 | 37 | 0 | 1954 | | LD | | LD ZERO LAMP |
| 0818 | 1E | | 1955 | | SKZ | | SKIP IF ZERO LAMP OFF |
| 0819 | A0 | 0820 | 1956 | | T | SETTF | ZERO LAMP ON,AND,NOT NET |
| 081A | 00EB | 0014 | 1957 | | LBL | #14 | ZERO LAMP OFF,OR,NET |
| 081C | 77 | 0008 | 1958 | | LDI | 8 | 8>A |
| 081D | 0B | | 1959 | | AD | | ADD KG FLAG TO,COM,TO PREV |
| 081E | 3F | 0 | 1960 | | EX | | RESTORE PREV KG FLAG |
| 081F | 7F | 0000 | 1961 | | LDI | 0 | 0>A TO CLR TOGGLE FLAG |
| 0820 | 77 | 0008 | 1962 | SETTF | LDI | 8 | 8>A TO SET TOGGLE FLAG |
| 0821 | 00EA | 0015 | 1963 | | LBL | #15 | |
| 0823 | 3F | 0 | 1964 | | EX | | SET OR CLR TOGGLE FLAG |
| 0824 | 37 | 0 | 1965 | | LD | | LD TOGGLE FLAG |
| 0825 | 67 | 0008 | 1966 | | ADI | 8 | SKIP IF LB/KG JUST CHANGED |
| 0826 | AA | 082A | 1967 | | T | CKRST> | NO CHANGE |
| 0827 | 21 | | 1968 | | SF2 | | SET FLG2 FOR A-Z CONVERSION |
| 0828 | 5840 | 0840 | 1969 | | TL | CNVT | |
| 082A | 58C6 | 08C6 | 1970 | CKRST> | TL | CKRST | |
| | | | 1971 | | | | |
| | | | 1972 | | ORG | 840 | |
| 0840 | DC | 00DC | 1973 | CNVT | TM | >FCPTY | DETERMINE CAPACITY |
| 0841 | 00E0 | 001F | 1974 | | LBL | #1F | ADDR ARI MSD |
| 0843 | 16 | | 1975 | | SKF1 | | SKIP IF 30 LB |
| 0844 | 8E | 084E | 1976 | | T | KGCNV | 15 KG SCALE |
| 0845 | 7E | 0001 | 1977 | | LDI | 1 | |
| 0846 | 2F | 0 | 1978 | | EXD | | ARI = 1----- |
| 0847 | 7E | 0001 | 1979 | | LDI | 1 | |
| 0848 | 2F | 0 | 1980 | | EXD | | ARI = 11---- |
| 0849 | 1F | | 1981 | | DECB | | ARI = 110--- |
| 084A | 7D | 0002 | 1982 | | LDI | 2 | |
| 084B | 2F | 0 | 1983 | | EXD | | ARI = 1102-- |
| 084C | 7C | 0003 | 1984 | | LDI | 3 | |
| 084D | 97 | 0857 | 1985 | | T | CNVT1 | GO SET ARI = 110230 |
| 084E | 1F | | 1986 | KGCNV | DECB | | ARI = 0----- |
| 084F | 76 | 0009 | 1987 | | LDI | 9 | |
| 0850 | 2F | 0 | 1988 | | EXD | | ARI = 09---- |
| 0851 | 1F | | 1989 | | DECB | | ARI = 090--- |
| 0852 | 78 | 0007 | 1990 | | LDI | 7 | |
| 0853 | 2F | 0 | 1991 | | EXD | | ARI = 0907-- |
| 0854 | 7E | 0001 | 1992 | | LDI | 1 | |
| 0855 | 2F | 0 | 1993 | | EXD | | ARI = 09071- |
| 0856 | 77 | 0008 | 1994 | | LDI | 8 | WANT ARI = 090718 |

PPS ASSEMBLY LISTING

| ADDR | CODE | ARG | STNO | | STMT | | |
|------|------|------|------|------|------|------|------|
| 0857 | 3F | 0 | 1995 | CNVT1 | EX | | ENTER FINAL CNVSN DIGIT |
| 0858 | 00BA | 0045 | 1996 | | LBL | #45 | ADDR AUTO ZERO REG |
| 085A | 14 | | 1997 | | SKF2 | | SKIP IF 1ST PASS:AUTO ZERO |
| 085B | 36 | 1 | 1998 | | LD | 1 | 2ND PASS,ADDR TARE REG |
| 085C | D4 | 00D4 | 1999 | | TM | >MULT | A-Z OR TARE X CNVSN FACTOR |
| 085D | 1F | | 2000 | | DECB | | |
| 085E | DD | 00DD | 2001 | | TM | >RNDOF | ROUND OFF RESULT |
| 085F | 00F5 | 000A | 2002 | | LBL | #0A | |
| 0861 | 14 | | 2003 | | SKF2 | | SKIP NOT 1ST PASS |
| 0862 | 7A | 0005 | 2004 | | LDI | 5 | 2ND PASS,DEST IS TARE |
| 0863 | 78 | 0004 | 2005 | | LDI | 4 | 1ST PASS,DEST IS AUTO ZERO |
| 0864 | D0 | 00D0 | 2006 | | TM | >MOVX | UPDATE AUTO ZERO OR TARE |
| 0865 | 14 | | 2007 | | SKF2 | | SKIP IF 1ST PASS |
| 0866 | BA | 087A | 2008 | | T | PRCNV> | 2ND PASS,DONE |
| 0867 | 25 | | 2009 | | RF2 | | RESET FLG2 FOR 2ND PASS |
| 0868 | DC | 00DC | 2010 | CNVTAR | TM | >FCPTY | DETERMINE CAPACITY |
| 0869 | 00E0 | 001F | 2011 | | LBL | #1F | |
| 086B | 16 | | 2012 | | SKF1 | | SKIP IF 30 LB |
| 086C | B7 | 0877 | 2013 | | T | KGTCNV | 15 KG |
| 086D | 1F | | 2014 | | DECB | | 30 LB,ARI = 0----- |
| 086E | 7D | 0002 | 2015 | | LDI | 2 | |
| 086F | 2F | 0 | 2016 | | EXD | | ARI = 02---- |
| 0870 | 7D | 0002 | 2017 | | LDI | 2 | |
| 0871 | 2F | 0 | 2018 | | EXD | | ARI = 022--- |
| 0872 | 1F | | 2019 | | DECB | | ARI = 0220-- |
| 0873 | 78 | 0004 | 2020 | | LDI | 4 | |
| 0874 | 2F | 0 | 2021 | | EXD | | ARI = 02204- |
| 0875 | 79 | 0006 | 2022 | | LDI | 6 | WANT ARI = 022046 |
| 0876 | 97 | 0857 | 2023 | | T | CNVT1 | GO CONVERT TARE |
| 0877 | 78 | 0004 | 2024 | KGTCNV | LDI | 4 | 15 KG |
| 0878 | 5880 | 0880 | 2025 | | TL | #880 | |
| 087A | 588C | 088C | 2026 | PRCNV> | TL | PRCNVT | |
| | | | 2027 | | | | |
| | | | 2028 | | ORG | 880 | |
| 0880 | 2F | 0 | 2029 | | EXD | | ARI = 4----- |
| 0881 | 7A | 0005 | 2030 | | LDI | 5 | |
| 0882 | 2F | 0 | 2031 | | EXD | | ARI = 45---- |
| 0883 | 7C | 0003 | 2032 | | LDI | 3 | |
| 0884 | 2F | 0 | 2033 | | EXD | | ARI = 453--- |
| 0885 | 7A | 0005 | 2034 | | LDI | 5 | |
| 0886 | 2F | 0 | 2035 | | EXD | | ARI = 4535-- |
| 0887 | 76 | 0009 | 2036 | | LDI | 9 | |
| 0888 | 2F | 0 | 2037 | | EXD | | ARI = 45359- |
| 0889 | 7D | 0002 | 2038 | | LDI | 2 | WANT ARI = 453592 |
| 088A | 5857 | 0857 | 2039 | | TL | CNVT1 | |
| 088C | 00BF | 0040 | 2040 | PRCNVT | LBL | #40 | |
| 088E | 37 | 0 | 2041 | | LD | | LD PRICE CONVERT ENB |
| 088F | 1E | | 2042 | | SKZ | | SKIP NOT ENABLED |
| 0890 | 94 | 0894 | 2043 | | T | *+4 | ENABLED |
| 0891 | D9 | 00D9 | 2044 | NOCNVT | TM | >CLRPR | CLR PRICE,TOTAL PRICE |
| 0892 | 58C6 | 08C6 | 2045 | | TL | CKRST | |
| 0894 | CF | 00CF | 2046 | | LB | >7A | |
| 0895 | D7 | 00D7 | 2047 | | TM | >CLEAR | CLR TEMP REG |
| 0896 | CD | 00CD | 2048 | | LB | >69 | |
| 0897 | 78 | 0007 | 2049 | | LDI | 7 | |
| 0898 | 1B | | 2050 | | LXA | | |
| 0899 | 71 | 000E | 2051 | | LDI | 14 | |
| 089A | D2 | 00D2 | 2052 | | TM | >MOV5 | MOVE PRICE TO TEMP REG |
| 089B | DC | 00DC | 2053 | | TM | >FCPTY | DETERMINE CAPACITY |
| 089C | 00E0 | 001F | 2054 | | LBL | #1F | |
| 089E | 16 | | 2055 | | SKF1 | | SKIP IF 30 LB |
| 089F | BE | 089E | 2056 | | T | KGPCV> | 15 KG |
| 08A0 | 1F | | 2057 | | DECB | | 30 LB,ARI = 0----- |
| 08A1 | 78 | 0004 | 2058 | | LDI | 4 | |
| 08A2 | 2F | 0 | 2059 | | EXD | | ARI = 04---- |
| 08A3 | 7A | 0005 | 2060 | | LDI | 5 | |
| 08A4 | 2F | 0 | 2061 | | EXD | | ARI = 045--- |
| 08A5 | 7C | 0003 | 2062 | | LDI | 3 | |
| 08A6 | 2F | 0 | 2063 | | EXD | | ARI = 0453-- |

PPS ASSEMBLY LISTING

| ADDR | CODE | ARG | STNO | | STMT | | |
|------|------|-----|------|--|------|--|--|
| 08A7 | 7A | 0005 | 2064 | | LDI | 5 | |
| 08A8 | 2F | 0 | 2065 | | EXD | | ARI = 04535- |
| 08A9 | 76 | 0009 | 2066 | | LDI | 9 | WANT ARI = 045359 |
| 08AA | 3F | 0 | 2067 | CNVT2 | EX | | ENTER FINAL CONVERSION DIG |
| 08AB | 008A | 0075 | 2068 | | LBL | #75 | |
| 08AD | D4 | 00D4 | 2069 | | TM | >MULT | PRICE X CONVERSION FACTOR |
| 08AE | 1F | | 2070 | | DECB | | |
| 08AF | DD | 00DD | 2071 | | TM | >RNDOF | ROUND OFF RESULT |
| 08B0 | 00AE | 0051 | 2072 | | LBL | #51 | |
| 08B2 | 37 | 0 | 2073 | | LD | | LD 5 DIGIT UNIT PRICE ENB |
| 08B3 | 00F0 | 000F | 2074 | | LBL | #0F | ADDR 5 DIGIT RESULT MSD+1 |
| 08B5 | 67 | 0008 | 2075 | | ADI | 8 | SKIP IF 5 DIGIT PRICE |
| 08B6 | 1F | | 2076 | | DECB | | 4 DIGIT PRICE,DECR ADDR |
| 08B7 | 37 | 0 | 2077 | CNVT3 | LD | | LD ADDRESSED RESULT DIGIT |
| 08B8 | 1E | | 2078 | | SKZ | | SKIP IF DIGIT 0 |
| 08B9 | 91 | 0891 | 2079 | | T | NOCNVT | DIG NOT 0,CANNOT CONVERT |
| 08BA | 17 | | 2080 | | INCB | | ADDR NEXT DIGIT,SKIP DONE |
| 08BB | 87 | 08B7 | 2081 | | T | CNVT3 | NOT DONE,LOOP |
| 08BC | 58C0 | 08C0 | 2082 | | TL | #8C0 | |
| 08BE | 58CA | 08CA | 2083 | KGPCV> | TL | KGPCNV | |
| | | | 2084 | | | | |
| | | | 2085 | | ORG | 8C0 | |
| 08C0 | 00F1 | 000E | 2086 | | LBL | #0E | |
| 08C2 | 79 | 0006 | 2087 | | LDI | 6 | |
| 08C3 | 1B | | 2088 | | LXA | | |
| 08C4 | 76 | 0009 | 2089 | | LDI | 9 | |
| 08C5 | D2 | 00D2 | 2090 | | TM | >MOV5 | MOVE RESULT TO PRICE |
| 08C6 | C3 | 00C3 | 2091 | CKRST | LB | >04 | |
| 08C7 | 37 | 0 | 2092 | | LD | | LD DIGIT TIMER |
| 08C8 | 5049 | 0049 | 2093 | | TL | CKRST1 | |
| 08CA | 7D | 0002 | 2094 | KGPCNV | LDI | 2 | 15 KG |
| 08CB | 2F | 0 | 2095 | | EXD | | ARI = 2----- |
| 08CC | 7D | 0002 | 2096 | | LDI | 2 | |
| 08CD | 2F | 0 | 2097 | | EXD | | ARI = 22---- |
| 08CE | 1F | | 2098 | | DECB | | ARI = 220--- |
| 08CF | 73 | 0004 | 2099 | | LDI | 4 | |
| 08D0 | 2F | 0 | 2100 | | EXD | | ARI = 2204-- |
| 08D1 | 79 | 0006 | 2101 | | LDI | 6 | WANT ARI = 220460 |
| 08D2 | 58AA | 08AA | 2102 | | TL | CNVT2 | GO CONVERT PRICE |
| 08D4 | DC | 00DC | 2103 | SETDI | TM | >FCPTY | DETERMINE CAPACITY |
| 08D5 | 00E2 | 001D | 2104 | | LBL | #1D | ADDR ARI MSD-2 |
| 08D7 | 15 | | 2105 | | SKC | | SKIP NOT 6KG |
| 08D8 | 9C | 08DC | 2106 | | T | *+4 | 6KG |
| 08D9 | 16 | | 2107 | | SKF1 | | SKIP NOT 15KG |
| 08DA | 7E | 0001 | 2108 | | LDI | 1 | 15KG |
| 08DB | 7E | 0001 | 2109 | | LDI | 1 | 30LB |
| 08DC | 7C | 0003 | 2110 | | LDI | 3 | 6KG |
| 08DD | 2F | 0 | 2111 | | EXD | | DIG>ARI MSD-2 |
| 08DE | 15 | | 2112 | | SKC | | SKIP NOT 6KG |
| 08DF | A3 | 08E3 | 2113 | | T | *+4 | 6KG |
| 08E0 | 16 | | 2114 | | SKF1 | | SKIP NOT 15KG |
| 08E1 | 7C | 0003 | 2115 | | LDI | 3 | 15KG |
| 08E2 | 7A | 0005 | 2116 | | LDI | 5 | 30LB |
| 08E3 | 7B | 0004 | 2117 | | LDI | 4 | 6KG |
| 08E4 | 2F | 0 | 2118 | | EXD | | DIG>ARI LSD+2 |
| 08E5 | 15 | | 2119 | | SKC | | SKIP NOT 6KG |
| 08E6 | AA | 08EA | 2120 | | T | *+4 | 6KG |
| 08E7 | 16 | | 2121 | | SKF1 | | SKIP NOT 15KG |
| 08E8 | 79 | 0006 | 2122 | | LDI | 6 | 15KG |
| 08E9 | 7F | 0000 | 2123 | | LDI | 0 | 30LB |
| 08EA | 7F | 0000 | 2124 | | LDI | 0 | 6KG |
| 08EB | 2F | 0 | 2125 | | EXD | | DIG>ARI LSD+1 |
| 08EC | 15 | | 2126 | | SKC | | SKIP NOT 6KG |
| 08ED | B1 | 08F1 | 2127 | | T | *+4 | 6KG |
| 08EE | 16 | | 2128 | | SKF1 | | SKIP NOT 15KG |
| 08EF | 7D | 0002 | 2129 | | LDI | 2 | 15KG |
| 08F0 | 7D | 0002 | 2130 | | LDI | 2 | 30LB |
| 08F1 | 7A | 0005 | 2131 | | LDI | 5 | 6KG |
| 08F2 | 3F | 0 | 2132 | | EX | | FINAL DIG>ARI LSD |

PPS ASSEMBLY LISTING

| ADDR | CODE | ARG | STNO | | STMT | | |
|---|---|---|---|---|---|---|---|
| 08F3 | 5368 | 0368 | 2133 | TL | SUBDI | | GO SUBT DIGITAL INITIAL |
| | | | 2134 | | | | |
| | | | 2135 | | ORG | 900 | |
| | | | 2136 | * TPRDS SUBROUTINE - SETS B ADDR TO CORRECT DIGIT | | | |
| | | | 2137 | * FOR TOTAL PRICE INITIAL ROUND OFF IN RESULT | | | |
| | | | 2138 | * TPRDS - TOTAL PRICE ROUND OFF DIGIT SEARCH | | | |
| | | | 2139 | * ON RETURN: ROUND OFF DIGIT BL IS IN A | | | |
| | | | 2140 | * B ADDR IS LOADED FOR RNDOFF | | | |
| 0900 | 00BA | 0045 | 2141 | TPRDS | LBL | #45 | |
| 0902 | 37 | 0 | 2142 | | LD | | UK SCALE ENB>A |
| 0903 | 1B | | 2143 | | LXA | | A>X |
| 0904 | 00BC | 0043 | 2144 | | LBL | #43 | |
| 0906 | 37 | 0 | 2145 | | LD | | LD 30LB SCALE ENB |
| 0907 | 00F8 | 0007 | 2146 | | LBL | #07 | ADDR NON-UK METRIC ROUND OFF |
| 0909 | 1E | | 2147 | | SKZ | | SKIP IF NOT 30LB SCALE |
| 090A | 1F | | 2148 | | DECB | | ADDR NON-UK LB ROUND OFF |
| 090B | 12 | | 2149 | | LAX | | RE-LD UK SCALE ENB |
| 090C | 1E | | 2150 | | SKZ | | SKIP IF NOT UK SCALE |
| 090D | 1F | | 2151 | | DECB | | ADDR UK METRIC OR LB RND OFF |
| 090E | 11 | | 2152 | | LABL | | FINAL BL>A |
| 090F | 05 | | 2153 | | RTN | | RETURN |
| | | | 2154 | * SETRCP SUBROUTINE - SETS RECOMPUTE FLAG | | | |
| | | | 2155 | * ON RETURN PRINT FLAG IS ADDRESSED | | | |
| 0910 | CC | 00CC | 2156 | SETRCP | LB | >57 | |
| 0911 | 70 | 000F | 2157 | | LDI | 15 | |
| 0912 | 38 | 7 | 2158 | | EX | 7 | SET RECOMPUTE FLAG |
| 0913 | 05 | | 2159 | | RTN | | |
| | | | 2160 | * CRCTAZ SUBROUTINE - CORRECTS AUTO ZERO OR TARE | | | |
| | | | 2161 | * REGISTER BY ONE COUNT TO BRING WGT TOWARD 0 | | | |
| 0914 | D6 | 0006 | 2162 | CRCAZ | TM | >ARICL | CLR ARI |
| 0915 | C7 | 00C7 | 2163 | | LB | >1A | |
| 0916 | 7E | 0001 | 2164 | | LDI | 1 | 1>A |
| 0917 | 2C | 3 | 2165 | | EXD | 3 | CORRECTION OF 1>ARI LSD |
| 0918 | 34 | 3 | 2166 | | LD | 3 | LD WGT SIGN |
| 0919 | 0E | | 2167 | | COMP | | COM FOR AUTO ZERO CORRECTION |
| 091A | 3F | 0 | 2168 | | EX | | ,COM,WGT SIGN>ARI SIGN |
| 091B | 00BE | 0041 | 2169 | | LBL | #41 | |
| 091D | 16 | | 2170 | | SKF1 | | SKIP IF GROSS CORRECTION |
| 091E | 36 | 1 | 2171 | | LD | 1 | NET,ADDR TARE REG |
| 091F | 03 | 00D3 | 2172 | | TM | >SUBT | CORRECT AUTO-ZERO BY 1 |
| 0920 | 16 | | 2173 | | SKF1 | | SKIP IF GROSS CORRECTION |
| 0921 | 05 | | 2174 | | RTN | | NET,RETURN |
| 0922 | C3 | 00C3 | 2175 | | LB | >04 | |
| 0923 | 522F | 022F | 2176 | | TL | MAXAZ | CK FOR,LT,400 CNTS |
| | | | 2177 | | END | | |

0 ERRORS DETECTED

| DEF | SYMBOL | REFERENCES | | | | | | | |
|---|---|---|---|---|---|---|---|---|---|
| 63 | >ADDC | 771 | 797 | 1180 | | | | | |
| 55 | >ARICL | 380 | 720 | 776 | 788 | 820 | 956 | 1038 | 1297 | 2162 |
| 59 | >BLANK | 919 | 921 | 971 | 1274 | 1408 | | | |
| 56 | >CLEAR | 543 | 719 | 743 | 765 | 924 | 1299 | 1311 | 2047 |
| 58 | >CLRPR | 553 | 999 | 1014 | 1050 | 1114 | 1326 | 1899 | 2044 |
| 57 | >CLRT | 551 | 922 | 1113 | 1890 | | | | |
| 71 | >CRTAZ | 987 | 1085 | | | | | | |
| 65 | >DELAY | 472 | 638 | 1659 | 1753 | | | | |
| 67 | >DLY,4 | 1637 | 1639 | | | | | | |
| 61 | >FCPTY | 614 | 989 | 1012 | 1064 | 1089 | 1122 | 1152 | 1204 | 1529 | 1806 |
| | | 1858 | 1973 | 2010 | 2053 | 2103 | | | |
| 54 | >MAGCK | 413 | 437 | 827 | 912 | 975 | 1025 | 1057 | 1206 | 1324 | 1405 |
| 69 | >MODE | 610 | 1217 | 1271 | 1584 | 1791 | 1803 | | |
| 68 | >MOVPR | 1312 | 1352 | | | | | | |
| 49 | >MOVX | 419 | 763 | 775 | 804 | 819 | 883 | 886 | 891 | 955 | 1041 |
| | | 1054 | 1088 | 2006 | | | | | |

PPS ASSEMBLY LISTING

| DEF | SYMBOL | REFERENCES | | | | | | | | |
|---|---|---|---|---|---|---|---|---|---|---|
| 51 | >MOV5 | 1344 | 1361 | 1423 | 1441 | 1448 | 1569 | 1581 | 1797 | 2052 | 2090 |
| 50 | >MOV5X | 738 | 756 | 786 | 814 | 994 | 1183 | 1433 | 1553 | 1893 | |
| 53 | >MULT | 733 | 754 | 784 | 812 | 992 | 1314 | 1372 | 1999 | 2069 | |
| 72 | >OUTP> | 925 | 1327 | 1788 | | | | | | | |
| 62 | >RNDOF | 1157 | 1377 | 2001 | 2071 | | | | | | |
| 70 | >SETRC | 552 | 840 | 1049 | 1221 | 1335 | 1350 | | | | |
| 66 | >SUBL | 1081 | 1143 | 1199 | | | | | | | |
| 52 | >SUBT | 761 | 773 | 802 | 817 | 822 | 881 | 889 | 953 | 967 | 1052 |
| | | 1093 | 2172 | | | | | | | | |
| 60 | >TPRDS | 1373 | 1381 | 1385 | 1392 | 1415 | | | | | |
| 64 | >UDOWT | 918 | 1220 | | | | | | | | |
| 31 | >00 | 566 | 830 | 934 | 1008 | 1200 | 1823 | | | | |
| 32 | >01 | 977 | 1028 | 1850 | | | | | | | |
| 33 | >02 | 598 | 1277 | 1894 | | | | | | | |
| 34 | >04 | 314 | 1700 | 1785 | 1827 | 1904 | 2091 | 2175 | | | |
| 35 | >09 | 465 | 615 | 1076 | 1086 | 1134 | 1343 | 1512 | 1656 | 1698 | 1723 |
| | | 1747 | | | | | | | | | |
| 38 | >1A | 723 | 746 | 764 | 768 | 779 | 791 | 805 | 1039 | 1078 | 1140 |
| | | 1308 | 2163 | | | | | | | | |
| 36 | >12 | 930 | 1042 | 1059 | 1831 | 1854 | | | | | |
| 37 | >13 | 1301 | 1333 | 1555 | 1712 | | | | | | |
| 39 | >21 | 760 | 772 | 880 | 888 | 915 | 966 | 1092 | 1517 | | |
| 40 | >29 | 439 | 1031 | 1310 | | | | | | | |
| 41 | >33 | 544 | 1095 | 1844 | 1900 | | | | | | |
| 42 | >48 | 303 | 557 | 892 | 1104 | 1264 | | | | | |
| 43 | >57 | 1285 | 1291 | 1906 | 2156 | | | | | | |
| 45 | >6E | 321 | 970 | 1181 | 1273 | 1345 | 1357 | 1551 | | | |
| 44 | >69 | 319 | 421 | 1579 | 1710 | 1793 | 1798 | 1837 | 1885 | 1891 | 2048 |
| 46 | >7A | 742 | 1298 | 1466 | 1558 | 1586 | 2046 | | | | |
| 216 | ADD | 186 | 226 | | | | | | | | |
| 481 | ADDC | 347 | 479 | 486 | 1384 | | | | | | |
| 347 | ADDC> | 63 | | | | | | | | | |
| 1340 | ADRNGT | 1331 | | | | | | | | | |
| 294 | ARICL | 55 | | | | | | | | | |
| 329 | BLANK | 59 | 320 | 339 | 1711 | 1799 | | | | | |
| 970 | BLNKWT | 454 | 659 | | | | | | | | |
| 1063 | C<ACL> | 1058 | | | | | | | | | |
| 1089 | C<ACLR | 1063 | 1084 | | | | | | | | |
| 973 | C<GAZC | 969 | | | | | | | | | |
| 1116 | C<INC | 1100 | | | | | | | | | |
| 1345 | C<MIN | 1307 | | | | | | | | | |
| 1878 | C<M<BT | | | | | | | | | | |
| 1055 | C<NAZC | | | | | | | | | | |
| 1648 | C<PRNT | | | | | | | | | | |
| 1291 | C<RCP | 1280 | 1283 | | | | | | | | |
| 2091 | C<RST | 1970 | 2045 | | | | | | | | |
| 1970 | C<RST> | 1967 | | | | | | | | | |
| 592 | C<RST1 | 2093 | | | | | | | | | |
| 591 | C<TOG> | 586 | | | | | | | | | |
| 1933 | C<TOGL | 591 | | | | | | | | | |
| 321 | C<WSGN | 1284 | | | | | | | | | |
| 1837 | C<OT | 1830 | | | | | | | | | |
| 296 | CLEAR | 56 | 299 | | | | | | | | |
| 1224 | CLROFC | 1219 | | | | | | | | | |
| 340 | CLRPF | 333 | 337 | | | | | | | | |
| 314 | CLRPR | 58 | | | | | | | | | |
| 285 | CLRT | 57 | | | | | | | | | |
| 154 | CMDIG | 151 | | | | | | | | | |
| 1297 | CMPJT | 1295 | | | | | | | | | |
| 1973 | CNVT | 1969 | | | | | | | | | |
| 2010 | CNVTAR | | | | | | | | | | |
| 1995 | CNVT1 | 1985 | 2023 | 2039 | | | | | | | |
| 2067 | CNVT2 | 2102 | | | | | | | | | |
| 2077 | CNVT3 | 2081 | | | | | | | | | |
| 2162 | CRCAZ | 354 | | | | | | | | | |
| 354 | CRCTAZ | 348 | | | | | | | | | |
| 348 | CRTAZ> | 71 | | | | | | | | | |
| 949 | CZTIM | 929 | 933 | 937 | | | | | | | |
| 500 | DELAY | 350 | | | | | | | | | |

PPS ASSEMBLY LISTING

| DEF | SYMBOL | REFERENCES | | | | | |
|---|---|---|---|---|---|---|---|
| 350 | DELAY> | 65 | | | | | |
| 504 | DELY1 | 510 | 516 | | | | |
| 511 | DELY2 | 505 | | | | | |
| 517 | DELY3 | 513 | 524 | | | | |
| 1499 | DISPON | 1496 | | | | | |
| 464 | DL.4MS | 351 | | | | | |
| 1482 | DLOOPA | 1486 | 1498 | | | | |
| 1491 | DLOOPB | 1494 | | | | | |
| 351 | DLY.4> | 67 | | | | | |
| 1715 | ENTDIG | 1709 | | | | | |
| 1913 | ENTFCT | 1812 | | | | | |
| 1890 | ENTKBT | | | | | | |
| 1903 | FCNDUN | 1800 | 1848 | 1889 | 1917 | | |
| 380 | FCPTY | 345 | | | | | |
| 345 | FCPTY> | 61 | | | | | |
| 393 | FCPTY1 | 386 | 390 | | | | |
| 398 | FCPTY2 | 394 | | | | | |
| 405 | FCPTY3 | 401 | | | | | |
| 1800 | FOUN> | 1805 | 1809 | 1819 | | | |
| 1848 | FOUN>> | 1826 | 1834 | 1853 | 1857 | 1862 | 1877 |
| 860 | FLTWGT | 853 | 858 | | | | |
| 872 | FLTWT1 | 867 | | | | | |
| 842 | INIFLT | 835 | | | | | |
| 1271 | ITLKCK | 1263 | | | | | |
| 20 | KAF | | | | | | |
| 1736 | KBCMND | 1705 | | | | | |
| 1906 | KBDUN | 1735 | | | | | |
| 1695 | KBD1 | 1689 | | | | | |
| 541 | KBERR | 1704 | | | | | |
| 21 | KBF | | | | | | |
| 1850 | KBTARE | 1843 | | | | | |
| 1705 | KCMND> | 1685 | | | | | |
| 22 | KON | 1499 | | | | | |
| 23 | KER | 541 | 1746 | | | | |
| 1704 | KERR> | 1680 | | | | | |
| 1670 | KEYBD | 1758 | 1912 | | | | |
| 1758 | KEYBD> | 1722 | 1727 | | | | |
| 1986 | KGCNV | 1976 | | | | | |
| 2094 | KGPCNV | 2083 | | | | | |
| 2083 | KGPCV> | 2056 | | | | | |
| 2024 | KGTCNV | 2013 | | | | | |
| 24 | KLA | 1483 | | | | | |
| 25 | KLB | 1492 | | | | | |
| 26 | KTR | 1676 | | | | | |
| 27 | KTS | 1670 | | | | | |
| 1869 | KT15KG | 1664 | | | | | |
| 1874 | KT6KG | 1866 | 1875 | | | | |
| 1230 | LOLMPS | | | | | | |
| 897 | LOPPUK | 1270 | 1391 | 1413 | | | |
| 1296 | LMOUT> | 1289 | | | | | |
| 1506 | LMPOLP | 1523 | | | | | |
| 1500 | LMPOUT | 1296 | | | | | |
| 864 | LSD/2 | 871 | | | | | |
| 258 | MADDL | 266 | | | | | |
| 143 | MAGCK | 54 | | | | | |
| 147 | MAGLP | 153 | 1549 | 1841 | 1887 | | |
| 412 | MAXAZ | 944 | 2176 | | | | |
| 245 | MDIG | 267 | 282 | | | | |
| 989 | MFCTR | 984 | | | | | |
| 303 | MODECK | 69 | | | | | |
| 88 | MOVPR | 68 | | | | | |
| 421 | MOVPRX | 88 | | | | | |
| 77 | MOVX | 83 | 352 | | | | |
| 352 | MOVX> | 49 | | | | | |
| 99 | MOV5 | 51 | 134 | 425 | 461 | | |
| 97 | MOV5X | 50 | | | | | |
| 235 | MULT | 53 | 239 | | | | |
| 268 | NDIG | 251 | | | | | |
| 2044 | NOCNVT | 2079 | | | | | |

PPS ASSEMBLY LISTING

| DEF | SYMBOL | REFERENCES | | | | | | | | |
|---|---|---|---|---|---|---|---|---|---|---|
| 1918 | NOKEY | 1703 | | | | | | | | |
| 1703 | NOKEY> | 1674 | | | | | | | | |
| 1415 | NOTOV | 1406 | | | | | | | | |
| 1014 | NOZOUN | 1003 | | | | | | | | |
| 1181 | OJTFLT | 1164 | | | | | | | | |
| 1216 | OJTF1 | 1203 | 1208 | | | | | | | |
| 1227 | OJTF2 | 1212 | 1215 | 1226 | | | | | | |
| 166 | OJTPT> | 72 | | | | | | | | |
| 1431 | OJTPUT | 166 | 1412 | 1414 | | | | | | |
| 1392 | OVALCK | 1380 | | | | | | | | |
| 1352 | OW>ARI | 1349 | | | | | | | | |
| 1628 | PARITY | 572 | | | | | | | | |
| 1582 | P3CCK | | | | | | | | | |
| 1592 | P3C1 | 1604 | | | | | | | | |
| 1598 | P3C2 | 1595 | | | | | | | | |
| 1600 | P3C3 | 1597 | | | | | | | | |
| 1609 | PJUT | 1606 | 1613 | | | | | | | |
| 1606 | PJUT> | 1585 | | | | | | | | |
| 1615 | PJUTLP | 1643 | | | | | | | | |
| 2026 | PRCVV> | 2008 | | | | | | | | |
| 2040 | PRCNVT | 2026 | | | | | | | | |
| 1813 | PRNCK | 1902 | | | | | | | | |
| 1524 | PRNTR | | | | | | | | | |
| 820 | PROCNT | | | | | | | | | |
| 1551 | PRSET | 1541 | 1546 | | | | | | | |
| 1308 | PRXFCT | 1305 | | | | | | | | |
| 1372 | PRXNGT | | | | | | | | | |
| 1811 | P1/2 | 1792 | | | | | | | | |
| 1789 | P1/2CK | 1760 | | | | | | | | |
| 1801 | P1/4CK | 1790 | | | | | | | | |
| 563 | RDSWA | 590 | | | | | | | | |
| 554 | RDSWS | 1929 | 1930 | | | | | | | |
| 1930 | RDSWS> | 1924 | 1928 | | | | | | | |
| 614 | RDWGT | 593 | 609 | 612 | | | | | | |
| 660 | RDWGT1 | 658 | | | | | | | | |
| 542 | RESET | 613 | 1849 | | | | | | | |
| 1165 | RNDBY2 | 1156 | | | | | | | | |
| 1171 | RNDBY5 | 1160 | | | | | | | | |
| 346 | RNDOF> | 62 | | | | | | | | |
| 476 | RNDOFF | 346 | | | | | | | | |
| 1177 | RNDWT1 | 1173 | | | | | | | | |
| 1180 | RNDWT2 | 1170 | | | | | | | | |
| 567 | RSLJOP | 577 | | | | | | | | |
| 1651 | RSTPR> | 1649 | | | | | | | | |
| 1667 | RSTPTR | 1651 | | | | | | | | |
| 227 | SOUN | 200 | 215 | | | | | | | |
| 28 | SES | 539 | | | | | | | | |
| 2103 | SETDI | 887 | | | | | | | | |
| 353 | SETRC> | 70 | | | | | | | | |
| 2156 | SETRCP | 353 | | | | | | | | |
| 1962 | SETTF | 1940 | 1945 | 1949 | 1956 | | | | | |
| 29 | SJS | 464 | 535 | 565 | 568 | 581 | 656 | 673 | 702 | 1514 | 1516 |
| | | 1539 | 1611 | 1632 | 1646 | 1655 | 1661 | 1666 | 1669 | | |
| 1051 | STARE | 1015 | 1027 | 1034 | | | | | | |
| 1015 | STARE> | 1007 | 1011 | | | | | | | |
| 952 | SJBAZ | 942 | 945 | | | | | | | |
| 888 | SJBOI | 2133 | | | | | | | | |
| 187 | SJBL | 66 | 197 | | | | | | | |
| 201 | SJBM | 199 | | | | | | | | |
| 208 | SJBML | 214 | | | | | | | | |
| 175 | SJBT | 52 | | | | | | | | |
| 1818 | TARECK | 1814 | | | | | | | | |
| 1899 | TOUN | 1836 | | | | | | | | |
| 1277 | TOUNCK | 1272 | | | | | | | | |
| 1879 | TL7CO> | 1868 | | | | | | | | |
| 1407 | TPBLK | 972 | 1290 | | | | | | | |

PPS ASSEMBLY LISTING

| DEF | SYMBOL | REFERENCES | | | | |
|---|---|---|---|---|---|---|
| 1284 | TPCLR | 1276 | 1351 | | | |
| 2141 | TPROS | 344 | | | | |
| 344 | TPROS> | 60 | | | | |
| 721 | T2CNVT | | | | | |
| 664 | T2LJOP | 675 | | | | |
| 777 | T3CNVT | | | | | |
| 693 | T3LJOP | 704 | | | | |
| 884 | UOFNT | 841 | 859 | 877 | | |
| 432 | UOONT | 349 | | | | |
| 349 | UOONT> | 64 | | | | |
| 455 | UOONT1 | 450 | 453 | | | |
| 1343 | UOTPXF | 1339 | | | | |
| 1151 | UOZLF | 1148 | | | | |
| 1744 | VFYCK | | | | | |
| 922 | X10CLR | 540 | | | | |
| 910 | X10EXP | | | | | |
| 926 | ZCAPT | 909 | | | | |
| 1122 | ZLAMP | 1103 | 1108 | 1112 | 1115 | 1118 |
| 1760 | 1/PCK> | 1745 | | | | |

What is claimed is:

1. Digital weight measuring apparatus comprising, in combination, scale apparatus, generating means connected to said scale apparatus for generating digital signals representing the weight on said scale apparatus, digital weight display apparatus, control means interconnected with said generating means and with said digital weight display apparatus to control the digital weight display apparatus to display the weight on the scale apparatus, switch means interconnected with the control means operable with a weight on the scale apparatus to change the weight on the scale displayed by said digital weight display apparatus in pounds to the weight on the scale apparatus displayed by said digital weight display apparatus in kilograms, storage means for storing a tare weight, means responsive to operation of the switch means to convert the stored tare weight from pounds to kilograms, and means to subtract the converted tare weight from a gross weight on the scale apparatus.

2. Digital weight measuring apparatus in accordance with claim 1 comprising in combination storage means for storing the price per unit, means responsive to the operation of said switch means for converting the stored price per unit from price per pound to price per kilogram, and means for multiplying the weight on the scale means by the converted price per kilogram to obtain the value of the weight on the scale means.

3. Digital weight measuring apparatus in accordance with claim 1 comprising in combination storage means for the price per unit information means responsive to the operation of said switch means for clearing from the storage means previously stored price per unit information.

4. Digital weight measuring apparatus comprising, in combination, scale apparatus, generating means connected to said scale apparatus for generating digital signals representing the weight on said scale apparatus, digital weight display apparatus, control means interconnected with said generating means and with said digital weight display apparatus to control the digital weight display apparatus to display the weight on the scale apparatus in kilograms, storage means for storing a zero correction factor, switch means interconnected with the control means, and means responsive to operation of the switch means to convert the stored zero correction in pounds to kilograms.

5. Digital weight measuring apparatus comprising in combination scale apparatus, generating means connected to said scale apparatus for generating digital signals representing the weight on the scale apparatus, said generating means including integrating apparatus, means for connecting the integrating apparatus to the scale apparatus for different time intervals for different scale capacities, switch means interconnected with said digital weight measuring apparatus operable when a weight is on the scale apparatus to change the time the integrating apparatus is connected to the scale apparatus.

6. Digital weight measuring apparatus in accordance with claim 5 wherein the generating means generates digital signals representing the weight on the scale apparatus in pounds in response to the connection of the integrating means to the scale means for one of the time intervals.

7. Digital weight measuring apparatus in accordance with claim 5, wherein the generating means generates digital signals representing the weight on the scale apparatus in kilograms in response to the connection of the integrating means to the scale means for one of the time intervals.

8. Digital weight measuring apparatus comprising in combination scale apparatus, generating means connected to said scale apparatus for generating digital signals representing the weight on the scale apparatus, said generating means including integrating apparatus, means for connecting the integrating apparatus to the scale apparatus for different time intervals for different scale capacities, a manual switch interconnected with said digital weight measuring apparatus, said manual switch having a pound position and a kilogram position, control means interconnected with said integrating means and with said manual switch to control the generating means to generate digital weight signals in accordance with the position of the manual switch and the weight on the scale apparatus.

9. Digital weight measuring apparatus in accordance with claim 8 wherein the control means controls the connection of the integrating means to the scale apparatus for different time intervals controlled by the position of the manual switch.

10. Digital weight measuring apparatus in accordance with claim 9 wherein the ratio of the two different time intervals is substantially equal to the ratio between pounds and kilograms.

11. Digital weight measuring apparatus in accordance with claim 8, wherein the control means includes storage means for storing zero correcting weight signals, means responsive to a change in the position of said manual switch to convert the stored zero correcting weight signals in accordance with the new position of the manual switch, and means for correcting the generated digital weight signals by the converted zero (correction) correcting weight signals.

12. Digital weight measuring apparatus in accordance with claim 8, wherein the control means includes storage means for storing unit price information and means responsive to a change in the position of the manual switch for clearing the storage means of previously stored unit price information.

13. Digital weight measuring apparatus in accordance with claim 8, wherein the control means includes storage means for storing tare weight signals and means responsive to a change in the position of the manual switch for converting the stored tare weight signals in accordance with the new position of the manual switch and means for changing the generating weight signals by the converted tare weight signals.

14. Digital weight measuring apparatus in accordance with claim 8, wherein, the control means includes storage means for storing unit price information and means responsive to a change in the position of the manual switch for converting the stored unit price information in accordance with the new position of the manual switch and means for computing the total price from the weight signals and the converted unit price information.

15. Digital weight measuring apparatus comprising in combination scale apparatus, switch means having a pound position and a kilogram position, digital weight generating means interconnected with the scale apparatus and with the switch means for generating digital weight signals representing the weight on the scale apparatus in accordance with the position of the switch means, means for storing a weight correction factor, and programmable control means interconnected with the digital weight generating means and the switch means responsive to a change in position of the switch means to convert the stored weight correction factor in accordance with the changed position of the switch means.

16. Digital weight measuring apparatus comprising in combination scale apparatus, switch means having a pound position and a kilogram position, digital signal weight generating means interconnected with the scale apparatus and with the switch means for generating digital weight signals representing the weight on the scale apparatus in accordance with the position of the switch means, storage means for storing a tare weight, and programmable control means interconnected with the digital signal weight generating means and with the switch means responsive to a change in position of the switch means to convert the stored tare weight in accordance with the changed position of the switch means.

17. Digital weight measuring apparatus comprising in combination scale apparatus, switch means having a pound position and a kilogram position, signal generating means interconnected with the scale apparatus for generating signals representing weight on the scale apparatus, the signal generating means including integrating apparatus, a programmable microcomputer interconnected with the signal generating means and with the switch means for interconnecting the integrating apparatus with the scale apparatus for different lengths of time in accordance with the position of the switch means, storage means for storing a weight correction factor, the programmable microcomputer including means responsive to a change in position of the switch means to convert the weight correction factor in accordance with the changed position of the switch means.

18. Digital weight measuring apparatus in accordance with claim 17 further comprising storage means for storing unit price information and wherein the programmable microcomputer includes means responsive to a change in position of the switch means to clear the unit price storage means.

19. Digital weight measuring apparatus in accordance with claim 17 further comprising storage means for storing unit price information and wherein the programmable microcomputer includes means responsive to a change in position of the switch means to convert the unit price information in accordance with the changed position of the switch means.

* * * * *